United States Patent [19]
Liron

[11] Patent Number: 6,084,864
[45] Date of Patent: *Jul. 4, 2000

[54] TRAFFIC ROUTING FOR SATELLITE COMMUNICATION SYSTEM

[75] Inventor: Moshe L. Liron, Palo Alto, Calif.

[73] Assignee: Teledesic LLC, Belevue, Wash.

[*] Notice: This patent is subject to a terminal disclaimer.

[21] Appl. No.: 08/960,487

[22] Filed: Oct. 29, 1997

Related U.S. Application Data

[63] Continuation of application No. 08/481,573, Jun. 7, 1995, Pat. No. 5,740,164, which is a continuation-in-part of application No. 07/016,204, Feb. 18, 1987, and application No. 08/203,140, Feb. 28, 1994, abandoned.

[51] Int. Cl.$^7$ .................................................. H04B 7/185

[52] U.S. Cl. ........................... 370/316; 370/356; 370/394

[58] Field of Search ..................................... 370/316, 351, 370/355, 356, 389, 394, 254, 255, 352; 342/351

[56] References Cited

U.S. PATENT DOCUMENTS

| | | | |
|---|---|---|---|
| 5,471,467 | 11/1995 | Johann | 370/60 |
| 5,600,638 | 2/1997 | Bertin et al. | 370/351 |
| 5,740,164 | 4/1998 | Liron | 370/316 |

Primary Examiner—Chi H. Pham
Assistant Examiner—Kim T. Nguyen
Attorney, Agent, or Firm—Christensen O'Connor Johnson & Kindness PLLC

[57] ABSTRACT

Methods and apparatus which route, control and manage traffic throughout a Satellite Communication System operating in low Earth orbit are disclosed. Voice, video and data traffic from terrestrial gateways (G) and from portable (P), mobile (M) or fixed (F) terminals are directed up through the constellation of satellites (S) and back down to destinations on Earth. The satellites provide continuous worldwide communication services while insuring uniform end-to-end transmission delays. The satellite network is highly adaptive to the constantly changing network topology, and will offer a synchronous circuit switched communication service that provides sequential delivery of user data, regardless of the type of the data transmitted. The network employs datagram switching, as opposed to conventional virtual circuit switching techniques. Packets associated with a single phone call do not necessarily travel along the same route, and consequently arrive at their common destinations at different times with a variable transmission delay. Packets (26) received from a portable (P), mobile (M) or fixed (F) terminal, from a satellite (S), or from a stationary gateway (G) are dispatched from an origin node (OUR_NODE) to a destination node (DEST_NODE) according to address instructions carried in the packet header (28). At each node, propagation delay vectors OUR_DELAY_EST [DEST_NODE, ℓ] are calculated using local computers. These delay vectors estimate a time delay which the packet (26) encounters in traveling from the origin node (OUR_NODE) to the destination node (DEST_NODE). An optimal route (opt_link) is then selected from the set of calculated delay vectors, and the packet (26) is routed to the destination node (DEST_NODE) via the pathway (opt_link) that insures both the lowest end-to-end delay and the best overall traffic management of the network.

6 Claims, 101 Drawing Sheets

Microfiche Appendix Included
(2 Microfiche, 161 Pages)

MAJOR NODE SOFTWARE SYSTEMS

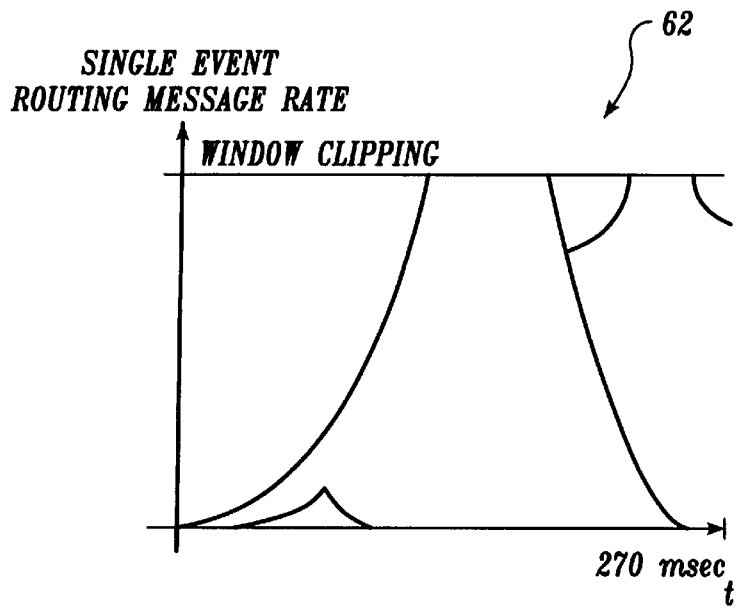
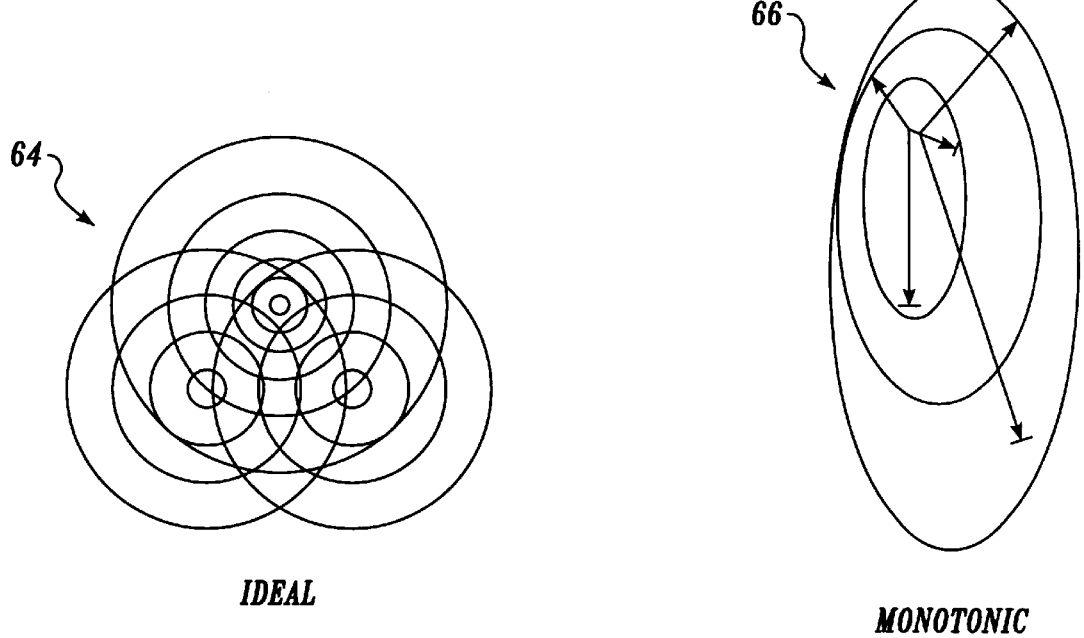
Fig. 10a
Fig. 10b
Fig. 10c

OM: FOOTPRINT OUTPUT MODULE (1 OF 8)

IM: FOOTPRINT INPUT MODULE (1 OF 8)

PACKET ROUTER

SYSTEM MESSAGE SWITCHING ARCHITECTURE

SYSTEM ARCHITECTURE

SWITCH ARCHITECTURE

DISTRIBUTED CONTROL ARCHITECTURE

RF POWER VS. SWITCH BANDWIDTH
AT MAX CALL CAPACITY (46,080 CALLS)

PACKET STRUCTURE

IPP: INPUT PACKET PROCESSOR

128X128 SWITCH

80X80 FAST PACKET SWITCH

OM: FOOTPRINT OUTPUT MODULE (1/42)

RF POWER VS. SWITCH BANDWIDTH
AT MAX CALL CAPACITY (46,080 CALLS)

SYSTEM MESSAGE SWITCHING ARCHITECTURE

GSL SWITCHING MATRIX

INPUT OUTPUT PACKET PROCESSOR BOARD

IPP: INPUT PACKET PROCESSOR

PACKET SWITCH TO FOOTPRINT:
OUTPUT PACKET STRUCTURE

*128X128 SWITCH*

FPS OUTPUT LINK SELECTION HARDWARE

TRAFFIC ROUTING FOR SATELLITE COMMUNICATION SYSTEM

CROSS-REFERENCES TO RELATED PATENT APPLICATIONS

This application is a continuation of U.S. application Ser. No. 08/481,573 filed Jun. 7, 1995, now U.S. Pat. No. 5,740,164, issued Apr. 14, 1998, which is a continuation-in-part of application Ser. No. 07/016,204, filed Feb. 18. 1987, and U.S. application Ser. No. 08/203,141 filed Feb. 28, 1994. now abandoned.

REFERENCE TO MICROFICHE APPENDIX

This Application includes a Microfiche Appendix (2 microfiche, 161 frames).

FIELD OF THE INVENTION

The present invention relates to the field of satellite communications. More particularly, this invention provides routing methods and hardware for transporting packets of data through a low Earth orbit satellite network. The network offers synchronous circuit switched communication services with uniform end-to-end transmission delays.

BACKGROUND OF THE INVENTION

A variety of technical advances over the past few decades has improved the capacity of communications networks to transport information over great distances. On a small scale, personal computers can be linked by networks called "local area networks" (LANs). Aside from the physical pathways such is cables and fibers which couple together independent machines, local area networks must embody specific formats, protocols or standards which delineate the way that messages are conveyed from one node to another. One standard may govern the size or length of a message or define how the messages are checked for errors, while another might set the speed at which the messages are sent. In a very simple network, a direct and permanent connection between two nodes provides for a straightforward and relatively uncomplicated environment for the transfer of messages. An introductory description of conventional network technology may be found in Chapter 18 of William Schweber's text entitled *Electronic Communication System*, published in 1991 by Prentice-Hall, Inc.

By way of a simple analogy, the messages conveyed along the permanent and unchanging link are like passengers on a train traveling through a tunnel between two stations, one in San Francisco and another in Oakland, located across the bay from each other at each end of the tunnel. The routs from San Francisco to Oakland is the only route available in our simple network, and all the passengers must use this pathway to complete the trip. Even if we are concerned about preserving the order in which our hypothetical passengers arrive at the second node in Oakland, the physical arrangement or "topology" of this simple network that extends only from San Francisco to Oakland guarantees that the first car of the train will arrive at the Oakland station ahead of the all the rail cars trailing behind it. Suppose, however, that once the passengers disembark at Oakland, they all need to travel to their ultimate common destination, New York City. The distance from Oakland to New York is much longer than the span between San Francisco and Oakland, and, if we continue to restrict our network to train travel, the second leg of the journey can be accomplished by a variety of routes. Some passengers might choose to take a rather direct route through Denver or Chicago, while others might take a detour north to Seattle or south to Los Angeles, and then on to New York after their various diversions. The increased complexity of our imaginary network arises out of the diversity of the choices available to the passengers in Oakland and presents a serious problem if we want to make sure that the passengers arrive in New York from Oakland in the same order in which they arrived in Oakland from San Francisco. The travelers who selected the more direct routes will most probably arrive at the destination node in our network before those who wandered away from the shortest link to New York. As a consequence, the sequence of arrivals is almost certain to be different from the pattern of arrivals experienced in the shorter trip from San Francisco to Oakland.

While maintaining the order of arrivals of individual passengers on a train may not matter much in the real world, preserving the integrity of a series of messages in a communication system is vital. If our rail passengers represent portions or blocks of conversation that are conveyed electronically between two people talking to each other on the telephone, any jumbling or transposition of words or sounds spoken by either party would result in a conversation that would be difficult or perhaps impossible to follow. Although many phone calls are routed through an unchanging wire link like the railroad tunnel in the analogy described above, the pathways that are used to convey some phone calls which extend across the continent or around the world travel over routes that can change during the course of the phone call. In some modern communication networks that bridge great distances, some portions of the train of speech may move along a wire or a cable, while other portions of the same phone call may be carried along an optical fiber or through the air between two microwave antenna towers. In a small number of current systems, the electrical messages comprising the voice information of the phone call are broken up into many separate digitized sequences called "packets" and are routed individually to avoid congestion in the network and to optimize the efficiency of the entire system. Some packets are conveyed along relatively direct itineraries, while others reach the same destination via more circuitous connections. Because small segments of an entire e all are separately routed over different links but ultimately are all destined for the same target location within the network, we must manage the receipt of arriving packets at the destination node. Usually this process entails complex sorting and re-ordering, so that the information can be presented to the recipient in an intelligible form.

The problem presented by the jumbled order of arrival of the packets is compounded by the human ear's sensitivity to the very brief and unnatural gaps in time that arise in a telephone conversation that links customers over great distances. When the span between the origin and destination of a message is relatively long, the propagation delays that arise due to the long distances the messages must journey can pose a serious predicament. Even though electrical signals traveling down a cable can exceed speeds of 120,000 miles per second, a trip from the United States to Asia measuring 10,000 miles can take nearly one tenth of a second. While this amount may not seem like a large delay, our hearing is so sensitive that in the course of normal conversation the introduction of a slight time lag of only one tenth of a second can be quite irritating. Delays exceeding one and one half tenths, or 150 milliseconds, can impair auditory perception to the extent that ordinary two way conversation becomes very difficult.

Since the inherent delay of nearly one tenth of one second that is generated by a phone call which is delivered through a 10,000 mile land and sea link from New York to Singapore is itself an impediment to aural perception, the use of geosynchronous satellites orbiting over 22,000 miles above the Earth poses a severe delay problem. A passage of 44,000 miles between two distant Earth stations would consume nearly 250 milliseconds. The portion of long-distance telephone traffic which is relayed by some satellite networks must employ complex signal processing to re-order packets which arrive at their destination out of sequence. These networks must also include circuitry that compensates for the troublesome delays introduced by the vast distances the digital information must travel to reach their common destination.

In some conventional packet networks, packets are carried to their destination through a pathway called a "virtual circuit". A virtual circuit is a route through a network from an origin to a destination that is established at the initiation of a call, and then is released when the call is terminated. The virtual circuit defines a path that includes nodes and links in the network that are used by all the packets associated with the virtual circuit. The packets arrive at their destinations by following instructions or maps that are generated at the origin of the call. Any change in network topology after the call is initiated and the packet itinerary is generated, such as the failure of a node or link, causes a discontinuity in the virtual circuit. When the virtual circuit is disturbed, the packet's itinerary is no longer valid, and the call is disconnected. Re-establishing a broken call by generating a new virtual circuit every time a failure occurs is a lengthy, inefficient and expensive process.

In European Patent Application EP 0 365 885, Bertiger et al. disclose a system for facilitating a global cellular/trunked mobile communication system for voice and data. The system employs a number of low Earth orbiting satellites having links directly to the users and via the public switched telephone network to other users. The satellites are interconnected by links. Switching intrasatellite or to other satellites via the links is performed by each of the satellites. Calls are handed-off as satellites move out of range of a particular telephone user. Bertiger et al. aver that the system determines to which appropriate satellite or cell a call is to be switched and an optimal path from itself to the next appropriate satellite (Bertiger at col. 4, line 19–25). However, Bertiger et al. does not describe how the "next appropriate satellite" is determined nor how an optimal path to that satellite is found except to say the determination may be made based upon the office code portion of the telephone number called. Bertiger et al. do not teach a method of calculating an optimal path from a source node to a destination node nor do they take into account propagation delay in the transmission paths resulting from variable link path lengths, link queue delay, or processing delay. While one skilled in the art may recognize that such delays exist, such delay is trivial only in a network such as Bertiger's where the connectivity path can be fixed at the origin of the call and remains essentially continuous and unchanging.

Conventional systems that employ packets that are switched through virtual circuits are capable of providing reliable communications service in networks that are static. If the nodes and the links connecting the nodes are dynamic, the use of packets that follow directions along a fixed itinerary in a virtual circuit that was mapped at the origin of the call becomes impractical. A satellite communications system that utilizes satellites in geosynchronous orbit is generally a static system, since the spacecraft do not change position appreciably relative to relay stations on the ground beneath them. Geosynchronous satellites, however, operate in very high 22,000 mile orbits, and the propagation delays inherent in conveying signals over a nearly 50,000 mile round-trip are not acceptable for many telephone environments. Low Earth orbit systems are seen to be essentially static where one satellite merely hands off a call to another satellite which moves into its place, covering the same cells on the Earth's surface as its predecessor-in-orbit.

In U.S. Pat. No. 4,905,233, issued Feb. 27, 1990, Cain et al. disclose a mechanism for establishing at least one transmission route between a source node and a destination node in a communication network. Transmission characteristics of each of the transmission paths among the nodes of the network are monitored so as to derive a plurality of path metrics representative of the ability of the network to transmit communication signals. Feasible transmission routes from source node to destination node are selected where the sum of path metrics from neighboring nodes to the destination node is less than the path metric of a transmission path the end nodes of which correspond to the source and destination nodes. Communication signals are then transmitted from the source node to the destination node over the selected feasible transmission routes. Typical link metrics are presented which include as terms, normalized propagation plus processing delay, expected transmission delay including quelling delay. Cain et al. do not describe a specific method of packet switching arid routing in a low Earth orbit satellite communication system in which the metrics or algorithms are implemented to provide synchronous circuit switched communication services with uniform end-to-end transmission delays. While Cain et al. indicate that their system updates link metrics periodically at each node they do not appear to reveal an adaptive, dynamic, distributed routing system which continuously runs an adaptive routing algorithm to pre-calculate the optimal route for each packet, one step at a time, at each satellite. Cain's routing procedure is autonomous in that each node determines a set of routing tables with no inputs from other nodes (Cain et al. at col. 8, line 28–29. Other U.S. Patents have described methods for routing messages in a network environment. For example, in U.S. Pat. No. 4,974,224, Boone describes a method similar to Cain et al. of optimally controlling the distributed flow of signals over a multi-node communications network.

In U.S. Pat. No. 5,233,604, Ahmadi et al. disclose a packet communication system which determines routing by identifying principal paths as those having minimum hop count paths with minimum delays less than a specified threshold.

In U.S. Pat. No. 5,265,092, Soloway et al. describe a method for providing loop free, shortest path routing of data packets by assuring that the first switch to forward the packet is on the shortest path to the destination node. Each switch informs adjacent switches in the network of the information in the switch's database used to compute forwarding tables.

In U.S. Pat. No. 5,115,495, Tsuchiya et al. describe a routing scheme in which communication stations in a network inform each neighboring station of the distance between itself and the destination station. The primary path is the shortest of all possible paths to the destination station.

In U.S. Pat. No. 5,088,032, Bosack reveals an improved method for routing data transmissions among computer networks.

In U.S. Pat. No. 4,987,536, Humblet discusses a routing tree in which its estimated shortest path through all of the nodes is communicated to the next adjacent node.

In U.S. Pat. No. 4,736,363, Aubin et al. describe a path oriented routing system for allowing switched pairs to communicate over multiple paths without packet disordering.

In U.S. Pat. No. 4,399,531, Grande et al. disclose a distributed digital data communication network providing effective transmission of messages between each node by flood routing. A response message based on stored data link status obtained when a message is received through the flood routing protocol, selects the shortest time delay path for responding to that message. None of the above references describe an adaptive, dynamic, distributed routing system which continuously runs an adaptive routing algorithm to pre-calculate the optimal route for each packet, one step at a time, at each satellite in a low Earth orbiting system.

Andrew S. Tannenbaum provides instruction on the various layers of network architecture, especially point-to-point networks, satellite and packet radio networks, and transport and session layers in chapters 1, 5, 6, and 8 of his work, *Computer Networks*, published by Prentice Hall.

In *Internetworking. A Guide to Network Communications*, published by M&T Books, Mark A. Miller discusses X.25, TCP/IP and XNS protocols in chapters 5–7.

Gene White teaches bridges, routers, network routing, routing principles, 20 and routing protocols in chapter 6 of his work, *Internetworking and Addressing*, published by McGraw-Hill, Inc.

Uyless Black provides a discussion of naming, addressing, and routing in an Internet in Chapter 3 and teaches route discovery protocols in Chapter 8 of his work, *TCP/IP and Related Protocols*, published by McGraw-Hill, Inc.

The intolerably long transit delay is only one of several reasons that militate against the use of high Earth orbit geostationary satellites for a world-wide communications system. No single public communications network is presently capable of offering continuous global service to a wide variety of customers using mobile, portable, and fixed terminals. The problem of providing an economically viable, 24-hour, world-wide network for voice, data, and video has presented a major challenge to the communications business. The development of a routing methods and associated hardware which could direct packetized call traffic through a constantly changing network would constitute a major technological advance and would satisfy a long felt need within the electronics and telephone industries.

SUMMARY OF THE INVENTION

The methods and apparatus disclosed in the present Application comprise software and hardware which manage the satellite communication links between the origin and destination of telephone calls which convey voice, data, or video information. The methods of this invention select the best series of connections from a terrestrial gateway or terminal up through a satellite constellation and back down to Earth. The constellation operates in low Earth orbit, and provides continuous worldwide service. The pathway that is selected for a particular call must be highly adaptive and able to change rapidly in response to the constantly changing geometry of the low Earth orbit constellation. Based upon inputs from the position determination algorithms that define the length of each link in the system, the algorithms of the present invention determine the optimal route for each transmission from each satellite and also establishes the most efficient distribution pattern of traffic throughout the system.

The present invention will offer its end users a synchronous circuit switched communication service which provides sequential delivery of user data regardless of the type of the data transmitted and uniform end-to-end transmission delays. One of the preferred embodiments of the invention comprises an asynchronous fast packet switched network in which the user bits are collected synchronously but transported in packets having variable transmission delays. The network employs datagram switching, as opposed to conventional virtual circuit switching techniques. Packets associated with a single phone call do not necessarily travel along the same route, and consequently arrive at their common destinations at different times with a variable transmission delay. Any re-ordering of packets that arrive due to variations in transit delays are re-sequenced by circuitry that resides at the destination node. The network's switching nodes are located aboard the satellites, which are constantly moving relative to each other. This continuous motion causes the propagation delays along the links to vary perpetually. As satellites of the constellation move in their different orbits, the set of satellites visible from any network element, such as a satellite, gateway or user terminal, constantly changes. A satellite that is visible from a gateway at some particular time may not be visible a few minutes later, and a previously invisible satellite may then appear. The underlying network "topology", which is defined as the interconnection geometry among the network elements experiences constant change. Hardware and software that are collectively called the "router" must continuously adapt to the changing topology. The time varying network topology is irregular, unlike conventional regular networks that utilize ring, cube, or star topologies. The present invention uses an arbitrary mesh configuration. The network topology also changes when new satellites are deployed, when the useful lives of old satellites come to an end, or when satellite and link failures occur. The traffic intensity or "load" on links changes randomly due to normal traffic fluctuations. These load changes lead to variable link queuing delays in addition to variable link propagation delays. "News" of events in one portion of the network does not reach all nodes simultaneously, requiring the router to make decisions with imperfect information.

The present invention is implemented in a Satellite Communication System which also utilizes Switching Methods disclosed in a Patent Application referred to above. The Switching Methods disclosed in this related Application overcome the limitations encountered by conventional packet switching using virtual circuits. The Switching Methods invention utilizes a "datagram" approach that routes every packet conveyed by the system independently at every node in the network. The packets are directed along an optimized pathway through the network by a fast packet switch that directs traffic based on instructions from a microprocessor that continuously runs an adaptive routing algorithm. This microprocessor uses orbital position information generated aboard each spacecraft to monitor the rapidly changing topology of the constellation and the distribution of traffic among its nodes and links.

The hardware portion of the present invention utilizes a self-routing fast packet switch, an input packet processor, a routing cache memory and an adaptive routing processor. The input packet processor functions like a gatekeeper or guide that extracts the destination node address from each packet and uses it to access routing information stored in the routing cache memory. The adaptive routing processor constantly updates the routing cache memory so each satellite has an accurate "knowledge" of the whereabouts of all its neighbors, and of the expected packet delay from adjacent nodes to all possible destination nodes. Based upon this position and expected delay information, the adaptive routing processor selects the best pathway from a particular satellite to a single neighboring satellite, and the packet is then moved through internal switch circuitry onboard the satellite on its way to other spacecraft in its journey to some eventual destination on Earth. The switching methods of the present invention optimize the utilization of the network facilities and minimizes transmission delays and variances of transmission delays. By precalculating the optimal route for each packet one step at a time at each satellite, the amount of time required to process individual packets is greatly reduced.

An appreciation of other aims and objectives of the present invention and a more complete and comprehensive understanding of this invention may be achieved by studying the following description of preferred and alternative embodiments and by referring to the accompanying drawings.

A BRIEF DESCRIPTION OF THE DRAWINGS

FIG. 10 is a schematic that shows routing information diffusion rates.

FIGS. 55, 56, 57, 58, 59, 60 and 61 provide plots of packet time delay data.

Figure 62:
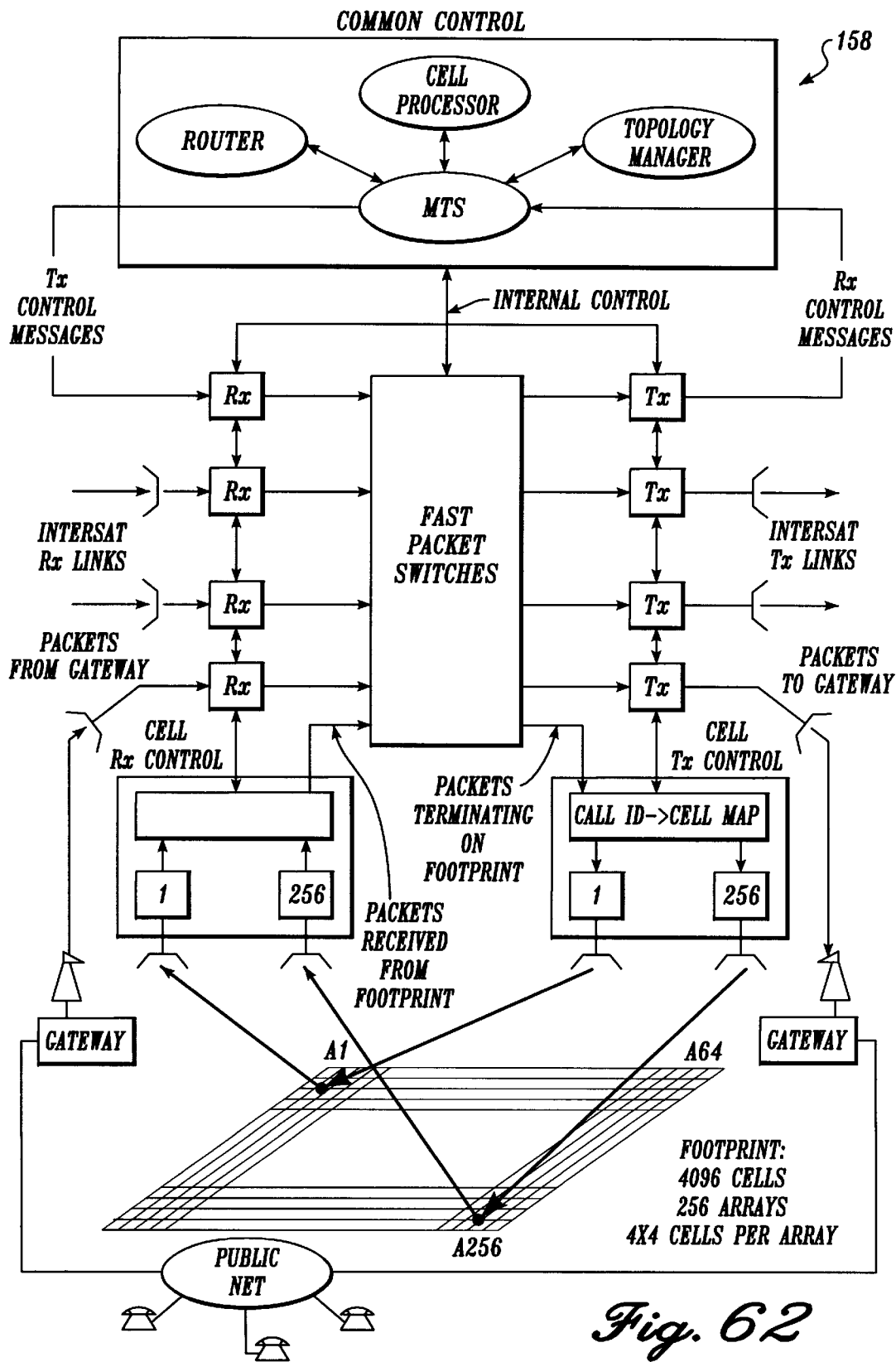

FIG. 62 reveals the fast packet switch environment.

Figure 63:
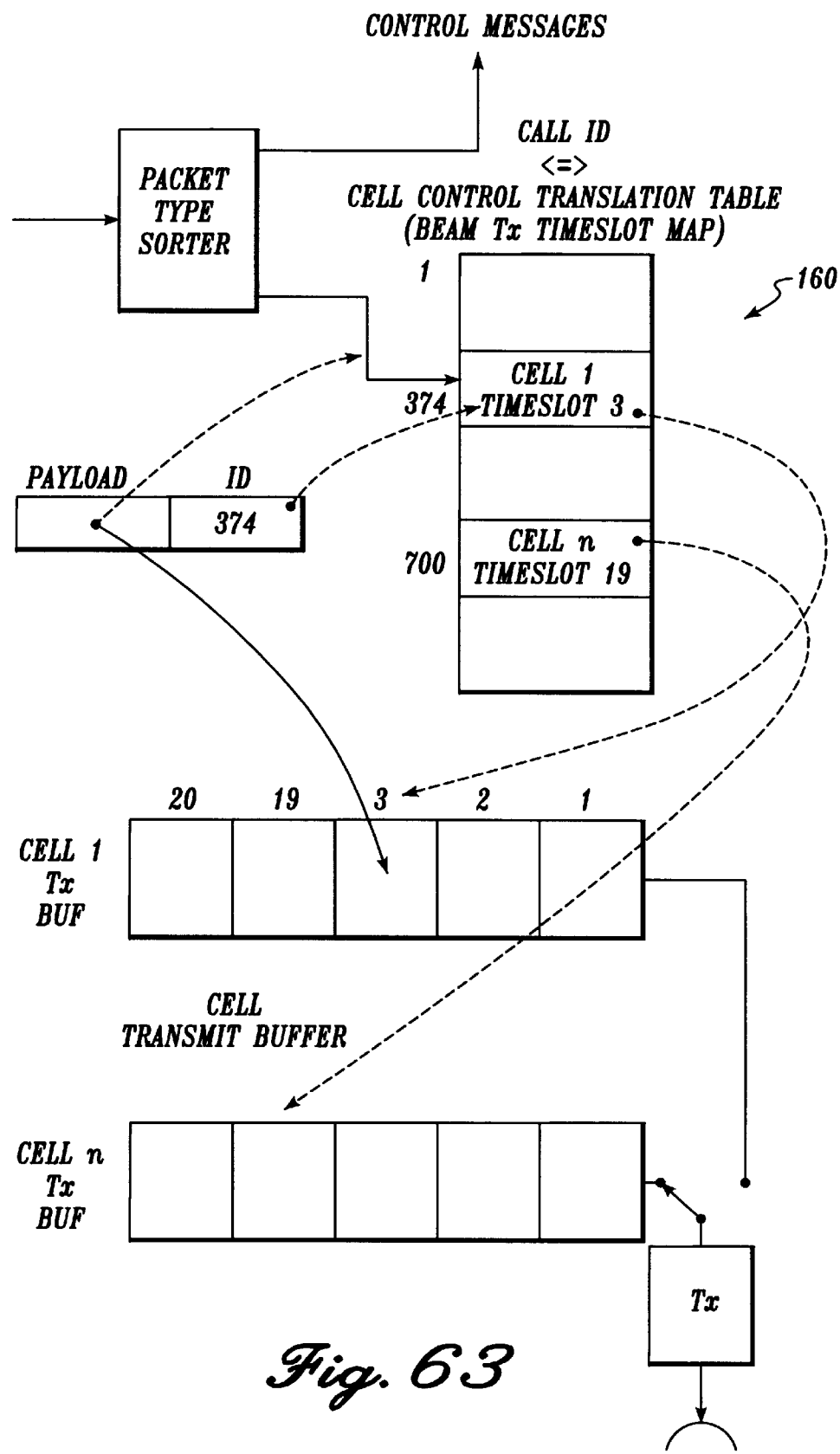

FIG. 63 shows how packets are sorted and buffered prior to transmission.

Figure 64:
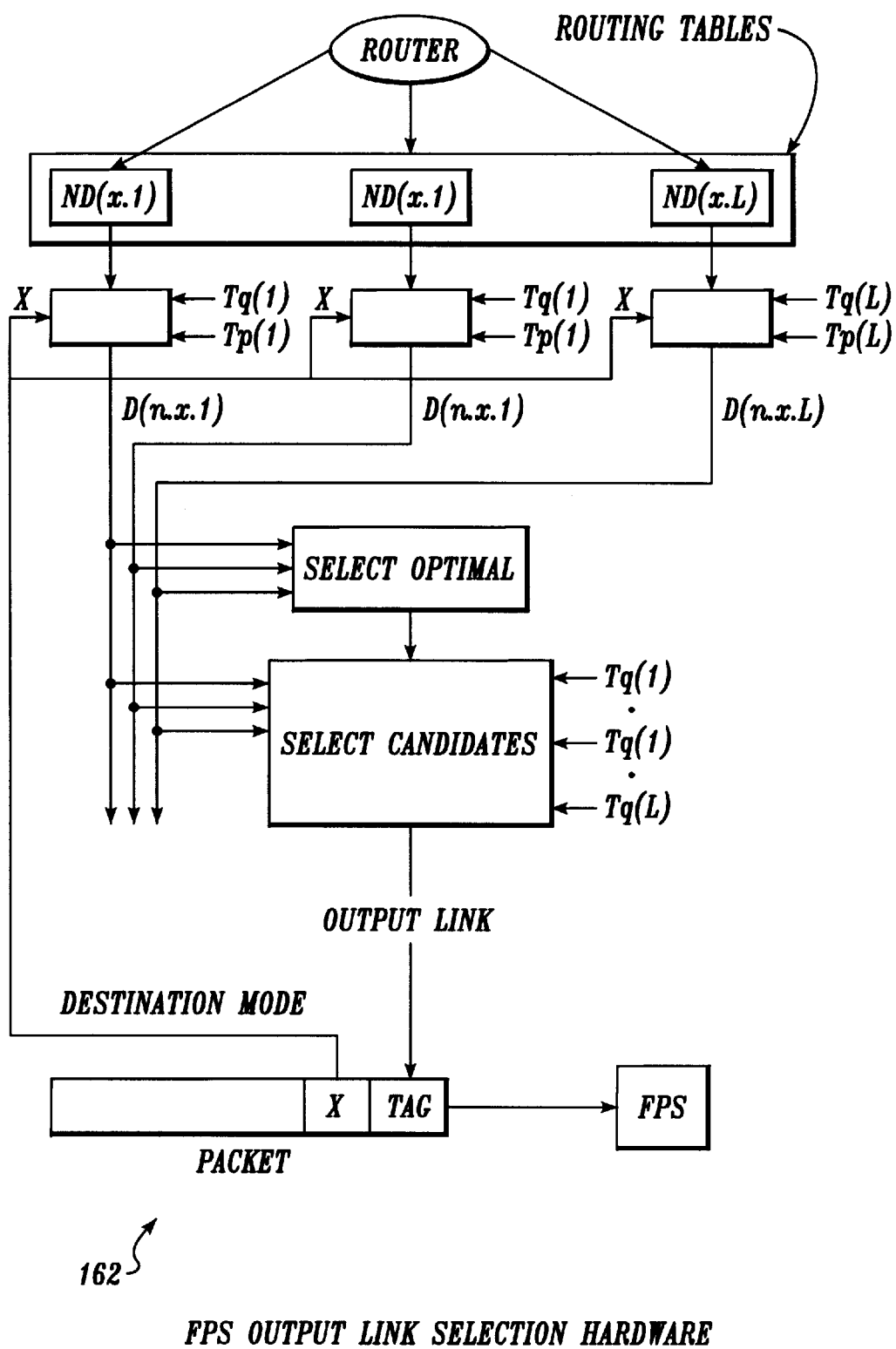

FIG. 64 is a block diagram that portrays FPS output link section hardware.

FIGS. 65, 66, 67, 68, 69, 70, 71, 72, 73, 74, 75, 75, 77, 78, 79 and 80 supply plots of packet time delay data.

Figure 81:
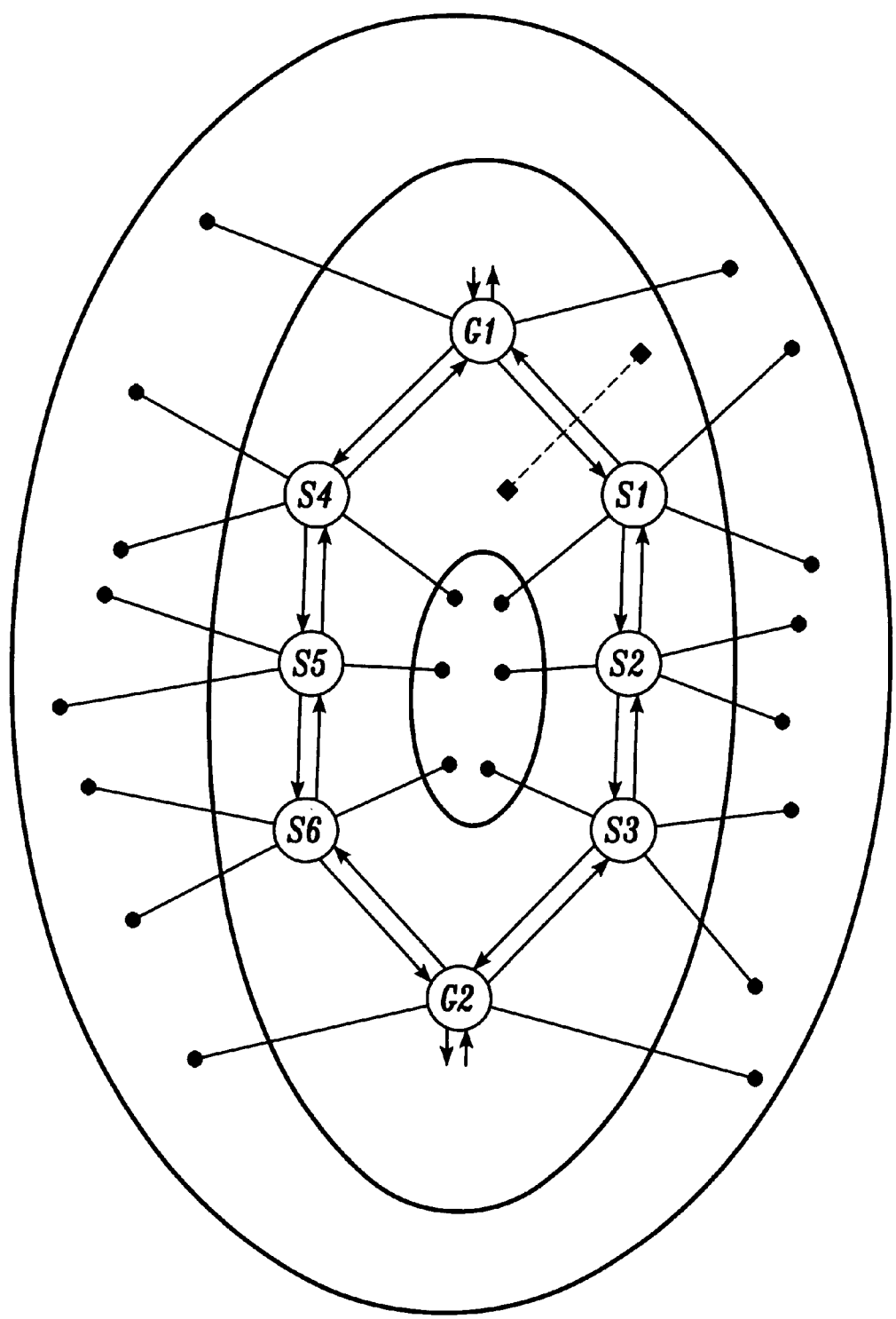

FIG. 81 depicts links among satellites and gateways.

Figure 82:
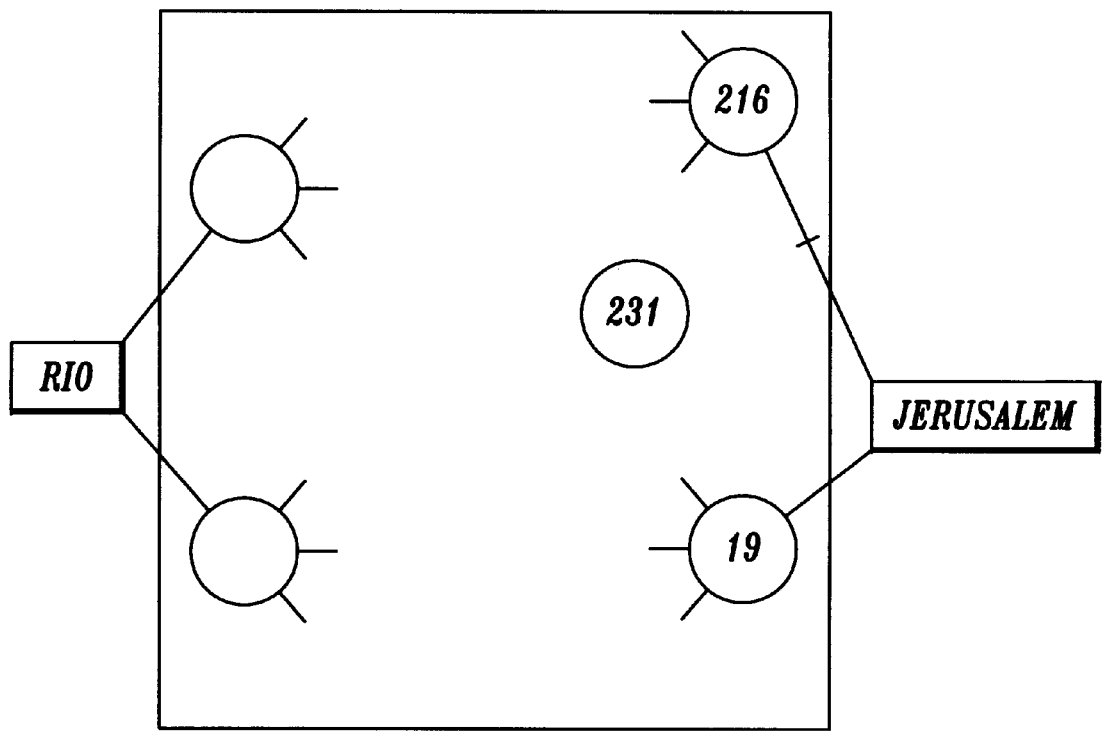

FIG. 82 portrays an example of traffic routing between Rio and Jerusalem.

FIGS. 83, 84, 85, 86, 87, 88, 89, 90, 91, 92, 93, 94, 95, 96, 97, 98, 99, 100 and 101 reveal additional information concerning packet delays.

A DETAILED DESCRIPTION OF PREFERRED & ALTERNATIVE EMBODIMENTS

The Traffic Routing Environment

The Satellite Communication System

The present inventions are intended for use in a Satellite Communication System, which is described in detail in co-pending U.S. patent application Ser. No. 08/203,140, filed on Feb. 28, 1994, by Edward F. Tuck et al. Although one of the preferred embodiments of the Satellite Communication System comprises 21 sets of 40 spacecraft traveling in 21 separate orbital planes, the discussion of the preferred embodiments of the present invention assume a satellite constellation comprising 336 satellites traveling in 21 orbits with 16 satellites in each orbit. The satellite altitude is fixed at approximately 700 km (435 miles). The relatively large numbers of satellites in the various preferred embodiments of the constellation were selected to provide continuous coverage of the Earth's surface at high angles of radiation with respect to the Earth's surface, thus avoiding foliage, terrain, and minimizing the length of the signal's passage through rain. Earth of the individual 336 spacecraft includes a sovereign routing switch which knows the position of its neighbors, and independently handles traffic without ground control. The satellites are capable of transporting calls to millions of customers using portable mobile and fixed residential and business terminals, and gateways to public phone networks. The constellation uses the 20 and 30 GHz frequency bands for communications between Earth E and the constellation, and the 60 GHz band for communicating among the satellites. The use of these extremely high frequencies allows for the use of relatively low power, miniaturized antenna components both on the ground and aboard the satellites. The entire constellation is designed to serve over twenty million subscribers and 60,000 full time DS-0 (64 kbps) circuits. The satellites will be coupled to traditional public and private phone systems on the ground through gateways which each utilize relatively large antennas and handle large volumes of call traffic. In the preferred embodiment of the invention, this interface between the terrestrial systems gateway and the terrestrial network is based on current standard ISDN interfaces to preserve compatibility. Unlike presently available cellular systems which relay calls to subscribers from local radio towers, the present invention offers direct communication between the satellites of the constellation and individuals using light-weight portable mobile and fixed telephones.

The present invention is also intended to be used in conjunction with the Non-Blocking Dynamic Fast Packet Switch for Satellite Communication System, which are described in a copending U.S. patent application Ser. No. 08/241,984, by David P. Patterson and Moshe L. Liron, filed on May 12, 1994. The Patterson and Liron Switching Method inventions comprise fast packet switch circuitry for implementing the routing methods comprising the present invention.

Two Microfiche Appendices, A and B, are included in this Specification. Appendix A presents Routing Tables calculated in accordance with a preferred embodiment of the invention. Appendix B presents listings of software code utilized to implement a preferred embodiment.

One of the important inputs to the fast packet switch circuitry is a continuous stream of orbital position information which is generated aboard each satellite by a navigation computer (not shown) running Autonomous Orbit satellite by a navigation computer (not shown) running, Autonomous Orbit Determination algorithms (AOD). The AODs compute ephemeris parameters for each satellite. These parameters are broadcast to every satellite in the constellation, so that all the spacecraft "know" their own positions and the position of every other satellite in the network. One embodiment of the AOD algorithms employs an inter-satellite ranging algorithm that calculates distances between spacecraft by measuring time delays that are inherent in fast-packet switching transmissions. A second embodiment of the AOD software incorporates an algorithm which fixes spacecraft position by computing differences in Doppler shifts of satellite transmissions. A third version uses known location fixed Earth reference stations to determine position.

Once the orbital position information is generated, it is used as an input to an adaptive routing processor which runs an adaptive routing algorithm (ARA). The ARA is a distributed algorithm run by each node in the constellation. In each node, the ARA monitors its own position relative to only its immediate neighbors, not to any of its non-neighboring nodes. The ARA constantly monitors the changing locations of all the spacecraft in the network, and also keeps track of communications traffic congestion among the links and nodes of the system. The adaptive routing processor produces an output called "Next-node-in-path-to-destination". As the name implies, this output contains information and provides instructions for moving communications data through the network one node at a time.

The Traffic Router

Figure 1:
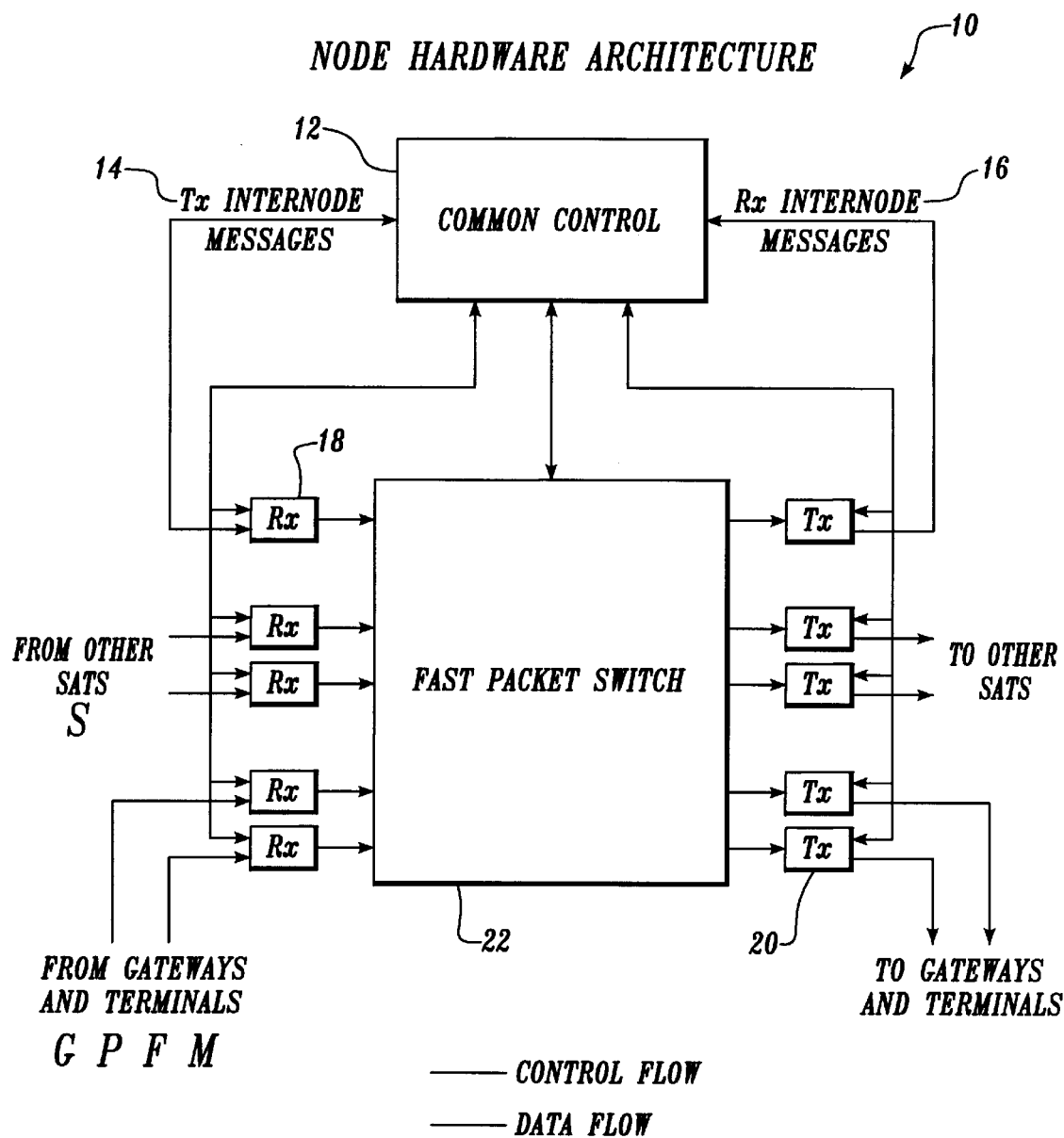
FIG. 1 is a schematic diagram of node hardware architecture.

The Satellite Communication System (SCS) described above is designed to provide its end users with synchronous circuit switched communication services. Users at a portable P, mobile M, fixed F terminal or gateway G will receive sequential deliveries of user "bits" regardless of their meaning with uniform end-to-end transmission delays. The SCS network is an asynchronous fast packet switched network in which the user bits are collected synchronously but transported in packets having a variable transmission delay. The efficiency of the network is achieved by employing "datagram" switching, as opposed to virtual circuit switching. Since one phone call may comprise many individually routed packets which may take different routes to reach a common destination, the network must include software and hardware systems which account for out-of-sequence arrivals of packets and for variations in pack et delays. FIG. 1 presents a schematic diagram which illustrates node hardware architecture 10 employed by the present invention.

A common control stage 12 aboard each spacecraft is capable of conveying internode messages 14 and 16 to receivers 18 and to transmitters 20 which communicate with other satellites S in the constellation. The common control stage 12 is also linked to a fast packet switch 22.

Figure 2:
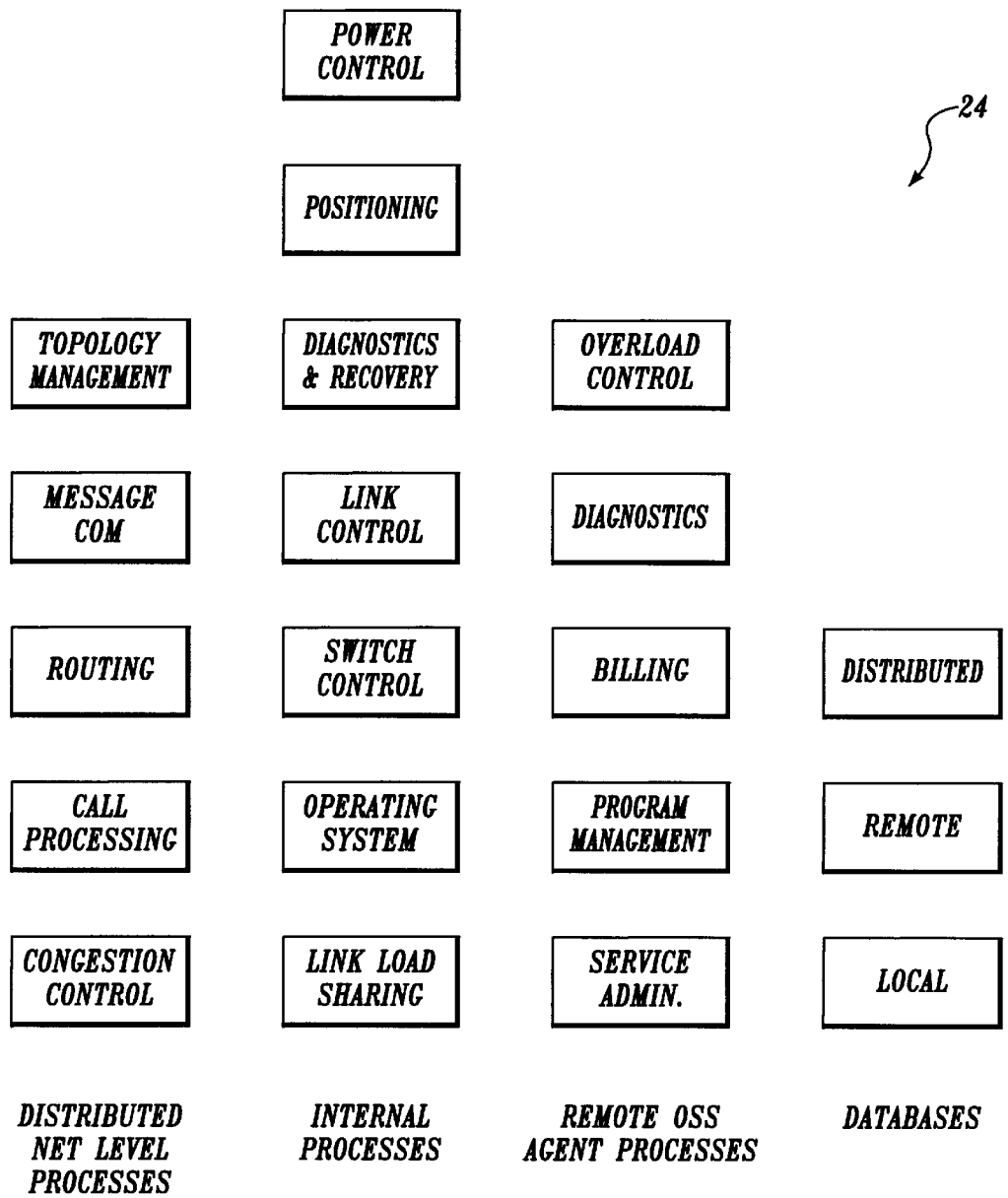
FIG. 2 is a schematic diagram of major node software systems.
Figure 3:
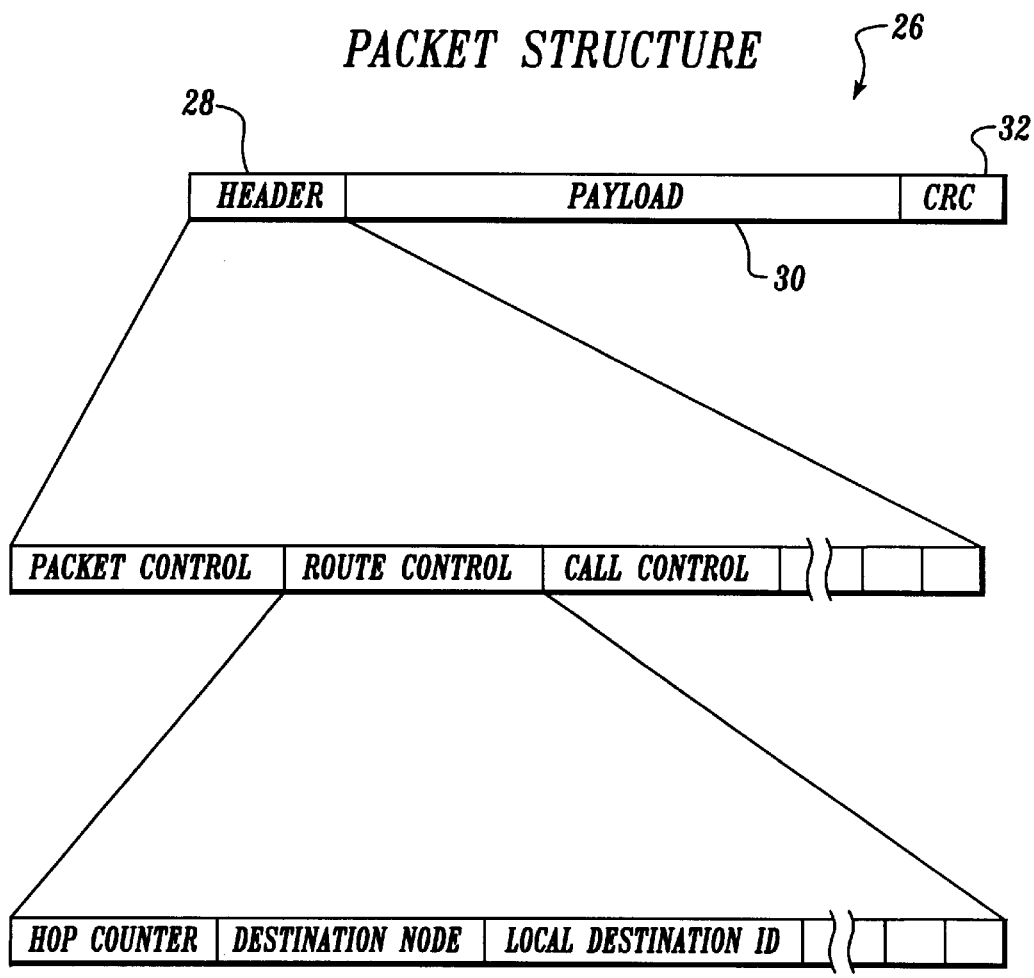
FIG. 3 is a diagram of a packet structure.

FIG. 2 depicts a chart of major node software systems 24, while FIG. 3 reveals the structure of packets 26 which are conveyed through the network. All packets 26 conveyed through the network are 512 bits long. The first portion of the packet 26 is a header 28 comprising 80 bits. The header 28 is a collection of control fields that define the packet priority and type, and contain routing information. A routing field within the header 28 includes a destination field that contains a destination node and a specific call/delivery identification within the destination node. A 416 bit payload 30 and a 16 bit cyclic redundancy check (CRC) 32 accompany the header. The payload 30 carries the substance of the message which the packet 26 transports, and the CRC 32 is used to detect errors. The structure recited above is used as a basis for all of the discussion and examples which appear in this document. For 150 Mbit links among the nodes of the network, the transmission time for a 512 bit packet 26 is:

$$T_s = \frac{512}{150,000,000} = 3.413 \text{ microseconds}$$

The discussions and examples which follow are also founded upon the presumption that all the circuits that are employed are type DSO circuits, which include a 64 Kb "payload" channel, and an associated 8K signalling and control channel. Since each packet 26 off loads 416 bits at a time from the user terminal and the DSO can generate a total of 72 Kb per second, a DSO generates $$\frac{72,000}{416} = 173.077 \text{ packets per second}$$

or one packet every 5.777 milliseconds:

$$\frac{416}{72,000} = 5.777 \text{ milliseconds}$$

Figure 4:
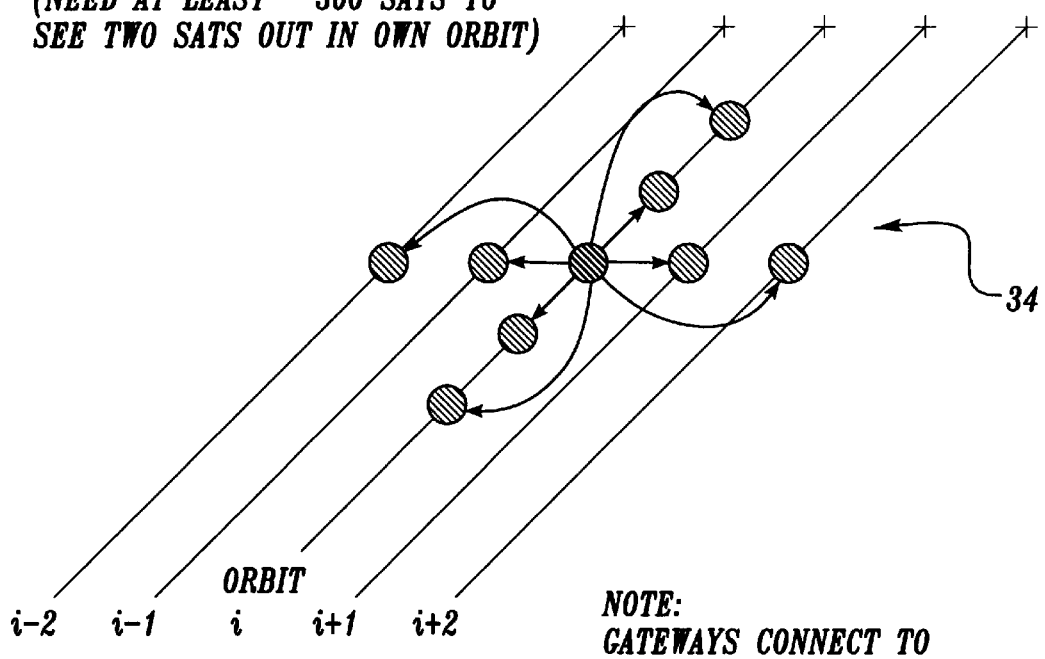
FIG. 4 is a schematic diagram of intersatellite links.

FIG. 4 portrays the generalized links 34 which couple together a group of satellites.

Figure 5:
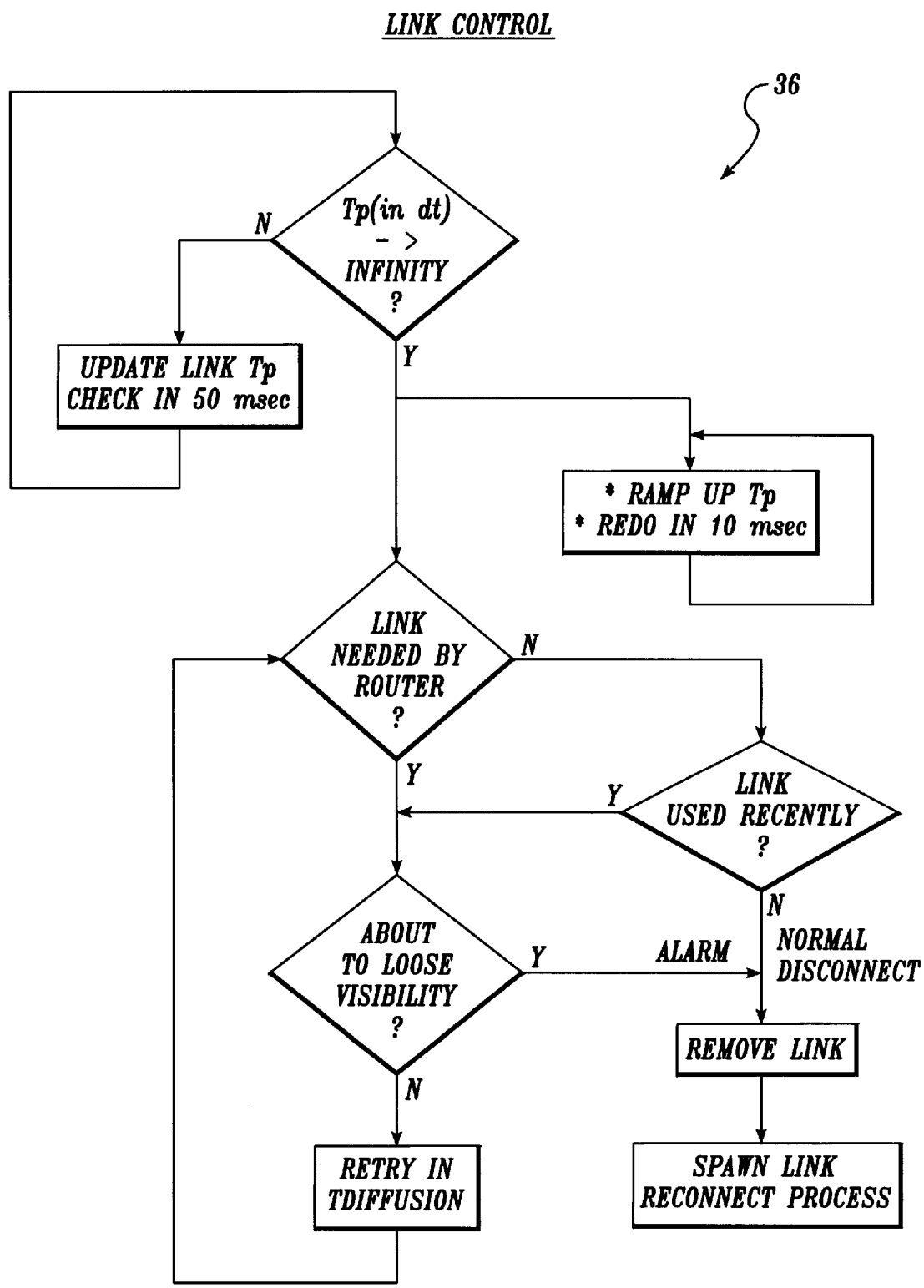
FIG. 5 is a schematic diagram of link control.
Figure 6:
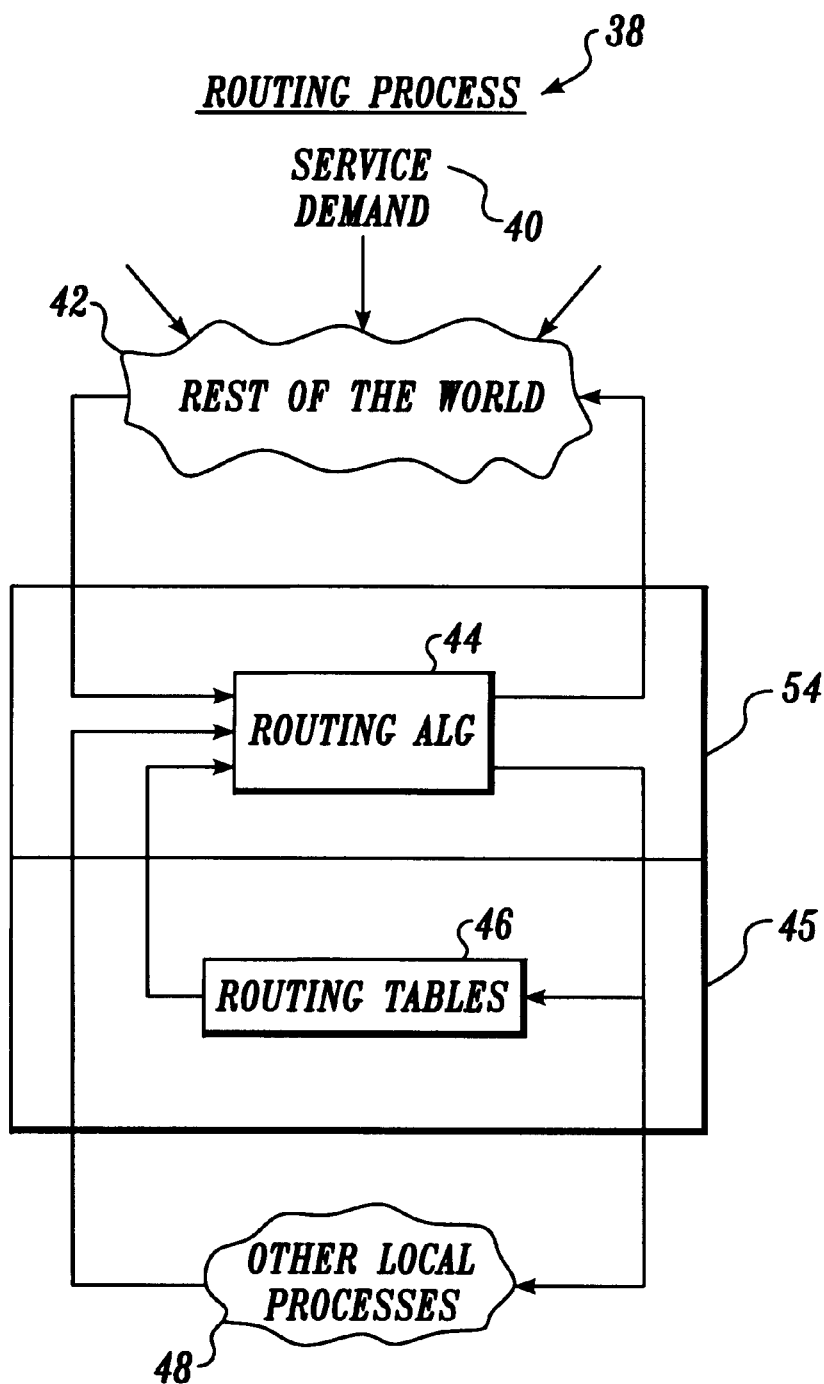
FIG. 6 is a schematic diagram of a routing process.

The link control process 36 is summarized in FIG. 5 while the routing process 38 is illustrated in the flow diagram shown in FIG. 6. Service demand 40 from subscribers 42 situated around the world prompt the routing algorithm 44 to determine optimum pathways for call traffic using routing tables 46 and other local processes 48.

Figure 7:
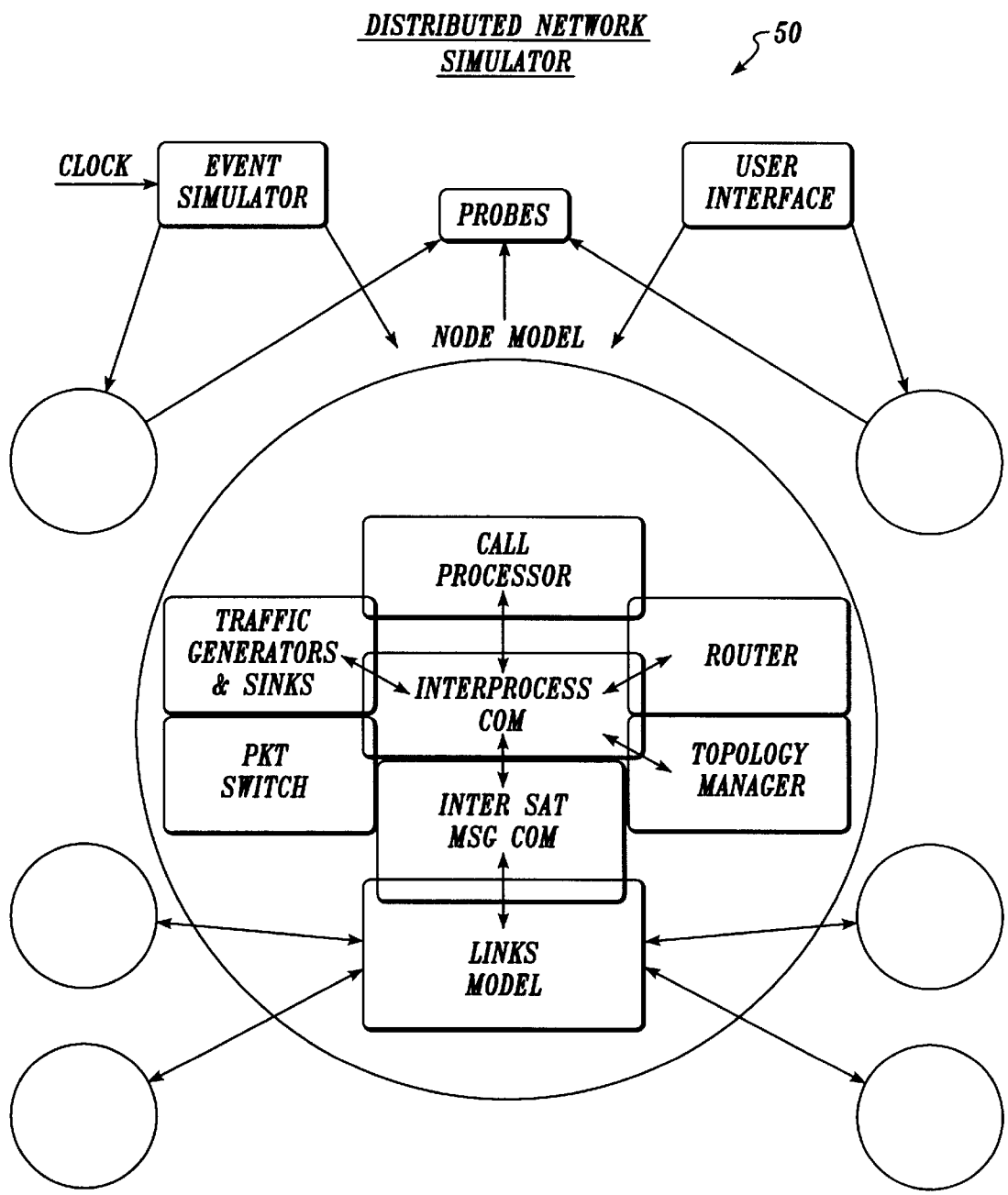
FIG. 7 is a schematic diagram of a distributed network simulator.
Figure 8:
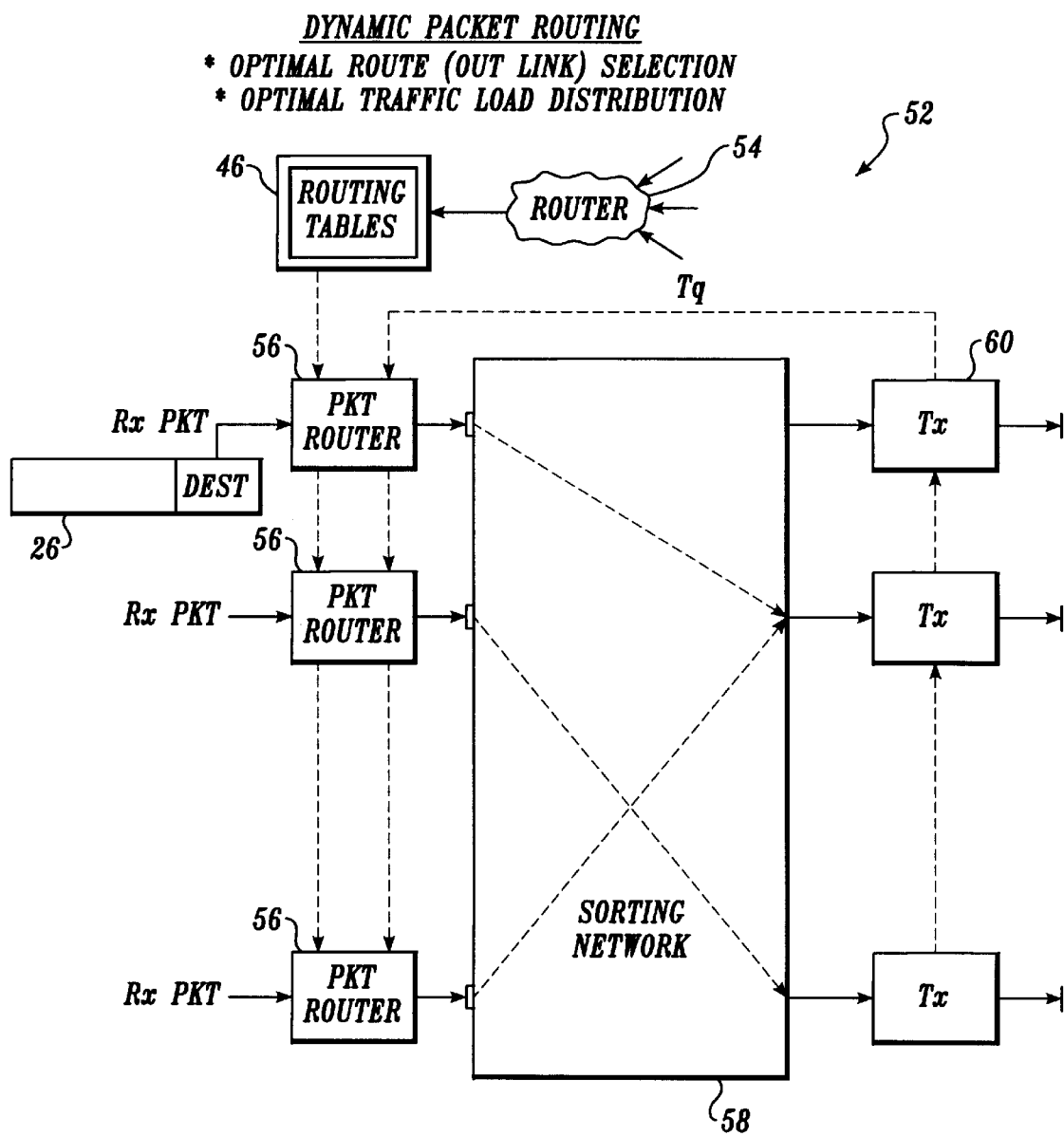
FIG. 8 is a flowchart of dynamic packet routing.
Figure 9:
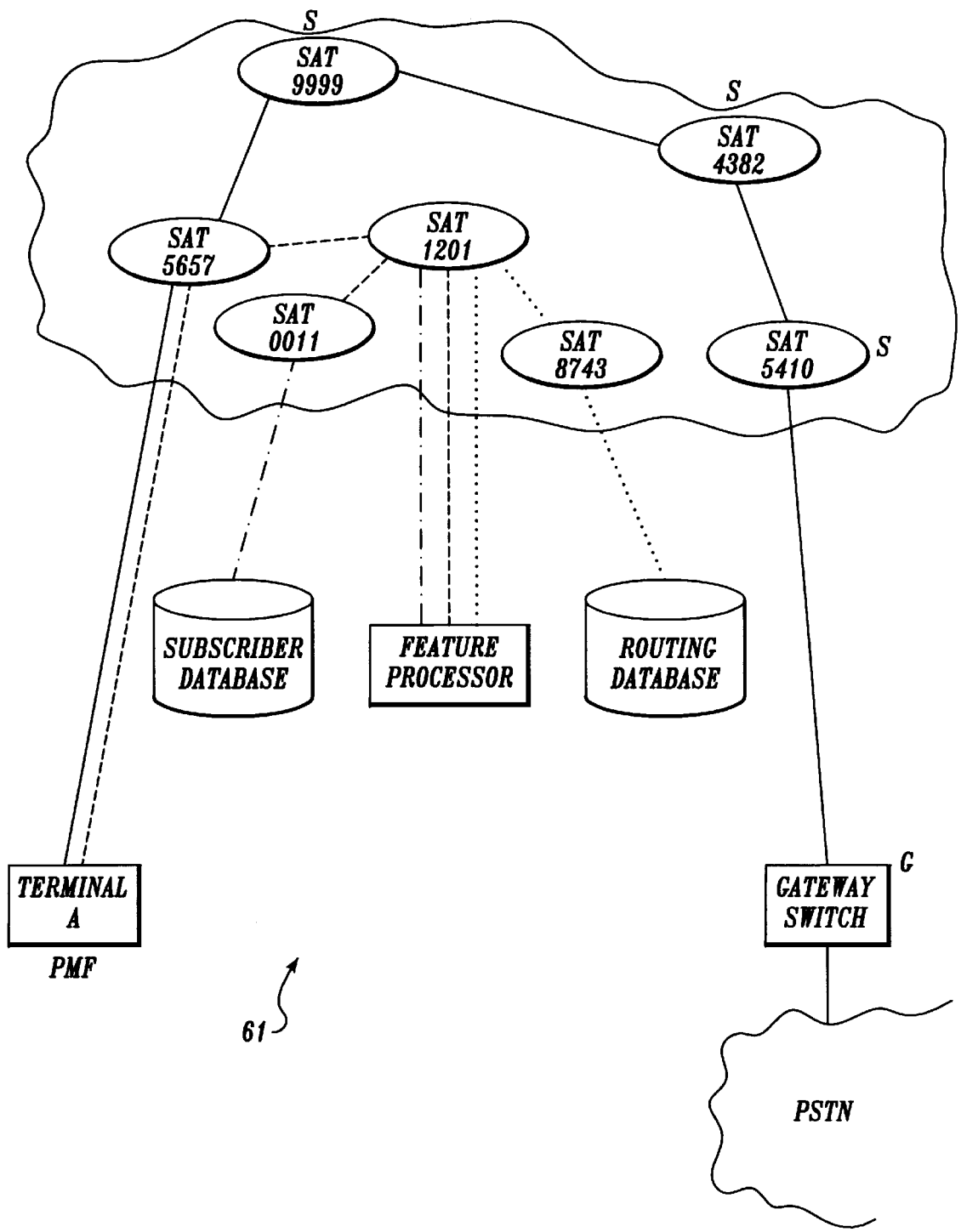
FIG. 9 is a diagram showing terminals, satellites, databases, a feature processor and a gateway.
Figure 11:
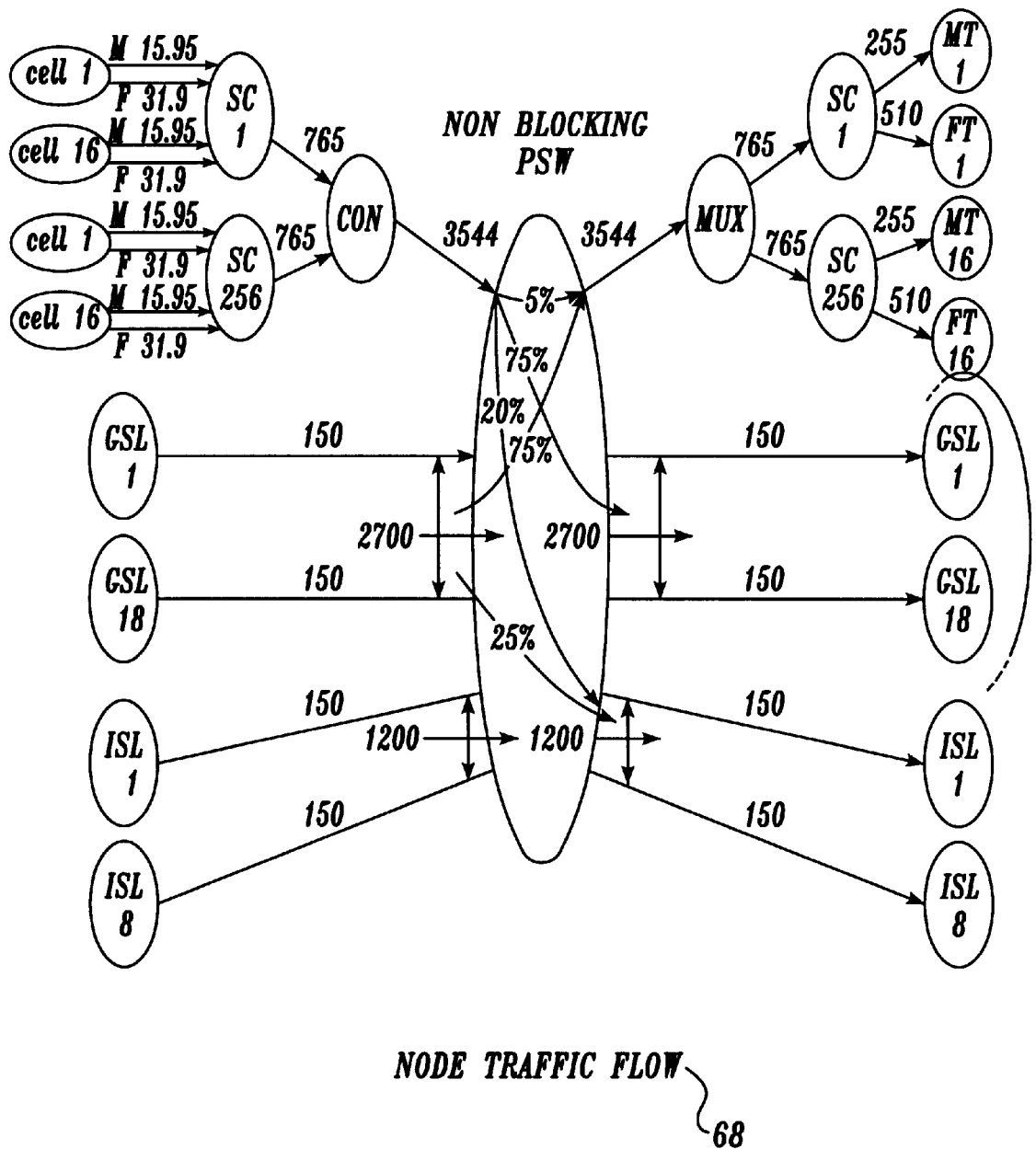
FIG. 11 is a schematic diagram showing node traffic flow.
Figure 12:
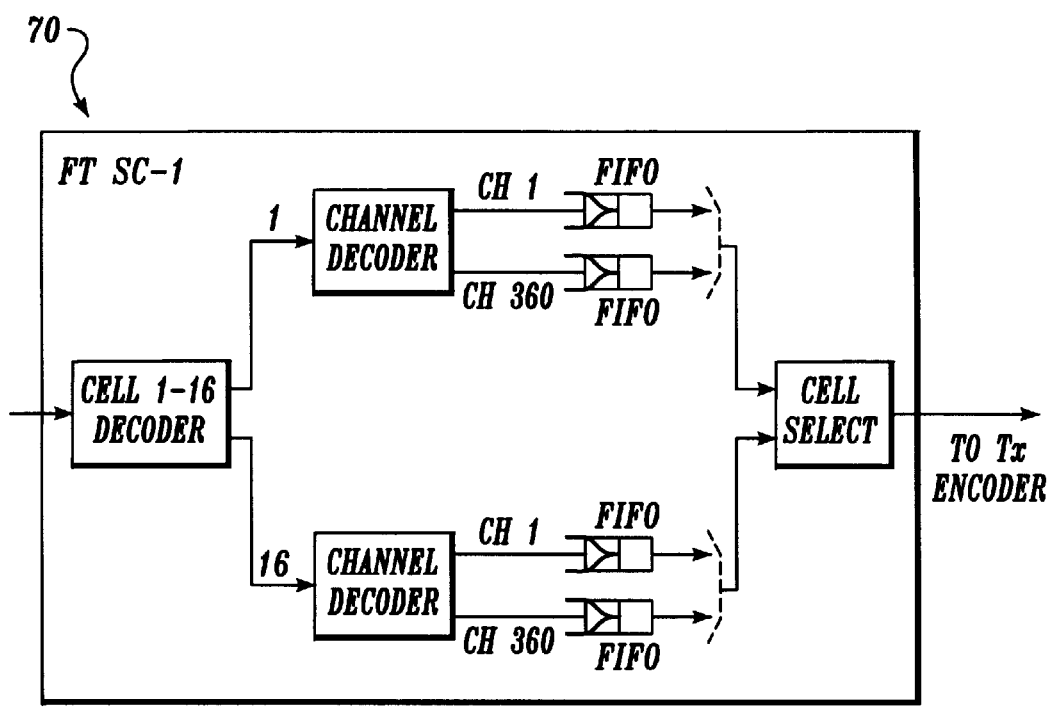
FIG. 12 is a schematic diagram of a channel decoder/encoder.
Figure 13:
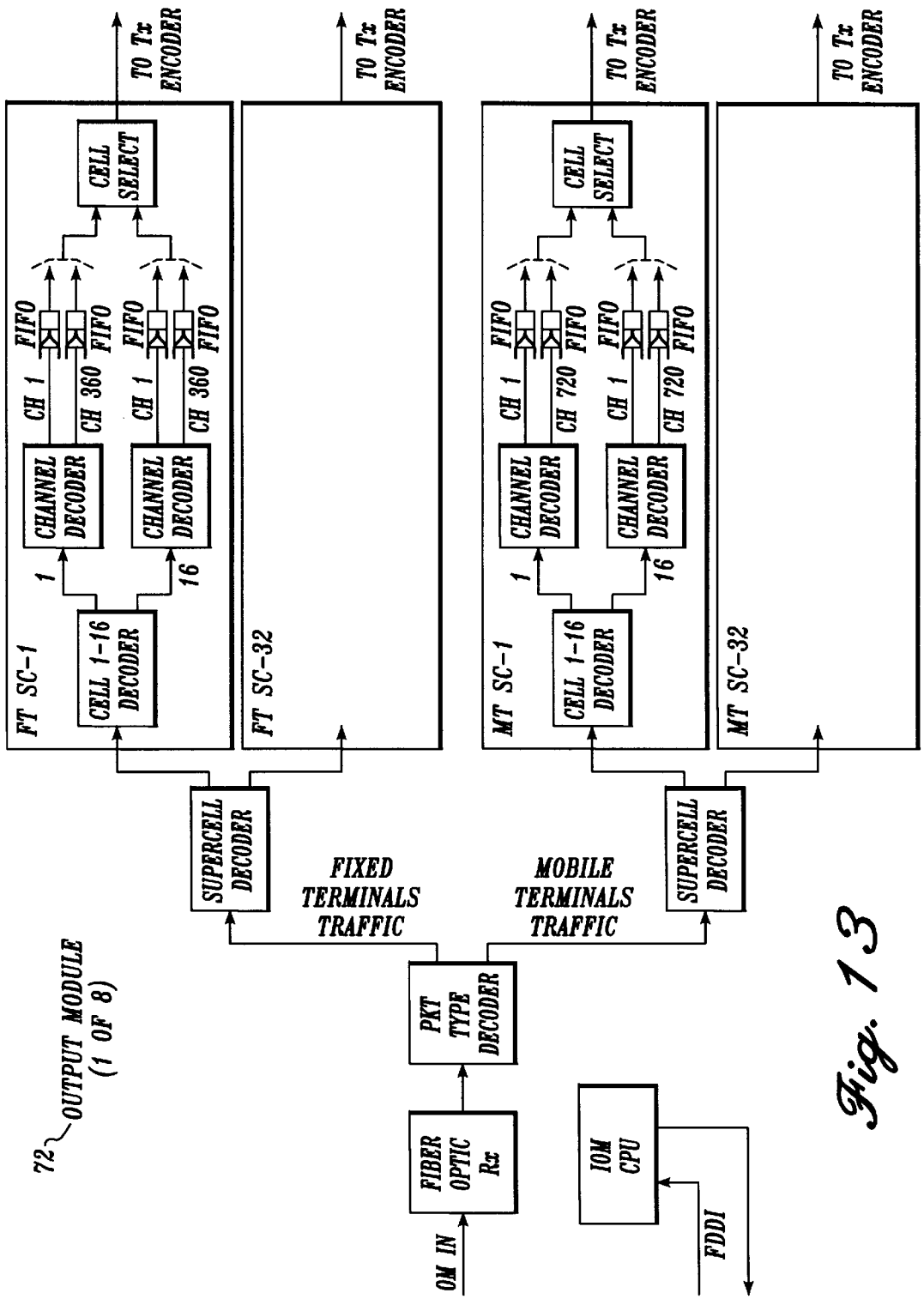
FIG. 13 is a schematic diagram of an output module.
Figure 14:
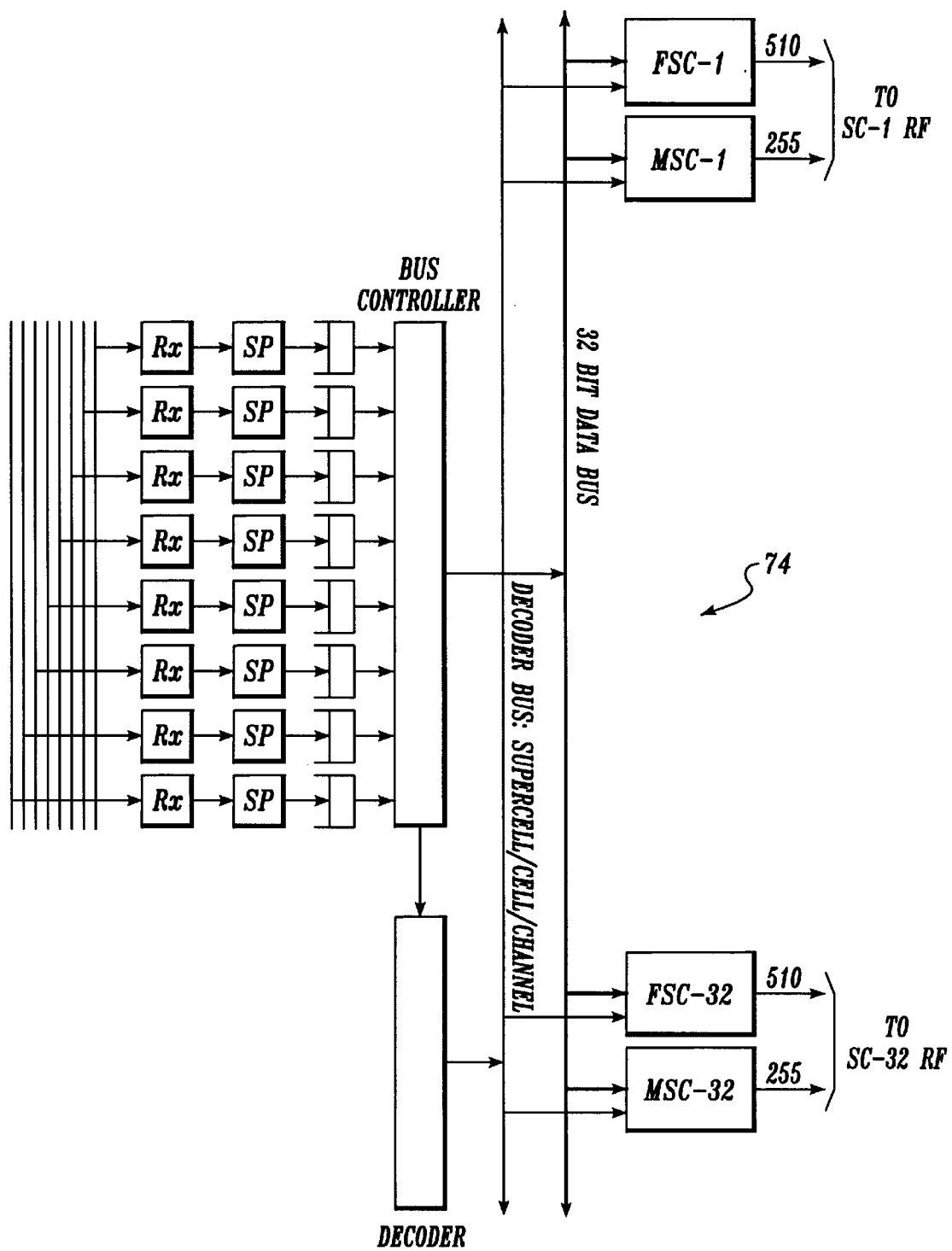
FIG. 14 is a schematic diagram of a footprint output module.
Figure 15:
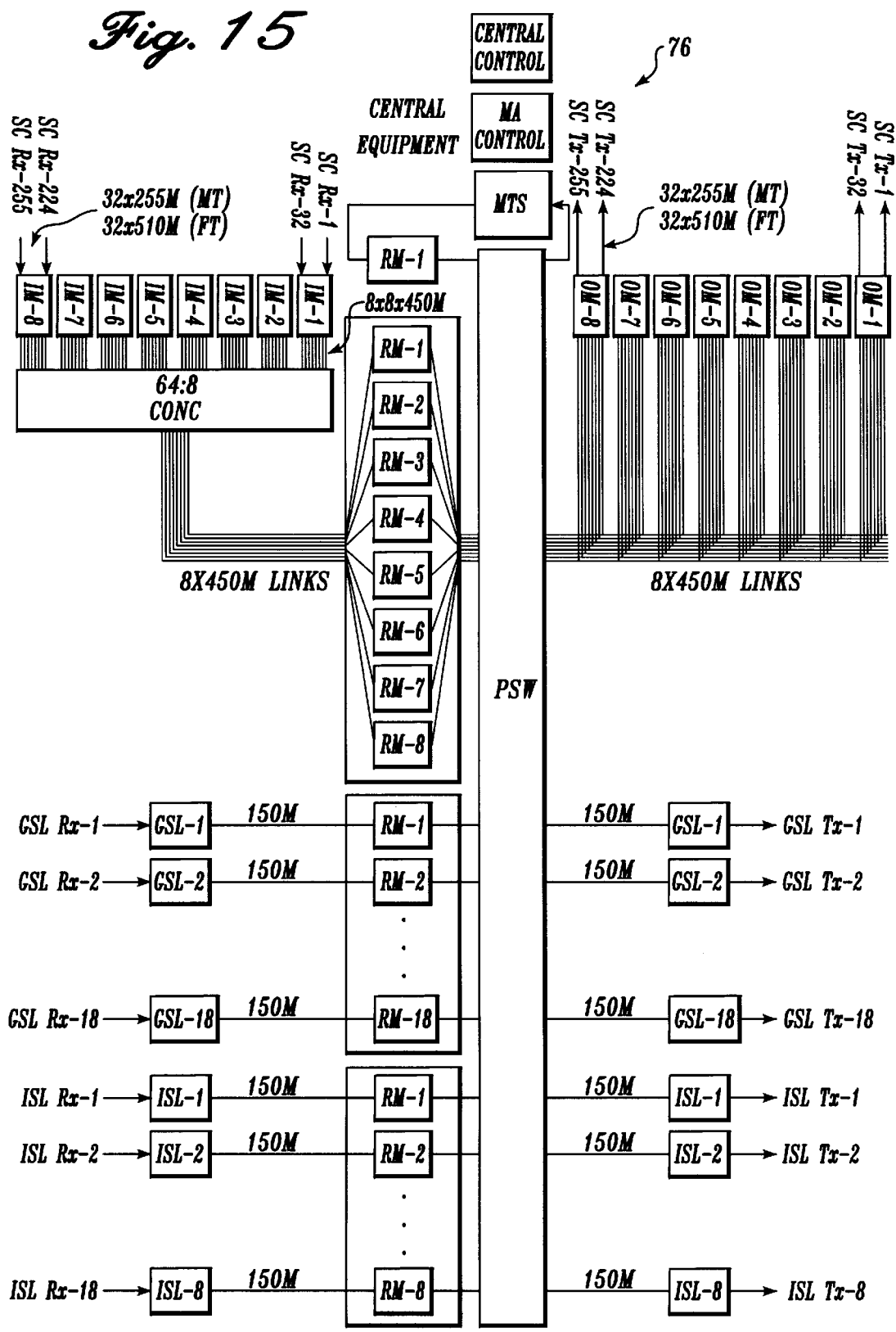
FIG. 15 is a schematic diagram of fast packet switch architecture.
Figure 16:
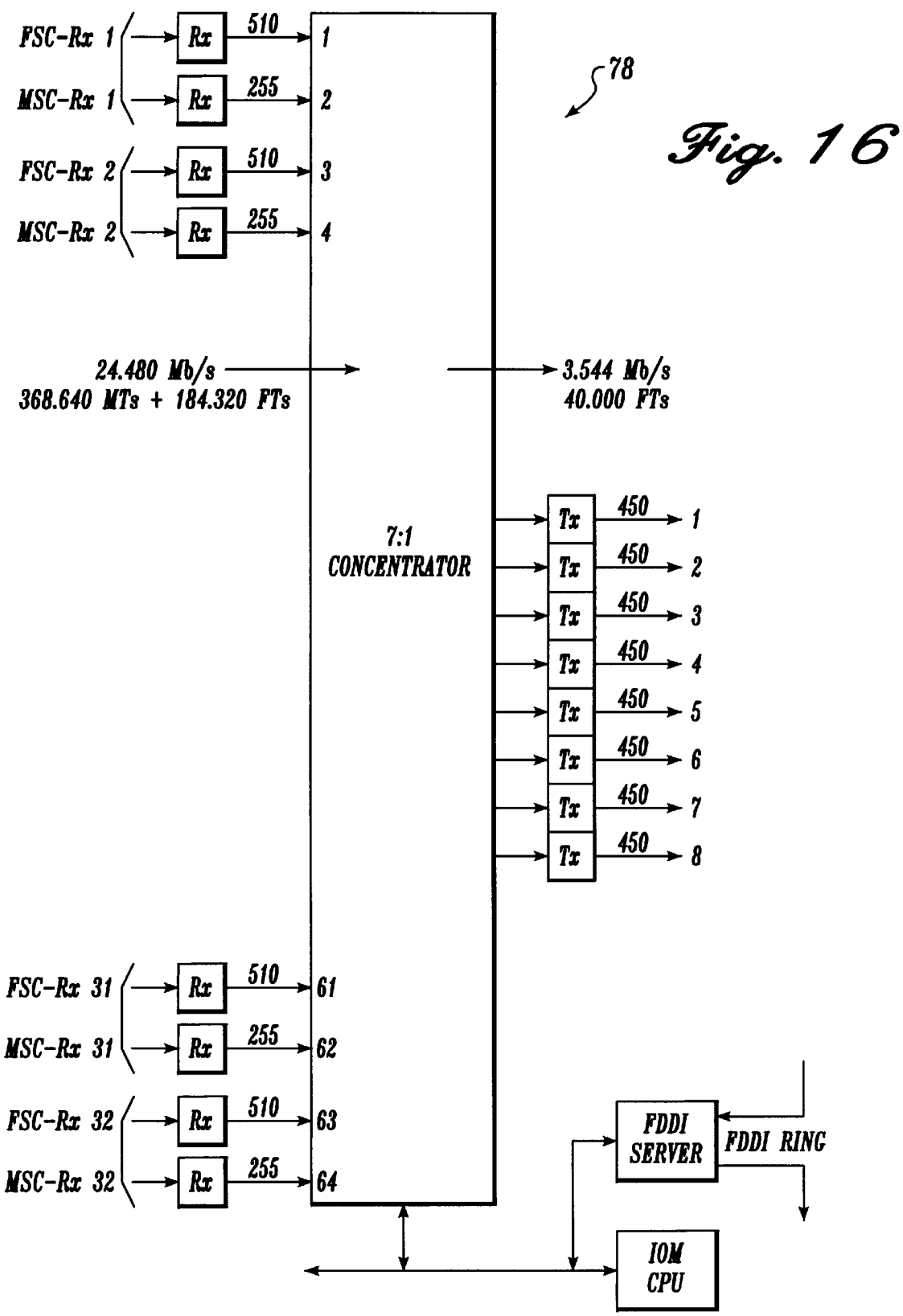
FIG. 16 is a schematic diagram of a footprint input module.
Figure 17:
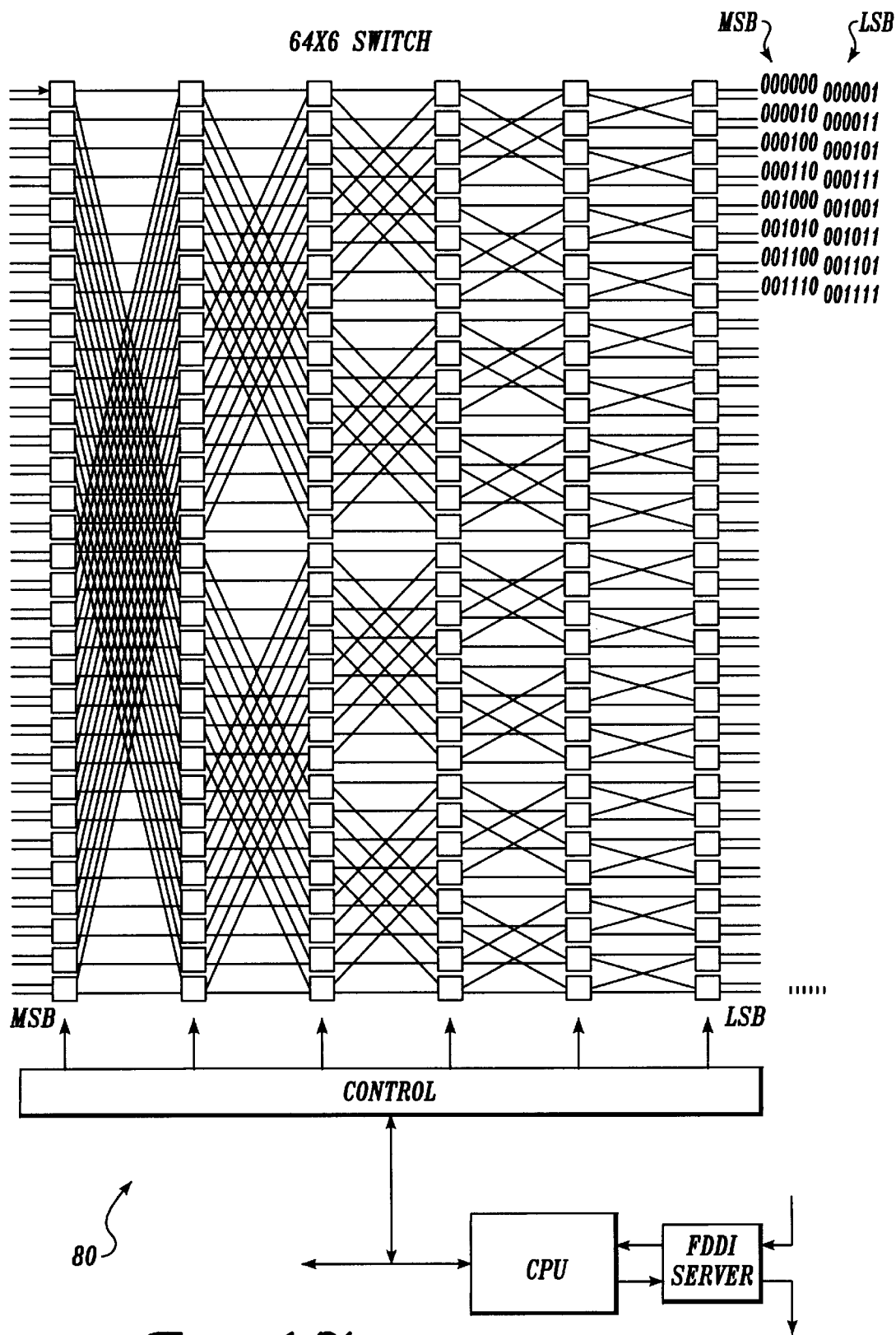
FIG. 17 is a schematic diagram of a 64 by 6 switch.
Figure 18:
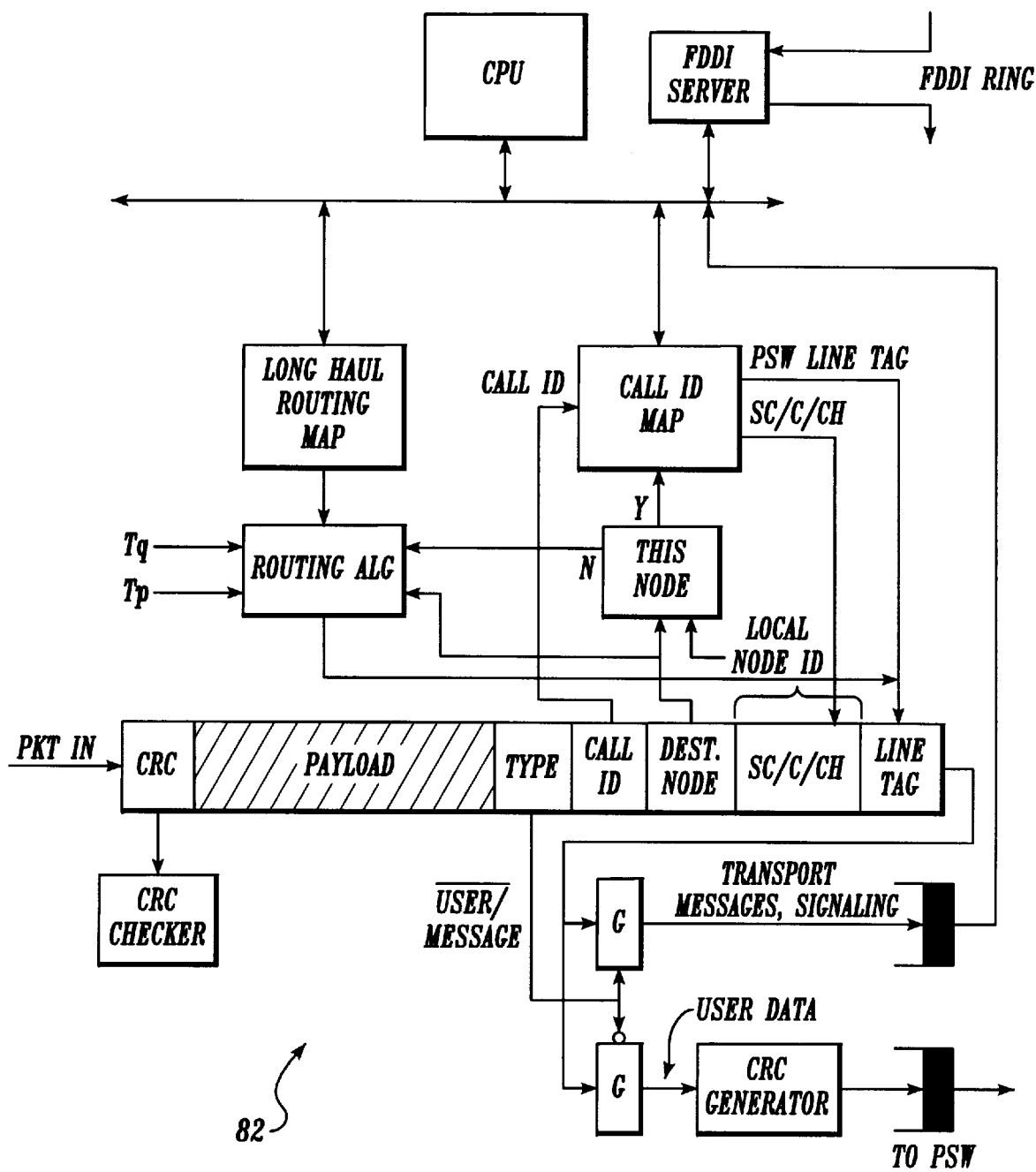
FIG. 18 is a schematic diagram of a packet router.
Figure 19:
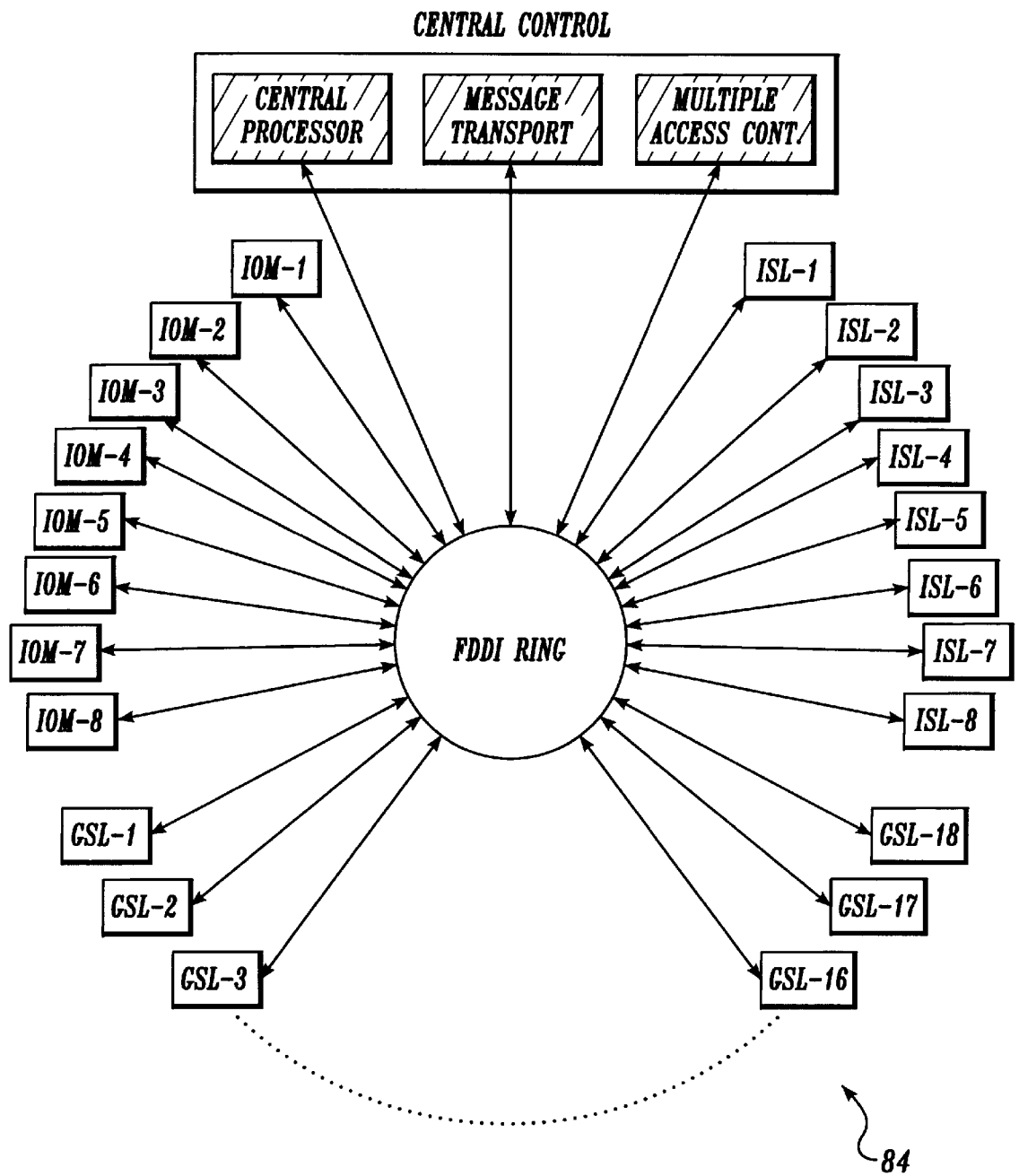
FIG. 19 is a schematic diagram of a system message switching architecture.
Figure 20:
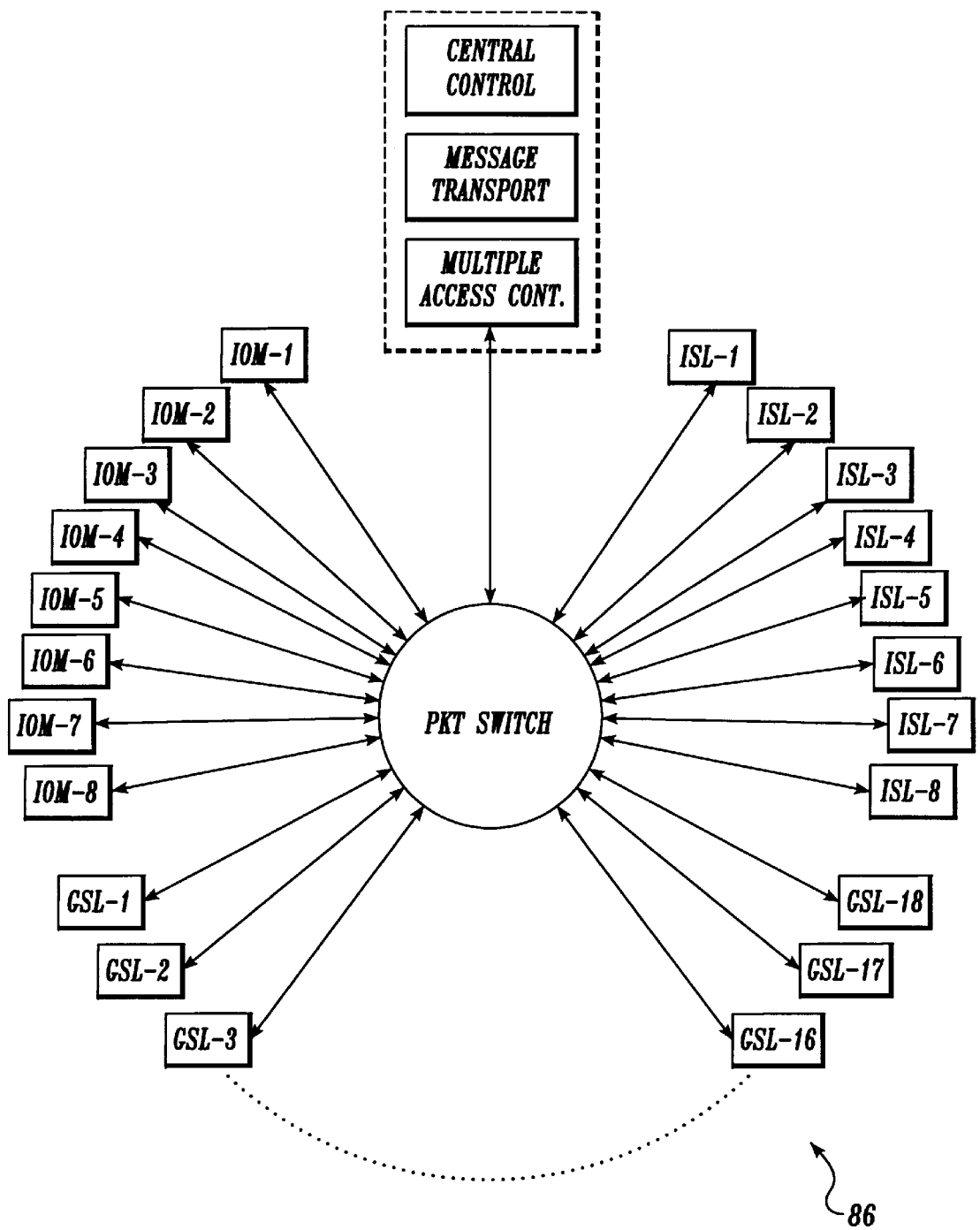
FIG. 20 is a schematic diagram of the switching system architecture.
Figure 21:
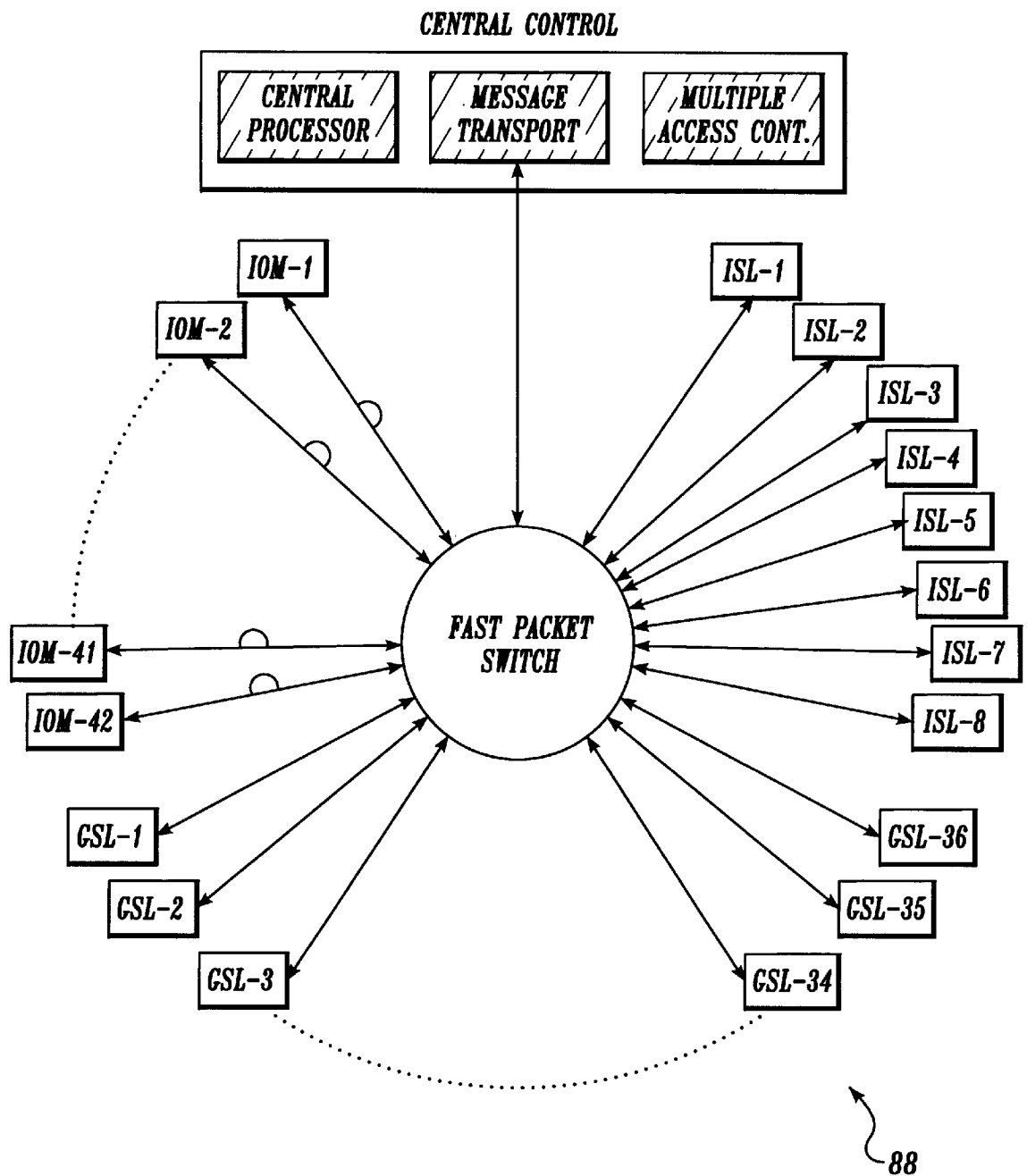
FIG. 21 is a schematic diagram of a central control system within the switch architecture.
Figure 22:
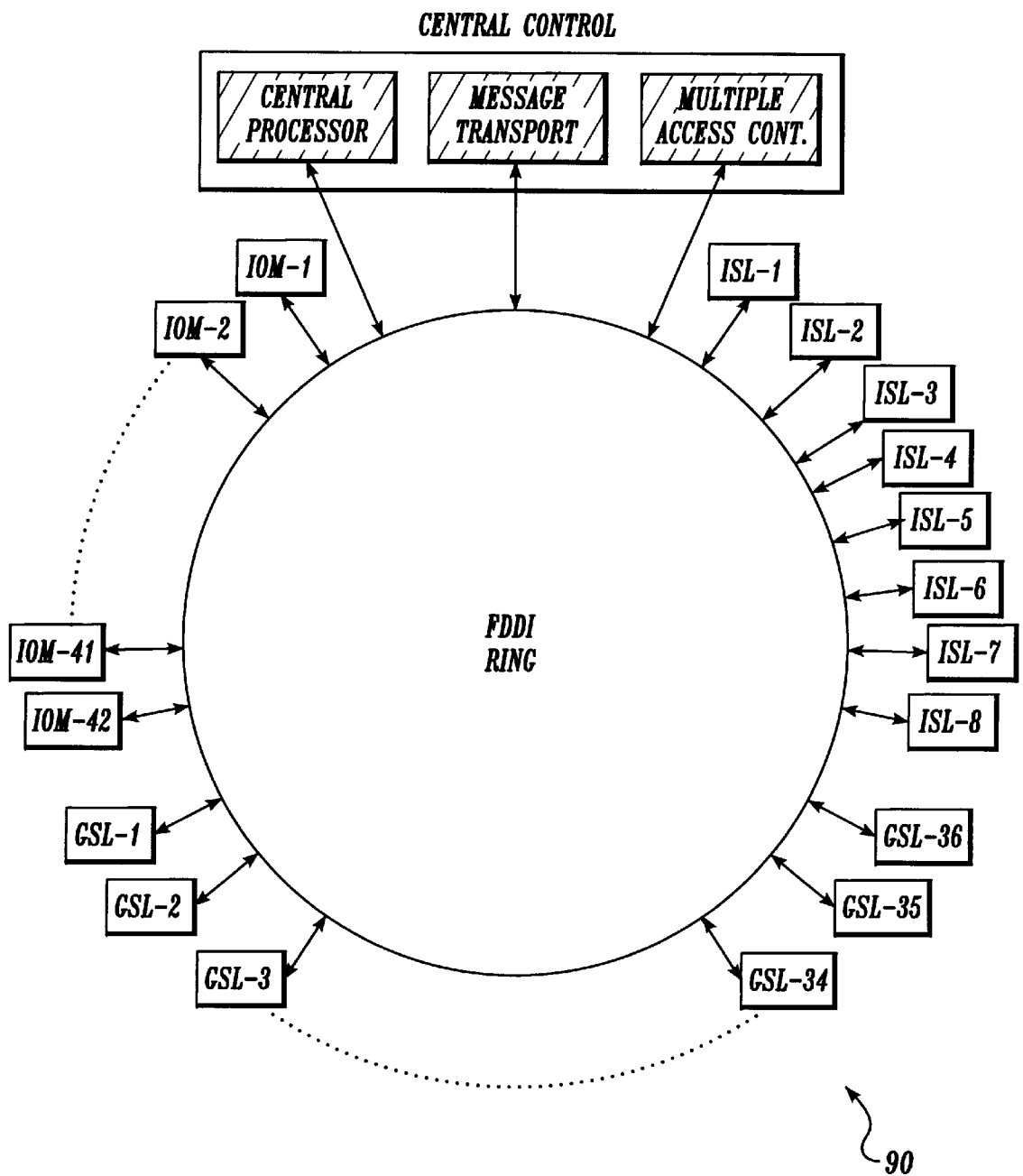
FIG. 22 is a schematic diagram of a distributed control architecture.
Figure 23:
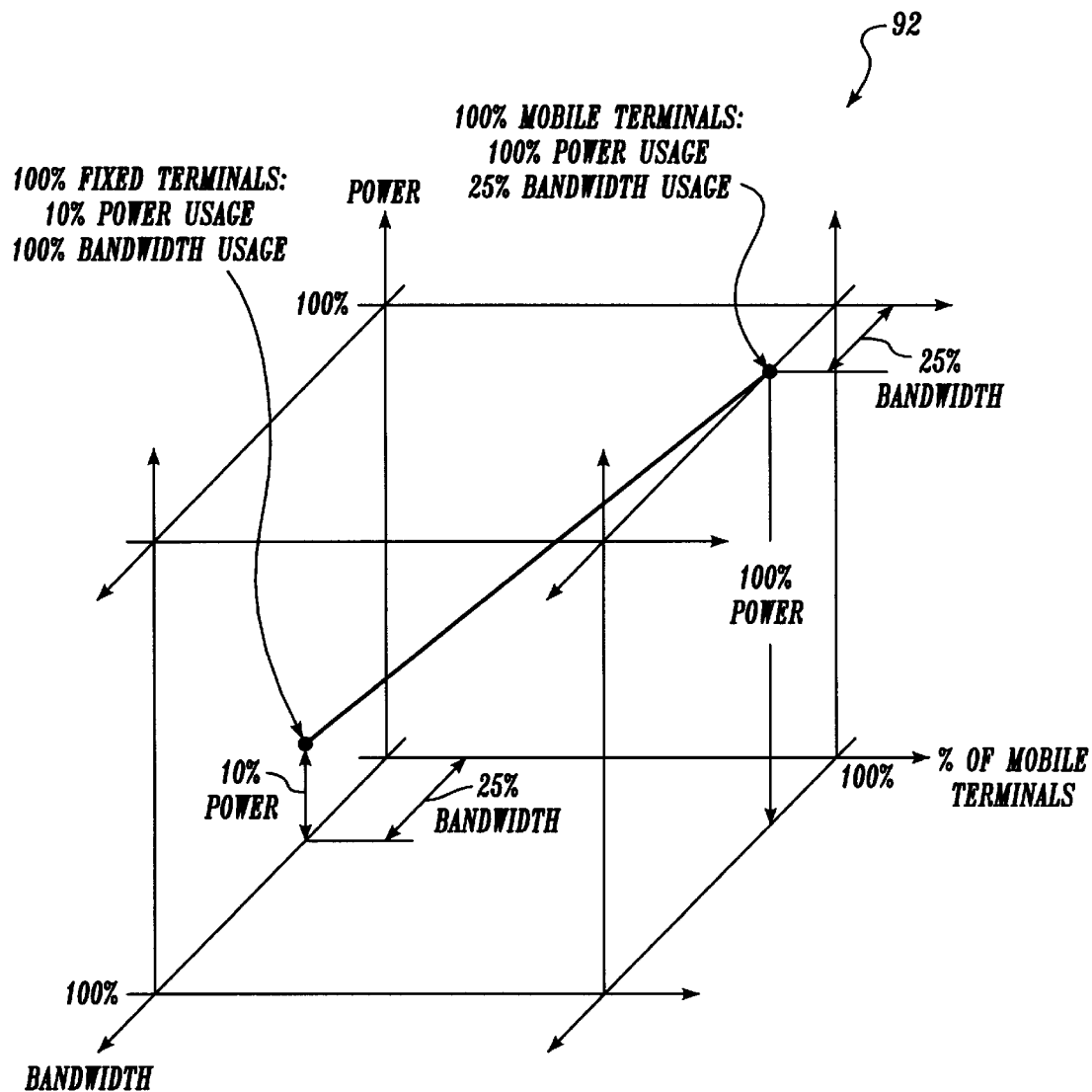
FIG. 23 is a schematic diagram showing RF power versus switch bandwidth at maximum cell capacity.
Figure 24:
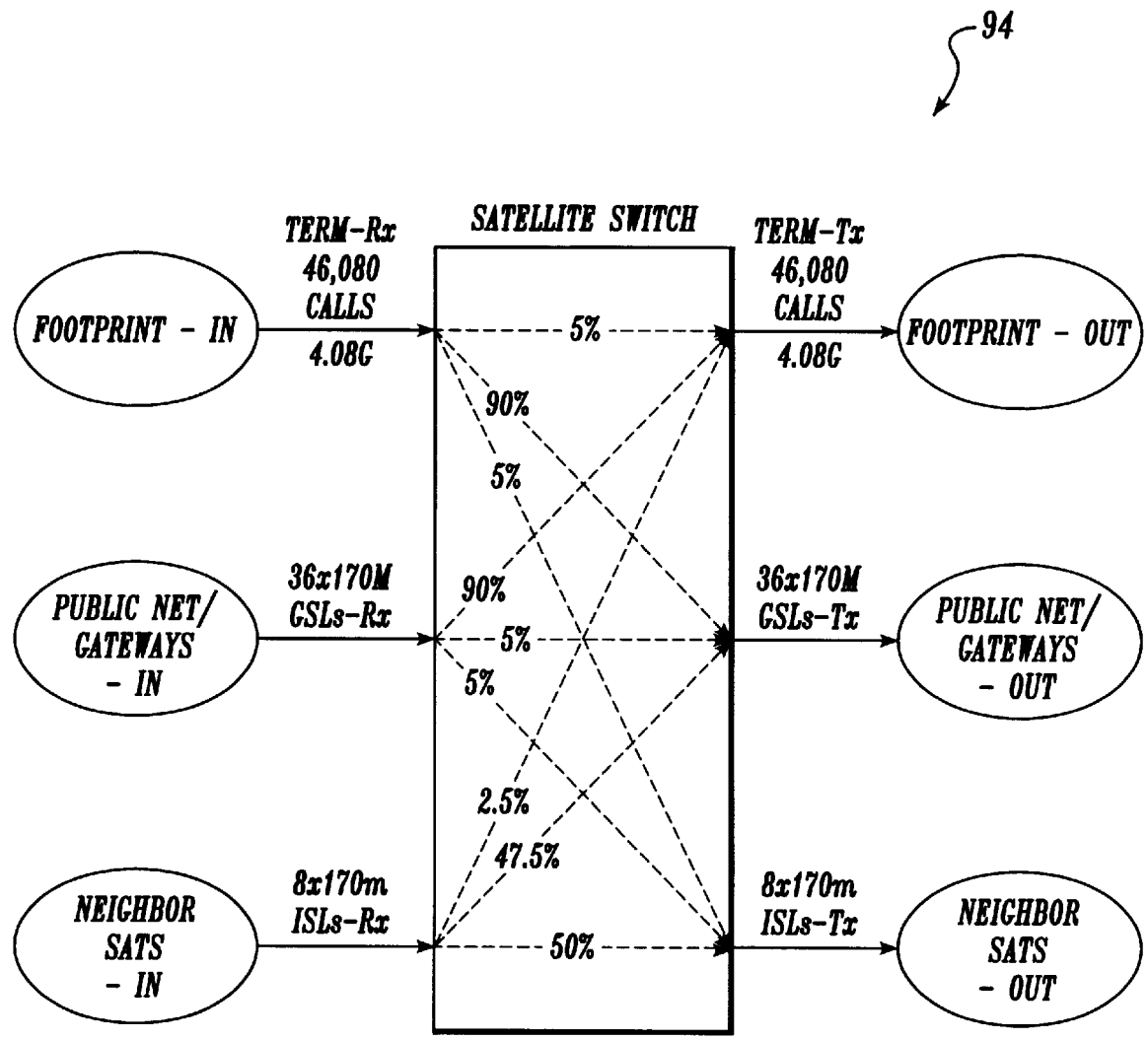
FIG. 24 is a schematic diagram that illustrates traffic distribution.
Figure 25:
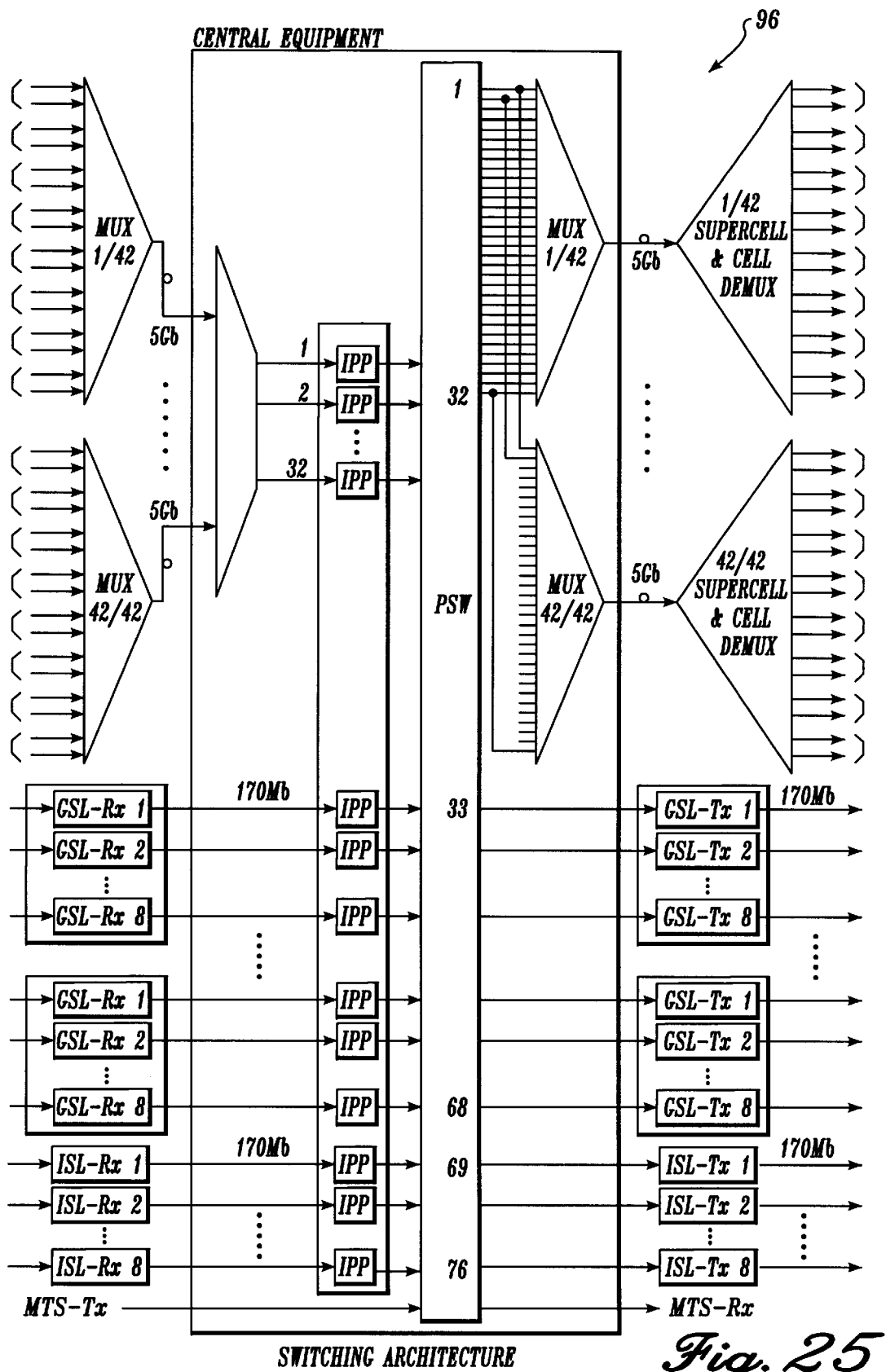
FIG. 25 is a schematic diagram of switching architecture.
Figure 26:
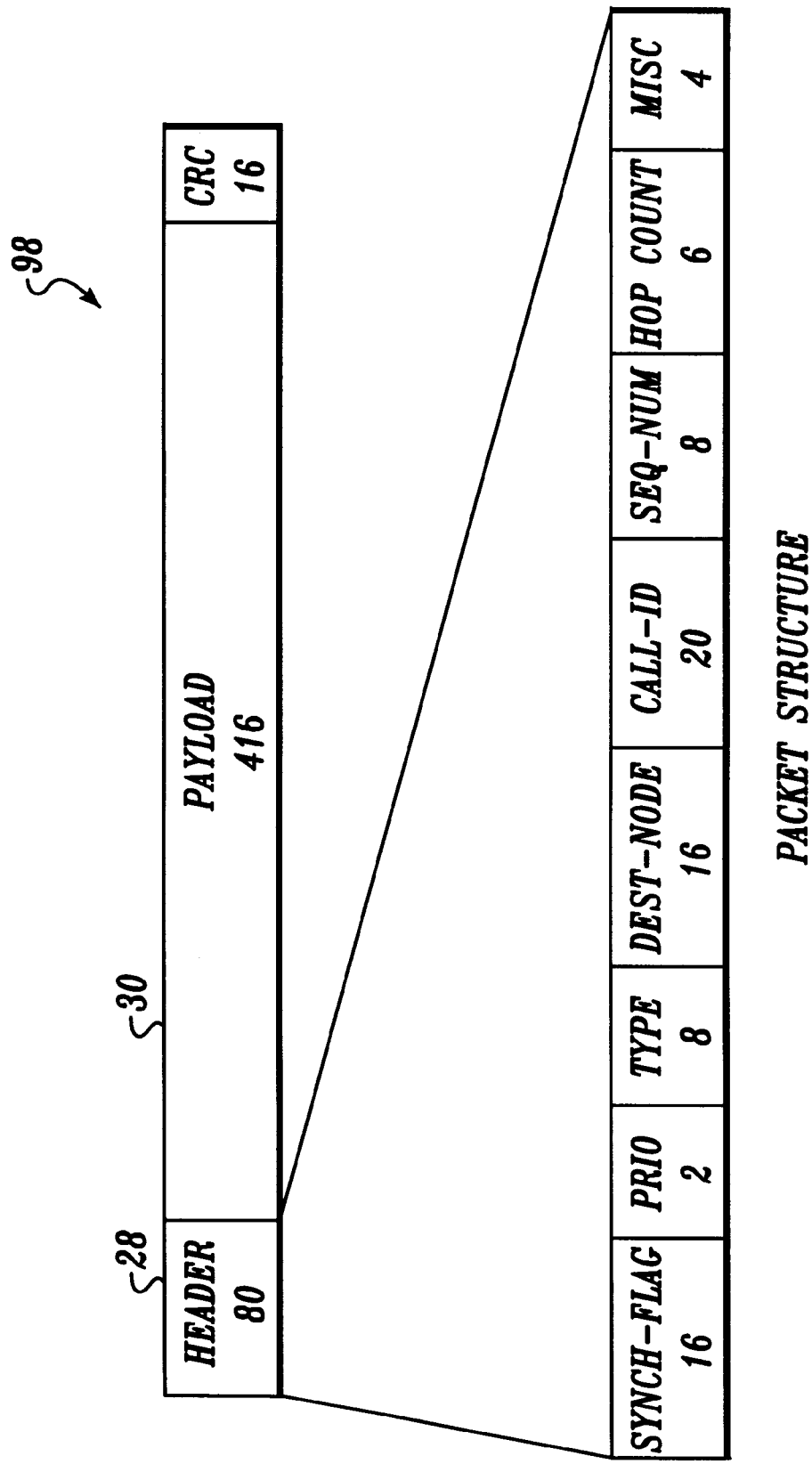
FIG. 26 is a schematic diagram of a packet structure.
Figure 27:
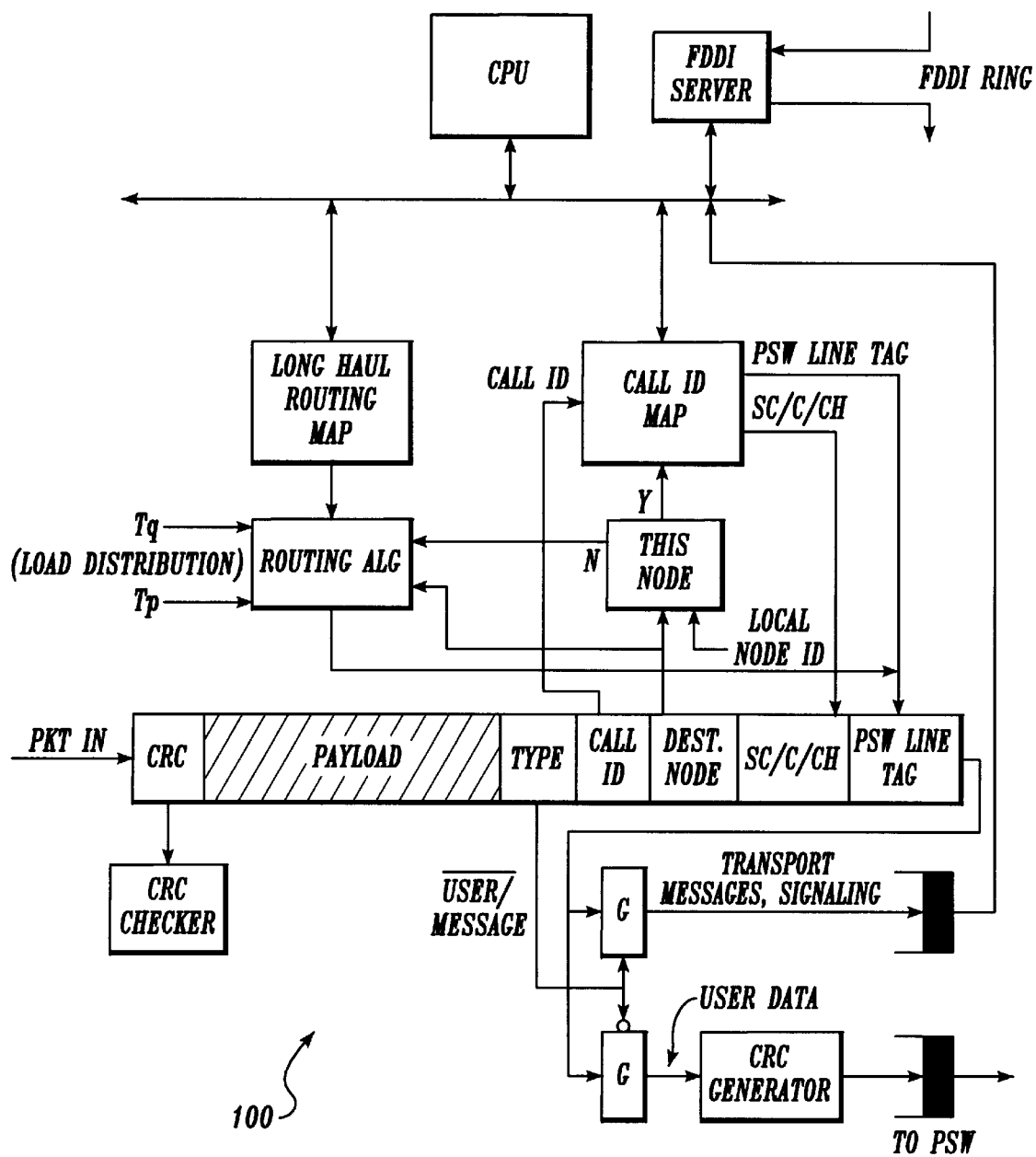
FIG. 27 is a schematic diagram of an input packet processor.
Figure 28:
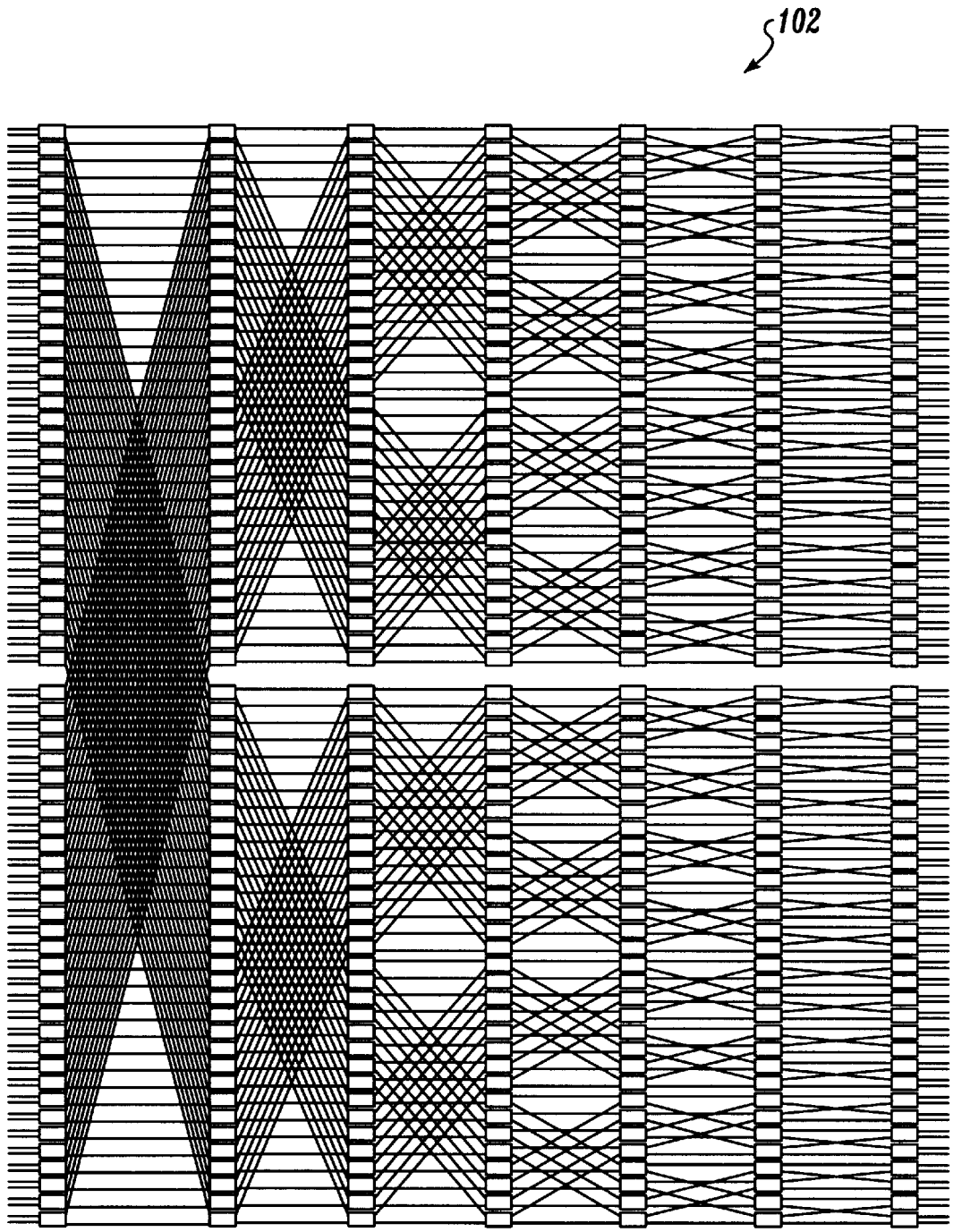
FIG. 28 is a schematic diagram of a 128 by 128 switch.
Figure 29A:
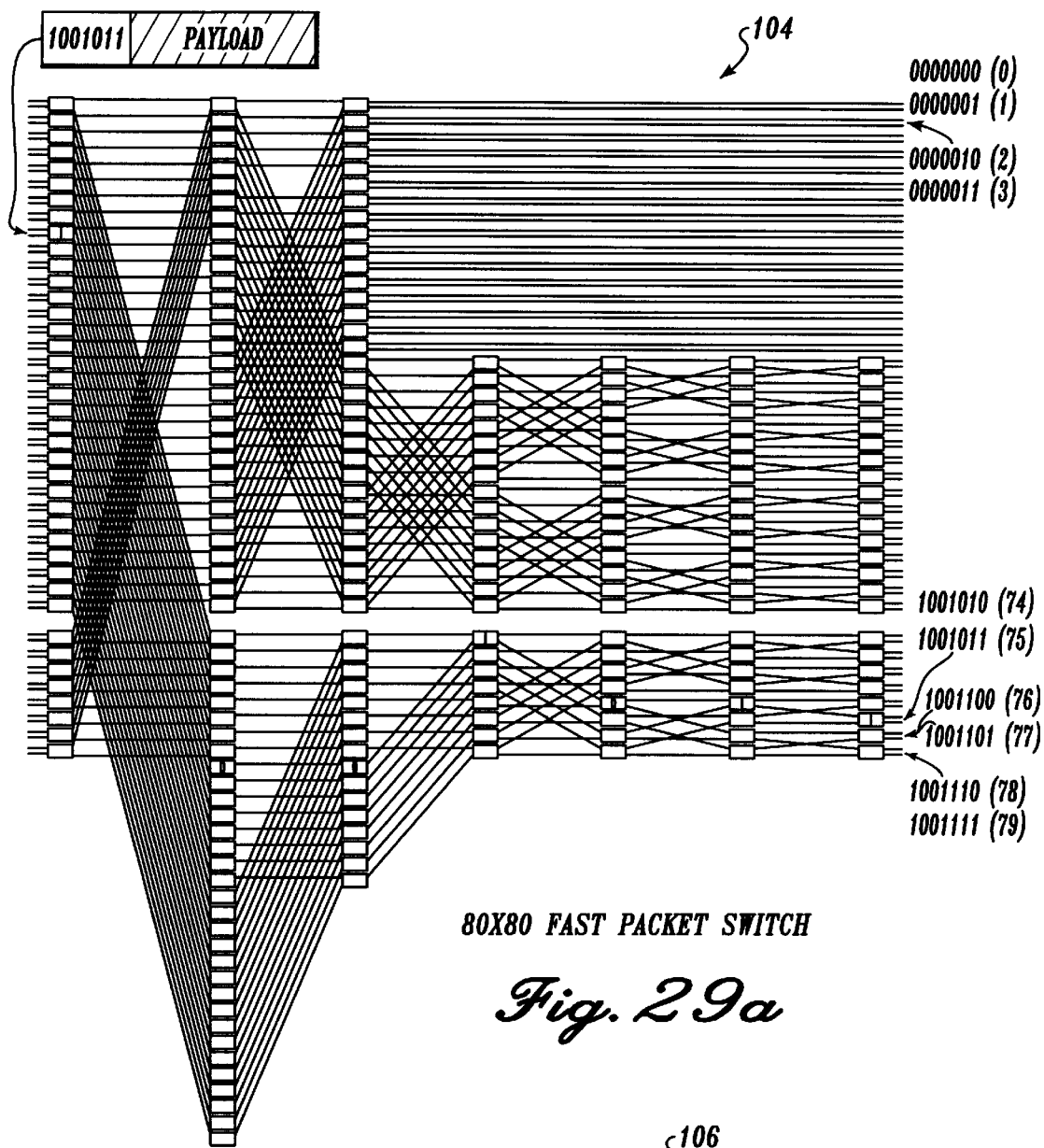
FIG. 29a is a schematic diagram of an 80 by 80 fast packet switch.
Figure 29B:
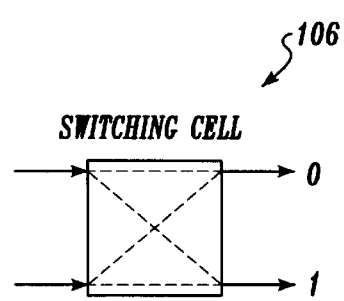
FIG. 29b is a schematic diagram of a single switching cell.
Figure 30:
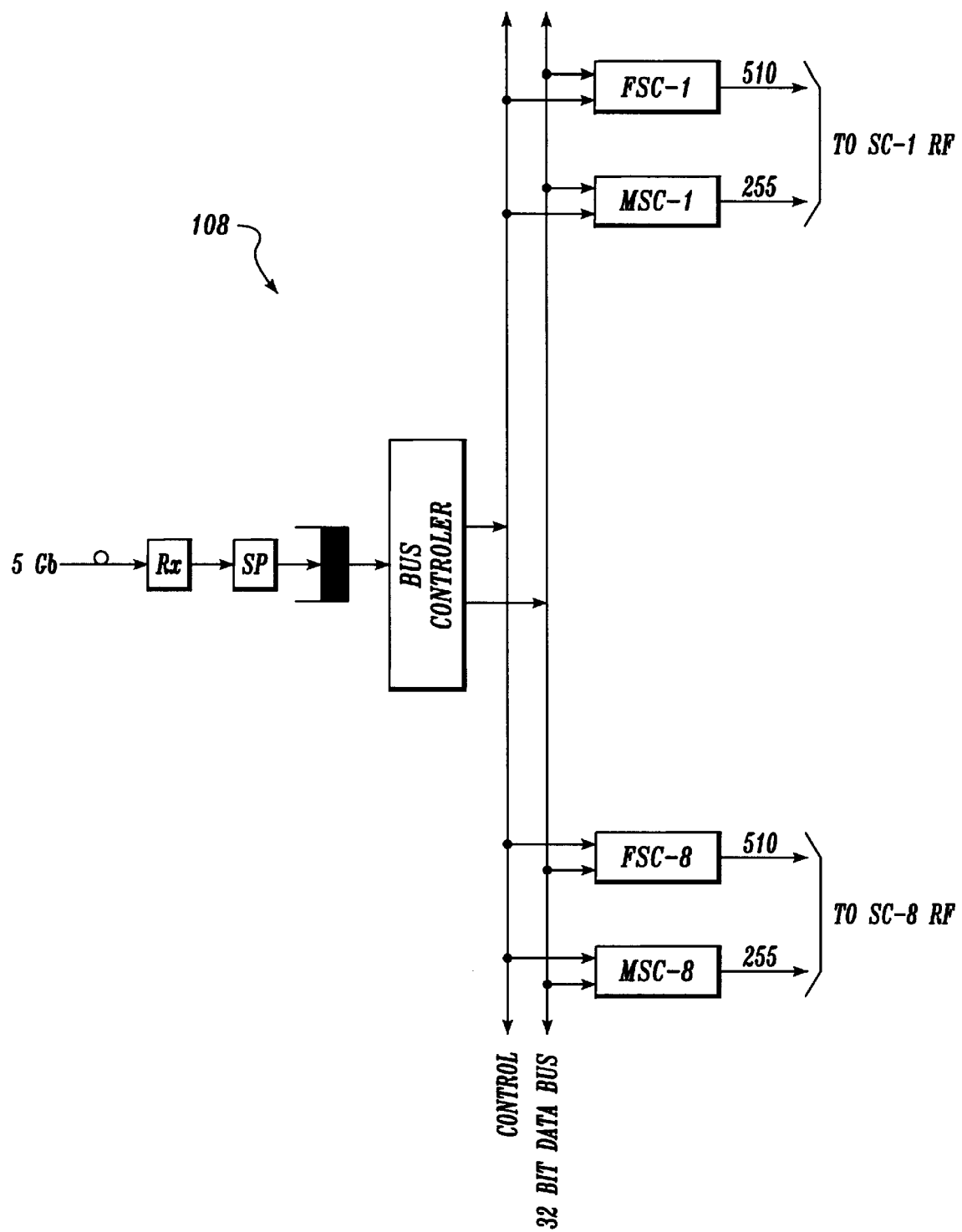
FIG. 30 is a schematic diagram of a footprint output module.
Figure 31:
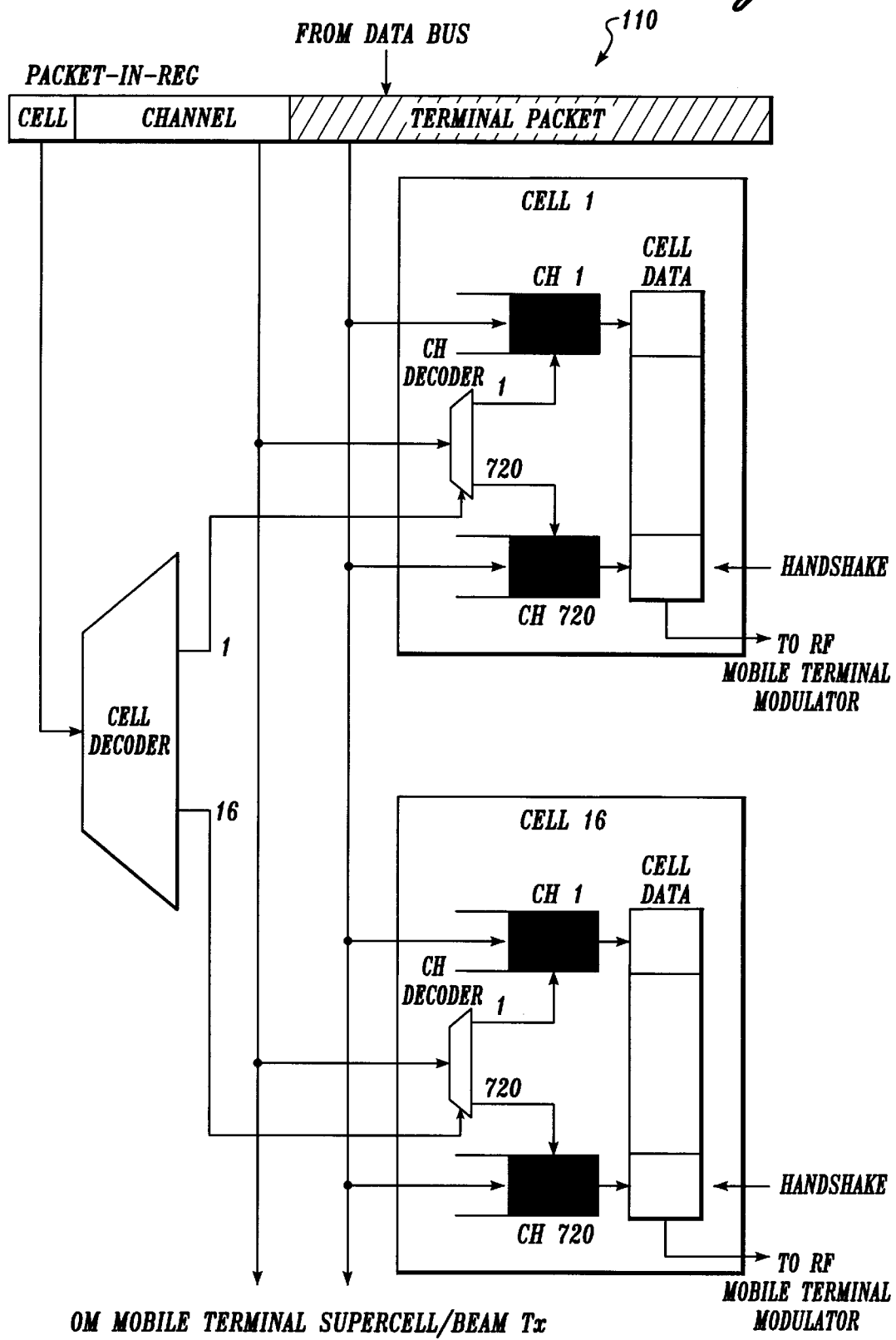
FIG. 31 is a schematic diagram of a mobile terminal supercell beam transmitter.
Figure 32:
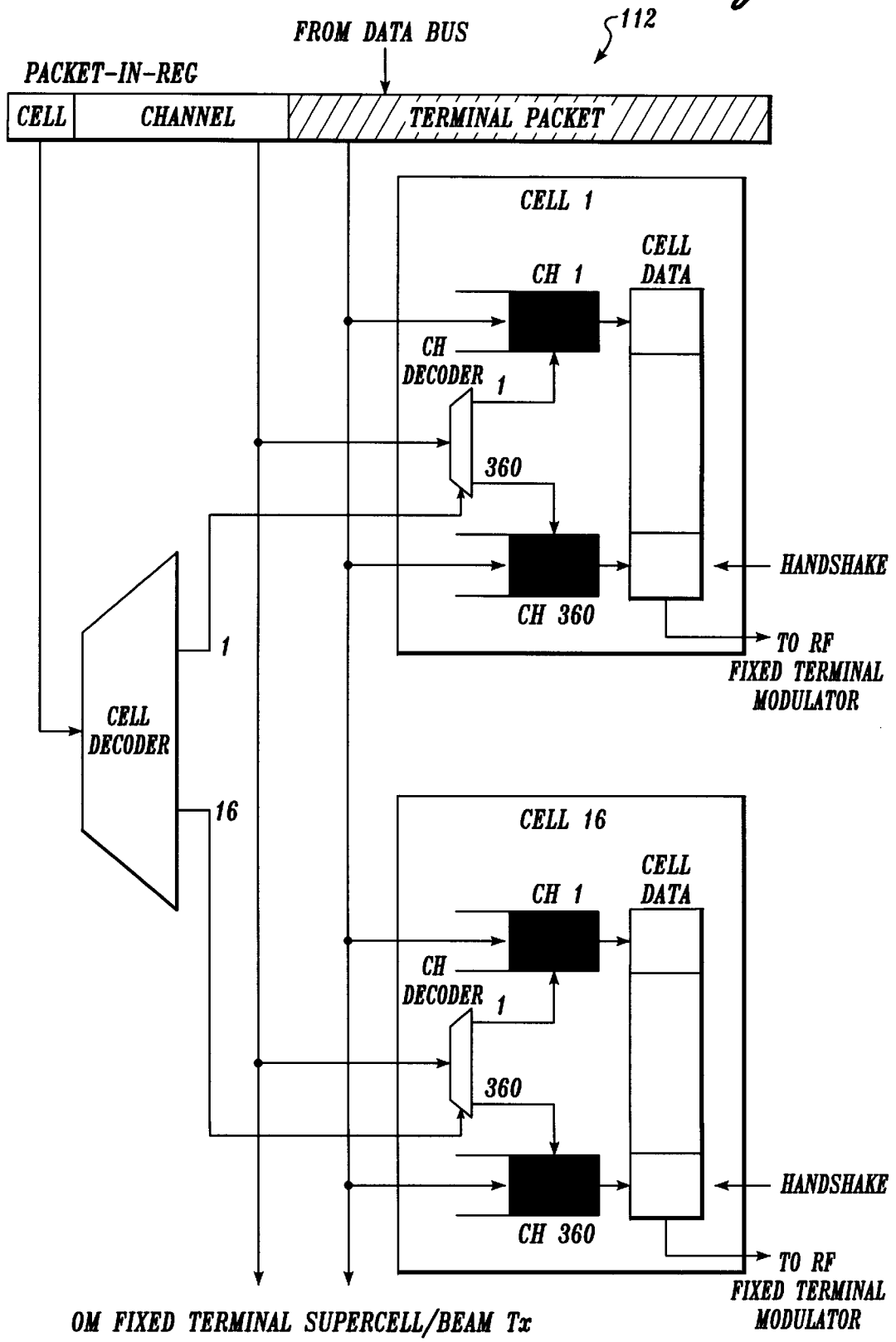
FIG. 32 is a schematic diagram of a fixed terminal supercell beam transmitter.
Figure 33:
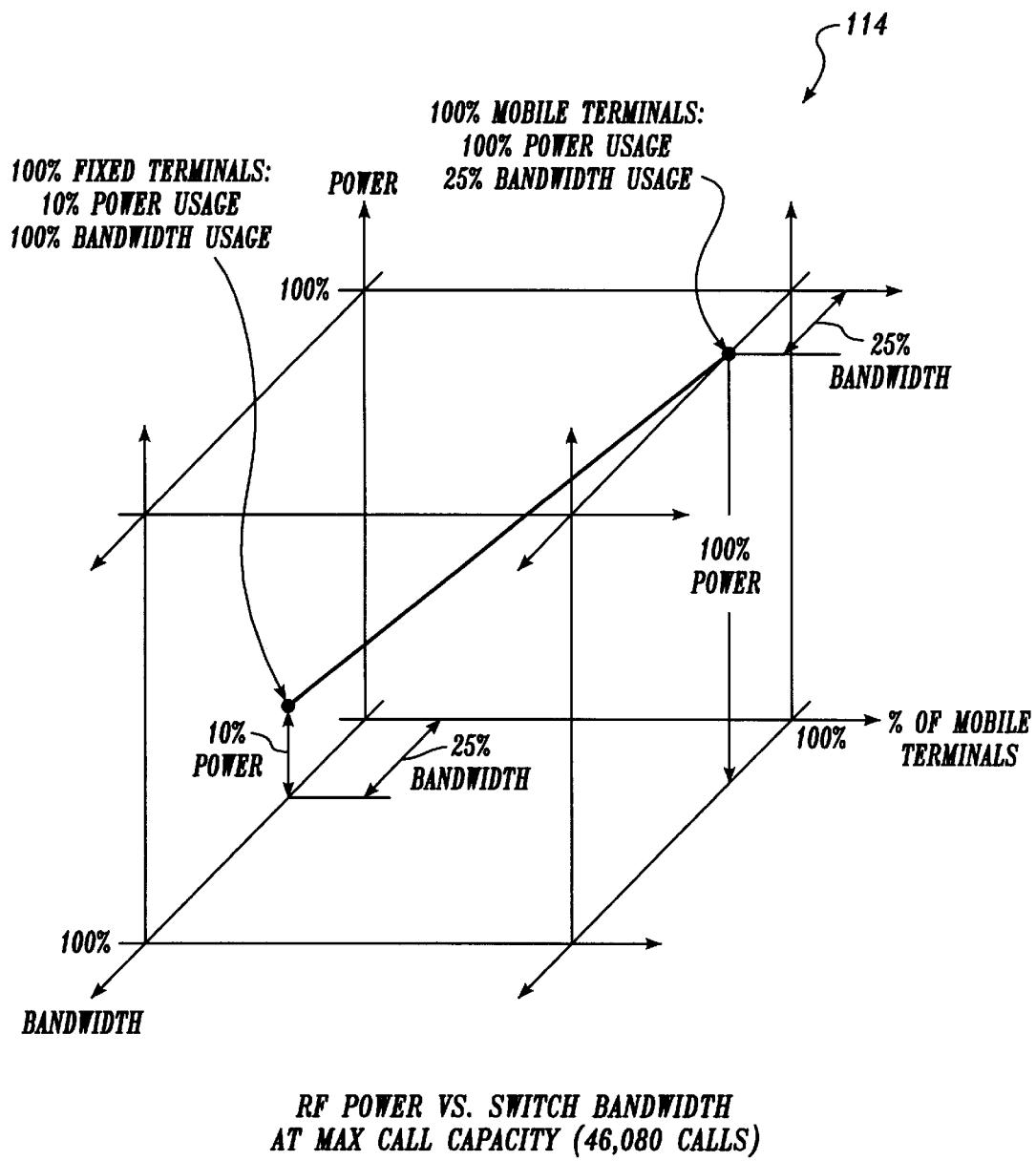
FIG. 33 is another schematic diagram of RF power versus switch bandwidth at maximum cell capacity.
Figure 34:
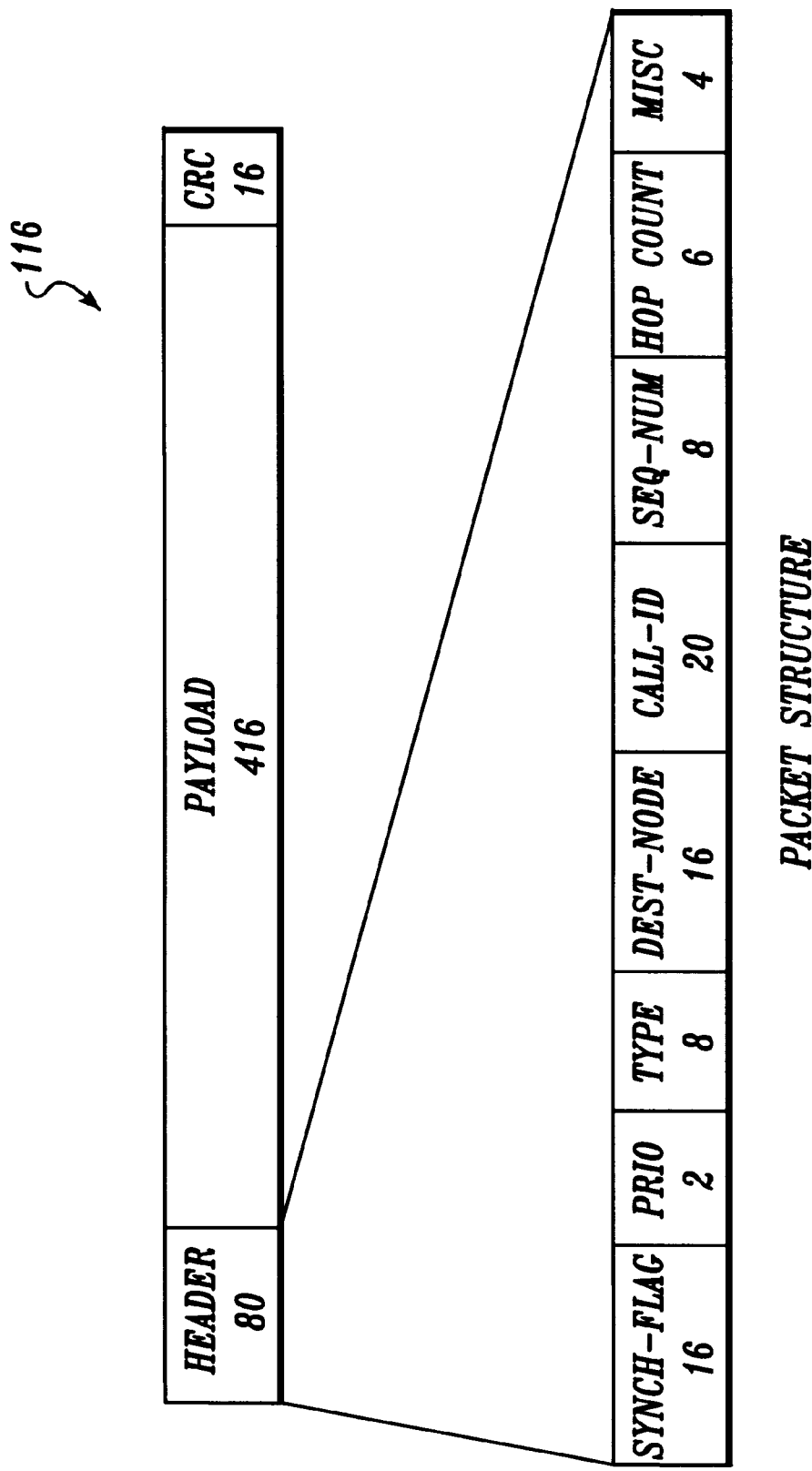
FIG. 34 is another schematic diagram of a packet stricture.
Figure 35:
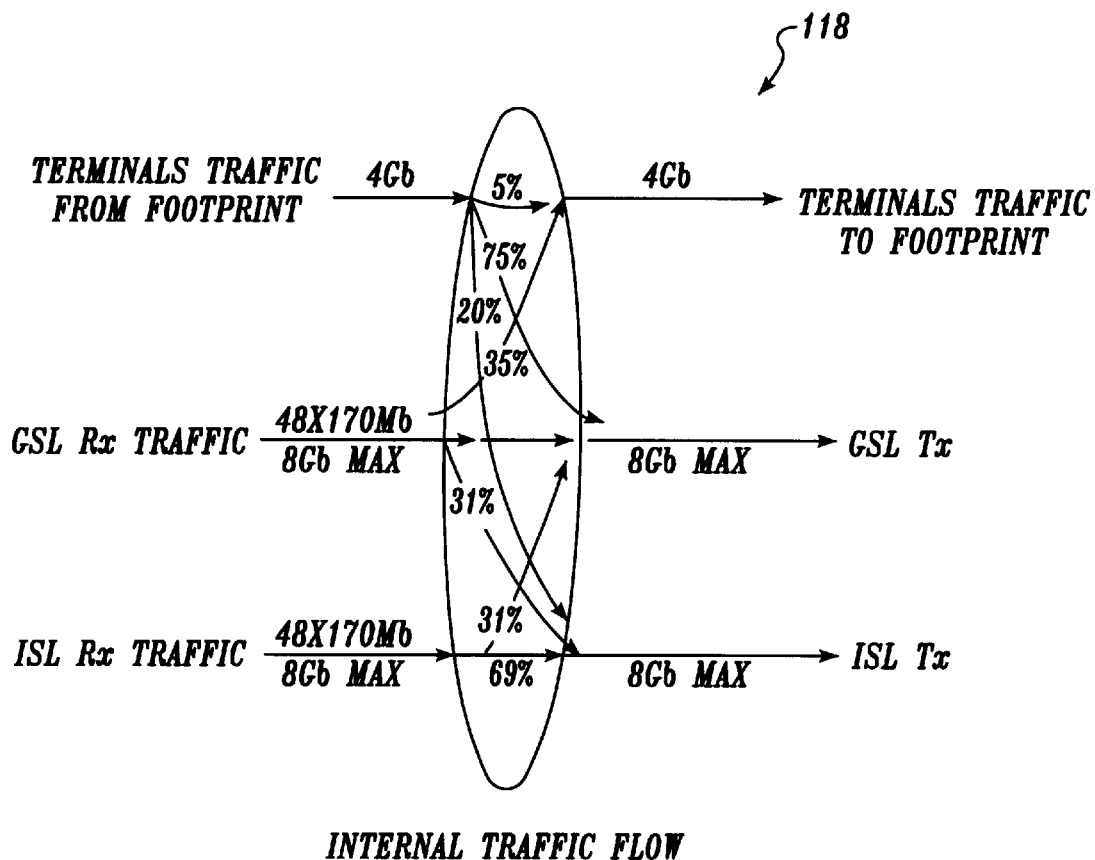
FIG. 35 is a schematic diagram showing internal traffic flow.
Figure 36:
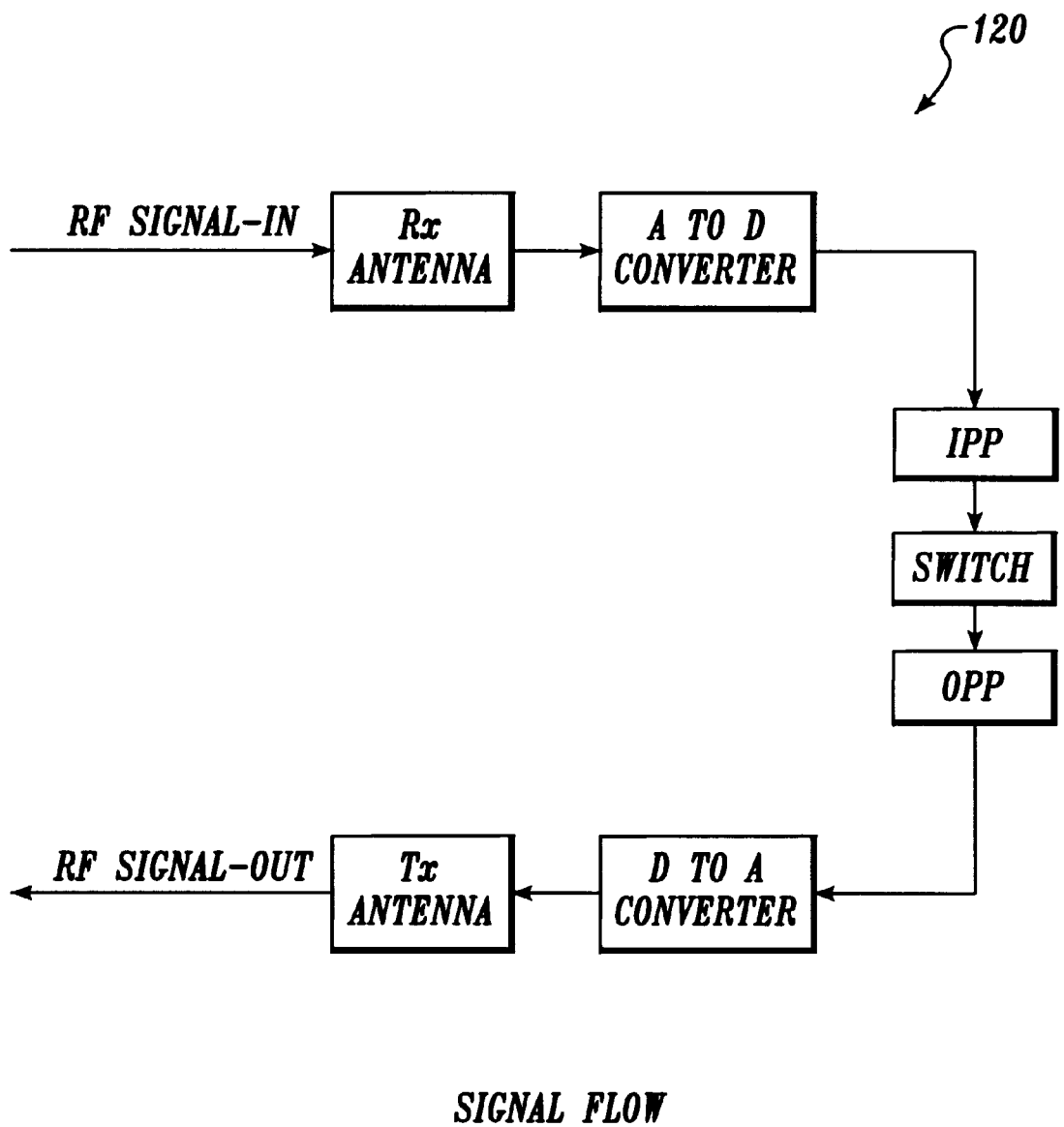
FIG. 36 is a schematic diagram illustrating signal flow.
Figure 37:
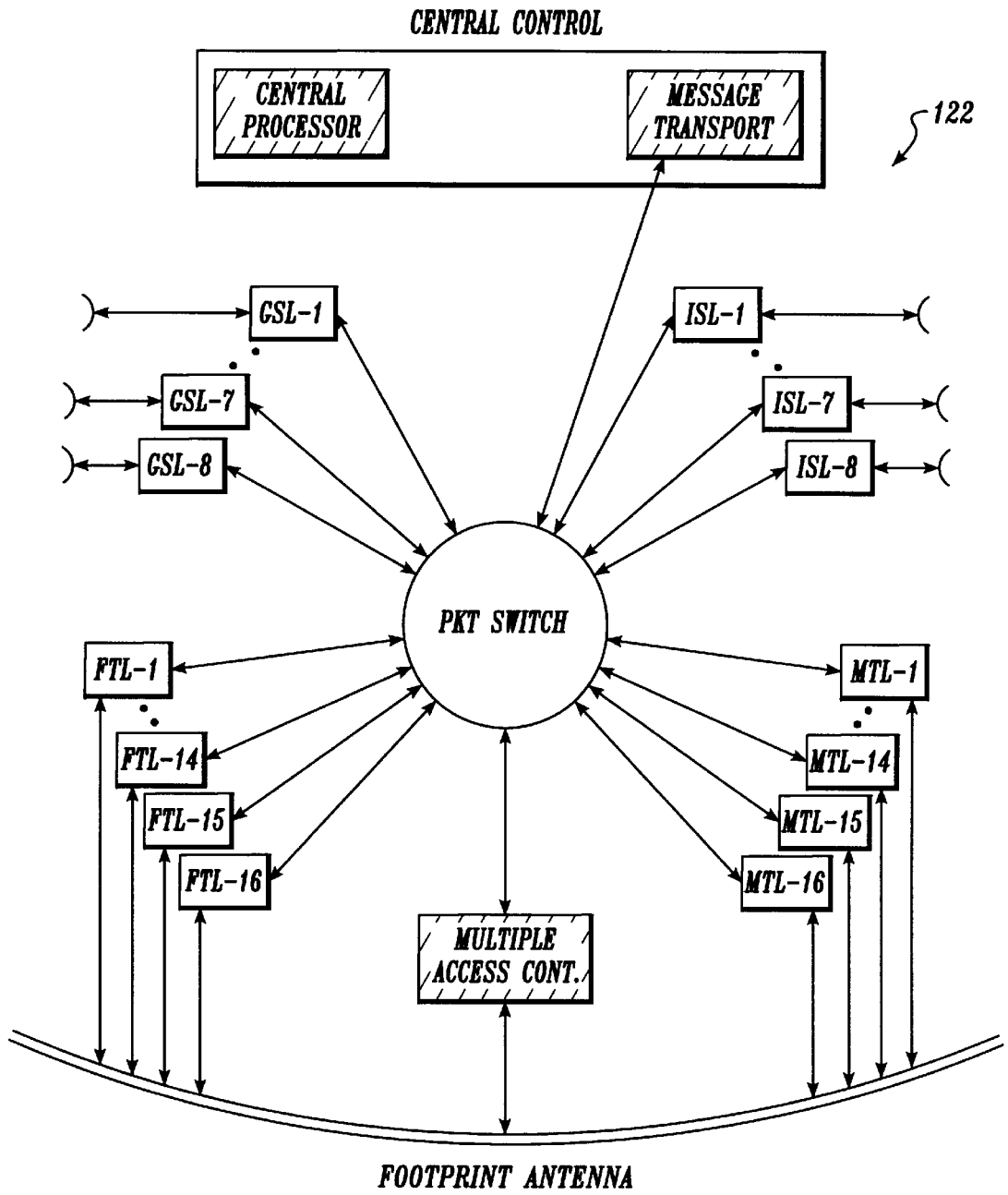
FIG. 37 is a schematic diagram which discloses system architecture of a satellite node.
Figure 38:
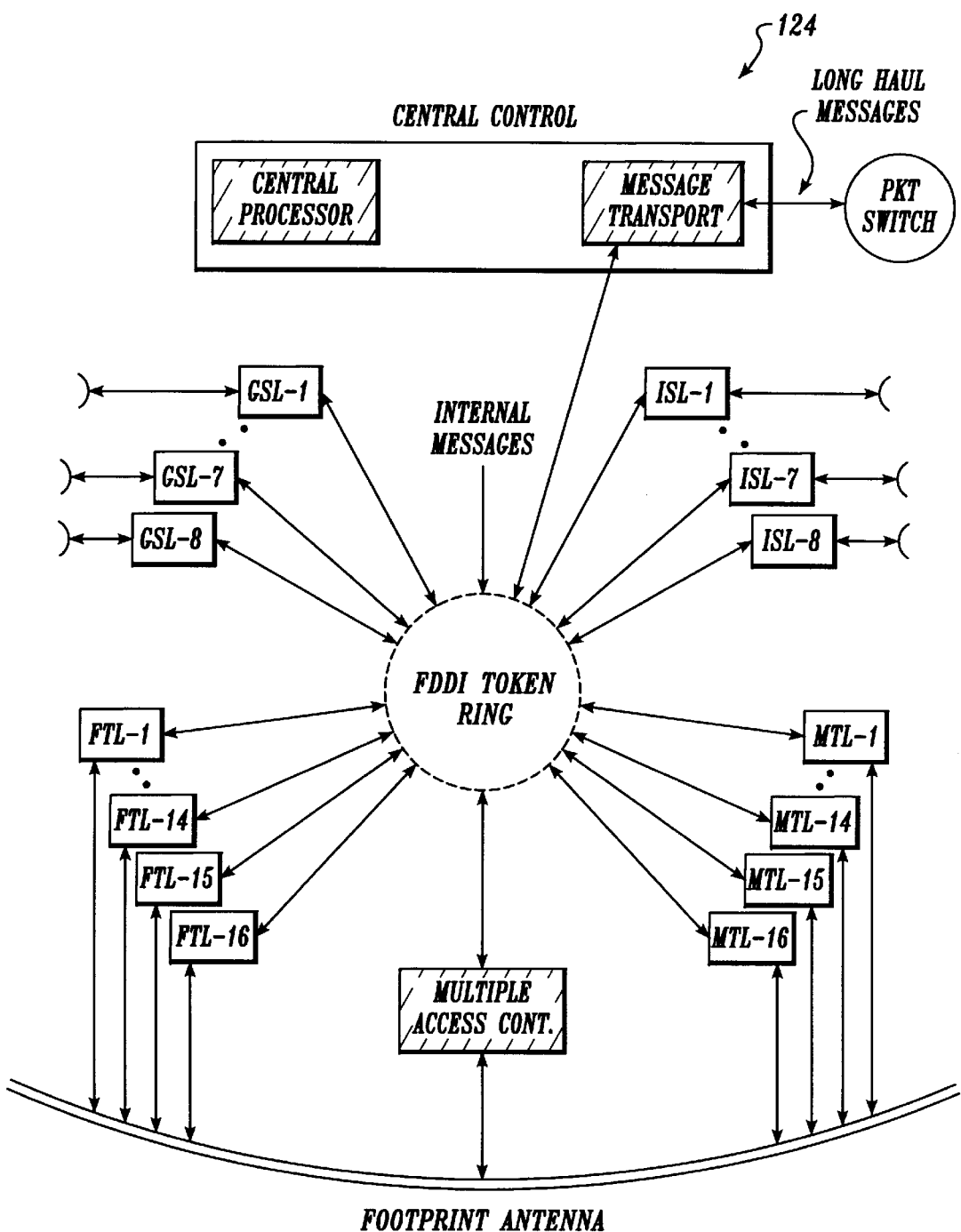
FIG. 38 is a schematic diagram of a system message switching architecture.
Figure 39:
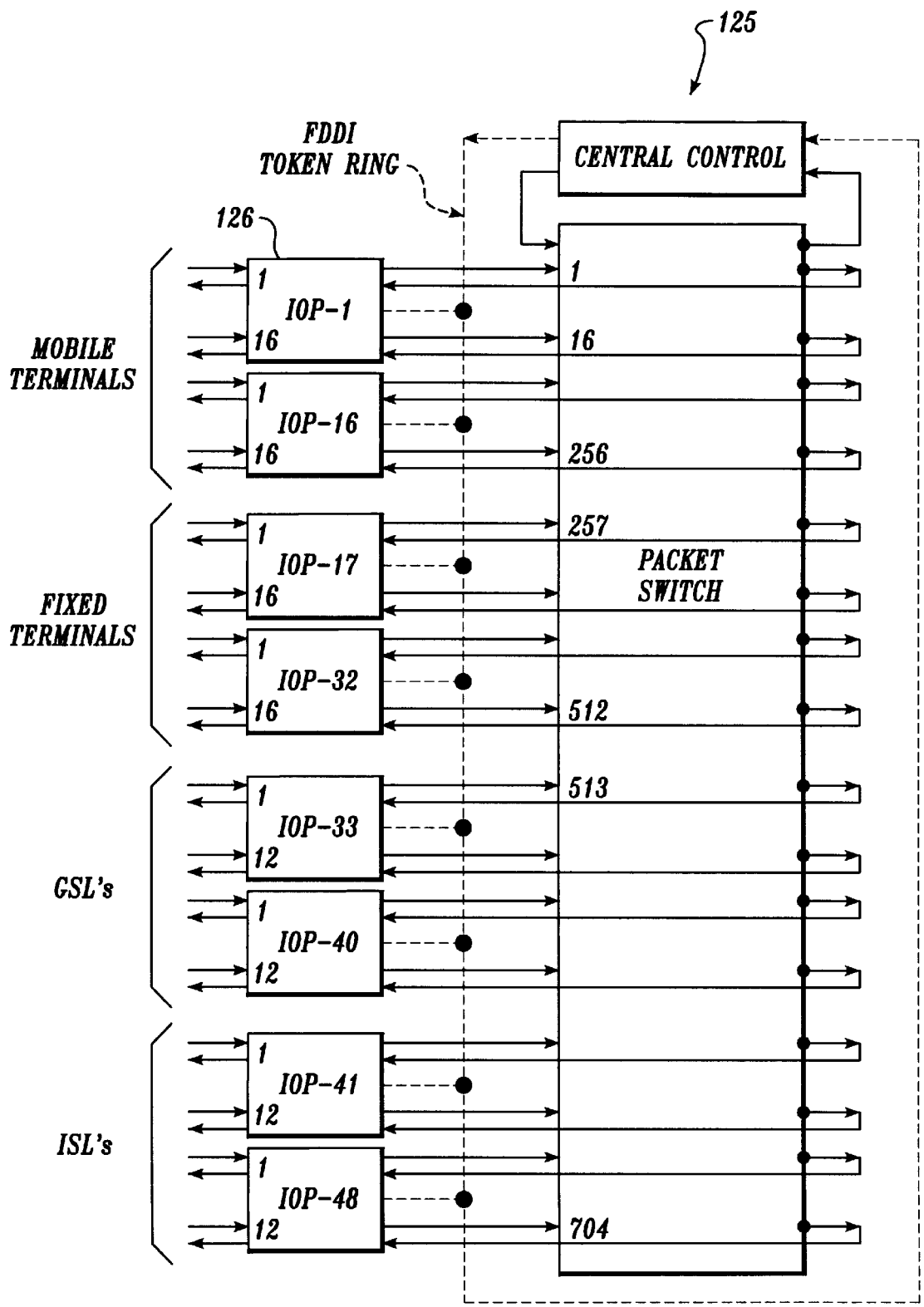
FIG. 39 is a schematic diagram of a packet switch and input output processors in a token ring.
Figure 40:
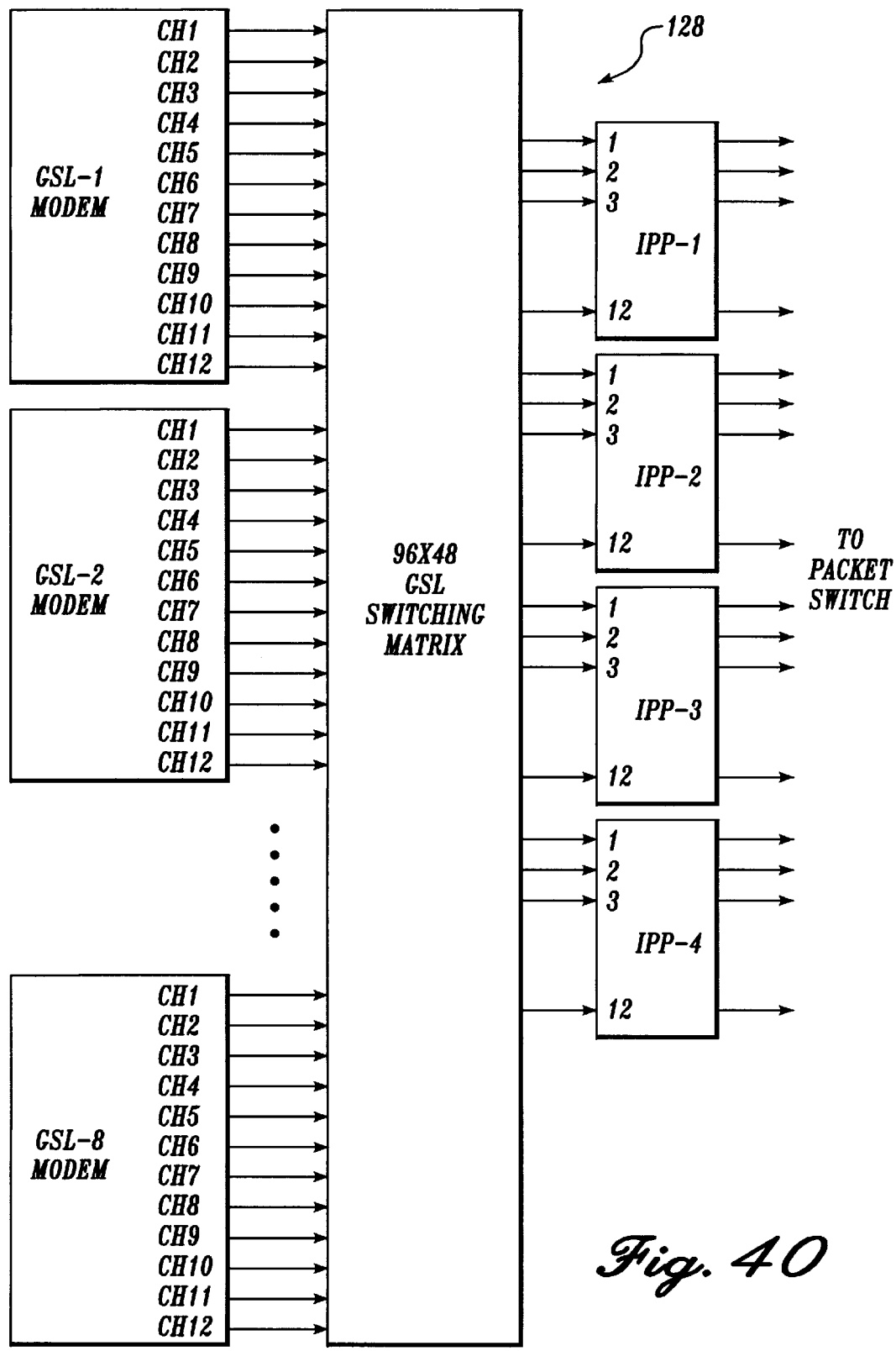
FIG. 40 is a schematic diagram of a GSL switching matrix.
Figure 41:
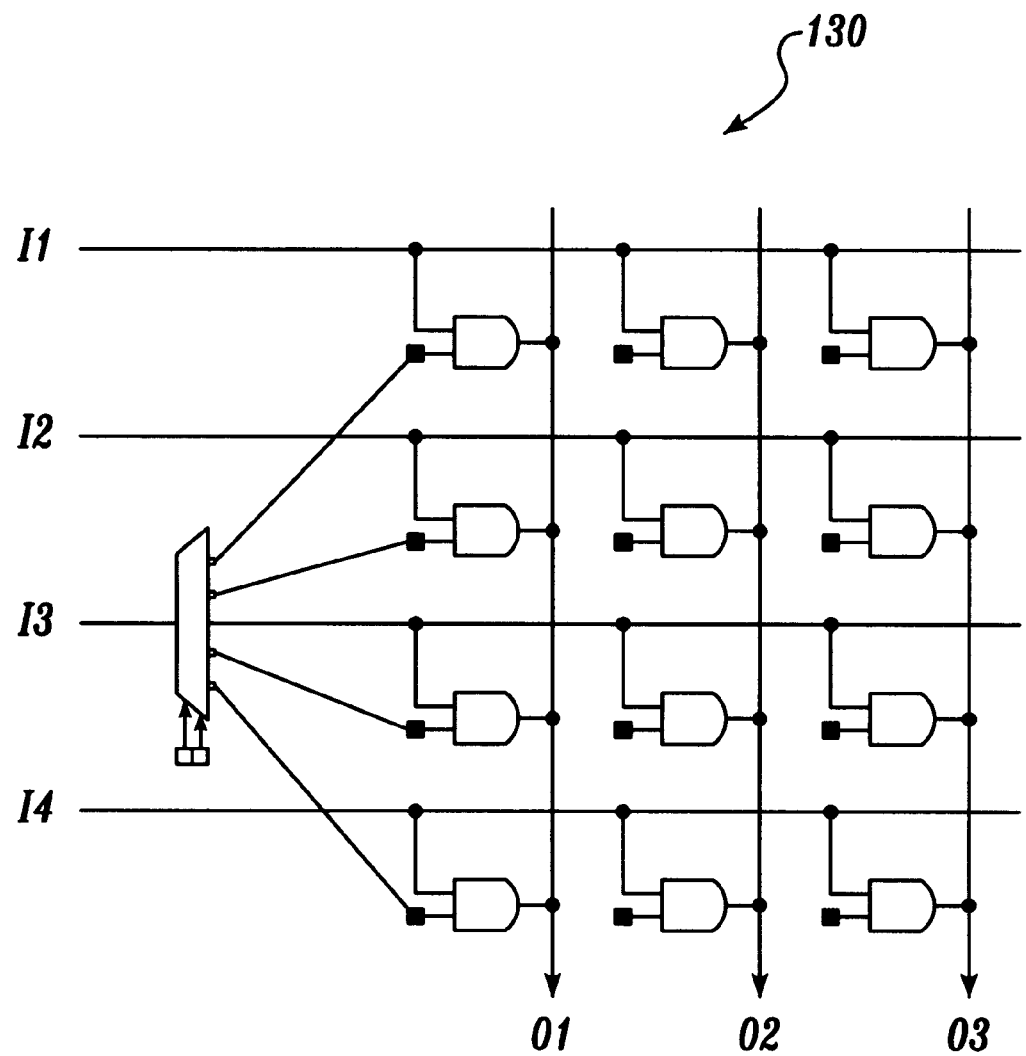
FIG. 41 is a schematic diagram of switching logic circuitry.
Figure 42:
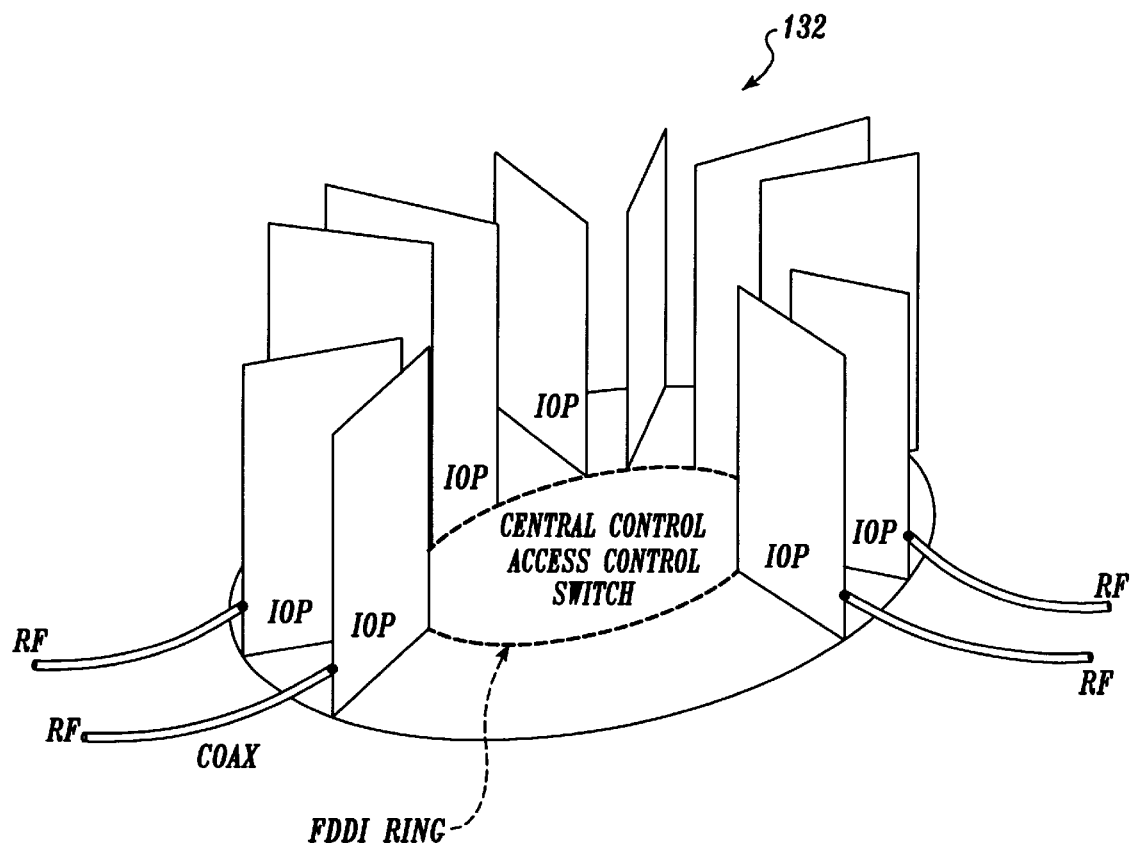
FIG. 42 is a schematic diagram of an FDDI ring.
Figure 43:
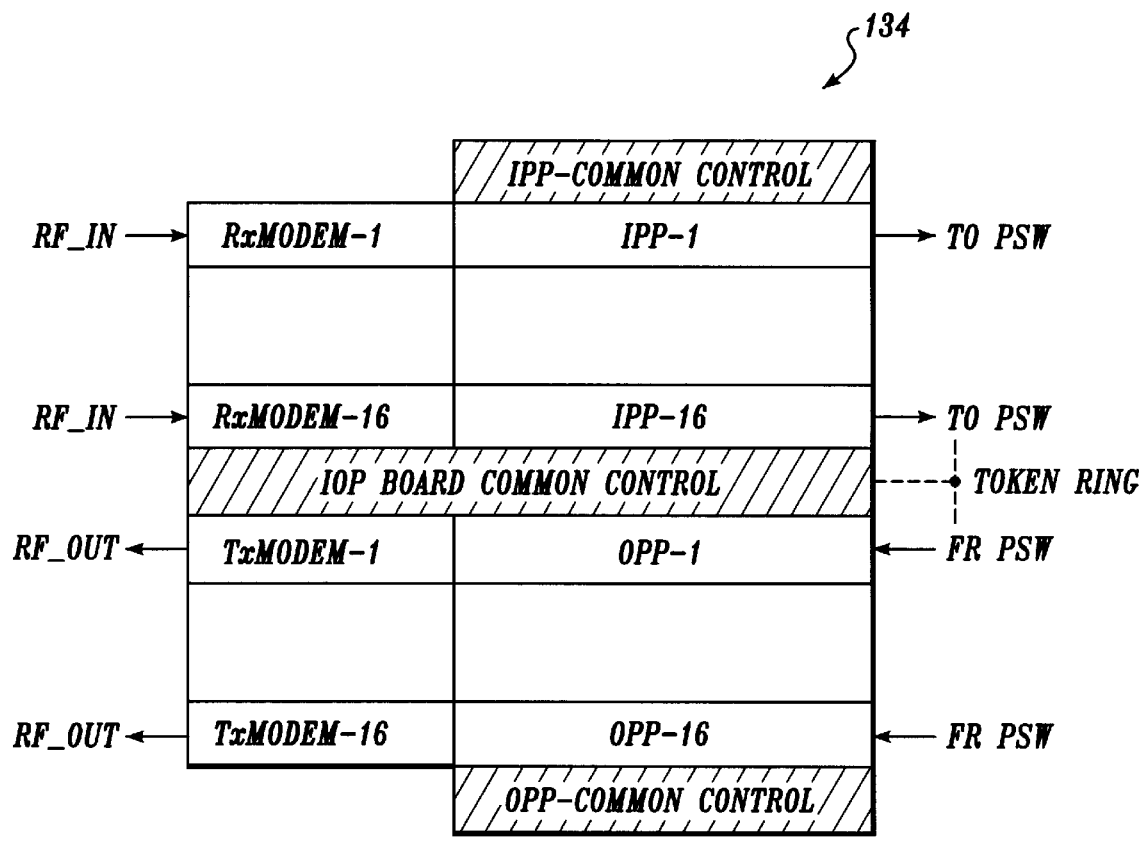
FIG. 43 is a schematic diagram of an input-output packet processor board.
Figure 44:
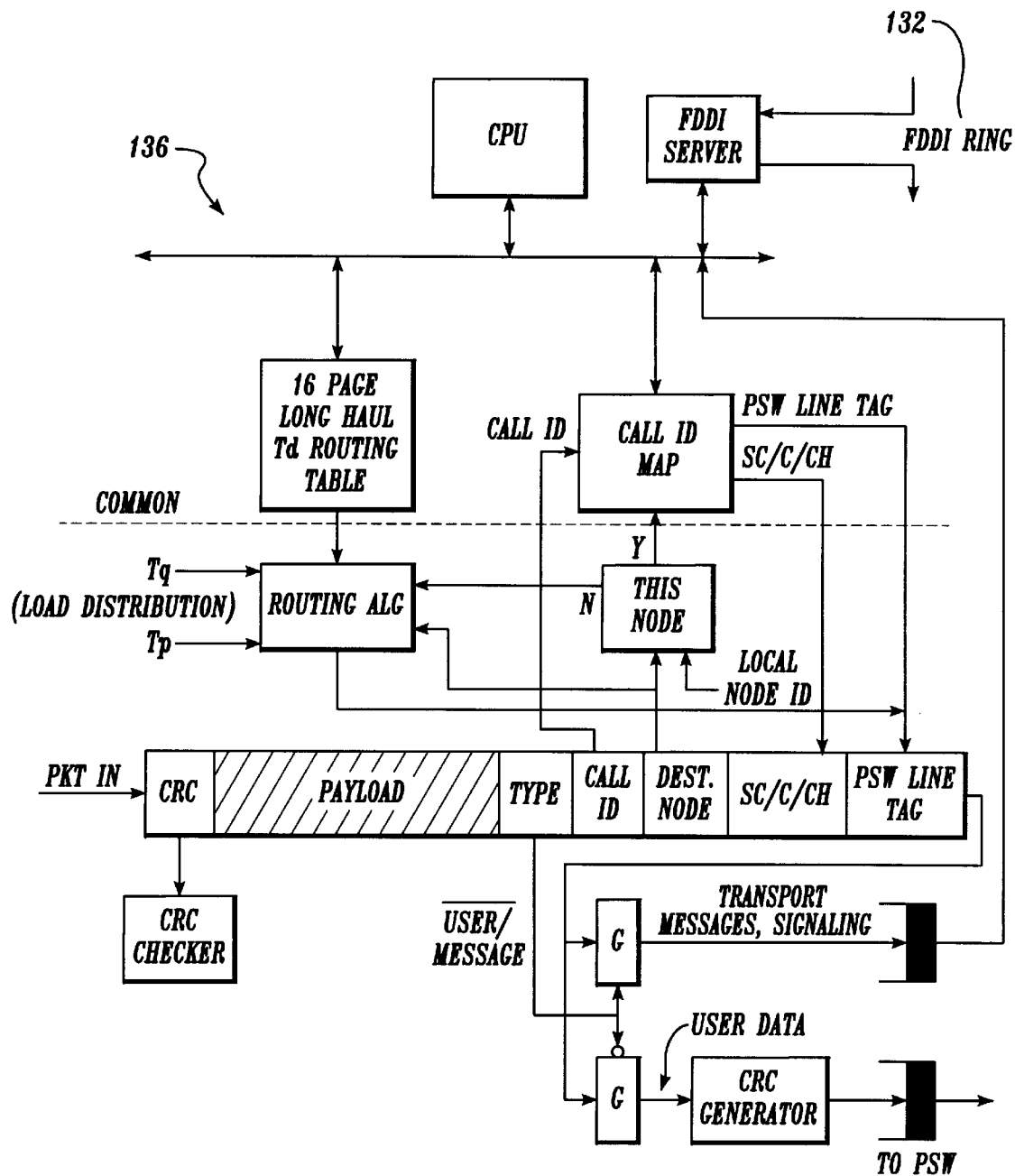
FIG. 44 is another schematic diagram of an input packet processor.
Figure 45:
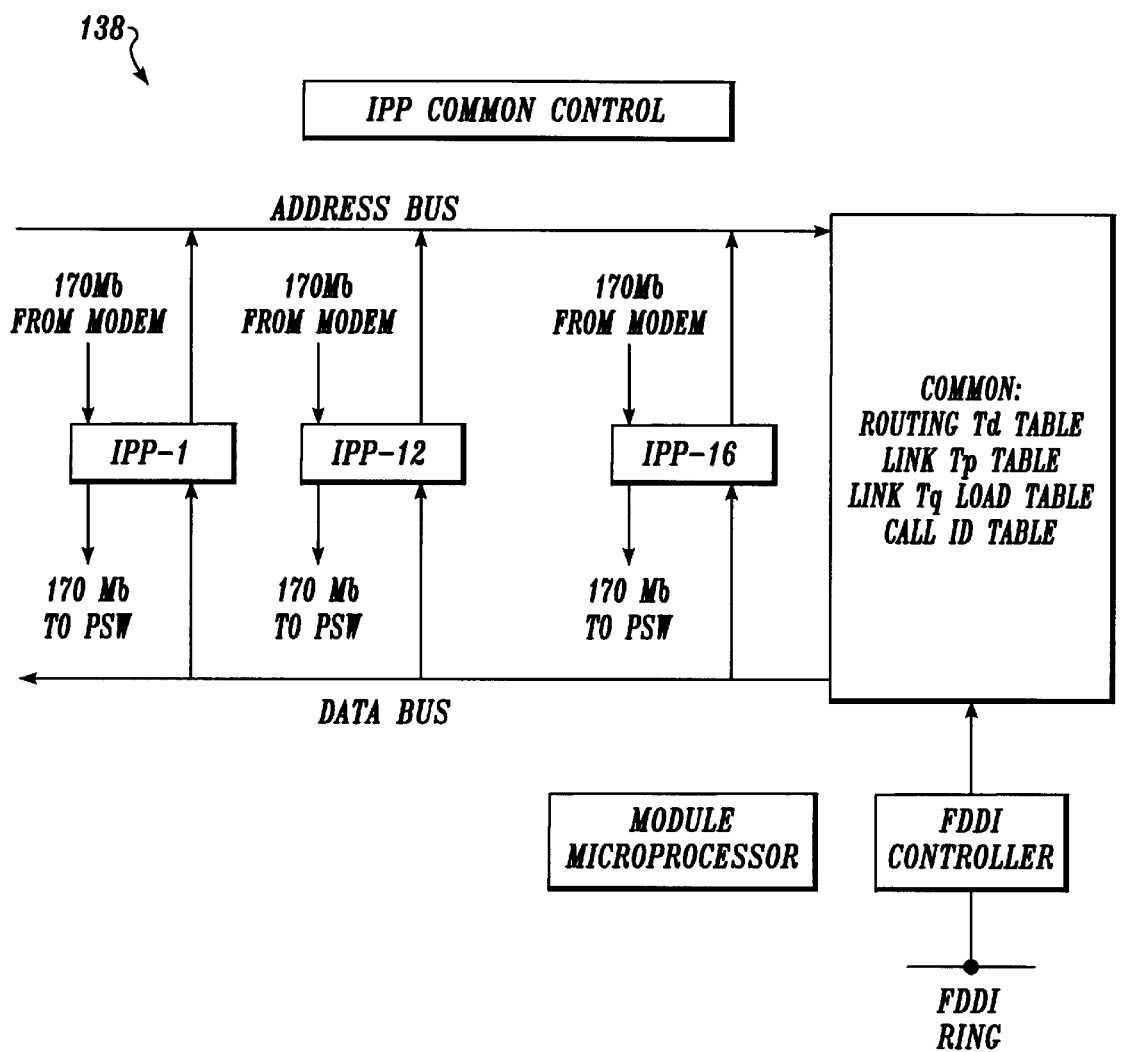
FIG. 45 is a schematic diagram showing IPP common control.
Figure 46:
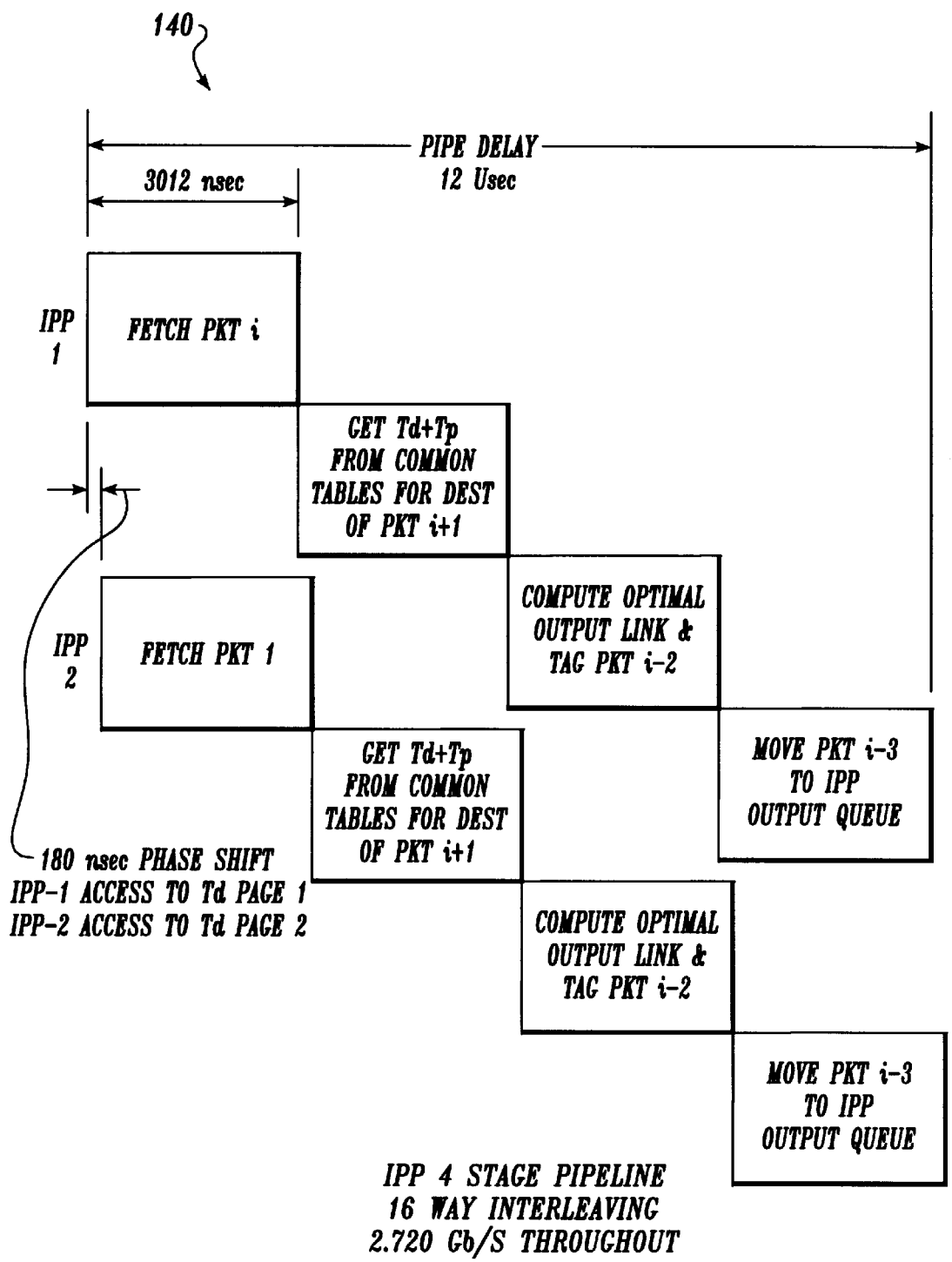
FIG. 46 is a schematic diagram of an IPP 4-stage pipeline.
Figure 47:
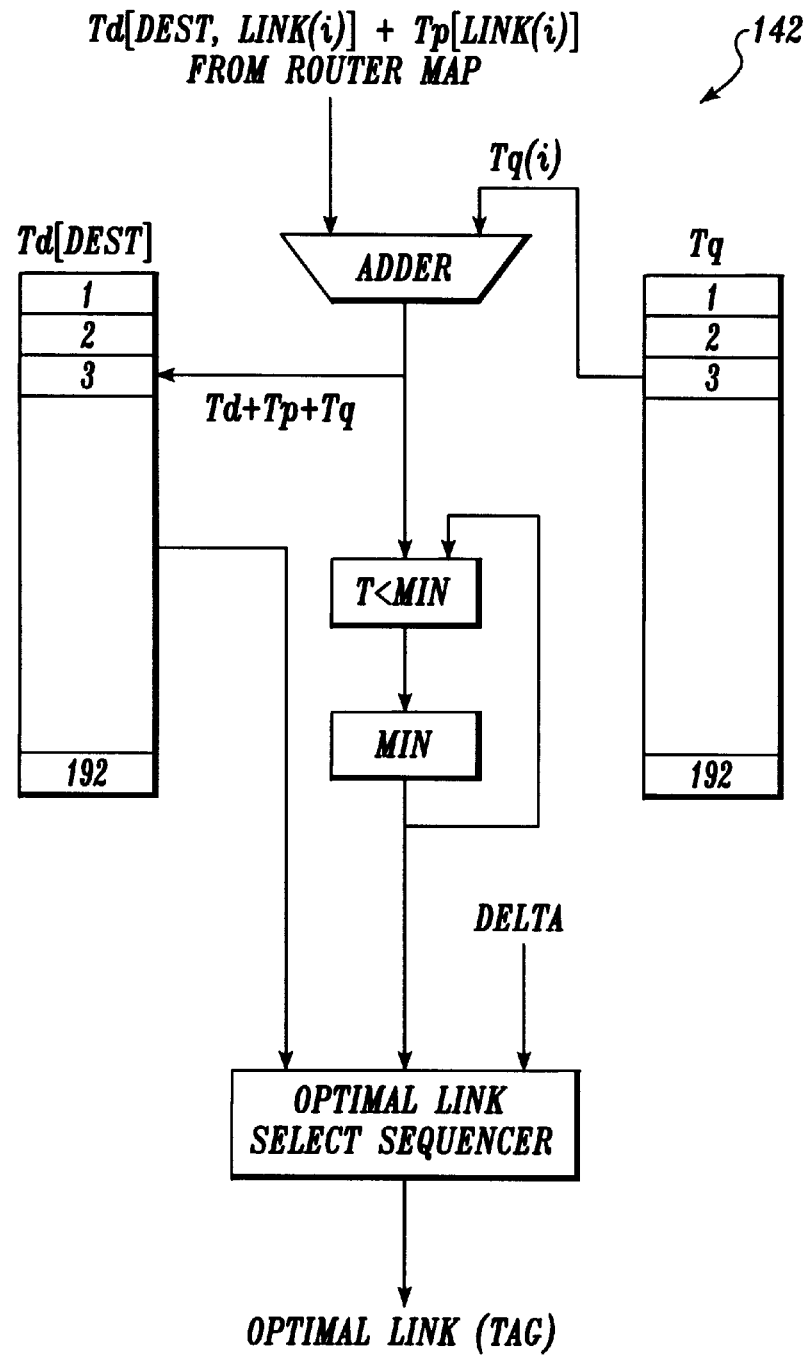
FIG. 47 is a schematic diagram of an IPP optimal route controller.
Figure 48:
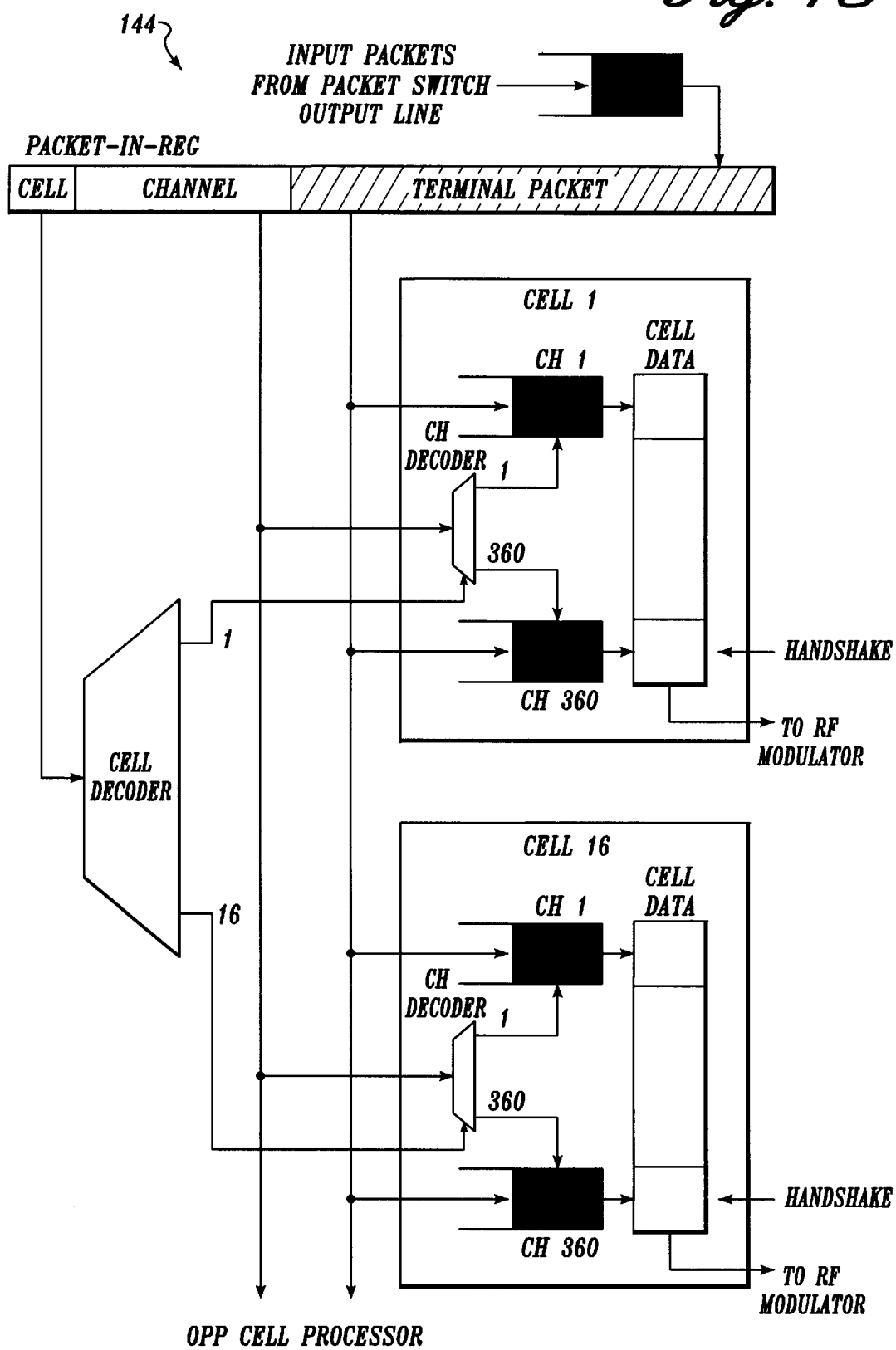
FIG. 48 is a schematic diagram of an OPP cell processor.
Figure 49:
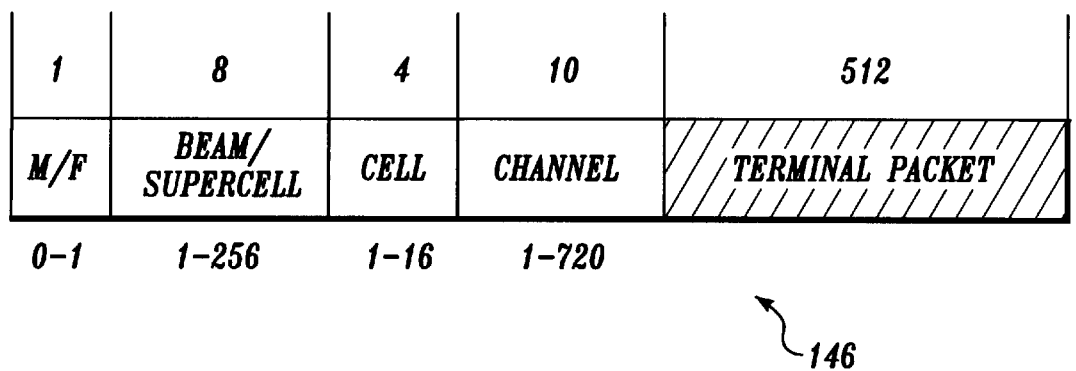
FIG. 49 is a schematic diagram of output packet structure.
Figure 50:
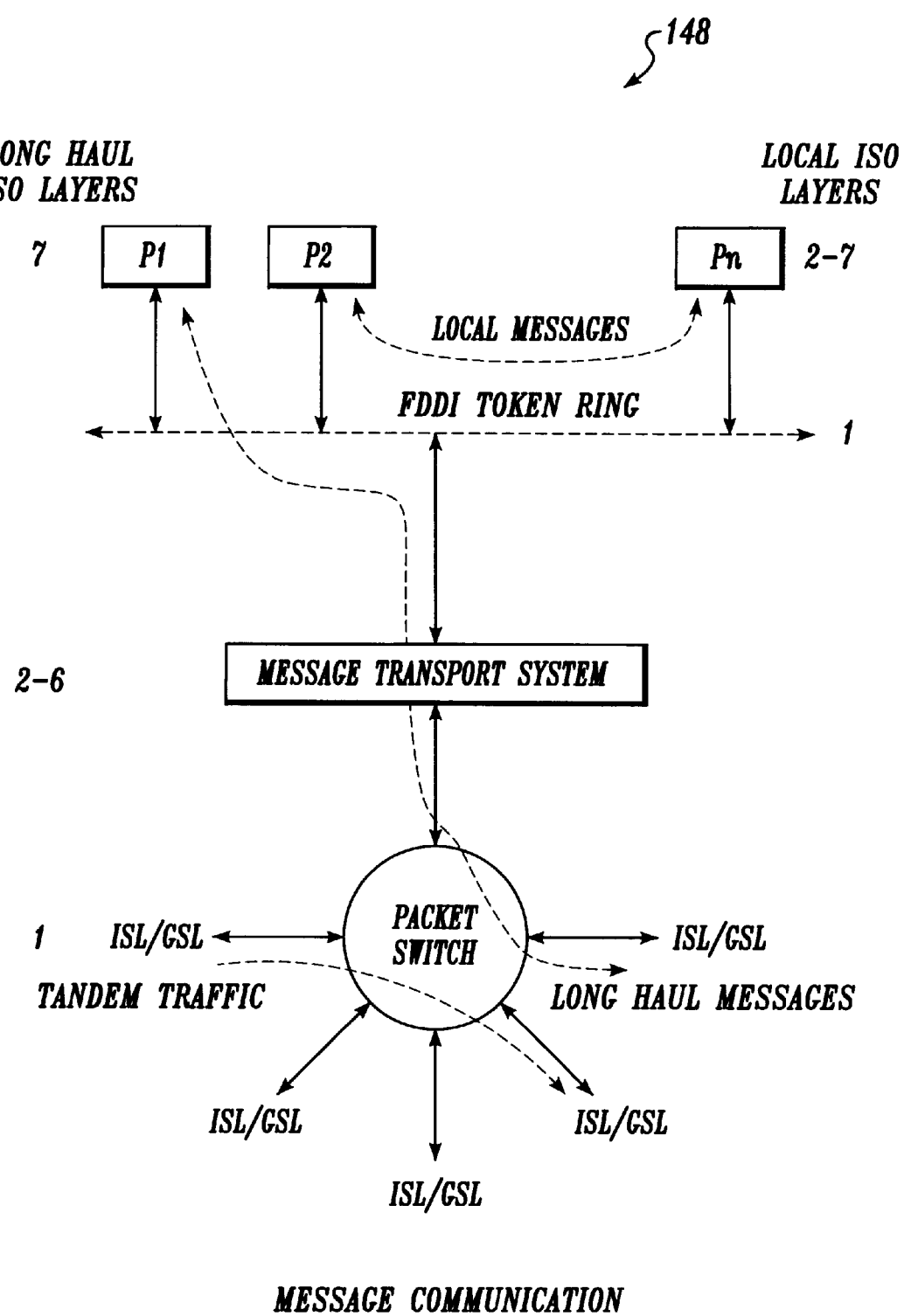
FIG. 50 is a schematic diagram that portrays a message communication.
Figure 51A:
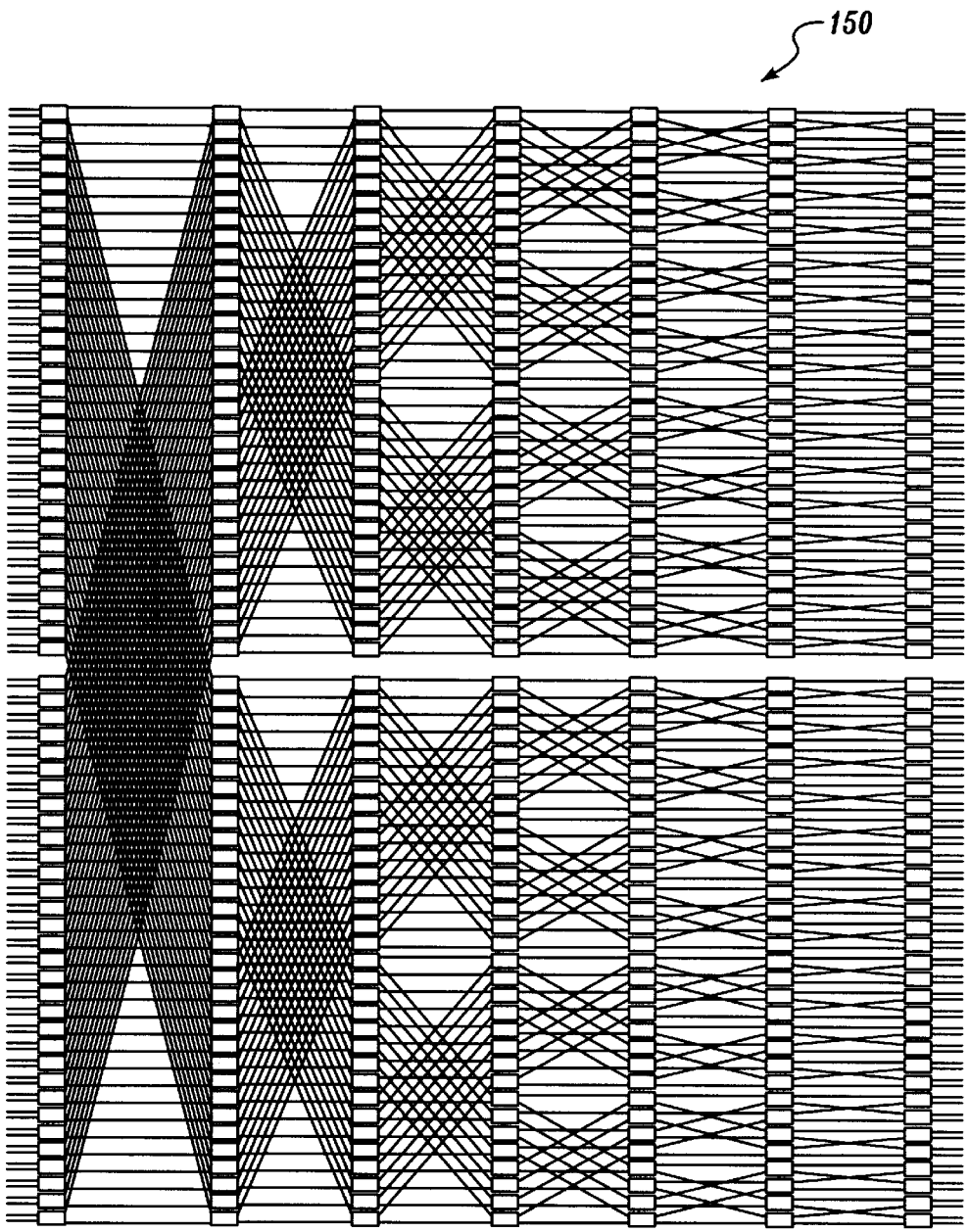
FIG. 51a is another schematic diagram of a 128 by 128 switch.
Figure 51B:
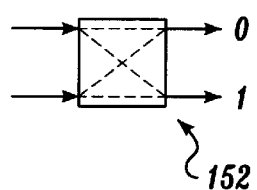
FIG. 51b is another schematic diagram of a switching cell.
Figure 52:
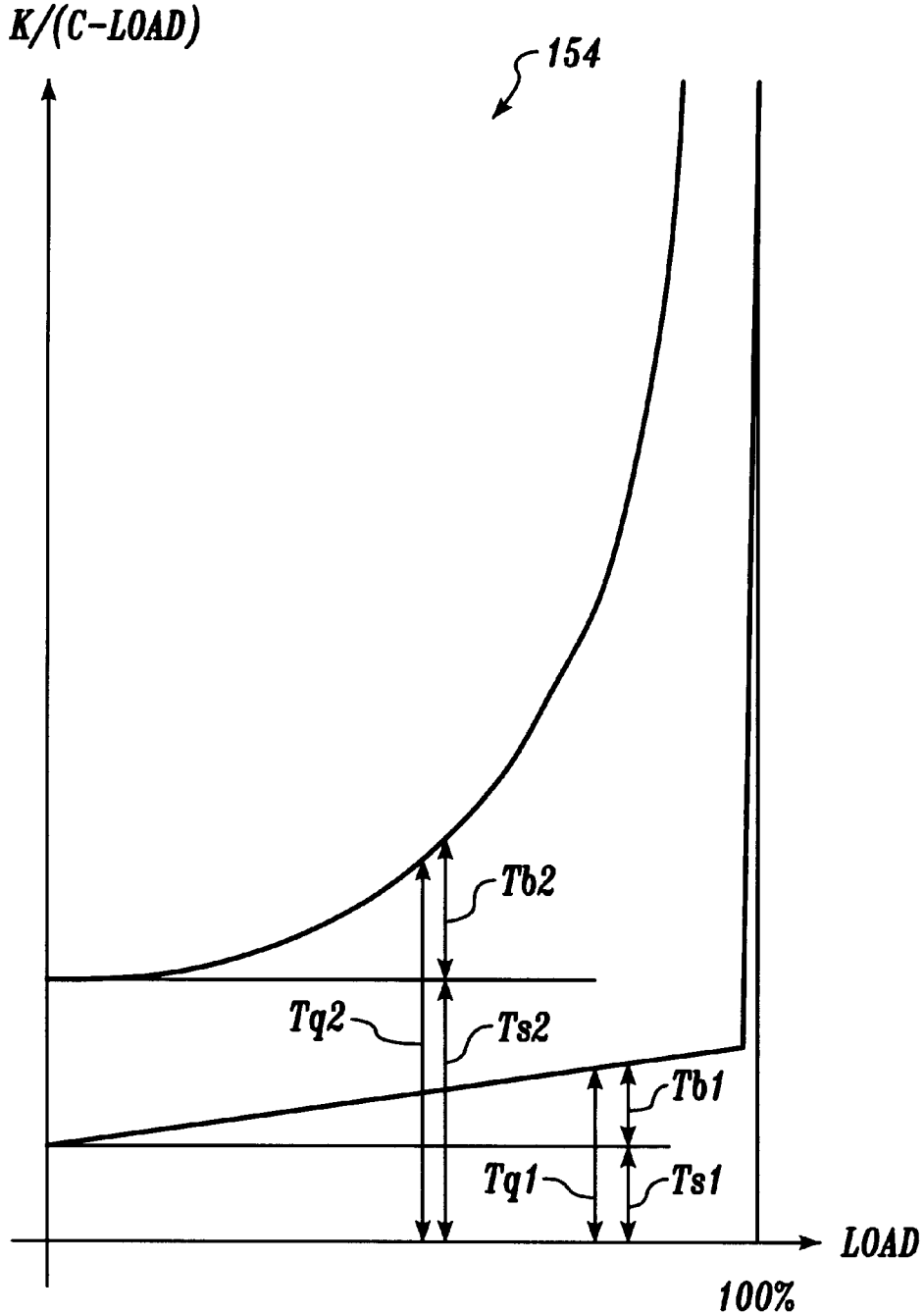
FIG. 52 is a graph of actual packet transmission time, LINK_Q_DELAY, versus traffic load.
Figure 53:
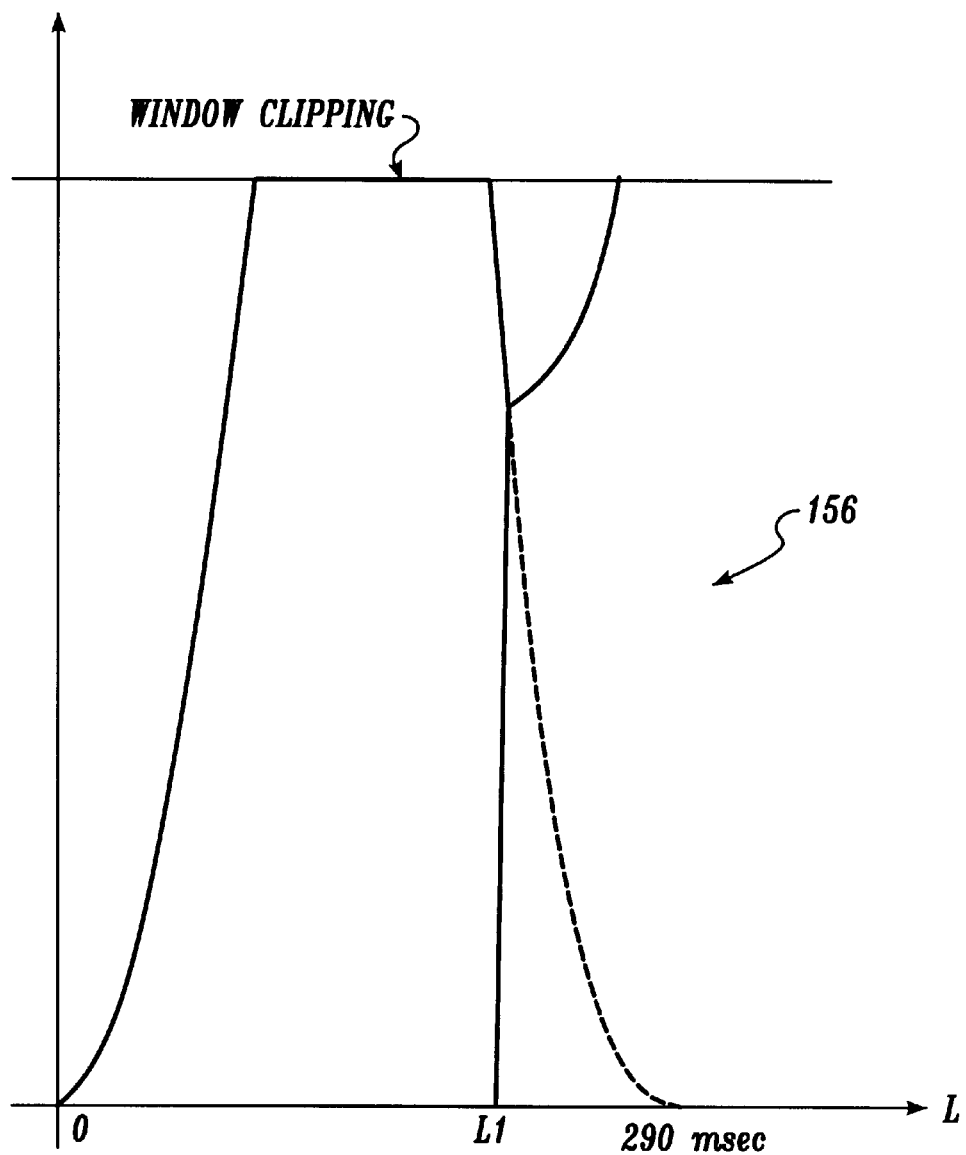
FIG. 53 is a graph of message generation rate versus time.
Figure 54:
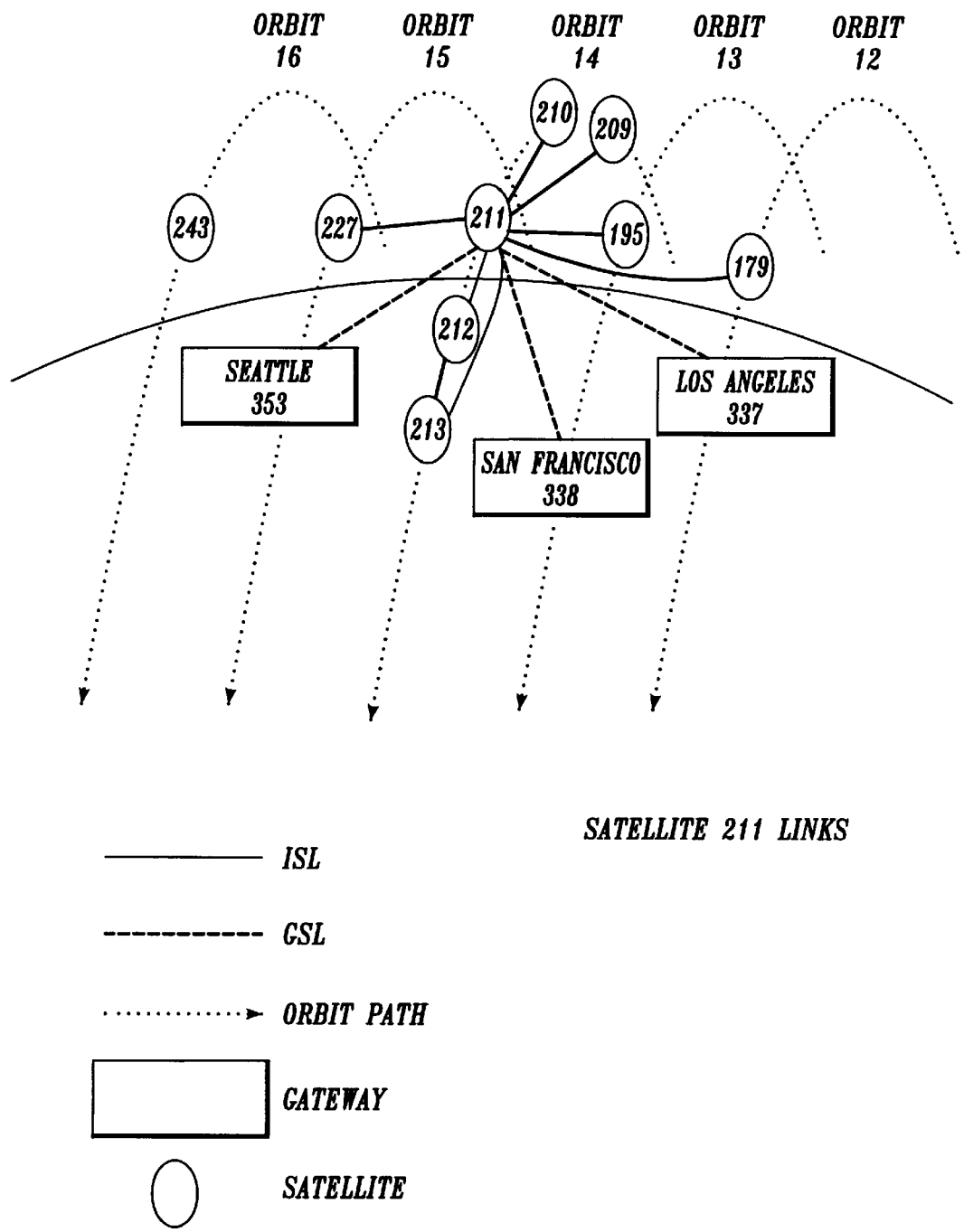
FIG. 54 shows eight intersatellite links and three gateway-satellite links emanating from a single satellite.

FIG. 7 is a chart 50 that exhibits the components of distributed network simulator. FIG. 8 exhibits the dynamic packet routing methods 52. The router 54 uses entries stored in routing tables 46 to instruct packet routers 56 how to process packets 26 to a sorting network 58 and associated transmitters 60. FIG. 9 is a diagram 61 showing terminals, satellites, databases, a feature processor, and a gateway. Three disparate rates of diffusion 62, 64 and 66 for routing information diffusing through the constellation are pictured in FIGS. 10a, 10b and 10c. FIG. 11 is a schematic diagram 68 showing node traffic flow. FIG. 12 is a schematic diagram 70 of a channel decoder/encoder. FIG. 13 is a schematic diagram 72 of an output module. FIG. 14 is a schematic diagram 74 of a footprint output module (1 of 8). FIG. 15 is a schematic diagram 76 of fast packet switch architecture. FIG. 16 is a schematic diagram 78 of a footprint input module. FIG. 17 is a schematic diagram 80 of a 64 by 6 switch. FIG. 18 is a schematic diagram 82 of a packet router. FIG. 19 is a schematic diagram 84 of a system message switching architecture. FIG. 20 is a schematic diagram 86 of the switching system architecture. FIG. 21 is a schematic diagram 88 of a central control system within the switch architecture. FIG. 22 is a schematic diagram 90 of a distributed control architecture. FIG. 23 is a schematic diagram 92 showing RF power versus switch bandwidth at maximum call capacity. FIG. 24 is a schematic diagram 94 which illustrates traffic distribution. FIG. 25 supplies an enhanced view of the switching architecture 96. FIG. 26 reveals an enhanced view of a structure of packets 98 which including a header 28 and a payload 30. FIG. 27 is a schematic diagram 100 of an input packet processor. FIG. 28 is a schematic diagram 102 of a 128 by 128 switch. FIG. 29a is a schematic diagram 104 of an 80 by 80 fast packet switch. FIG. 29b shows a single switching cell 106. FIG. 30 is a schematic diagram 108 of a footprint output module (1/42). FIG. 31 is a schematic diagram 110 of a mobile terminal supercell beam transmitter. FIG. 32 is a schematic diagram 112 of a fixed terminal supercell beam transmitter. FIG. 33 is another schematic diagram 114 of a RF power versus switch bandwidth at maximum cell capacity. FIG. 34 is another schematic diagram 116 of a packet structure. FIG. 35 is a schematic diagram 118 showing internal traffic flow. FIG. 36 is a flow chart which demonstrates the general flow of signals 120 through the fast packet switch 22. FIG. 37 reveals the overall architecture of the satellite node 122 as it relates to the packet switching process. FIG. 38 is a schematic diagram 124 of a system message switching architecture. FIG. 39 is a schematic diagram 125 which portrays the relationship among the relationship among the fast packet switch 22 and Input Output Packet processor (IOP) units 126. FIG. 40 is a schematic diagram 128 of a GSL switching matrix. FIG. 41 is a schematic diagram 130 of switching logic circuitry. FIG. 42 is a schematic diagram 132 of an FDDI ring. FIG. 43 is a schematic diagram 134 of an input-output packet processor board. FIG. 44 reveals the details of the input packet processor (IPP) 136 that is connected to a FDDI ring 132. FIG. 45 is a schematic diagram 138 showing IPP common control. FIG. 46 exhibits an IPP four stage pipeline 140. FIG. 47 is a flow chart that explains the general process performed by an IPP Optimal Route Controller 142. FIG. 48 is a schematic diagram 144 of an OPP cell processor. FIG. 49 is a schematic diagram 146 of output packet structure. Message communication 148 within the switching hardware is revealed in FIG. 50. FIG. 51a is a schematic diagram 150 that exhibits the pathways within a 128×128 switch 150, while FIG. 51b is a schematic diagram of a switching cell 152. FIG. 52 is a graph 154 of actual packet transmission time, LINK_Q_DELAY, versus traffic load. In the Specification that follows, related terms are joined by an underline, "i" without characters printed above them. This format is a standard convention in the field of computer programming and is not intended to suggest deletions in the text. In the Claims, the underline character is replaced with a hyphen "–" to avoid any suggestion that the Claims contain deletions. FIG. 53 is a graph 156 of message generation rate versus time. FIG. 54 shows eight intersatellite links and three gateway satellite links emanating from a single satellite. FIGS. 55 through 61 provide plots of pocket time delay data. FIG. 62 reveals the fast packet switch environment 158. FIG. 63 is a diagram 160 that shows how packets 26 are sorted and buffered prior to transmission. FIG. 64 is a block diagram 162 that portrays FPS output link selection hardware.

Each satellite S in the constellation is a switching node which is treated equally as an independent and sovereign member of the network. Since each satellite S is constantly moving relative to all the other satellites in the network, the broadcast link lengths, and, therefore, the propagation delays of the packets, also vary. As the satellites S move in their orbits, the group of satellites which is visible from any other satellite S, gateway G or terminal M, F, P at any given time is constantly changing. A satellite S that is visible from a gateway G at a particular time may not be visible a few minutes later, and a previously invisible satellite S may come into view within the same few minutes. The underlying network topology, which embodies the interconnection geometry among the network elements, changes continuously, and requires the router to continuously adapt to the changing topology. The time varying network topology is irregular, as opposed to the regular topology of a ring, cube or star, and represents an arbitrary mesh configuration. The network topology also changes when new satellites are deployed, when the useful life of some members of the original constellation come to an end, or when satellite or link failures; occur. The traffic load or intensity on links changes randomly due to normal traffic statistics, fluctuations and varying call patterns. These load changes l,ad to variable link queuing delays, in addition to variable link propagation delays. Because "news" occurring in one portion of the network does not reach all the nodes in the network simultaneously, the router must make decisions based upon imperfect information. The deficiencies of the information that is available to the router are caused by both a lack of correctness and the tardiness.

Distributed Routing

The present invention comprises an adaptive dynamic distributed routing algorithm designed specifically to operate in the Satellite Communication System environment. Packets 26 generated at traffic sources are switched through the network in a store-and-forward fashion. The router at each hop forwards the packet to the next hop, minimizing the packet end-to-end delay which the packet experiences in its trip from the source to the destination. The decision of how to forward a packet is determined by each hop independently with no a-priori or static route determination. Routing decisions are based on the latest information available to the router at the switching hop, and reflect dynamic global network considerations as well as the local node considerations. In the one of the preferred embodiments, both satellites and gateways possess routing capabilities, so the term "node" is used to refer both to satellites and to gateways. A gateway G is treated simply as a stationary satellite. The term "routing" not only includes the process of directing each packet 26 at each node, but embraces the related operations of controlling traffic flow, overloads and congestion; and optimizing traffic distribution.

FIG. 6 may also be described as a canonical representation 38 of the router, viewed as a finite state machine. The router considers data collected locally from the router itself, as well as from other local sources such as the topology manager. Routing data is also received from peer routers located at neighboring nodes. Inter-node message communication is facilitated by the node Message Transport System (MTS). The router forms its local "view of the world" from this information, and shares it with local processes and peers in neighboring nodes. One of the key characteristics of the present invention relates to the method that a router in each node employs to exchange information with its neighboring peers. This exchange permits a node to learn the specific status of its neighbors and its neighbors' views of the rest of the network. Each node can influence or even coerce its neighbors to factor the local node's state into their own actions. The node can then deduce and construct a local routing strategy consistent with the rest of the network, and can also participate in influencing the overall distributed network routing strategy. The final distributed strategy results from the joint cooperation of all nodes.

This "self-organizing" approach is accomplished subject to the following objectives:

1. Interaction is permitted only among immediate neighbors. If each of the N network nodes has an average of K neighbors, the total number of "pair-wise" interactions is on the order of K*N instead of the astronomical N*(N−1) pairs of interactions.

2. The routing strategy deduced independently by each node must be correct and consistent throughout the network. In normal operation no routing loops may be created. Major failure events however may lead to temporary but detectable and recoverable routing loops.

3. Minimum end-to-end packet delivery delay must be assured. The optimal performance of the entire network is judged based on both local and global network considerations.

4. The network is configured to permit full routing connectivity so that any node OUR_NODE can optimally communicate with any other node DEST_NODE.

5. Alternate routes are created whenever possible.

6. The network must be adaptive to changes in network load and traffic patterns, and be capable of functioning in an arbitrary network topology.

7. Each node in the network is designed to behave as independently as possible of other nodes and its routing algorithm is designed to be insensitive to the time that routing information is received from its neighbor nodes. Its decisions are always based on the most current information it possesses. The network must maintain the highest levels of asynchronous and time-independent behavior. The network always "tries" to do the best job at any given time with the information and nodes that are currently available.

8. The entire system is self-initializing, and is capable of automatically learning about previously unknown nodes, such as newly deployed nodes.

An Example

Some of the essential parameters of one example of cane of the preferred embodiments of the invention are described in Tables 1, 2 and 3. Depending on the constellation, many other alternative sets of parameters can be employed to practice the invention.

TABLE 1

The Satellite Constellation

| | |
|---|---|
| Satellite Altitude | 700 km |
| Orbital Inclination | 70 degrees |
| Elevation Mask Angle | 15 degrees |
| Intra-orbit Overlap Ratio | 0.2238 |
| Band Overlap Ratio | 0.1249 |

TABLE 2

Satellite Deployment

| | |
|---|---|
| Orbits | 21 |
| Satellites per Orbit | 16 |
| Total Satellites | 336 |

TABLE 3

Gateways
(Nodes aboard satellites are numbered 1 to 336)

| | |
|---|---|
| G Los Angeles | 337 |
| G San Francisco | 338 |
| G New York | 339 |
| G Melbourne | 340 |
| G Liverpool | 341 |
| G Capetown | 342 |
| G Tokyo | 343 |
| G Helsinki | 344 |
| G Rio de Janeiro | 345 |
| G Jerusalem | 346 |
| G Moscow | 347 |
| G Chicago | 348 |
| G Dallas | 349 |
| G Miami | 350 |
| G Atlanta | 351 |
| G Denver | 352 |
| G Seattle | 353 |
| G Sebuku | 354 |

TABLE 3-continued

Gateways
(Nodes aboard satellites are numbered 1 to 336)

| | |
|---|---|
| G Peking | 355 |
| G Bayanhongor | 356 |

Estimating Packet Delays

In the following example, packets are sent from an originating node called "OUR_NODE" and are received at a destination node called "DEST_NODE".

In a constellation of satellites, the number of possible destinations for packets originating at OUR_NODE is one node fewer than the total number of satellites in the constellation.

DEST_NODE and OUR_NODE are considered to be neighbors of each other if each has set up a direct link to the other. A link used by OUR_NODE to transmit packets to a neighbor is called a TX_LINK, while the neighbor receiving packets over this link refers to the same link as an RX_LINK. Each TX_LINK has a matching RX_LINK in the reverse direction, i.e., links are implemented in full duplex. In normal conditions absent any faults, the total number of transmit and receive links are the same, or:

OUR_TOTAL_RX_LINKS=OUR_TOTAL_TX_LINKS.

The total number of RX_LINKs from OUR_NODE to all its neighbors is designated OUR_TOTAL_RX_LINKS, and, similarly, the total number of TX_LINKs to OUR_NODE is called OUR_TOTAL_TX_LINKS. OUR_NODE associates a link identification number with each link:

1, 2, ... , $\mathcal{L}$, ... , OUR_TOTAL_TX_LINKS.

OUR_NODE may have more than one TX_LINK to any given neighbor and the total number of neighbor nodes of OUR_NODE is designated by the value:

OUR_TOTAL_NEIGHBORS.

OUR_NODE maintains a table referred to as:

OUR_NEIGHBOR that identifies the neighbor node at the remote edge of each of OUR_NODE's links. OUR_NEIGHBOR [$\mathcal{L}$] identifies the neighbor node connected to link $\mathcal{L}$. When OUR_NODE is in possession of specific packet to be delivered to some other final destination node DEST_NODE(PACKET), associated with the router OUR_NODE must decide which of its TX_LINKs will be used to transmit PACKET to DEST_NODE(PACKET). Optimal routing occurs when end-to-end packet transmission delays are minimized. The router on OUR_NODE maintains a table named OUR_DELAY_EST which contains delay estimates. The table OUR_DELAY_EST has a total of TOTAL_NODES rows and OUR_TOTAL_TX_LINKS columns. This table also includes one row for each possible DEST_NODE in the network, and one column for each of OUR_NODE's TX_LINKs, the "candidate" links. The table entry called OUR_DELAY_EST[DEST_NODE, $\mathcal{L}$]

is OUR_NODE's current best estimate of the total time it would take a packet to reach DEST_NODE from OUR NODE if OUR NODE were to choose TX_LINK $\mathcal{L}$ as the link on which the packet will be forwarded to DEST_NODE. Entries of the row in the table that correspond to OUR_NODE (i.e., the delay estimate from OUR_NODE to OUR_NODE) are, by definition, set to zero.

Each entry OUR_DELAY_EST[DEST_NODE, $\mathcal{L}$] is computed using Algorithm 1:

OUR_DELAY_EST[DEST_NODE, $\mathcal{L}$] =

LINK_PROP_DELAY[$\mathcal{L}$] + LINK_Q_DELAY[$\mathcal{L}$] +

OUR_NEIGHBOR_DELAY_EST[DEST_NODE,

OUR_NEIGHBOR[$\mathcal{L}$]]

where LINK_PROP_DELAY[$\mathcal{L}$] is the current propagation delay of link $\mathcal{L}$ connecting OUR_NODE to the neighbor OUR_NEIGHBOR [$\mathcal{L}$] terminating $\mathcal{L}$ at its remote edge. The value LINK_PROP_DELAY[$\mathcal{L}$] varies with time as the distance between OUR_NODE and OUR_NEIGHBOR [$\mathcal{L}$] changes with satellite movement. The node link manager periodically updates the value of LINK_PROP_DELAY[$\mathcal{L}$] for each link. An Autonomous Orbit Determination algorithm performs and calculates the values of LINK_PROP_DELAY[$\mathcal{L}$].

LINK_Q_DELAY[$\mathcal{L}$] is the current link queuing delay consisting of two components, Twait_in_q and Ttx. Twait_in_q represents the time spent by a packet in the link $\mathcal{L}$ buffer waiting for all the packets ahead of it in the queue to be transmitted. Ttx is the actual packet transmission time once a packet reaches the head of the queue (called the "service time" in queuing theory). Ttx is a function of the packet length and the link transmission bandwidth. Both Twait_in_q and LINK_Q_DELAY increase as the link traffic load increases. The higher the link bandwidth, the wider the range of the semi-linear dependency of LINK_Q_DELAY on the offered traffic load. This relationship is quite different from the exponential behavior of LINK_Q_DELAY when the link bandwidth is low, as shown in FIG. 52. The functional behavior of LINK_Q_DELAY is described by the following expression:

LINK_Q_DELAY~k/(link_bw−exerted_load)          Equation 4

Until the exerted load approaches the link bandwidth, LINK_Q_DELAY is about constant, but beyond that point, LINK_Q_DELAY is exponential. This behavior is a direct consequence of the law of large numbers which, when applied in this context, suggests that scaling up both the link bandwidth (service capacity) and the exerted traffic load by the same factor results in a decrease of LINK_Q_DELAY by the same factor. Because of the very high capacity of the 150 Mbit links, the links between the nodes in the network can be used very efficiently and at loads approaching 100% of the total link bandwidth. Because the value of LINK_Q_DELAY may change very rapidly in time, its value is measured by hardware which tracks the link transmit buffer size. This monitoring circuitry provides an instantaneous measured value of LINK_Q_DELAY.

OUR_NEIGHBOR_DELAY_EST

The router in OUR_NODE maintains a table OUR_NEIGHBOR_DELAY_EST with TOTAL_NODES rows and OUR_TOTAL_NEIGHBOR columns. A particular entry:

OUR_NEIGHBOR_DELAY_EST[DEST_NODE, OUR_NEIGHBOR[$\mathcal{L}$]]

stores the delay reported by OUR_NEIGHBOR[$\mathcal{L}$] to OUR_NODE (via a message) stating the least delay from itself (OUR_NEIGHBOR[$\mathcal{L}$]) to DEST_NODE after the neighbor has considered the delay from itself to DEST_NODE over all of its links.

The time varying terms LINK_PROP_DELAY and LINK_Q_DELAY are derived by OUR_NODE locally. The OUR_NEIGHBOR_DELAY_EST table is derived from estimate reports to OUR_NODE from all neighbors. It represents a "dependent" and distributed term. The delay estimates received from neighbors, in turn, depend on the estimates of each of their respective neighbors (one of which may possibly be OUR_NODE). From the routers' viewpoint, and assuming traffic load control issues are ignored, the optimal link from OUR_NODE to DEST_NODE is that TX_LINK $\mathcal{L}$ for which OUR_DELAY_EST(DEST_NODE, $\mathcal{L}$) is currently lowest. The actual link used by OUR_NODE to forward packets to DEST_NODE is not always the optimal link. If objectives concerning traffic load distribution are factored into the decision, another link may be chosen.

OUR_NODE maintains a table called

OUR_MIN_DELAY_EST(DEST_NODE)

with TOTAL_NODES rows. This table contains one row for each DEST_NODE known to OUR_NODE. Table row DEST_NODE stores the current minimum delay estimate from OUR_NODE to DEST_NODE, i.e., the delay estimate from OUR_NODE to DEST_NODE over OUR_NODE's optimal link to DEST_NODE.

The Information Sent By A Node To Its Neighbors

The routing process in each satellite is based on a node like OUR_NODE, as opposed to a gateway-based node. OUR_NODE sends routing data (comprising internal delay estimates) to each of its neighbors, including its gateway neighbor nodes. The routing data is refreshed and sent periodically. In the preferred embodiment of the invention, the data is refreshed and sent about every 50 milliseconds (msec). In addition to the regular updates every 50 msec, routing data is also transmitted:

when a local event has been detected by the router of OUR_NODE affecting its own routing tables;

upon OUR_NODE's receipt of information from one or more of its neighbors which leads to changes in delay estimates contained in the local routing tables in a way that might possibly affect other nodes; and upon a request by another local process, such as the topology manager, when detecting certain events affecting the router.

The routing message is transported by the Message Transport System (MTS) and is sent by OUR_NODE to each of its neighbors OUR_NEIGHBOR[$\mathcal{L}$]over the TX_LINK ($\mathcal{L}$=1, 2, . . . , L) connecting OUR_NODE to that neighbor.

This message is called the routing information message:

OUR_REP_DELAY_EST(OUR_NEIGHBOR_NODE($\mathcal{L}$), DEST_NODE)

This message comprises TOTAL_NODES entries including one for each DEST_NODE known to OUR_NODE. The entry in the particular position DEST_NODE represents OUR_NODES's report to NEIGHBOR_NODE($\mathcal{L}$) of OUR_NODE's current minimum delay estimate to DEST_NODE. In most cases (see below) it is set to the corresponding value in table OUR_MIN_DELAY_EST (DEST_NODE). Table Four summarizes the entries in the Routing information table.

TABLE 4

The Routing Information Message

| DEST_NODE | OUR_REP_DELAY_EST(OUR_NEIGHBOR($\mathcal{L}$),DEST_NODE) |
|---|---|
| 1 | OUR_MIN_DELAY_EST($\mathcal{L}$) |
| 2 | OUR_MIN_DELAY_EST(2) |
| . | . |
| x | OUR_MIN_DELAY_EST(x) |
| . | . |
| TOTAL_NODES | OUR_MIN_DELAY_EST(TOTAL_NODES) |

Some entries in OUR_REP_DELAY_EST are not the true delay from OUR_NODE to DEST_NODE.

TABLE 5

LINK STATES

A link may be in one of the following states:
S1: Logically disconnected
S4: Disconnect in progress
S5: Normal information exchange The state names shown in Table 5 are borrowed from the X24 protocol and have similar meanings.

Generating the Transmission Routing Information Message

If a link $\mathcal{L}$ is not active i.e., not in S4 or S5, the neighbor OUR_NEIGHBOR[$\mathcal{L}$] is ignored and a routing information message is not sent to that destination. If a packet is sent from node OUR_NODE to node DEST_NODE using link $\mathcal{L}$, the delay value OUR_MIN_DELAY_EST(OUR_NODE, DEST_NODE, which represents an entry in the routing information message sent by OUR_NODE over link $\mathcal{L}$ to neighbor OUR_NEIGHBOR[$\mathcal{L}$] is set by the router of OUR_NODE using the following steps:

1. Select next destination node DEST_NODE.
2. If all values of DEST_NODE have been processed, go to Step 9.
3. Use Algorithm 1, presented on page 36 above, for each link $\mathcal{L}$ of OUR_NODE to find that link which currently yields the least OUR_MIN_DELAY_EST (OUR_NODE,DEST NODE, $\mathcal{L}$) to DEST_NODE. Call that link $\mathcal{L}$, the opt_link. If OUR_NODE can not reach DEST_NODE over any link, set opt_link to NULL.
4. If OUR_NODE is equal to DEST_NODE, set OUR_MIN_DELAY_EST(OUR_NODE,DEST NODE) to zero to reflect the delay from OUR_NODE to itself.
5. Otherwise, if opt_link is NULL, then set OUR_MIN_DELAY_EST(OUR_NODE,DEST_NODE) to infinity to signify that DEST_NODE can not be reached from OUR_NODE. This condition represents an infinite delay.

6. Otherwise, if opt_link is the same as link $\ell$, i.e., the link over which the routing information message/ message is about to be sent to neighbor OUR_NEIGHBOR[$\ell$]), then set OUR_MIN_DELAY_EST(OUR_NODE,DEST_NODE) to infinity. This step is crucial for avoiding routing loops. It signals to OUR_NEIGHBOR[$\ell$] that it should avoid using OUR_NODE for reaching DEST_NODE because either:
   DEST_NODE can not be reached at all from OUR_NODE (See Step 3); or
   OUR_NODE is currently using OUR_NEIGHBOR [$\ell$] to reach DEST_NODE.

7. Otherwise, set OUR_MIN_DELAY_EST(OUR_NODE, DEST_NODE) to OUR_MIN_DELAY_EST(OUR_NODE, DEST_NODE, opt_link). This case arises when, OUR_NODE can reach DEST_NODE and the optimal path to DEST_NODE is not via OUR_NEIGHBOR[$\ell$].

8. Repeat Step 1.

9. Send the routing information message to neighbor OUR_NEIGHBOR[$\ell$].

10. If this send procedure was triggered as a result of the periodic transmission process, then schedule in the next transmission. This step may be different if the procedure was triggered by an urgent send request, which is described below.

Processing Received Routing Information Messages

The input link over which OUR_NODE receives a routing information message is designated by Li. OUR_NODE can be either a satellite S or a gateway G. Link Lo designates its complement output link. Each entry OUR_NEIGHBOR_DELAY_EST[OUR_NEIGHBOR[$\ell$], DEST_NODE] in the vector is the delay from neighbor OUR_NEIGHBOR[$\ell$] to node DEST_NODE. Upon receiving a routing information message, the local router updates table OUR_NEIGHBOR_DELAY_ESTLo(Li*, DEST_NODE), and deduces any implied changes. Routing information messages sent subsequently by the router to its neighbors will reflect these changes. If a routing information message is received over an input link having no associated complement output link, the message is ignored and discarded. This transient condition may arise during a link disconnect procedure, which is discussed below. Otherwise, each vector entry is processed using a Process Reception Routing information message comprising the following steps:

1. Set variable opt_link_changes to zero.

2. If all entries DEST_MODE have been processed, skip to Step 17, otherwise select the next DEST_NODE in sequence.

3. If DEST_NODE is the same as OUR_NEIGHBOR [$\ell$], then set table entry OUR_NEIGHBOR_DELAY_ESTLo(Li*, Li*)=0.

4. Otherwise, if DEST_NODE is the same as OUR_NODE, then set table entry OUR_NEIGHBOR_DELAY_ESTLo(Li*, DEST_NODE)=0.

5. Otherwise, if OUR NEIGHBOR_DELAY_EST(Li*, DEST_NODE) is the same as that reported in the previous vector, that is OUR_NEIGHBOR_DELAY_ESTLo (Li*, DEST_NODE)=OUR_NEIGHBOR-DELAY_EST(Li*, DEST_NODE), return to Step 2.

6. Set OUR_NEIGHBOR_DELAY_ESTLo(Li*, DEST_NODE)=OUR_NEIGHBOR_DELAY_EST (Li*, DEST_NODE).

7. Set old_opt_link(DEST_NODE) to be the optimal link used to reach DEST_NODE from OUR_NODE up until the present time.

8. Use Algorithm 1 to compute old_delay(DEST_NODE), which is the delay estimate from OUR_NODE to DEST_NODE with the old parameters.

9. Use Algorithm 1 for each link $\ell$ OUR_NODE to compute new_opt_link(DEST_NODE): the new optimal link to DEST_NODE factoring in the new parameters.

10. Use Algorithm 1 to compute new_delay(DEST_NODE), which is the delay estimate from OUR_NODE to DEST_NODE with the new parameters.

11. If new_opt_link(DEST_NODE) is the same as old_opt_link(DEST_NODE), then return to Step 2. The delay to DEST_NODE may have changed up or down, but not enough to cause the optimal link to DEST_NODE to switch.

12. Increment variable opt_link_changes.

13. If old_opt_link(DEST_NODE) is NULL and new_opt_link(DEST_NODE) is not NULL, deduce that node DEST_NODE is a new node which can now be reached from OUR_NODE via link Lo. Enter new DEST_NODE into the routing tables.

14. Otherwise, if old_opt_link(DEST_NODE) is not NULL and new_opt_link(DEST_NODE) is NULL, deduce that DEST_NODE has been detached from the net and is no longer reachable from OUR_NODE. Remove DEST_NODE from the routing tables. This conclusion may be premature in the event of a major failure, but, in that case, the condition indicated by Step 13 will occur as soon as the network adapts.

15. Otherwise, if old_opt_link(DEST_NODE) is not NULL and new_opt_link(DEST_NODE) is not NULL, decide that if old_delay(DEST_NODE) is now very high, e.g., more than the maximum allowable transmission echo delay of 100 msec, the switch occurred because DEST_NODE can no longer be reached from OUR_NODE via old_opt_link (DEST_NODE) In this instance, new_opt_link (DEST_NODE) provides a good alternate route. This event may occur routinely when the network adapts to local or global changes in the network topology. In some cases, the switch occurs because new_opt_link (DEST_NODE) provides a lower delay compared to old_opt_link(DEST_NODE). In this case, old_opt_link(DEST_NODE) may become an alternate route to DEST_NODE.

16. Return to Step 2.

17. If opt_link_changes is greater than zero, urgently send the latest routing information message to each neighbor to supply the latest changes.

Network Adaptation Through Information Diffusion

Phase 1: Topology Adaptation

When Algorithm 1 first begins running within a given node, that particular node has no information about any other nodes in the network. The first routing information message received from one of its neighbors introduces OUR_NODE to that neighbor alone, since that neighbor itself knows only of itself as well. After a short time, each node recognizes all of its neighbor;, roughly within an amount of time that is approximately equal to the LINK_PROP_DELAY of the link interconnecting the two neighbors. In the second "wave" of information the level of "node awareness" increases, and each neighbor NEIGHBOR_NODE of OUR_NODE will report about NEIGHBOR_NODE's neighbors, which are one or two hops away from OUR_NODE. Since each encounter with a new node DEST_NODE triggers OUR_NODE to urgently send the news, See Step 17 above, Process Reception Routing information message to its neighbors, a diffusion process is initiated, in which every node OUR_NODE in the network eventually learns of any other node DEST_NODE. Each node learns that DEST_NODE exists, the best way to reach node DEST_NODE and a first order estimate of the delay from OUR_NODE to DEST_NODE. Any subsequent topological change resulting from satellite, gateway, nodes or links being added or removed also triggers a diffusion and topology adaptation process.

Phase 2: Minimum Delay Adaptation

Although each node has learned some information during the Topology Adaption phase, the adaptation process continues until each node OUR_NODE knows the best way to route packets to each destination DEST_NODE, i.e., how to route packets to achieve absolute minimum end-to-end delays. The Minimum Delay Adaptation Phase is complete when no further optimal link switches occur anywhere in the network. When optimal links are set and do not change, all nodes have jointly agreed on a consistent global solution for routing. This distributed solution is optimal, and though the solution is not necessarily unique, it guarantees that no better solution exists.

Ongoing Adaptation

In the normal course of operation, the link queuing delay, LINK_Q_DELAY, may change as a result of traffic load variations. The link propagation delay, LINK_PROP_DELAY, varies as well, since the many nodes keep moving with respect to each other. The value of LINK_PROP_DELAY is sampled periodically, while the value of LINK_Q_DELAY is sampled by the local router just prior to the transmission of a new routing information message. The packet switch 22 uses the instantaneous value of LINK_Q_DELAY which is measured by circuits at each node. A change in LINK_Q_DELAY or LINK_PROP_DELAY of link $\mathcal{L}$ of node OUR_NODE affect's the delay value OUR_MIN_DELAY_EST(OUR_NODE, DEST_NODE, $\mathcal{L}$ as computed by Algorithm 1. If $\mathcal{L}$ is an optimal link for some destination node DEST_NODE, then the delay change may also lead to a local switch in the optimal link opt_link(DEST_NODE). All routing information messages sent subsequently will reflect these changes, informing the neighbors of the local changes. Even a small change in OUR_MIN_DELAY_EST(OUR_NODE, DEST_NODE, $\mathcal{L}$), which may not even lead to a local optimal link switch, i.e., change in the delay value, may trigger a switch in some neighbors, which, in turn, may lead to a switch in their own neighbors. As a consequence, a small change in one portion of the network may trigger a diffusion and adaptation process that spans the entire network. The changes in the neighbors of OUR_NODE may, in turn, be reflected back to OUR_NODE to trigger more changes in OUR_NODE. These changes may include optimal link switching, which will again be followed by reflections back to neighbors. In most cases, because LINK_PROP_DELAY is sampled frequently and because LINK_Q_DELAY may vary rapidly during, heavy traffic load conditions, the effects of one local change may not have had a chance to fully settle down throughout the network before another local change occurs and a new diffusion and adaptation process is triggered.

Adaptation Rate

The nature of the diffusion process is random and very complex. Each node triggers diffusion waves which result from local conditions. Nodes are also influenced by waves of information originating in other nodes. Since nodes are not evenly spaced and their response to newly arrived information occurs at non-deterministic times, the waves of information do not propagate uniformly about the center of the original cause. These non-deterministic times depend upon the node internal processing conditions, process scheduling priorities, etc. The propagation delay of an event or cause triggered in some node OUR_NODE to another remote node DEST_NODE depends primarily on two factors:

1. The number of hops between the two nodes, since each intervening hop processes the information and then broadcasts its resultant routing information messages in all directions, including the relative backward direction; and
2. The message transmission times which themselves are determined by link propagation delays and the message system queuing delay.

The diffusion process may generate an avalanche of messages which are each multiplied when they are received by a node (See FIGS. 10A & 53). A windowing scheme is employed to limit memory requirements. When the windowing scheme is utilized, messages available for transmission are simply dropped if the window is full. In addition to lowering the amount of message system memory required to buffer messages, this limitation assures, to the greatest extent possible, that only the latest news is transmitted. In the worst case, news will be transmitted during the periodic vector transmission cycle. When the network experiences heavy message communications loads, a node DEST_NODE that is only one hop away from a neighbor OUR_NODE will receive its information from OUR_NODE through another node before receiving the information directly from OUR_NODE.

Diffusion Simulation Results

Computer simulations were performed by the inventor to test the preferred embodiment of the present invention. The simulation employed a small window of size one and which was started in a state in which no node knows of any other node. In this test, Phase One was complete in about 138 milliseconds. Phase One is the period in which all topology information is diffused through the network. The process of forming an optimal minimum delay network is accomplished in Phase Two. In the simulation, Phase 2 was completed in about 292 msec. The window size had a small effect on the adaptation time. Increasing the window size to 4 decreased the adaptation time by about ten percent. In the simulation, LINK_PROP_DELAY was sampled every 50 msec, and the periodic routing information message transmission process operated every 51 msec. This caused new routing information to be generated before it had a chance to be fully diffused into the network. As a result, the distributed adaptation hunted for the optimal solution continuously and never had a chance to settle down.

Routing Table Example

The first six tables in Appendix A provide an abbreviated view of the routing table of node 211, a satellite in the network. The links between node 211 and the network ire shown in FIG. 54. Delays are listed in milliseconds. A very large delay value, such as $1 \times 10^{31}$, is used to represent infinity, i.e., the node is not reachable (NR) via that link. Node 211 can reach node 36, which is also a satellite, via neighbor 195 in 48.990 msec. Node 36 can not be reached via the link to neighbor 210. The lowest delay is 43.099 msec, via neighbor 213. Gateway Los Angeles, abbreviated in the table as G_LOS, is node number 337 and is a neighbor of node 211. The delay between Gateway Los Angeles and node 211 via a direct link is 3.862 msec long. If a satellite is connected to gateways 353, 338, 337, those links can not be used for reaching any satellite or gateway node other than the gateway itself, since a gateway is not allowed to serve as a tandem switch. For example, the delay from node 211 to the Los Angeles gateway is set to infinity for all destination nodes DEST_NODE other than for the Los Angeles node, where the delay is 3.862 msec. The number of hops between an origin and a destination is irrelevant, since the only parameter that is important is the end-to-end delay experienced by packets as they travel through the system.

The next five tables in appendix A show the router delay table of gateway G Los Angeles taken at the same time as the first six tables were taken. The next table shows the end-to-end delay from any gateway to any other gateway. There is no absolute symmetry in the delay estimates between all pairs of gateways. The occasional minute difference is due to computational round-off errors, and also stems from the independent adaptation of each gateway as it adapts to network conditions at different times depending on when news reaches a particular node. For example, gateway Peking ("PEKIN") estimates its delay to gateway Sebuku ("SEBU") at 56.477 microsec only, while Sebuku estimates its delay to Peking at 56.475 microsec, a 2 microsec difference.

Table 18 shows the numbers of hops from LA to each gateway. Table 19 shows the delay from LA to the gateway when no traffic is generated. LA can reach Helsinki (G_HEL) via satellite 211 in 5 hops and 36.273 msec. Alternatively, LA can reach Helsinki via satellite 87 in 10 hops and 39.683 msec. All the tables are read shortly after the topology adaptation is complete at a "no traffic load" condition.

TABLE 18

LOS-ANGELES: Hops To Other Gateways

| Link To Sat | 87 | 211 |
|---|---|---|
| G SAN | 3 | 2 |
| G NEW | 4 | 4 |
| G MEL | 8 | 7 |
| G LIV | 9 | 4 |
| G CAP | 7 | 8 |
| G TOK | 7 | 5 |
| G HEL | 10 | 5 |
| G RIO | 7 | 6 |
| G JER | 6 | 8 |
| G MOS | 11 | 5 |
| G CHI | 3 | 3 |
| G DAL | 3 | 3 |
| G MIA | 4 | 5 |
| G ATL | 4 | 3 |
| G DEN | 2 | 3 |
| G SEA | 3 | 2 |
| G SEB | 4 | 4 |
| G PEK | 6 | 6 |
| G BAY | 4 | 6 |

TABLE 19

LOS-ANGELES: No Load Delays

| link to sat | 87 | 211 |
|---|---|---|
| $T_q$ | 0.003 | 0.003 |
| $T_p$ | 4.132 | 3.858 |
| % util | 0.000 | 0.000 |
| NumTxQ | 0 | 0 |
| MaxTxQ | 0 | 0 |
| G SAN | 13.319 | 7.088 |
| G NEW | 17.516 | 22.772 |
| G MEL | 73.938 | 69.212 |
| G LIV | 37.208 | 34.882 |
| G CAP | 170.960 | 76.378 |
| G TOK | 39.438 | 38.609 |
| G HEL | 39.683 | 36.273 |
| G RIO | 51.034 | 52.868 |
| G JER | 54.287 | 50.144 |
| G MOS | 43.389 | 38.837 |
| G CHI | 12.741 | 16.937 |
| G DAL | 13.576 | 13.484 |
| G MIA | 22.136 | 31.841 |
| G ATL | 18.820 | 18.118 |
| G DEN | 7.702 | 11.976 |
| G SEA | 13.280 | 7.150 |
| G SEB | 30.621 | 30.223 |
| G PEK | 41.792 | 43.430 |
| G BAY | 43.530 | 48.722 |

TABLE 20

LOS-ANGELES: Delays after 2500 circuits are connected

| link to sat | 87 | 211 |
|---|---|---|
| $T_q$ | .006 | 0.651 |
| $T_p$ | 4.131 | 3.860 |
| % util | 30.600 | 99.962 |
| NumTxQ | 1 | 215 |
| MaxTxQ | 6 | 222 |
| G SAN | 13.320 | 7.739 |
| G NEW | 17.518 | 23.420 |
| G MEL | 73.939 | 69.859 |
| G LIV | 37.210 | 3S.531 |
| G CAP | 70.840 | 77.027 |
| G TOK | 39.441 | 39.258 |
| G HEL | 39.686 | 36.922 |
| G RIO | 51.037 | 53.520 |
| G JER | 54.290 | 50.791 |
| G MOS | 43.392 | 39.486 |
| G CHI | 12.743 | 17.588 |
| G DAL | 13.577 | 14.134 |
| G MIA | 22.138 | 32.487 |
| G ATL | 18.823 | 18.774 |
| G DEN | 7.703 | 12.626 |
| G SEA | 13.282 | 7.798 |
| G SEB | 30.623 | 30.873 |
| G PEK | 41.794 | 44.077 |
| G BAY | 43.532 | 49.366 |

TABLE 21

ATLANTA: Delays after 2500 circuits are connected

| link to sat | 119 | 243 |
|---|---|---|
| $T_q$ | 0.006 | .0651 |
| $T_p$ | 4.163 | 3.859 |
| % util | 30.594 | 99.957 |
| NumTxQ | 1 | 215 |
| MaxTxQ | 6 | 222 |
| G LOS | 18.826 | 18.773 |
| G SAN | 23.875 | 18.136 |
| G NEW | 7.030 | 13.025 |

TABLE 21-continued

ATLANTA: Delays after 2500 circuits are connected

| link to sat | 119 | 243 |
|---|---|---|
| G MEL | 78.005 | 78.239 |
| G LIV | 30.255 | 31.180 |
| G CAP | 60.476 | 66.628 |
| G TOK | 43.851 | 49.656 |
| G HEL | 32.732 | 32.571 |
| G RIO | 40.550 | 43.121 |
| G JER | 49.380 | 43.886 |
| G MOS | 36.438 | 34.725 |
| G CHI | 12.775 | 7.189 |
| G DAL | 13.609 | 14.133 |
| G MIA | 22.171 | 22.091 |
| G DEN | 18.258 | 12.625 |
| G SEA | 23.837 | 18.196 |
| G SEB | 33.434 | 30.872 |
| G PEK | 45.821 | 51.014 |
| G BAY | 48.324 | 49.301 |

TABLE 22

Link Utilization

| LINK | utilization (%) |
|---|---|
| Atlanta -> 119 | 30.594 |
| Atlanta -> 243 | 99.957 |
| LA -> 87 | 30.600 |
| LA -> 211 | 99.962 |
| 243 -> Atlanta | 99.955 |
| 243 -> 211 | 99.954 |
| 119 -> Atlanta | 30.218 |
| 119 -> 103 | 30.626 |
| 103 -> 119 | 30.430 |
| 103 -> 87 | 30.433 |
| 211 -> LA | 99.956 |
| 211 -> 243 | 99.960 |
| 87 -> LA | 30.263 |
| 87 -> 103 | 30.601 |

TABLE 23

GSL Disconnect Times

| G BAYANHONGOR -> S 279 | 162.284 |
|---|---|
| G BAYANHONGOR -> S 83 | 280.134 |
| G PEKING -> S 295 | 304.470 |
| G PEKING -> S 99 | 157.155 |
| G SEBUKU -> S 73 | 238.840 |
| G SEBUKU -> S 225 | 197.723 |
| G SEATTLE -> S 71 | 162.469 |
| G SEATTLE -> S 211 | 279.018 |
| G DENVER -> S 87 | 307.925 |
| G DENVER -> S 227 | 169.912 |
| G ATLANTA -> S 119 | 283.364 |
| G ATLANTA -> S 243 | 112.466 |
| G MIAMI -> S 104 | 166.146 |
| G MIAMI -> S 258 | 287.283 |
| G DALLAS -> S 227 | 102.261 |
| G DALLAS -> S 103 | 344.495 |
| G CHICAGO -> S 103 | 237.255 |
| G CHICAGO -> S 243 | 224.334 |
| G MOSCOW -> S 4 | 168.203 |
| G MOSCOW -> S 246 | 284.740 |
| G JERUSALEM -> S 216 | 61.006 |
| G JERUSALEM -> S 19 | 76.272 |
| G RIO-DE-JANIERO -> S 138 | 182.582 |
| G RIO-DE-JANIERO -> S 320 | 203.594 |
| G HELSINKI -> S 230 | 219.261 |
| G HELSINKI -> S 324 | 278.165 |
| G TOKYO -> S 327 | 275.443 |
| G TOKYO -> S 115 | 129.471 |

TABLE 23-continued

GSL Disconnect Times

| G CAPE-TOWN -> S 171 | 118.707 |
|---|---|
| G CAPE-TOWN -> S 47 | 363.326 |
| G LIVERPOOL -> S 308 | 120.418 |
| G LIVERPOOL -> S 214 | 304.781 |
| G MELBOURNE -> S 143 | 272.885 |
| G MELBOURNE -> S 267 | 168.037 |
| G NEW-YORK -> S 259 | 159.559 |
| G NEW-YORK -> S 119 | 284.080 |
| G SAN-FRANCISCO -> S 71 | 342.185 |
| G SAN-FRANCISCO -> S 211 | 141.982 |
| G LOS-ANGELES -> S 87 | 287.212 |
| G LOS-ANGELES -> S 211 | 113.356 |

Light Traffic Load Example

Figure 55:
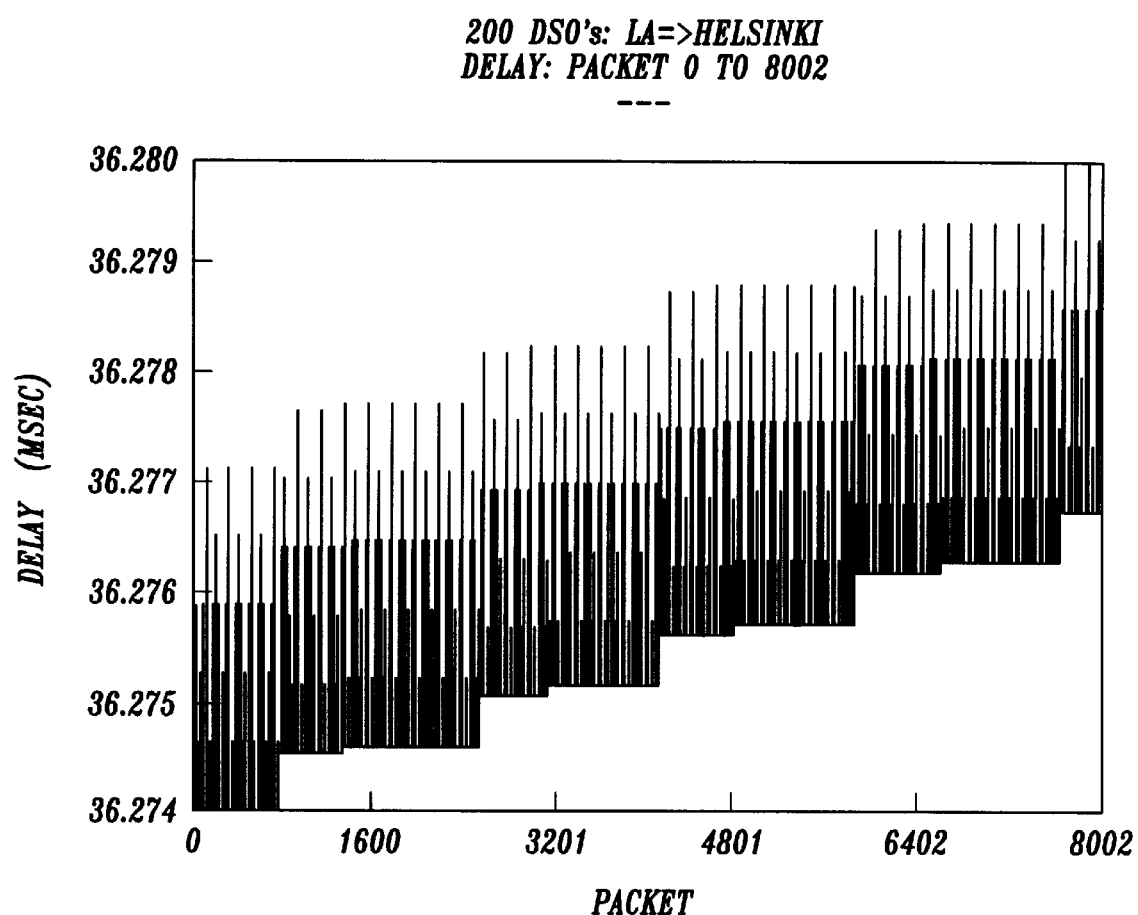

Shortly after the data in Tables 18 and 19 were read from the simulator, 200 full duplex DS0 circuits were connected from Los Angeles to Helsinki. In the simulation of one of the preferred embodiments of the invention, each of the 200 circuits was started at a random time within the same 5.777 msec interval or one "packet time" (See page 24). FIG. 55 shows the end-to-end delay of 8,002 packets originating in LA and received by Helsinki. This delay corresponds to a time interval of 5.777*8002/200=231 msec. The spikes in this Figure correspond to packets which, when generated at the source, need to be queued up before their transmission can start. This is true because the link is currently busy transmitting another packet. During a heavy traffic load, it is quite likely that a newly generated packet must wait for many packets to be transmitted ahead of it. In this particular example, however, most of the packets find the link free at the instant of their generation, and need not be queued up at all cue to the relatively light load. Some packets, however, do happen to be generated while another packet is being transmitted, or even while some packet is still in the queue, simply due to the random nature of the traffic generation. If the queue is empty and the link is busy when a packet is generated, that packet will reed to wait for a maximum of 3.413 microseconds, which is equal to one full packet transmission time. In other cases, the packet may be generated when the link has partially transmitted a packet. Accordingly, the spike heights in FIGS. 55 and 56 are not necessarily multiples of 3.413 microseconds.

Figure 56:
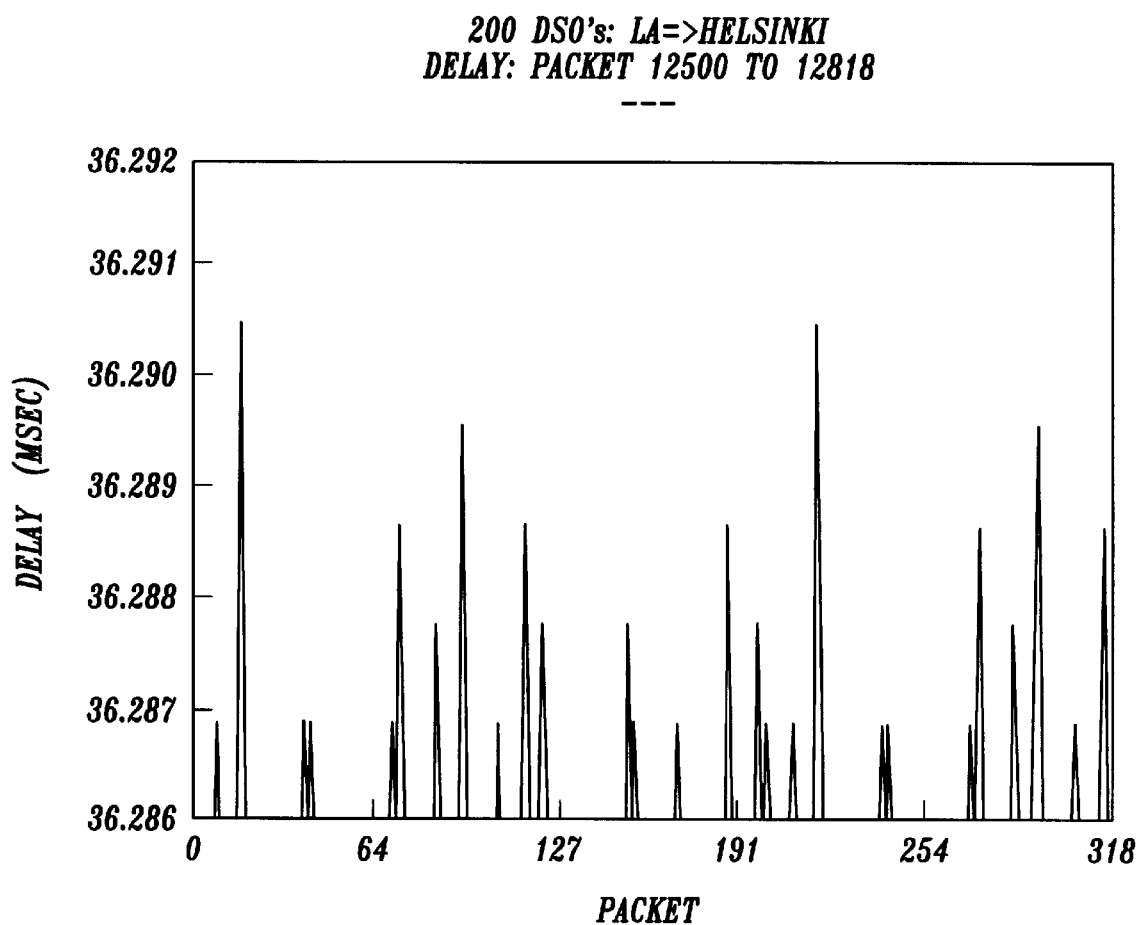
Figure 57:
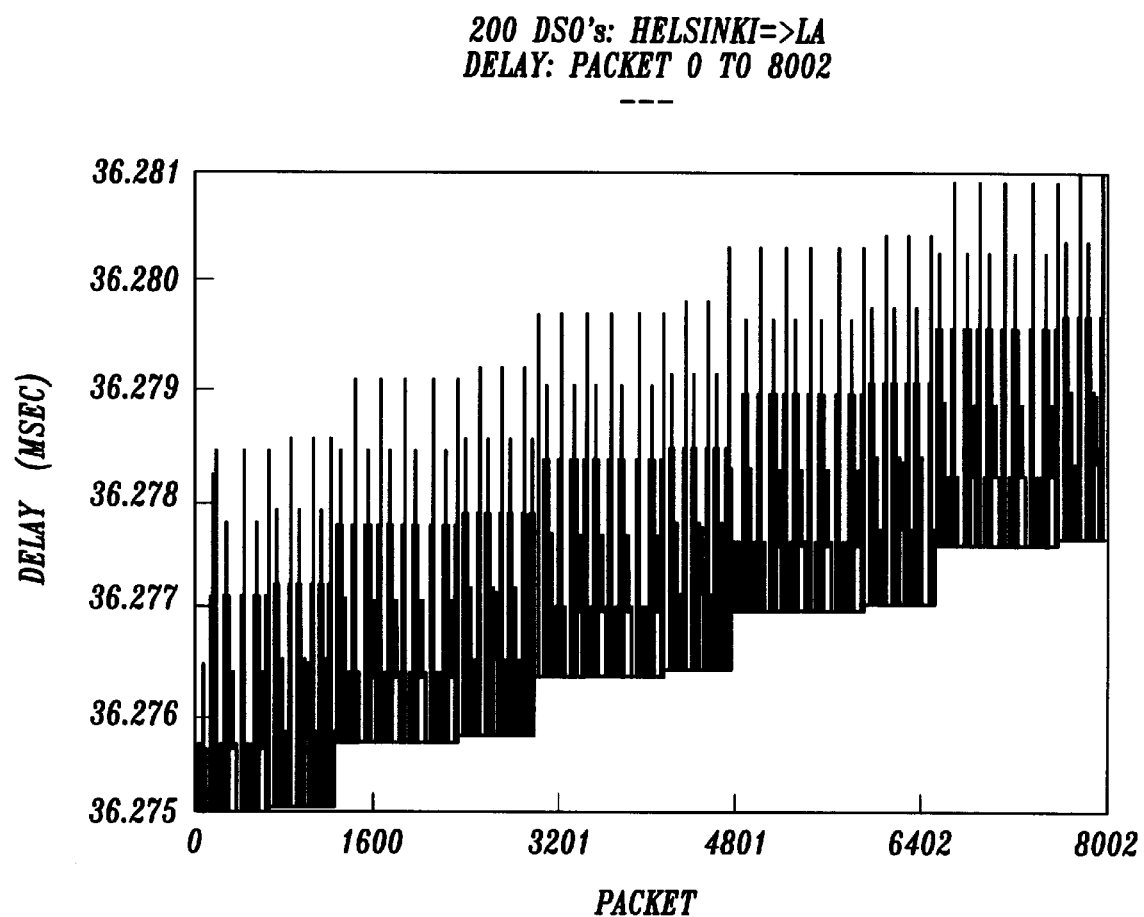

FIG. 56 depicts a short time interval in which packets 12,500 to 12,818 are received by Helsinki. The points with no "spikes" experienced varying degrees of queuing delays, depending on when packets were, randomly generated compared to those which were awaiting transmission. FIG. 55 shows that the "base line" of the delay increases with time. This increase reflects the changes in the LINK_PROP_DELAY of the optimal links along the path from LA to Helsinki, which results from the movement of the satellites. The increase occurs in steps, as opposed to a continuous rise, because of a simulation approximation. Simulating the "flight" of each packet across a link precisely would require computing the value of LINK_PROP_DELAY during the packet flight. Since this computation would require a substantially greater simulation time, the value of LINK_PROP_DELAY that is measured periodically by the link manager is used. When some node along the route from LA to Helsinki samples LINK_PROP_DELAY, the impact of the change in LINK_PROP_DELAY, which is measured locally, propagates during the router adaptation process to eventually reach LA and Helsinki. These "jump times" are not the same as those depicted in FIG. 57, which reveals the traffic delay from Helsinki to LA. The routing information messages carrying the "news" of the new value of LINK_PROP_DELAY arrive at the two nodes at different times.

Figure 58:
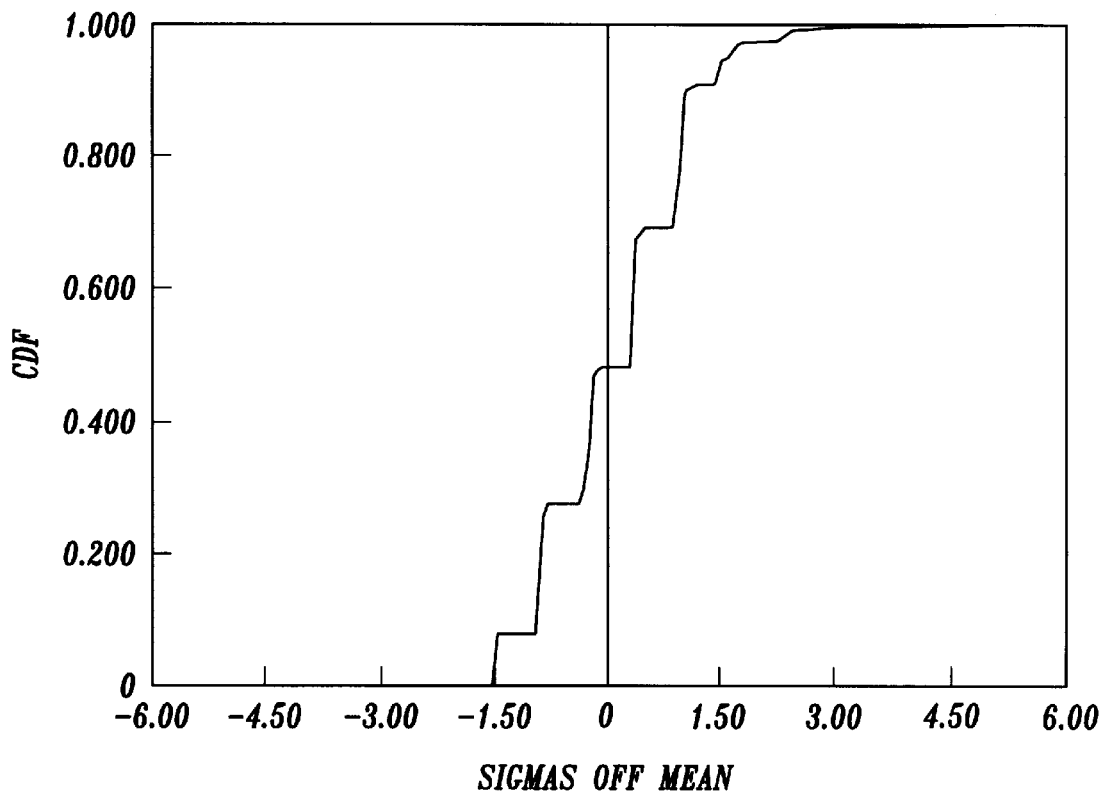
Figure 59:
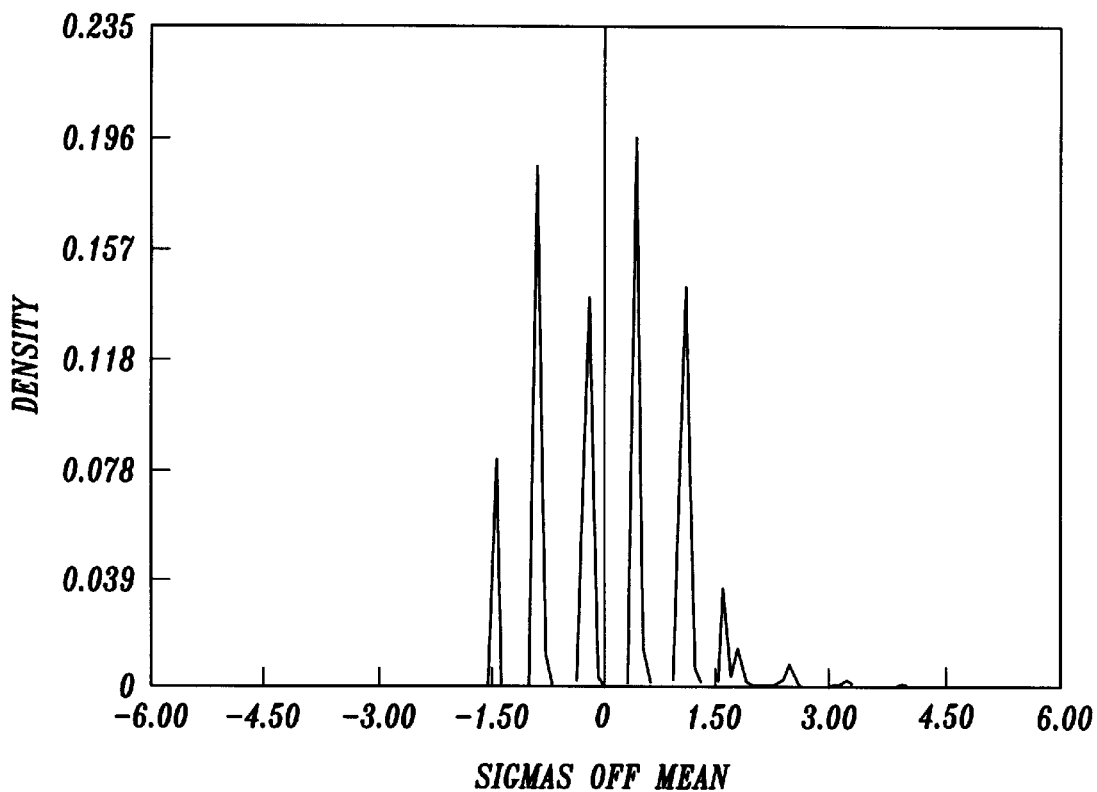
Figure 60:
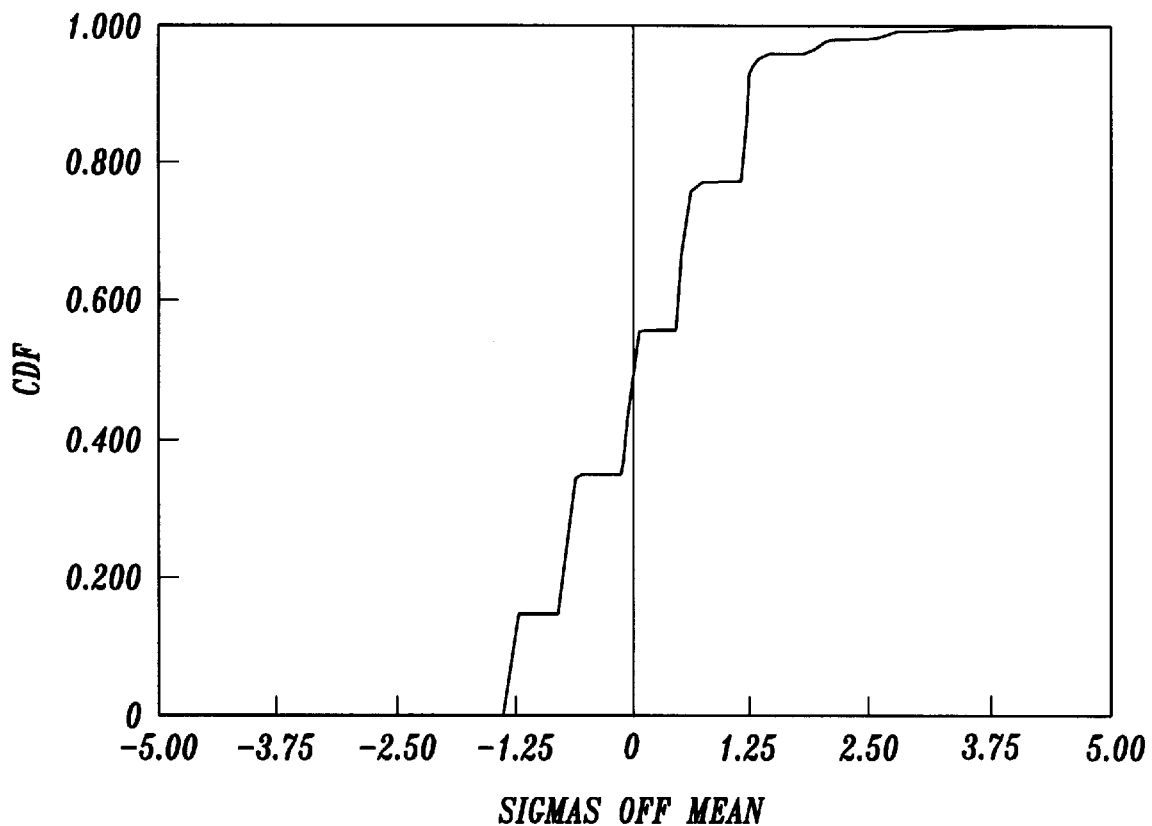
Figure 61:
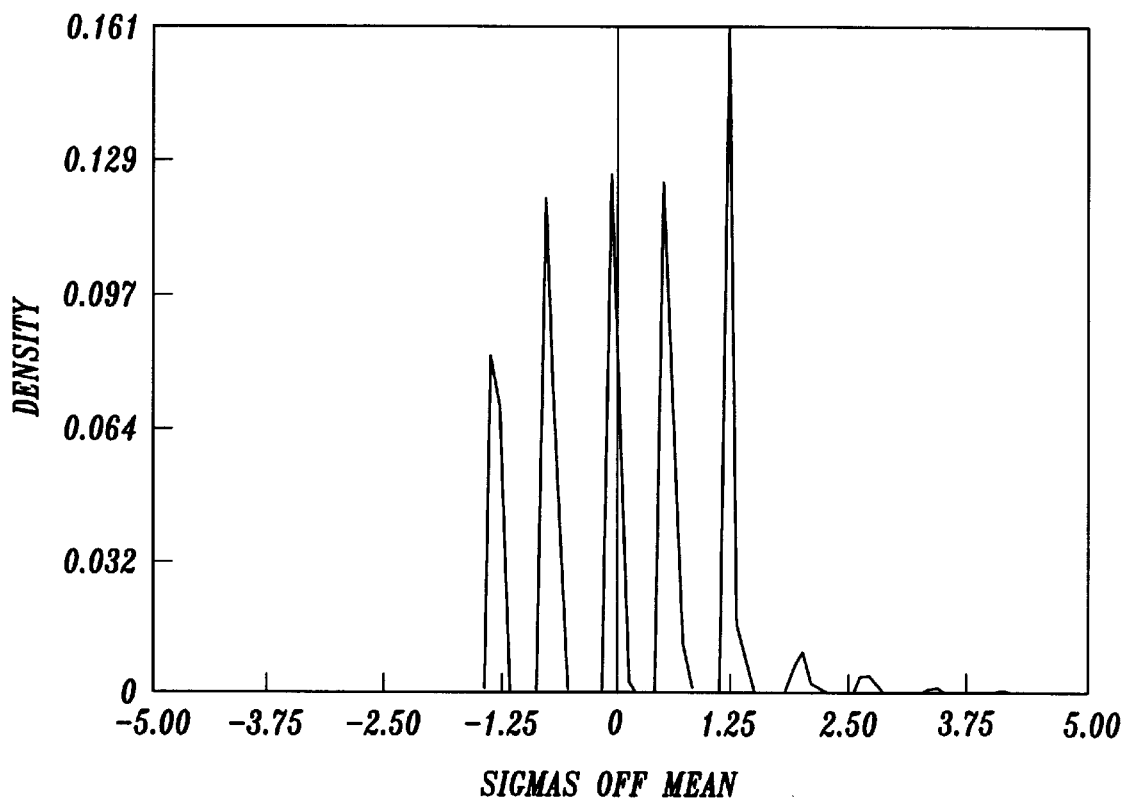

FIG. 58 displays the delay distribution function of packets 0 to 8002 from LA to Helsinki. All packets follow the same route and arrive with very little delay variance. This variance results from the changing value of LINK_PROP_DELAY of the links along the path, and is attributable to the occasional and small random queuing delay that is discussed above. One sigma corresponds to only 1.4 microseconds. FIG. 59 illustrates the same information, but as a density function instead of the cumulative distribution function. Some signs of normality are already evident despite the low traffic density. FIGS. 60 and 61 show the simulation results of the traffic in FIG. 57, but are portrayed in the opposite direction, from Helsinki to LA. As expected, the two sets are very similar. In heavy traffic conditions and with traffic flowing in the network in all directions, this symmetry may not exist.

Packet Switching

FIGS. 8 and 24 reveal the overall architecture of the satellite node as it relates to the packet switching process. Packets 26 are received from any of the following sources:

1. Mobile M and fixed F terminals located under the satellite footprint via Mobile Terminal-Satellite Links (MTSLs) and Fixed Terminal-Satellite Links (FTSLs);
2. Gateways G used for bringing in traffic from calls originating or terminating on the public network via Gateways to Satellite Links (GSLs); and
3. Other satellites via the InterSatellite Links (ISLs).

Packets 26 are grouped in two categories, those carrying user data comprising voice, video, digital data, etc.; and those carrying control messages that are used in network administration and control functions. The fast picket switch 22 is responsible for switching each incoming packet to its appropriate destination.

Packets 26 can be switched to satellites S, gateways G and terminals P, M and F. Those destined for other satellites S are transported over ISL output links. Packets 26 passing through satellite nodes on their way to their final destinations may contain user data or control messages. Packets 26 directed to a gateway G using a GSL output link may also carry user data or control messages. If the packet carries user data, the call associated with the packet originates or terminates on the public network. If the packet conveys a control message, it terminates at the gateway node common control. Mobile M and fixed F terminals can communicate directly with satellites in orbit. Mobile terminal to satellite links MTSLs can convey packets at 16 Kb per second. An additional two Kbps are reserved for a 2 Kb per second control and signalling channel. Fixed terminal to satellite links are 64 Kb channels, with an additional 8 Kb reserved for control and signalling. Packets traveling to mobile and fixed terminals include user data packets that carry voice messages, and control message packets bearing call control information. Packets may also be delivered to a node Message Transport system (MTS) if the packet type is a control message.

Packet Switching and Delay Variance

Routing And Link Load Distribution

The fast packet switch 22 utilizes the router 56 to select the currently optimal output link from a local node to a destination node DEST_NODE. The output link is selected anew for each received packet, based on decision factors offered by the router's recommendation, as computed by OUR_MIN_DELAY_EST(OUR_NODE, DEST_NODE, $\ell$), and by instantaneous link load factors. Instead of limiting the choice to using only the absolute optimal link, namely, that $\ell$ for which OUR_MIN_DELAY_EST (OUR_NODE,DEST_NODE, $\ell$), is lowest, the fast packet switch 22 may use links having delays that are fairly close to the optimal delay, but which have loads LINK_Q_DELAY that are lower than that of the optimal link. The parameter Delta defines the term "fairly close". In the simulation of one of the preferred embodiments of the invention, Delta is 50 microseconds. This method of selecting the output link provides automatic link load distribution as well as some degree of link overload control. The method of the invention comprises the following steps:

1. Find the link $\ell$ whose delay OUR_MIN_DELAY_EST(OUR_NODE, DEST_NODE, $\ell$) is lowest. Call that delay Dmin(OUR_NODE, DEST_NODE).
2. Mark all candidate links $\ell$ having delay OUR_MIN_DELAY_EST(OUR_NODE,DEST_NODE, $\ell$)<=Dmin(OUR_NODE, DEST_NODE)+Delta. A link in this set yields a delay of at most Dmin(OUR_NODE,DEST_NODE)+Delta.
3. From among the candidate links, select the one currently having the lowest LINK_Q_DELAY:
   a. Setting Delta to zero constrains the router to consider only the optimal link and other links having the exact same delay.
   b. Increasing Delta increases the degree of load distribution, but only at the expense of also increasing the variance in the packet transmission delay. Using sub-optimal links can cause packets to be routed along paths which do not provide absolute minimum delay, but which help meet load distribution objectives.
   c. The short term, worst case packet delay occurs when the packet happens to be switched over the worse sub-optimal link at each hop along the route and each such sub-optimal link happens to increase the delay by a full Delta above the optimal. With Delta set to 50 microseconds, load distribution will contribute at most 0.5 msec in delay variance to a very long 10 hop circuit, which is still quite low.
   d. The best case occurs when the packet is routed over the optimal link at each hop.
   e. The load distribution process is but a single component contributing to the total variance which is also influenced by:
      normal statistical traffic patterns and intensity fluctuations;
      continuous changes in LINK_PROP_DELAY due to satellite movement; and
      topological changes resulting from link disconnects which result from loss of neighbor visibility, and new link connects that replace disconnected links. These topological changes may cause the delay to increase or decrease abruptly by as much as several milliseconds (See simulation results in FIGS. 83–101). The greater the number of satellites in the constellation, the lower the change in delays.

FIGS. 44, 45, 46, 47, 48, 63 and 64, show the hardware which is used to select the packet output link. OUR_MIN_DELAY_EST (OUR_NODE, DEST_NODE, $\ell$) is computed by using routing tables OUR_NEIGHBOR_DELAY_EST$\ell$[OUR_NEIGHBOR[$\ell$], SOME_NODE], and the current values of LINK_PROP_DELAY and LINK_Q_DELAY of each link. The value of LINK_Q_DELAY is a linear function of the number of bits or packets waiting to be transmitted in the output link transmitter buffer. This buffer operates on a first in, first out basis (FIFO). LINK_PROP_DELAY is the latest sampled value and is measured periodically. Once the output link has been selected, its binary identification number is inserted into an N bit tag in front of the packet that is used by the fast packet switch 22 in navigating the packet through its internal switching stages to the selected output link. If the fast packet switch 22 has a total of L output links, then the value of N is equal to the upper bound of log2L. Ttag bit i controls switching stage 1.

An Example of Load Distribution

At a transmission rate of 150 Mb per second, a gateway to satellite link GSL can support up to 292,969 512-bit packets per second. A single DSO requires 72 Kb for the 64Kb B channel and 8 Kb for signalling and control channel. With 416 bits of payload per packet, each DSO requires 173 packets per second. A single GSL or ISL can, therefore, support up to 1,693 DSOs.

In the following example, 2,500 full duplex circuits from the Los Angeles Gateway to the Atlanta Gateway are simulated. This load is significantly more than a single link is capable of handling. All 2,500 circuits are started at random times within a short time interval of 5.777 msec, which is the rate at which a DSO generates packets. The optimal link from Los Angeles to Atlanta is via satellite 211 which, at zero load, has a delay of 18.118 msec (See Table 17). This route includes 3 hops (See Table 18). The delay via satellite 87 is equal to 18.820 msec (See Table 19), which is 702 microsec higher then the optimal route, and the packets travel through 4 hops.

Figure 65:
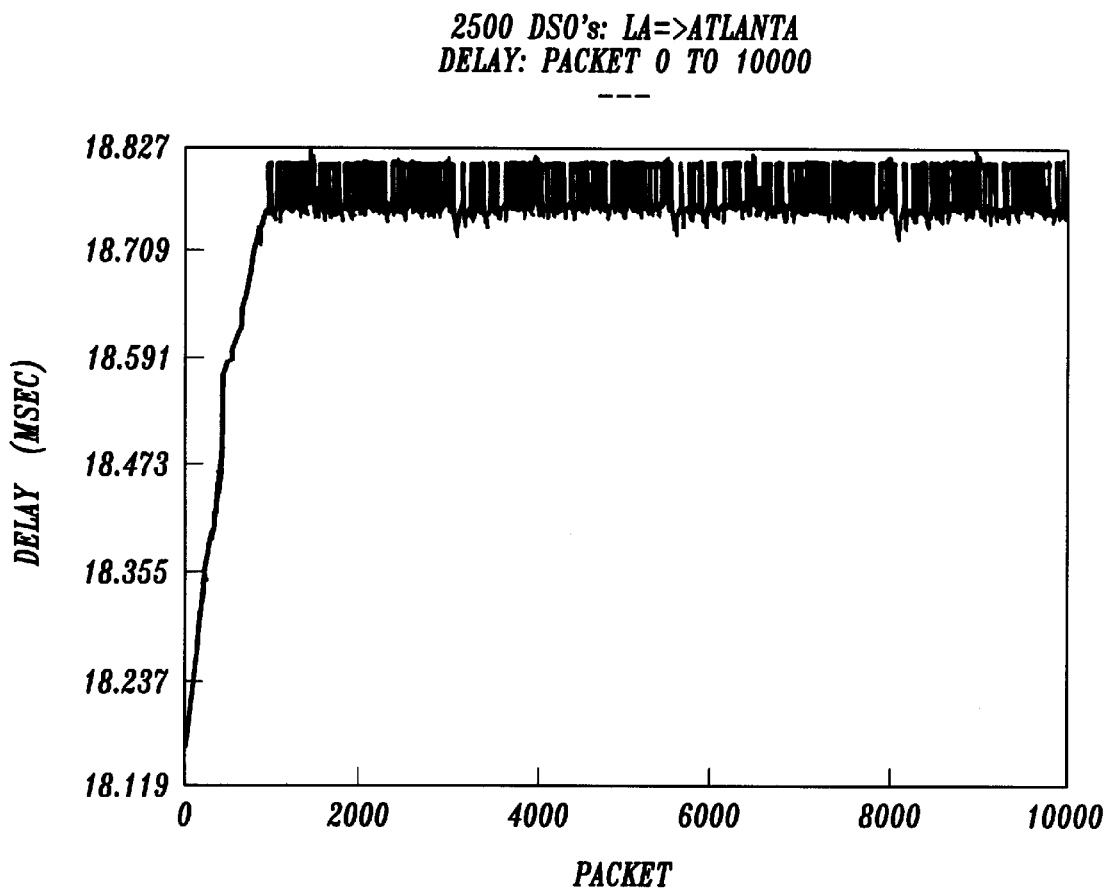

FIG. 65 shows the delay of each packet launched by LA and received in Atlanta. The first few packets need not compete for links since they are the first to be dispatched, and speed through the network at pure propagation delays. Because of the heavy load, packets then begin to queue up oil the outgoing link from LA to 211. LINK_Q_DELAY builds up to the point where the delay via satellite 87 is now comparable to that of the optimal link. With Delta set to 50 microseconds, load sharing becomes a factor as soon as the delay to Atlanta via 211 builds up to 18.820 msec–50 microsec=18.770 msec (A queuing delay on link LA->211 of LINK_Q_DELAY=702–50=652 microsec). FIG. 65 shows that this point is reached after LA has generated about one thousand packets. From this point on, the load sharing algorithm works as described above. If too many packets are switched to link LA->87, the queue on link LA->211 has time to drain sufficiently to lower its queuing delay below 652 microsec, thereby leaving link LA->87 outside of Delta by eliminating LA->87 as a candidate. In this particular case, LA->211 will never be selected if other candidate links exist, because its queue will always be the longest until it drains sufficiently to eliminate all possible candidates. When all the candidates have been eliminated, the primary link is used again, pushing its queuing delay up and creating new candidates which take the optimal link out of contention again.

Figure 66:
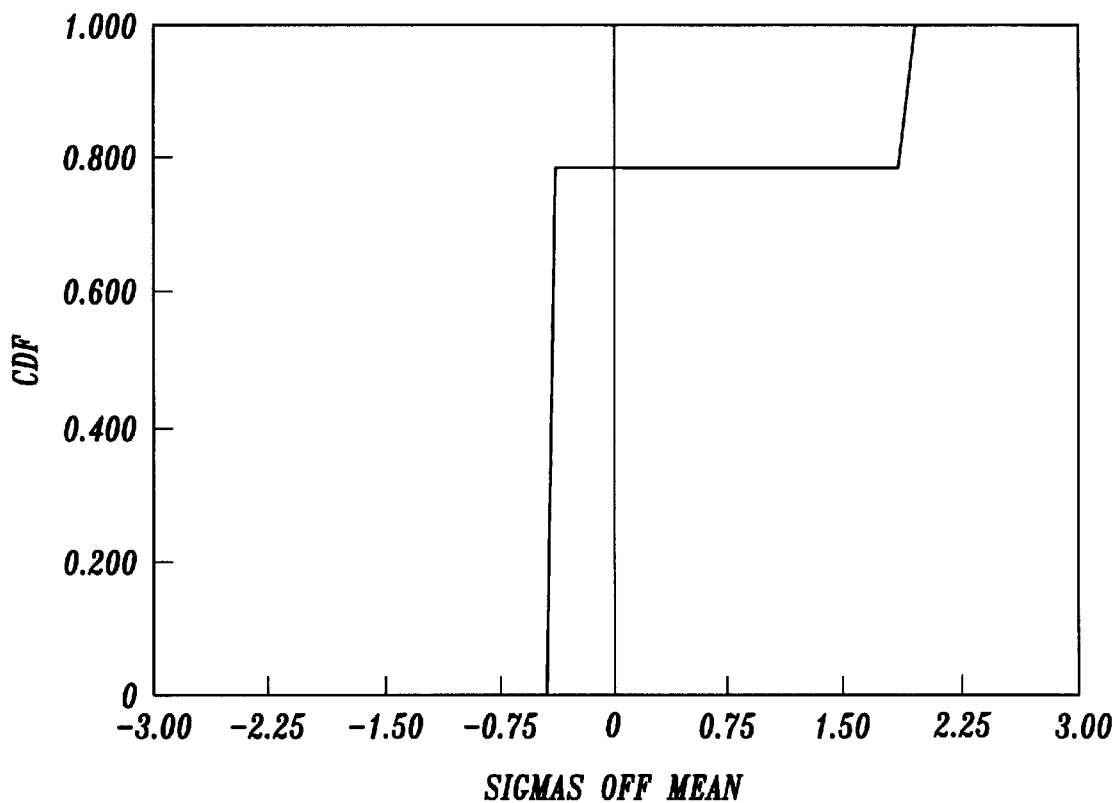
Figure 67:
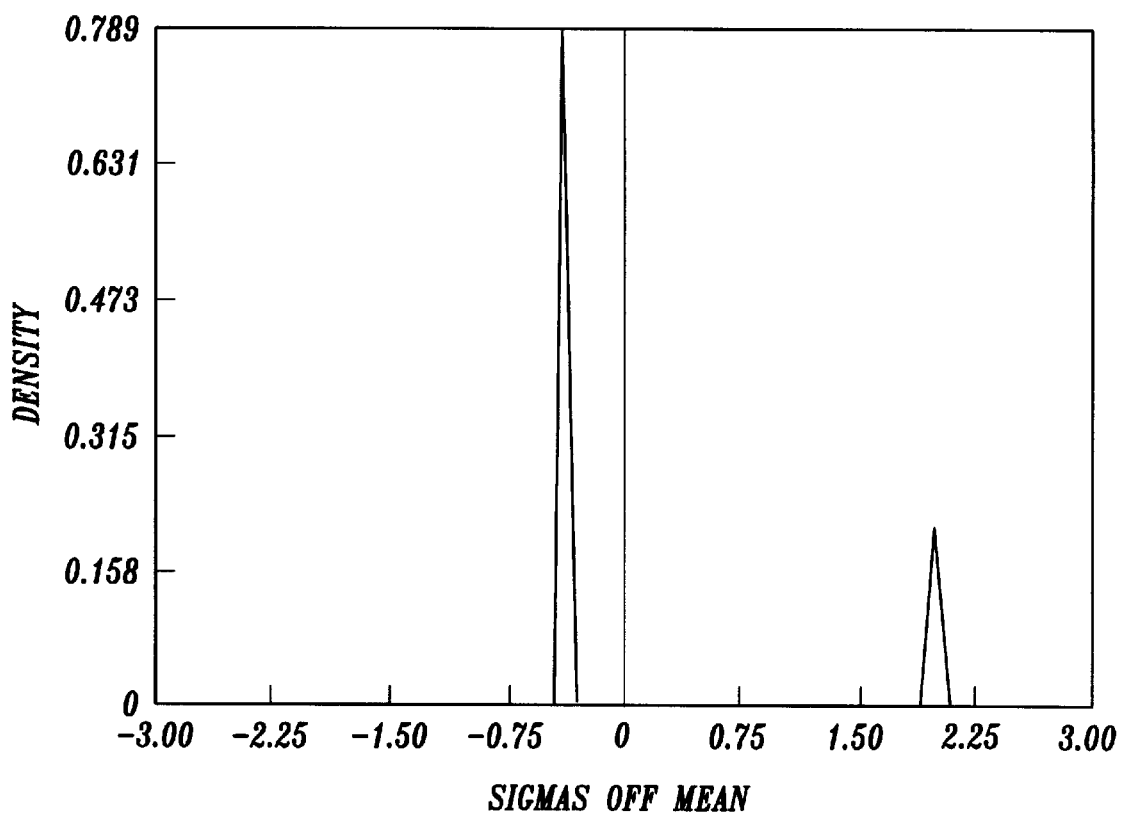
Figure 68:
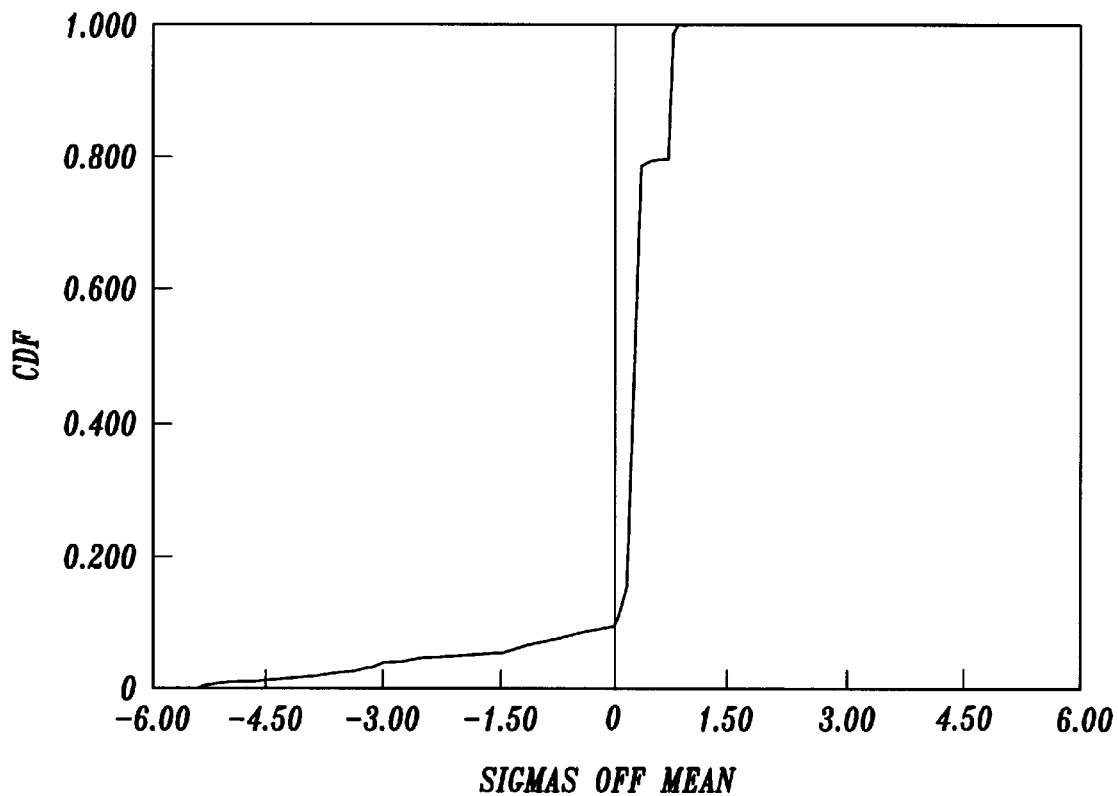
Figure 69:
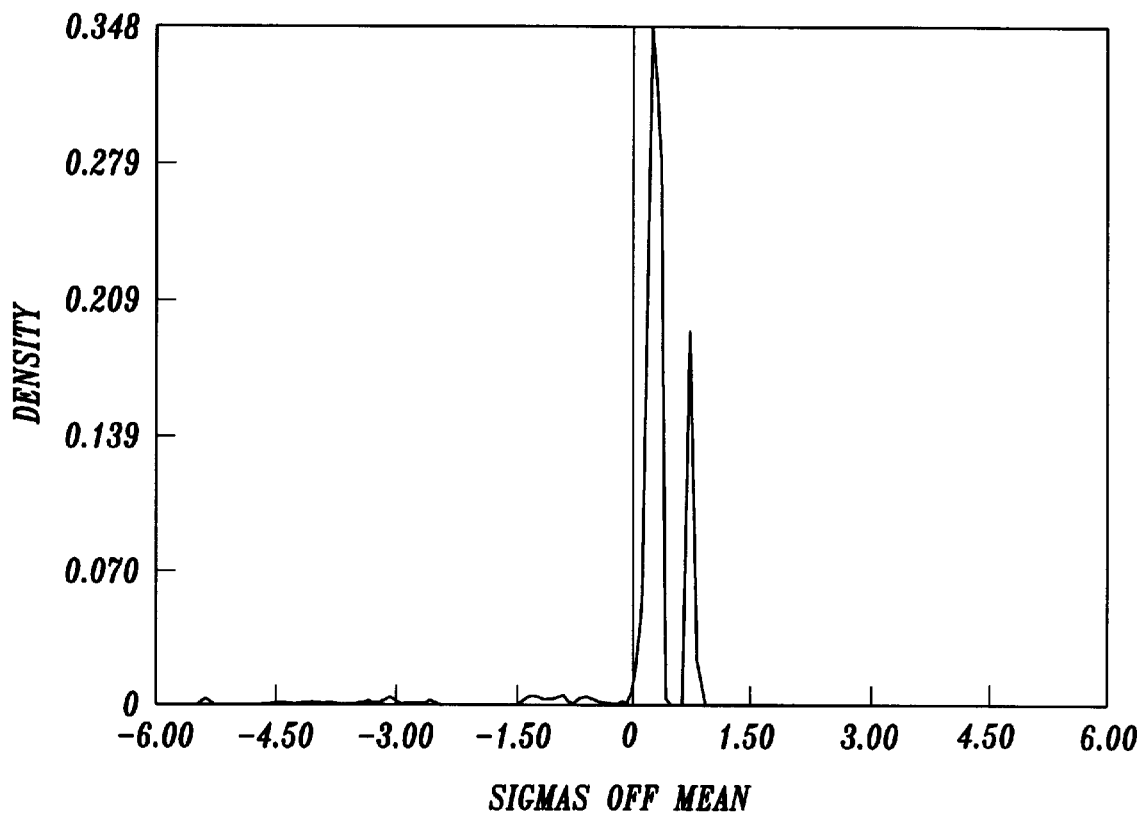
Figure 70:
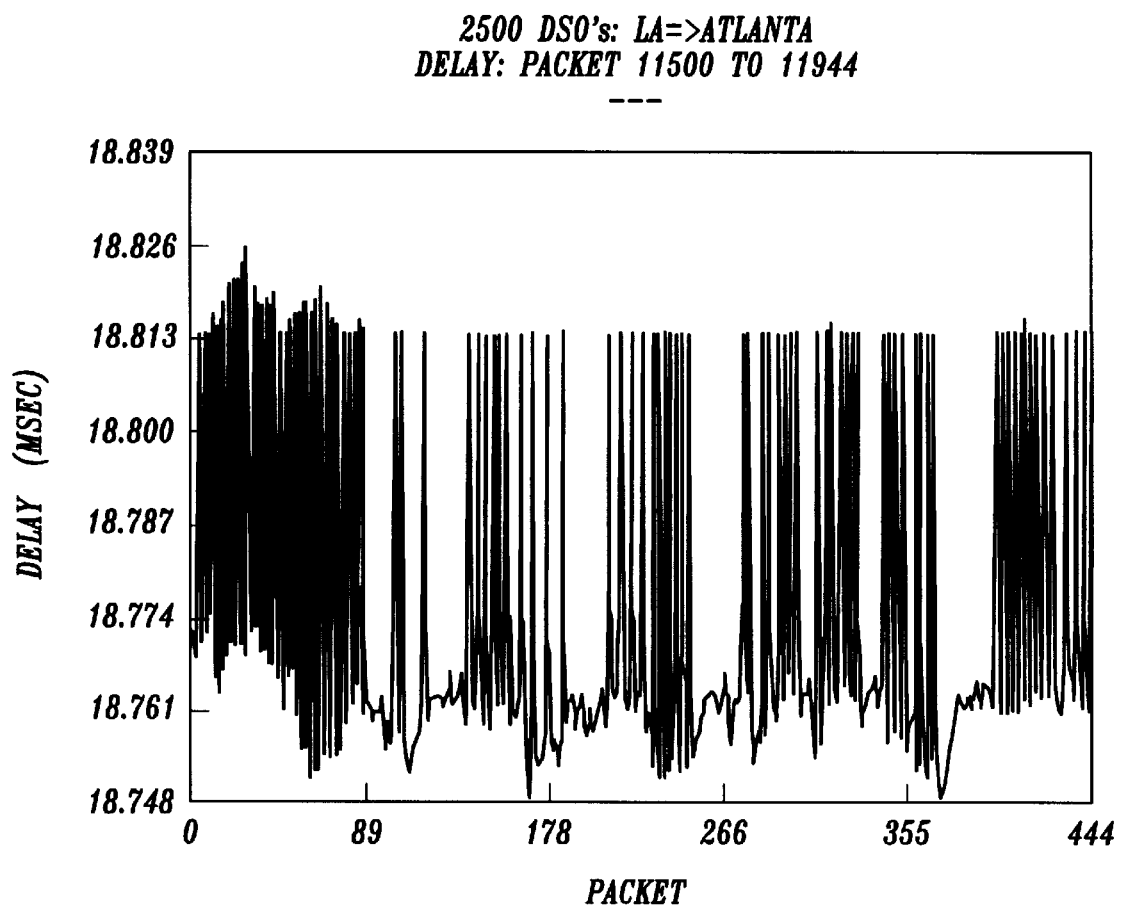
Figure 71:
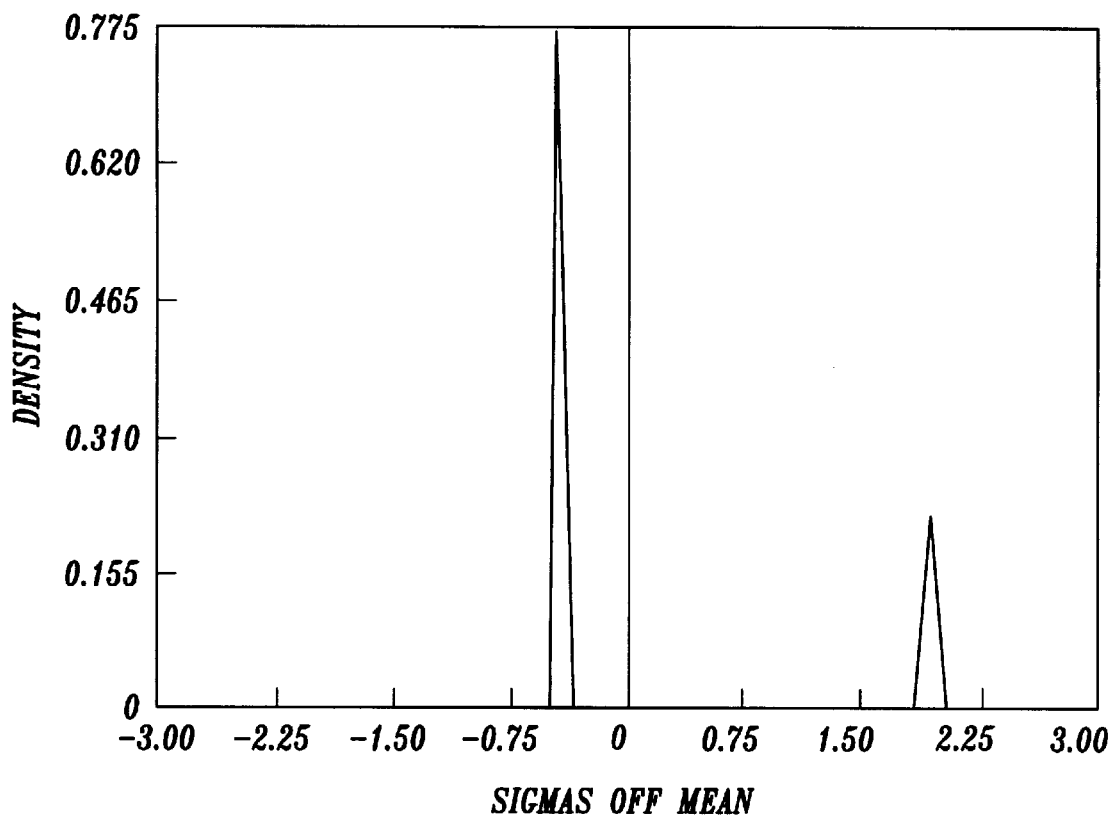
Figure 72:
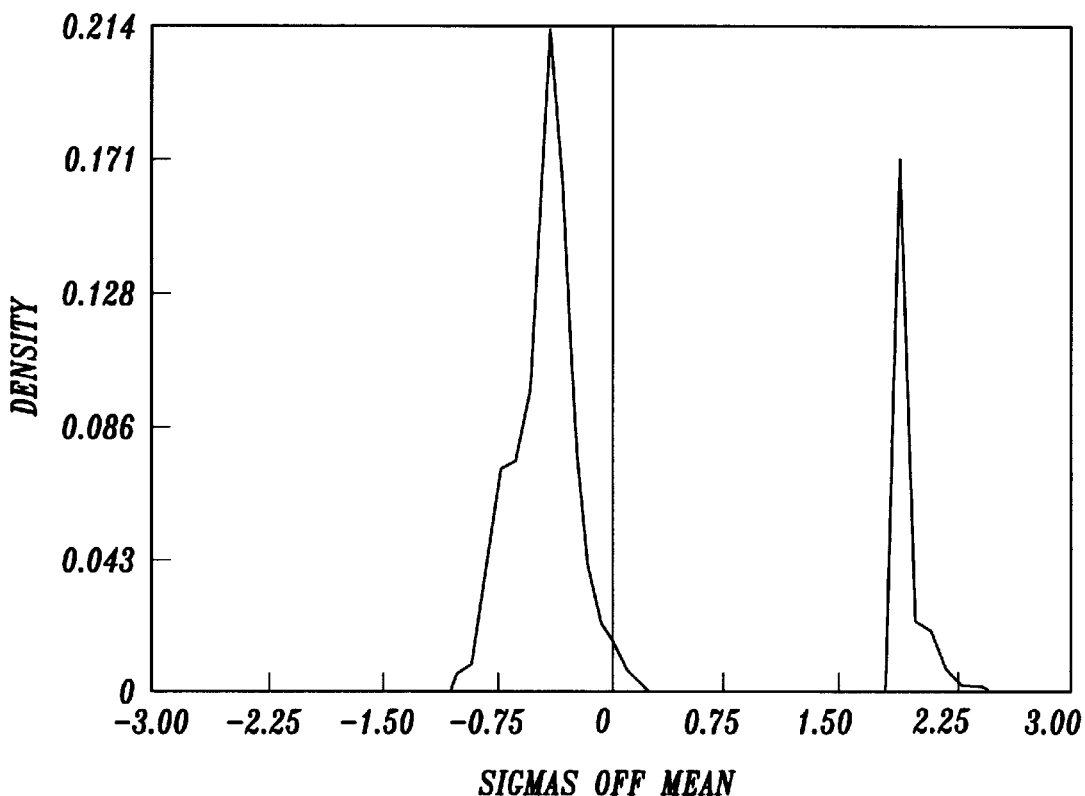
Figure 73:
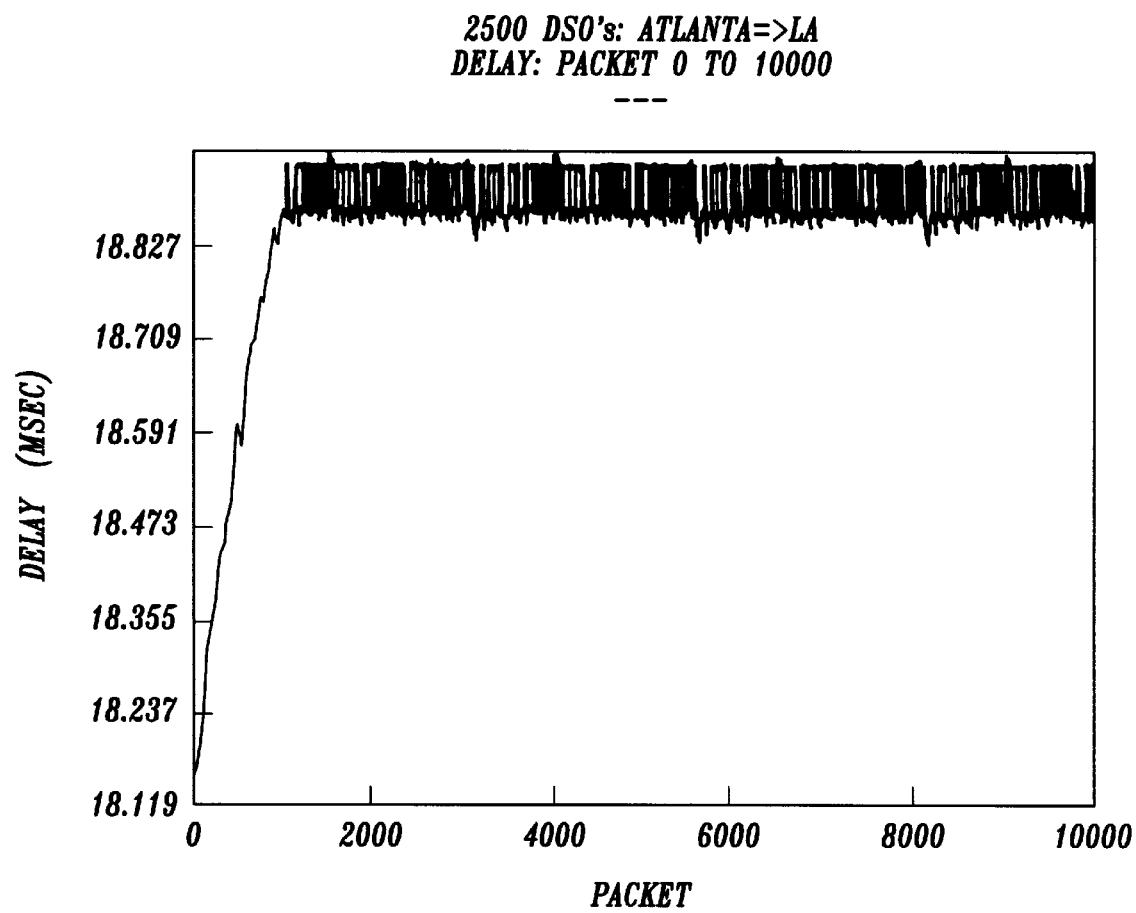
Figure 74:
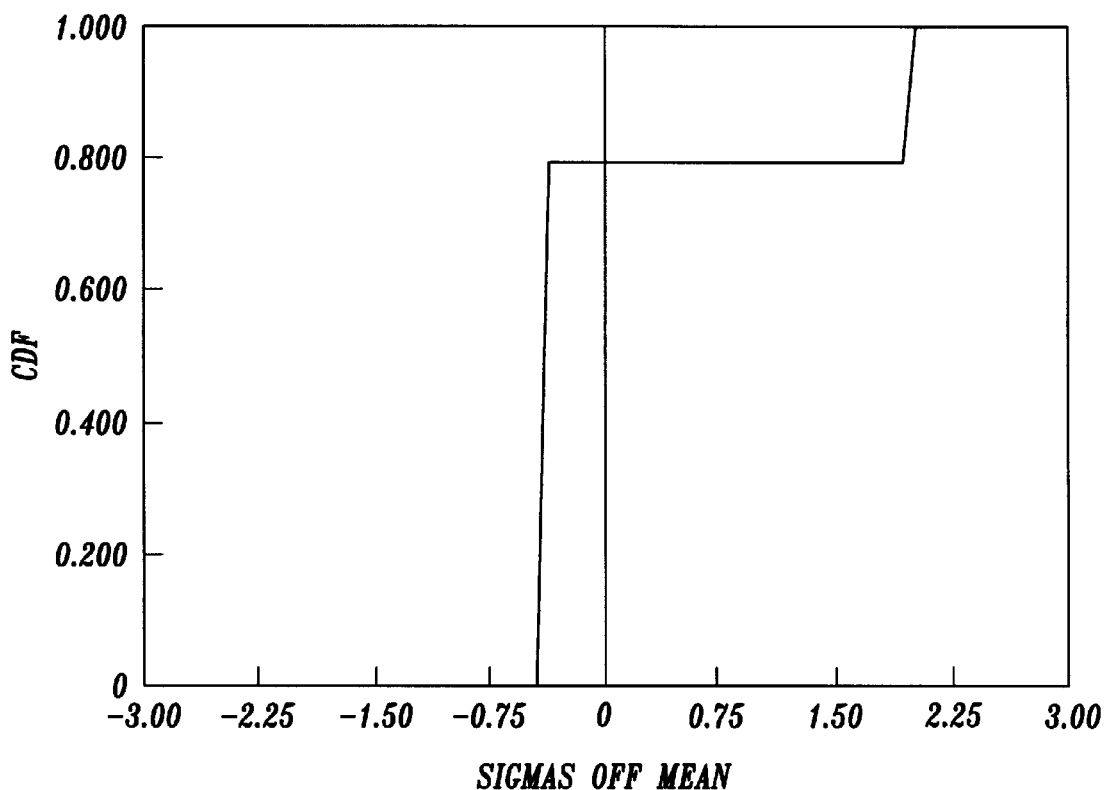
Figure 75:
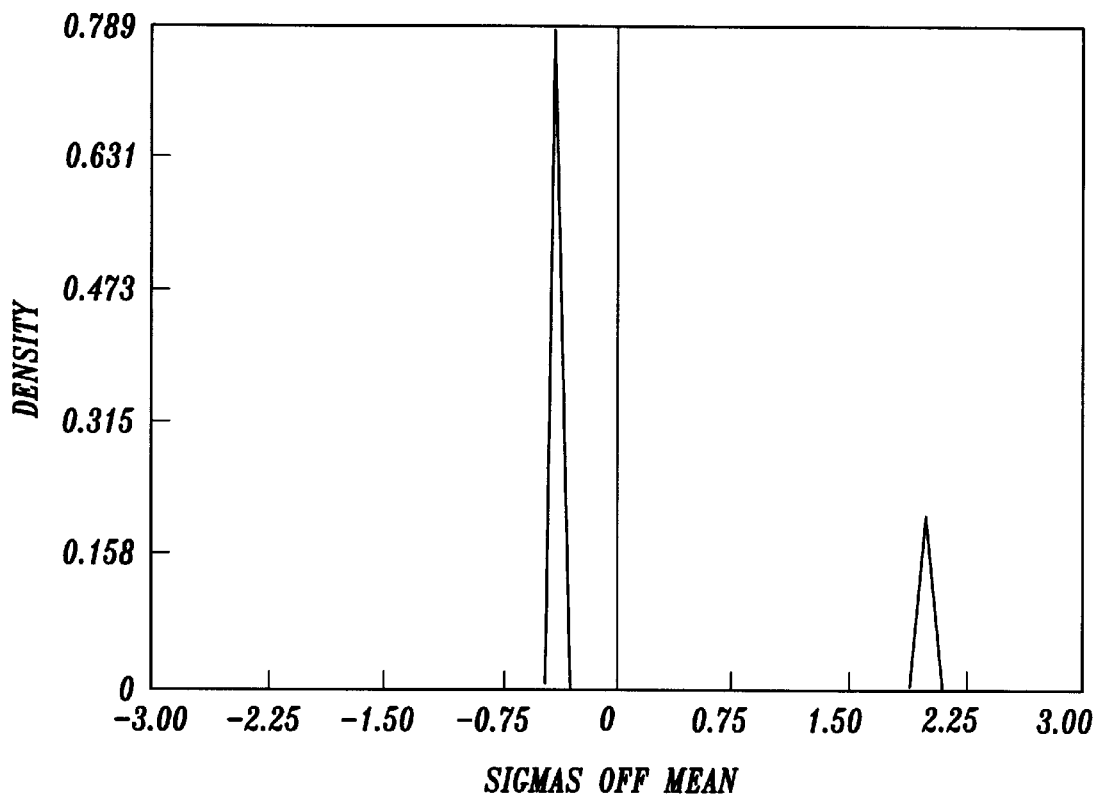
Figure 76:
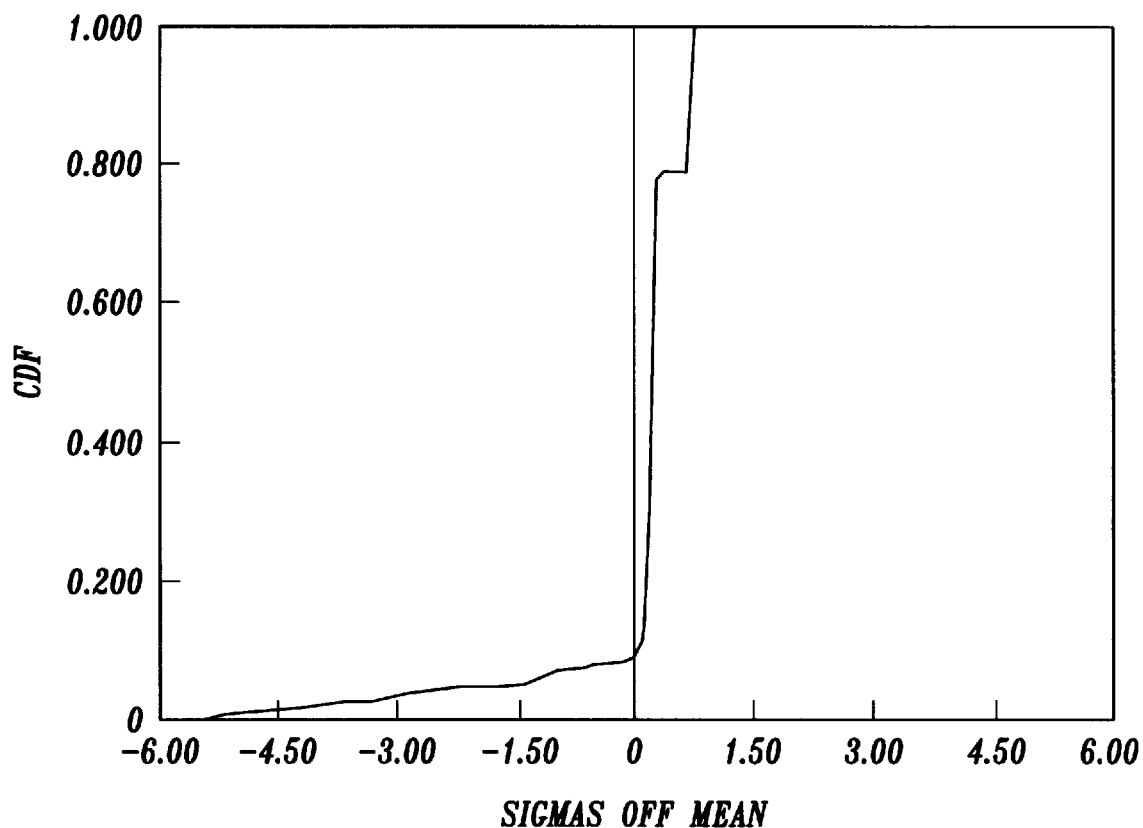
Figure 77:
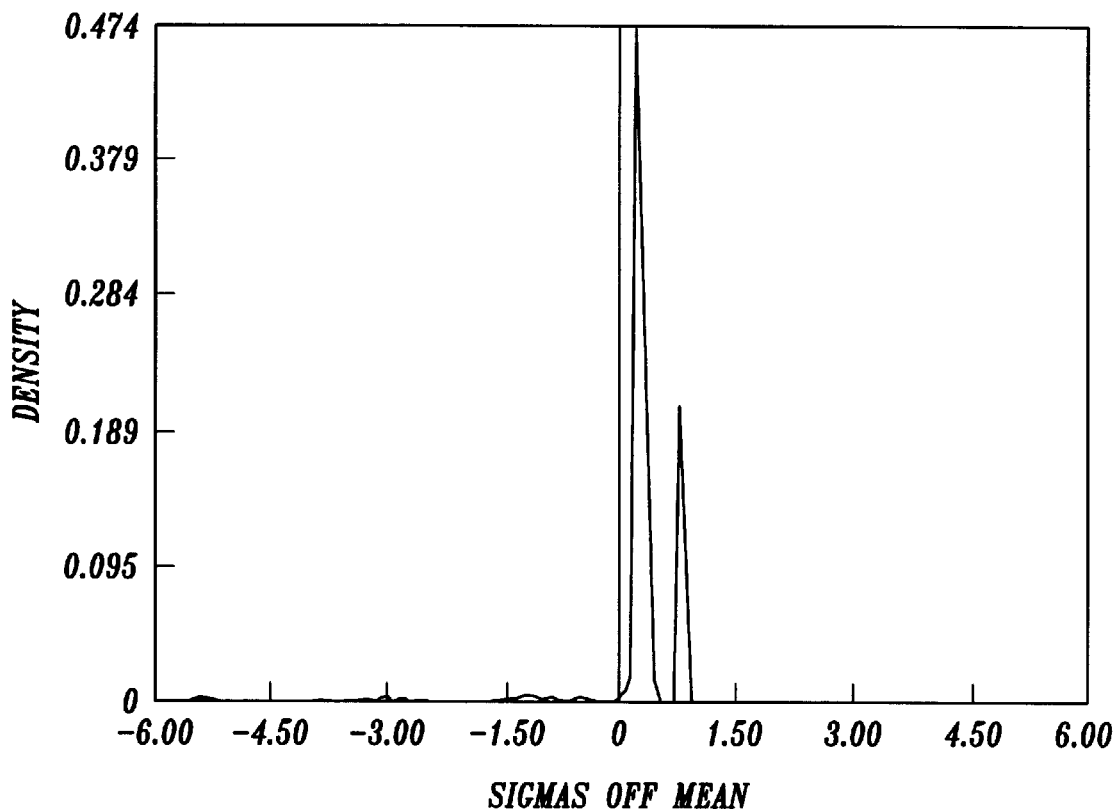
Figure 78:
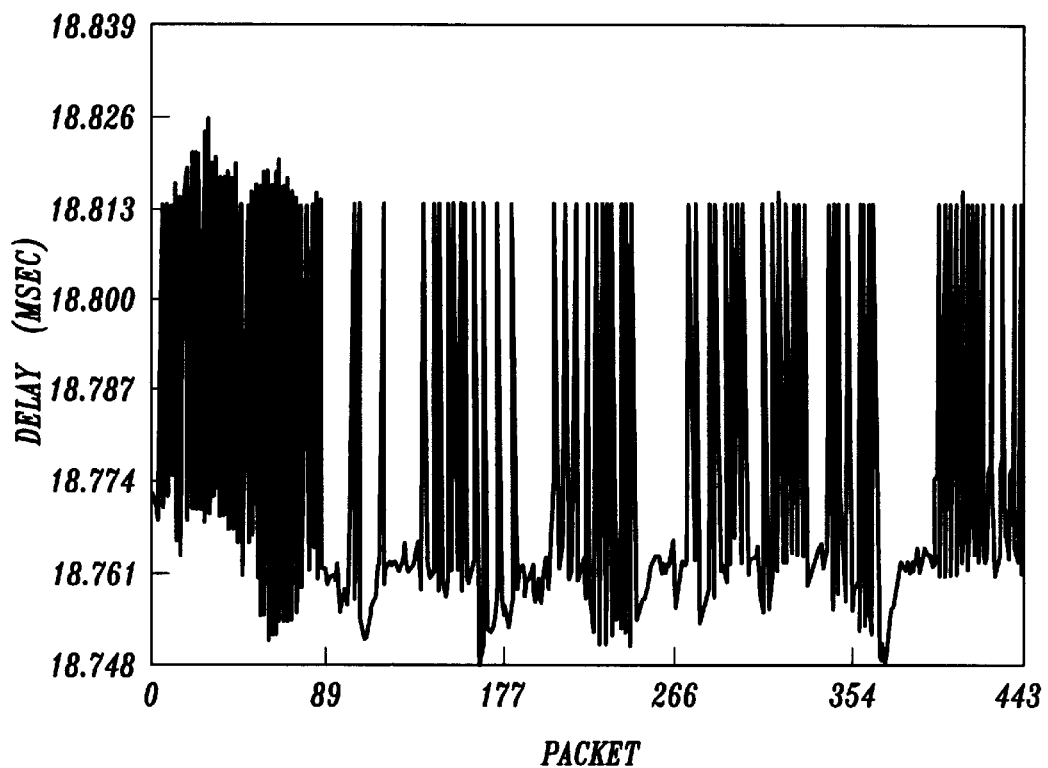
Figure 79:
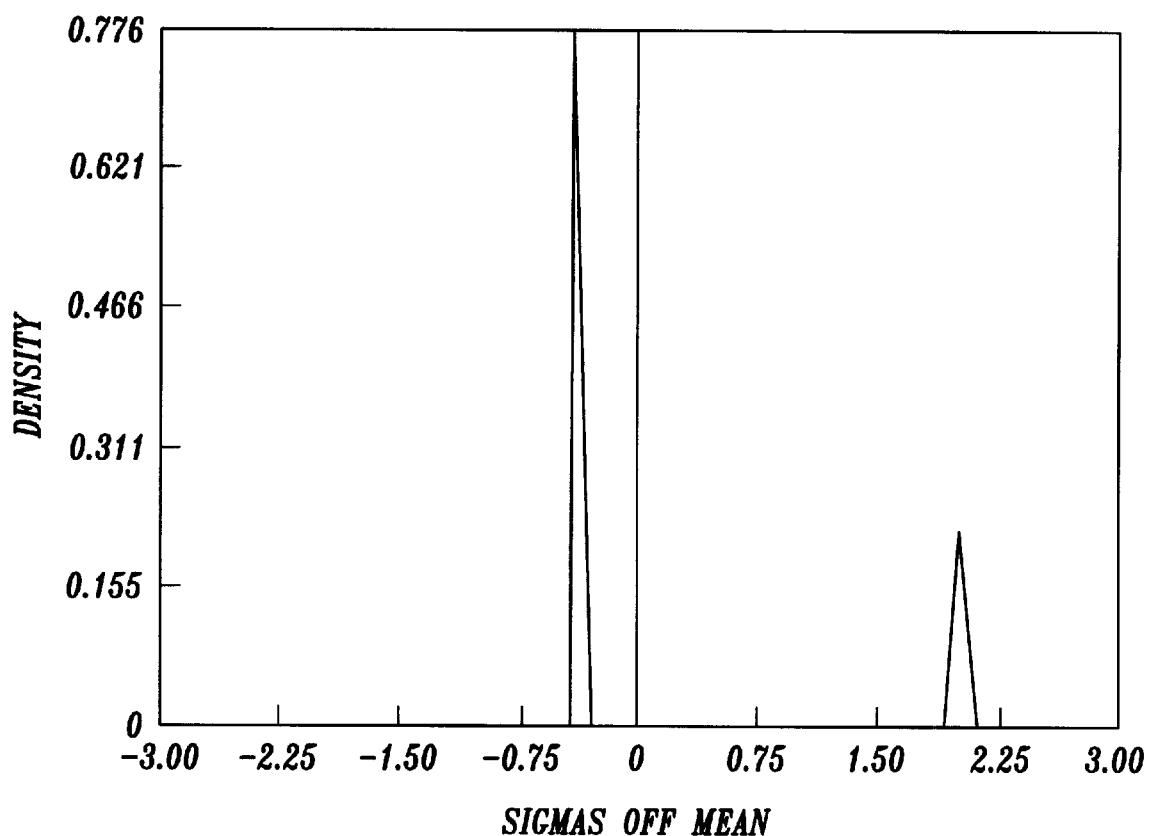
Figure 80:
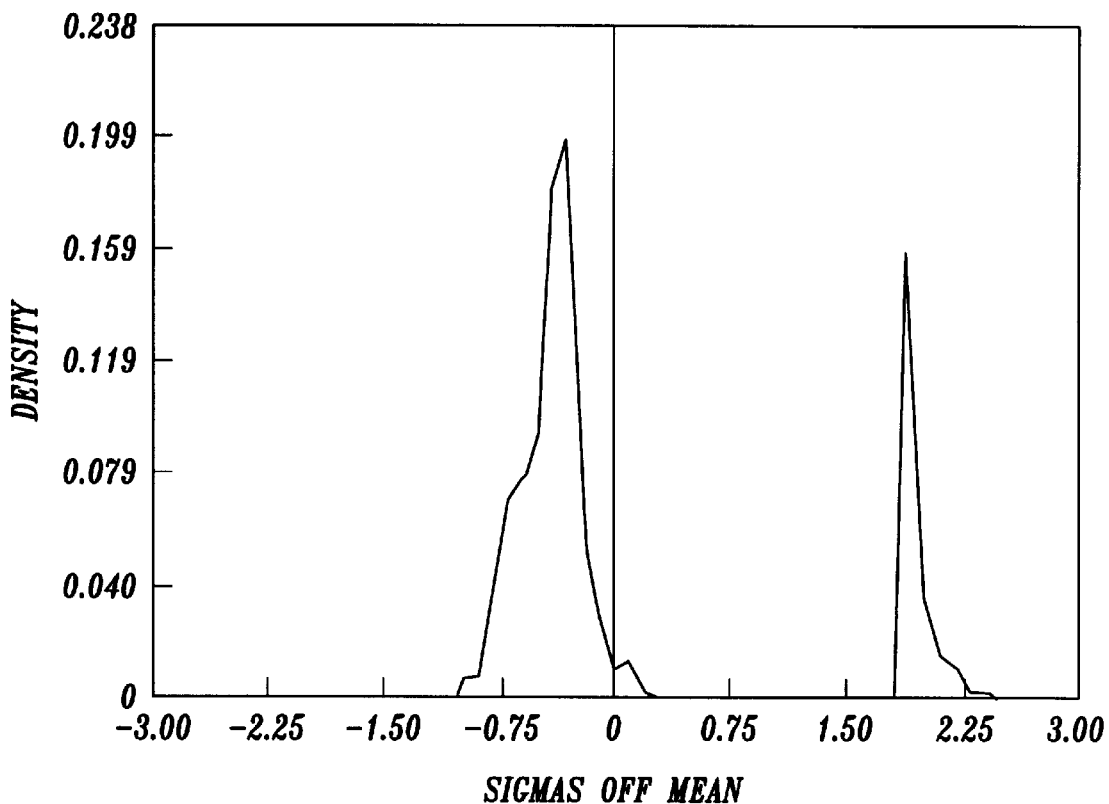

FIGS. 66 and 67 show the hop distribution and density functions of the LA->Atlanta packets. Packets which happen to leave LA on link LA>211 take a three hop route, while packets leaving on link LA->87 take routes comprising five hops. The spike on the right part of the density function corresponds to the four hop routes, and the spike on the left relates to the three hop routes. The area under the spike corresponds to the number of packets taking that number of hops. The area under the three hop spike is higher than the area corresponding to the four hops. FIGS. 68 and 69 show the LA-> Atlanta end-to-end delay distribution and density functions. Since these FIGS. 66, 67, 68 and 69 include the initial queuing delay buildup, they do not represent the steady state hop distribution. FIG. 70 shows the end-to-end delay of packets 11,500 to 11,944 received by Atlanta long after the load sharing has started, and represents a steady state condition. FIGS. 71 and 72 are the corresponding hop and delay density functions. In this particular example, the variance is quite low despite the heavy traffic. FIGS. 73–80 correspond to the traffic originating in Atlanta and terminating in LA. The two sets are almost symmetric.

The Link Manager

The link manager process is responsible for:

1. Tracking the link type and its specific parameters;
2. Controlling the process of establishing a link between a local and a remote node (ISLs and GSLs). During this process the link manager coordinates activities with the peer link manager in the remote node;
3. Controlling the link state;
4. Processing maintenance functions including:
   a. fault alarm detection and processing (red, yellow);
   b. error statistics collection;
   c. buffer overflow detection and processing;
   d. link diagnostics; and
   e. tracking the current propagation delay, LINK_PROP_DELAY;
5. Responding to ground based OSS functions as well as other local node processes commands and requests for link information; and
6. Advising ground based OSS functions and other internal processes of link events of interest. For each important event, the link manager maintains a "mailing list" of processes which need to be informed of that event e.g., the processes that need to know of a "RED ALARM" event.

The Topology Manager & InterSat Link Assignment

The topology manager is a distributed process that is responsible for dynamically controlling the way in which nodes are interconnected by ISLs and GSLs. Satellite based nodes support eight ISLs and eight GSLs. Gateways support an unlimited number of GSLs which may be connected to any visible satellite.

In one of the preferred embodiments of the invention, the satellite constellation comprises 841 satellites organized in 29 orbits, each being populated by 29 satellites. The larger the constellation size, the higher the number of satellites that are visible from each satellite at any given time. Within its own orbit, a satellite has a direct line of sight with at least the satellite in front of it "sat-F", behind it "sat-R", the satellite in front of sat-F, "sat-FF", and the satellite behind sat-R, "sat-RR". Four of the eight satellite ISLs are assigned permanently to these satellites and are designated as follows:

ISL 1: to satellite F
ISL 2: to satellite R
ISL 3: to satellite FF
ISL 4: to satellite RR In this example, the orbit in which a satellite travels is identified by an orbit number that is determined by the variable "ORB". The fifth, sixth, seventh and eighth ISLs, called "free choice" ISLs, are assigned as follows:
ISL 5: to the nearest available satellite in orbit–1, the near left or right neighbor;
ISL 6: to the nearest available satellite in orbit+1 the near right or left neighbor;
ISL 7: to the nearest available satellite in orbit–2 the far left or right neighbor; and
ISL 8: to the nearest available satellite in orbit+2 the far right or left neighbor.

This identification is modulo the number of orbits and satellites per orbit. (See Appendix A for details about the shorthand identification of the ISLs.) These rules of free choice ISL assignment assure that their life span will be very long. Their reassignment occurs only at the upper and lower latitudes, when the satellite's relative "right" and "left" orbits are flipped. Since the satellites are expected to carry very little originating, terminating or tandeming traffic, it the highest and lowest latitudes, ISL switch-over is expected to have little impact on the network.

FIG. 54 shows the ISL link assignment for satellite 211 in a constellation that includes 21 orbits with 16 satellites per orbit. This configuration was simulated while letting free choice ISLs be connected to the nearest available and consenting satellite, regardless of the orbit of the neighbor satellite. Under these conditions, the average network delay was lowered slightly (by about one percent), but the number of simultaneous ISL switch-overs was extremely high, as many as sixty simplex ISLs at a time. Under these simulation conditions, the switch-overs were allowed to occur not only at the high and low latitudes, but also at any latitude and anywhere in the entire network. Such topology reassignments are highly undesirable, since they transform the network topology very drastically within a very short time interval. During the transition period and while the network routing capability is readapted, the connectivity in some portion of the network may be very sparse, leaving insufficient capacity to transport all the ongoing traffic. Under these conditions, some satellites may switch several of their ISLs simultaneously. During heavy load conditions, some portions of the network may temporarily experience severe local overload that leads to packet mis-sequencing or even the loss of packets 26. Although such a topology is undesirable and is not employed in the preferred embodiment, the routing algorithm itself is capable of coping with such conditions and provide the best routing performance during such periods.

Gateway Link Assignment

The GSL assignment is controlled primarily by the gateway G, but is also subject to the consent of the satellite to whom the gateway wishes to assign a link. When a gateway G with a free or unassigned GSL seeks to assign a GSL to a satellite called "SAT" the following conditions are sought:

1. SAT must currently be visible from the gateway G;
2. The link to SAT must have a long useful life time. Any assigned GSL or ISL undergoes a disconnect procedure which is described below. The disconnect procedure occurs at a time called "Tdisc_alarm", which happens only seconds prior to loss of visibility between the link edge nodes. The time interval that elapses while the link is actually useful for service is called "Tuseful", and runs from time "Tnow" until the link disconnect procedure starts. In assigning a new GSL or an impermanent ISL, the network requires that Tuseful exceed some minimum value.
3. The unassigned GSL that is being "considered" by the gateway G must not currently be in use by the gateway for another of its GSLs. This objective diversifies the gateway connectivity.
4. The satellite must also be willing to assign a GSL. SAT may decline because it has no free GSLs or is undergoing an overload condition.
5. SAT should be as close as possible to G.

The details of the GSL engagement and selection method are stated below:

1. Initialize variables:
   a. min_dist=$1\times10^{99}$
   b. best_sat=<none>
2. Consider next satellite SAT. If none are left, then skip to Step 11.
3. If SAT is not visible, then return to Step 2.
4. If SAT is already used by gateway G, for one of its GSLs, then return to Step 2.
5. If SAT, which is currently visible, will not be visible in Tuseful+Tdisc_alarm from Tnow, then return to Step 2.
6. Ask SAT if it is willing to assign an ISL to G. If not, then return to Step 2.
7. Use the orbital position determination method described above to find "dist", the distance to SAT in Tuseful+Tdisc-alarm from Tnow.
8. If dist is the same or higher than the minimum distance, "min_dist", then return to Step 2, since a better choice has already been found.
9. Set min_dist equal to dist, and call the best candidate "best_sat". Set best_sat equal to SAT. SAT is the best choice found so far.
10. Return to Step 2.
11. If best_sat exists, i.e., best sat is not set to <none>, assign the GSL between G and best_sat, otherwise no new GSLs can currently be assigned.

Link Removal

The need for GSL or ISL link removal arises when two linked nodes in the network approach loss of visibility from each other. This approaching loss of visibility is detected by the link manager during a period of time called "Tdisc_alarm" before the actual loss of visibility. This advance warning gives the system sufficient time to execute an orderly disconnect procedure in which the network adapts to the new topology that reflects the loss of that link. Traffic is automatically re-routed away from the broken link to working links, and the system finds the new optimal routes in response to the new network topology. Detecting a loss of visibility ahead of time is accomplished using a look-ahead function called "node_dist". This function is implemented by a Node Positioning Determination System (NPDS). The term OUR_NODE represents a particular satellite S or gateway G, and the term NEIGHBOR_NODE stands for other satellite or gateway. "Tnow" is used to represent the current time, and "Tdisc_alarm" corresponds to some arbitrary time interval. The distance function node_dist(OUR_NODE, NEIGHBOR_NODE, Tnow, Tdisc_alarm) computes the distance between OUR_NODE and NEIGHBOR_NODE at Tdisc_alarm seconds from Tnow. If at time Tnow+Tdisc_alarm NEIGHBOR_NODE will not be visible from OUR_NODE, then the function returns a value of infinity and triggers a disconnect alarm at OUR_NODE. This function is called periodically by the link manager at the same time the link LINK_PROP_DELAY measurement is taken, and has a period of 50 msec in the simulation example. In one of the preferred embodiments of the invention, Tdisc_alarm is set to four seconds.

Abrupt Link Disconnect

Consider the network fragment shown in FIG. 81 displays a network fragment with gateways G1 and G2 communicating with each other via satellite S1. The link from gateway G1 to satellite S1 is about to be disconnected as a result of visibility loss (in Tdisc_alarm). The "simple" and erroneous approach would have gateway G1 and satellite S1 set their internal link LINK_PROP_DELAY to infinity to signal that the link is unavailable, and to let the normal adaptation process handle the new topology. This approach, however, would lead to a relatively long network reaction and adaptation period. During this interval, packets would wander through the network and would either fail to advance towards their final destination or would arrive out of sequence, since a consistent routing solution had not been achieved yet throughout the network. This is demonstrated in the simulation example shown in FIG. 81.

Orderly Link Disconnect

The present invention provides a mechanism that assures that no packets arrive in the wrong order or are lost during a disconnect process and the subsequent network adaptation. The approach is analogous to a clutch used in a car when shifting gears so as to smooth out the transition. Once a disconnect alarm is received, the link manager in each of the link edge nodes starts a process which gradually and artificially increases the value of LINK_PROP_DELAY. The router receives the value of LINK_PROP_DELAY from the link manager at face value, and recomputes its routing tables as necessary. Increasing LINK_PROP_DELAY gradually has the effect of slowly discouraging the use of the link by making the "cost" of using that particular link increasingly higher, yet still permitting its use. Some packets 26 approaching their destinations, assuming that the delay incurred by traveling through the link selected for them is still an acceptable delay, may be "surprised" to find the delay, i.e., the "cost", is now higher, but still worth paying now that they have already journeyed to the next node. Sooner or later, and depending on the diffusion process; speed and the rate at which LINK_PROP_DELAY is increased, nodes far away from the affected link find that routes using that link have become too "expensive" in terms of delay time, and switch to a "cheaper" route which avoids using the expensive link. Since the network connectivity of the present invention is "rich enough", meaning that there are many usable nodes which afford a wide variety of choices, the new cheaper route that is selected in place of the expensive route will provide service at a more "reasonable" price. The router itself is totally oblivious to the link disconnect process, and continues business as usual. The operation of the supply and demand of the link "marketplace", however, naturally discourages the use of relatively expensive links, and maintains the efficient operation of the entire system.

Simulation results show that ramping up the apparent value of LINK_PROP_DELAY by 500 milliseconds from its true measured value every ten milliseconds is a good compromise. The more extreme alternatives would be to ramp up LINK_PROP_DELAY too quickly, which would result in the scenario described above in which LINK_PROP_DELAY is ramped to infinity in zero time, and ramping up LINK_PROP_DELAY too slowly and unnecessarily dragging out the link disconnect process. The disconnect process must be completed within the period of time called Tdisc_alarm, which is set to four seconds in the simulation. This four seconds represents the time when the loss of visibility actually occurs. This approach allows the link to be used by those nodes which still find the link useful during the discouragement process. The link edge nodes, however, must decide when it is safe for them to remove the link from service. The first criteria which is employed by the two link edge nodes is that LINK_PROP_DELAY must have been ramped up enough to discourage the local router from using the link for reaching any other node in the network. This condition is verified by determining that the link is no longer an optimal link with respect to any other node in the network. In addition to meeting the first criteria, the link edge nodes must also be assured that all other nodes in the network have also been discouraged from using the link and have adapted to new routes which exclude the disconnected link.

This network-wide discouragement is accomplished by waiting until no traffic has arrived at the link for a sufficiently long time period, indicating that the news has spread into the network and adaptation has been completed by all nodes. In the simulation of the present invention, the link "quiet period." was required to be at least 300 msec from the time the disconnect process started. When both conditions have been achieved, the link is removed and the new link assignment procedure is activated to find a replacement link.

Finally, a red disconnect alarm is triggered ore second before the actual loss of visibility if the orderly link disconnect process has not been completed. This alarm should not occur in the preferred embodiment of the invention because the two conditions discussed above should always be met within the time periods specified. In poorly connected networks, however, such a condition may arise, indicating that topology holes have been created by link disconnects. Such holes may persist for a long time or be eliminated as soon as the link reassignment "plugs" the holes. No such holes were encountered in the simulation described above.

Disconnect Procedures

Four link disconnect procedures "Check Link LINK_PROP_DELAY", "Start Link Disconnect", "Check Link Free", and "Increase Link LINK_PROP_DELAY" are described below as method steps.

I. Procedure Check Link LINK_PROP_DELAY

A periodic process to check LINK_PROP_DELAY of link $\mathcal{L}$.

1. If $\mathcal{L}$ does not have disconnect permission, then the procedure is finished, since the link is a permanent link.
2. If $\mathcal{L}$ is not in state L_S5, then the procedure is finished. If $\mathcal{L}$ is in state L_S4, indicating a disconnect in progress, the value of LINK_PROP_DELAY is currently controlled by procedure increase_link_LINK_PROP_DELAY which increases its value artificially to discourage its use.
3. Measure the current value of LINK_PROP_DELAY.
4. Execute function node_dist(OUR_NODE, DEST_NODE, Tnow, Tdisc_alarm) to measure LINK_PROP_DELAY in Tdisc_alarm seconds from Tnow.
5. If a disconnect alarm is detected, then start procedure. Start_link_disconnect to handle the alarm and the procedure is finished.
6. Schedule next run of this procedure in TLINK_PROP_DELAY_check.

II. Procedure Start_link_disconnect

Initiates the link disconnect process.

1. Set link $\mathcal{L}$ state to L_S4, indicating a disconnect in progress.
2. If the local node is a satellite, as opposed to a gateway which does not transmit routing information messages, urgently trigger router adaptation.
3. Start procedure. Check_link_free to periodically check when the link may be removed safely.
4. Start procedure increase_link_LINK_PROP_DELAY to gradually increase the apparent link delay.

III. Procedure Check_link_free

Checks that conditions are met to complete link removal.

1. Set Tsoon=1 second.
2. Execute function node_dist(OUR_NODE, DEST_NODE, Tnow, Tsoon) to check if a node will lose visibility of its currently linked node within Tsoon seconds from Tnow. If yes, then an orderly disconnect was not completed, and link state must be set to L_S1, indicating a logical disconnect. Go to Step 8 to free the link.
3. Since the visibility between the two nodes is now known to persist within time Tsoon, check if it is already safe to remove the link.
4. Check if the link has not transmitted or received packets lately. If it has, conclude that:
   a. If transmitted $\mathcal{L}$ is still required locally for reaching some destinations; or
   b. If received, $\mathcal{L}$ is still an optimal link for some other node;
   then quit and re-schedule the process execution for 20 msec from the current time.
5. If the local node is a satellite, check with the local router to see if link $\mathcal{L}$ is still required for reaching satellites or gateways in the network. The link is "free", as far as the local router is concerned, if $\mathcal{L}$ is not an optimal link with respect to any node. If the link is still needed by the router, then quit and re-schedule the process execution for 20 msec from the current time.
6. Disconnect the link. Set the link state to L_S1, indicating a logical disconnect.
7. Ask the node at the remote link edge if it too has set link $\mathcal{L}$'s peer link to L_S1, indicating a coordinated link removal. If not, conclude that the remote node is not yet ready. Quit and re-schedule the process execution for 20 msec from the current time.
8. Free the link.

IV. Procedure Increase_link_LINK_PROP_DELAY

Ramps up LINK_PROP_DELAY to discourage the use of the link.

1. Set LINK_PROP_DELAY=LINK_PROP_DELAY+LINK_PROP_DELAYinc.
2. If node is a satellite, then trigger the router to perform adaptation based on the new value of LINK_PROP_DELAY.
3. Reschedule this procedure to execute at time LINK_PROP_DELAYinc_period. LINK_PROP_DELAY is thus increased at a rate of LINK_PROP_DELAYinc seconds every LINK_PROP_DELAYinc_period seconds.

Disconnecting a Link under a Heavy Load

Under heavy traffic loads, the link handover process is a "break-before-make" approach, meaning that the disconnect occurs before the link reassignment. During the time window, starting with the link disconnect procedure and ending with a new link reassignment and replacement, the remaining links must have sufficient capacity to carry the full traffic load. Each gateway must therefore have at least two GSLs, preferably to two different satellites, so that both links will not be disconnected simultaneously. Also, it is preferred to keep the number of links disconnected simultaneously by the same node to an absolute minimum, preferably to no more than one link at a time. This goal should not be difficult to realize, since the preferred embodiment of the invention is capable of "looking ahead" far enough and scheduling the disconnects appropriately. Bib allocating an extra link that is primarily reserved for gateways, a make-before-break approach can be implemented. This approach, although costing an extra link, will lower the traffic peak or overflow which may result from temporarily missing the disconnected link during the handover. If a network of nodes having OUR_NODE links employs appropriate handover scheduling, a make-before-break approach will require n+1 links (not 2n).

EXAMPLE

Orderly Link Disconnect and Reassignment

A distance function is applied to each GSL to find which GSL in the simulation will be the first to be disconnected because the visibility between its edge gateway and satellite has been lost. The GSL disconnect times are shown in Table 23. The first GSL to be disconnected is the link between gateway Jerusalem and satellite 216, as shown in FIG. 82. This occurs at t=61.006 seconds from Tnow=0. Note that Tables 6 through 17 reflect conditions at t=about 150 msec, and that the delay tables at t=61 second are totally different.

In the simulation, the initial simulation time is set to Tnow=60.7 seconds. The satellites are then set to their correct positions for that time, and the network is allowed to adapt. The topology adaptation phase takes about 135.0 msec. At about t=60.850, 200 full duplex DSOs are launched from Jerusalem to Rio as shown in FIG. 82. The call setup is complete within approximately twice the round trip delay between the two gateways, which takes about 87 msec. When the circuits are connected, traffic generation is started.

GSL Disconnect

The particular choice of connecting circuits to Rio in the simulation is based upon the fact that the link Jerusalem>216, which will be disconnected soon, happens to be Jerusalem's optimal link to Rio, and the simulation goal is the performance of a test of the disconnect process of links carrying traffic. The end-to-end delay from Jerusalem to Rio via satellite 2165 is 43.567 msec. The end-to-end delay via satellite 19 is 51.136 msec. Although the disconnect alarm is "ripe" at t=61.006 msec, it is not recognized until the link managers in Jerusalem and at satellite 216 run their periodic distance function at t=61.050. At that time, the alarm condition is recognized and the disconnect process is initiated. By the time the disconnect alarm sounds in Jerusalem and satellite 216, each gateway has received a few hundred packets. Jerusalem starts ramping up the LINK_PROP_DELAY of its link to satellite 216 as discussed above. When the value of LINK_PROP_DELAY is such that the delay to Rio via satellite 19 is lower than via 211, the optimal link to Rio is switched from 211 to satellite 19. All subsequent packets generated by Jerusalem are forwarded to Rio via satellite 19.

Figure 83:
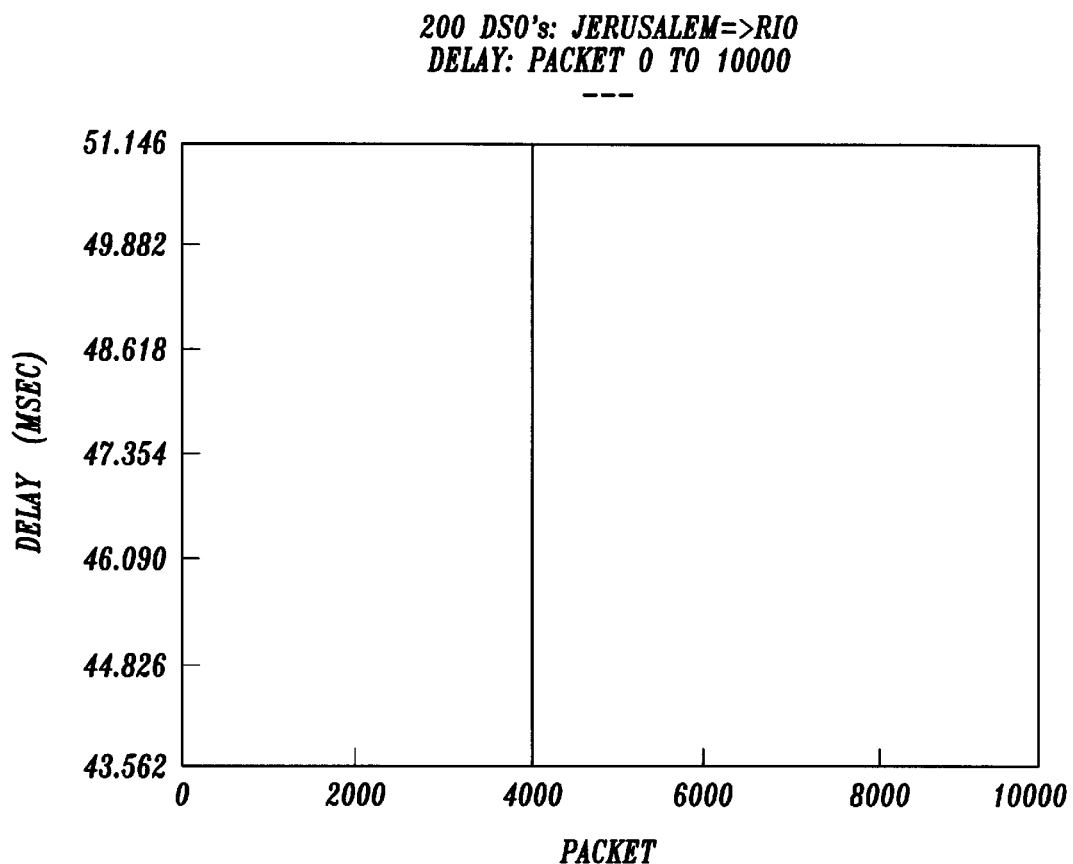
Figure 93:
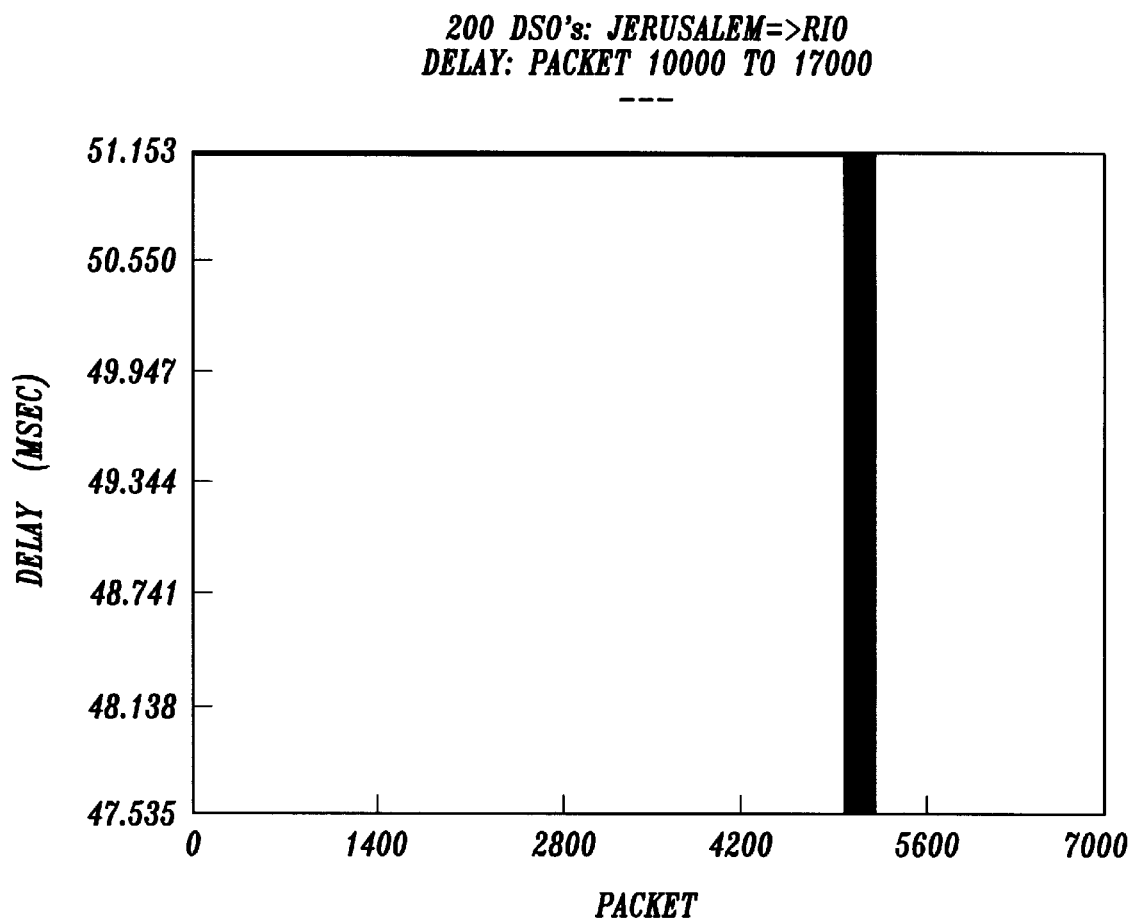

FIG. 83 shows the traffic received by Rio from Jerusalem. The first 4,000 packets are received via the "old" route at a delay of 43.562 msec, while subsequent packets are received via the "new" route. At t=60.850, the delay from Jerusalem to Rio via satellite 19 was 51.136 msec, compared to a delay of 51.146 msec which was experienced when receiving packet number 10,000. This slight difference is due to changes in the distance between the satellites along the path from Jerusalem to Rio. Although, in this particular case, the delay has increased by 10 microsec, in general it may also decrease over other time intervals. FIG. 93 illustrates the concept of "cleanliness". The delay following the switch increased abruptly by about 7.6 msec. This large delay change is the primary factor affecting the delay variance and must be absorbed by the circuit terminal equipment. The "make-before-break" approach does not guarantee that the delay jump during a disconnect will necessarily be reduced. This phenomenon occurs since the newly assigned link may not necessarily result in a delay with respect to at least some destinations, which is any lower than that provided by the already assigned link. However, it cannot hurt either, and will probably help in many cases at the expense of an extra link.

Figure 84:
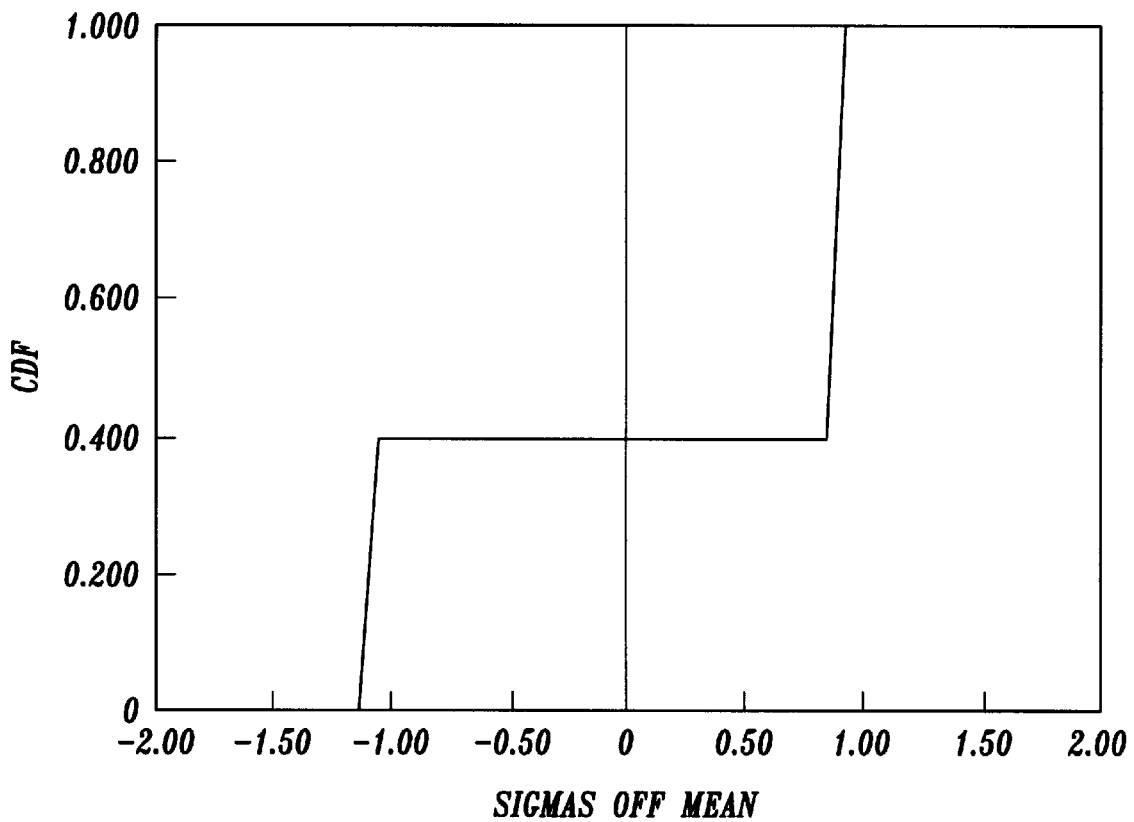
Figure 85:
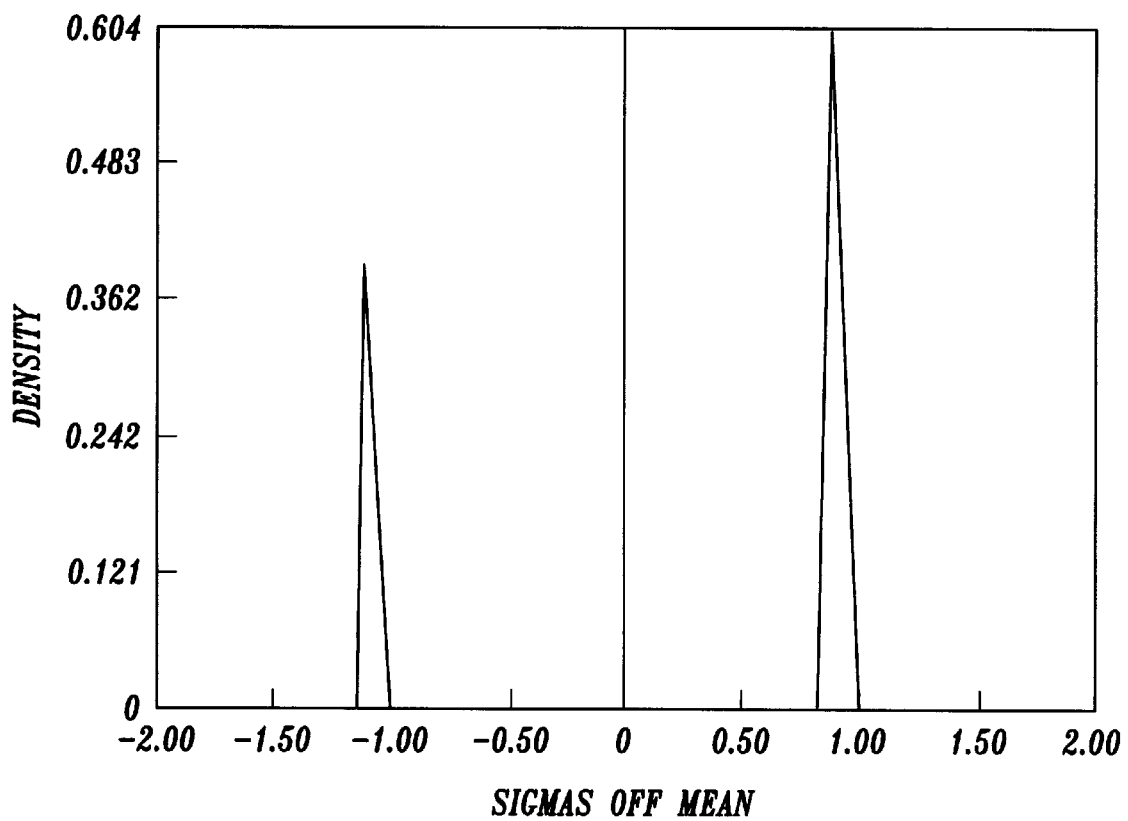
Figure 86:
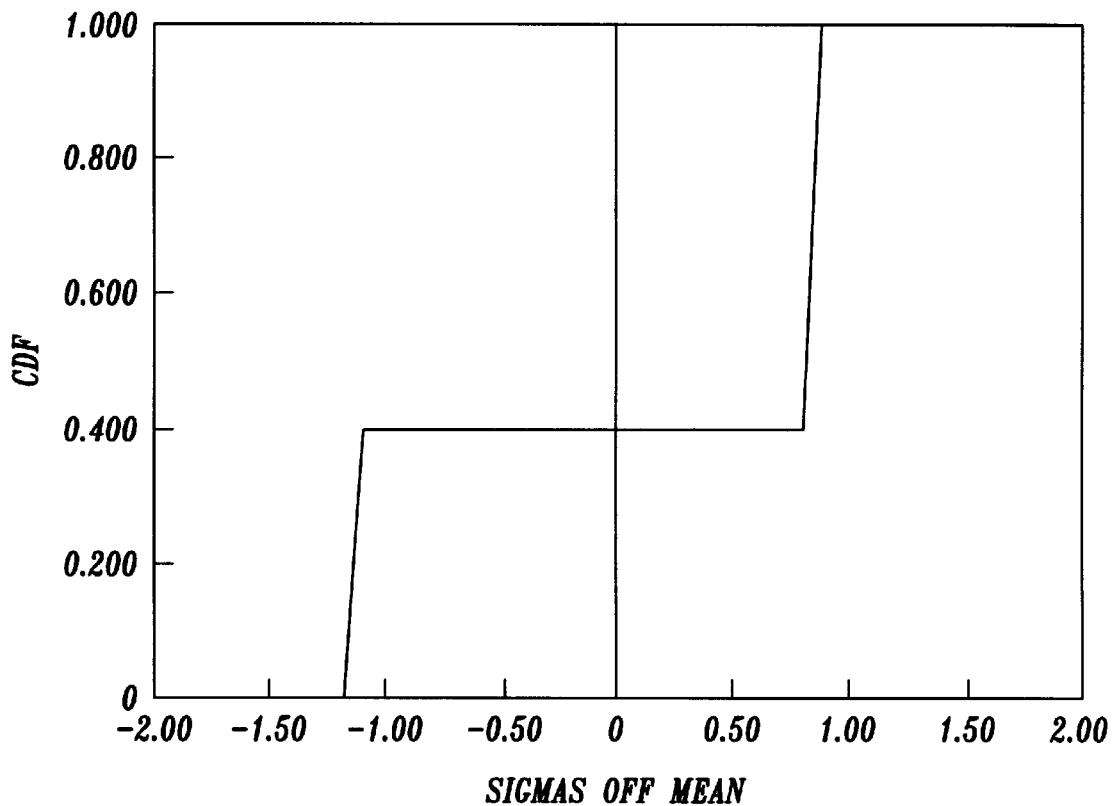
Figure 87:
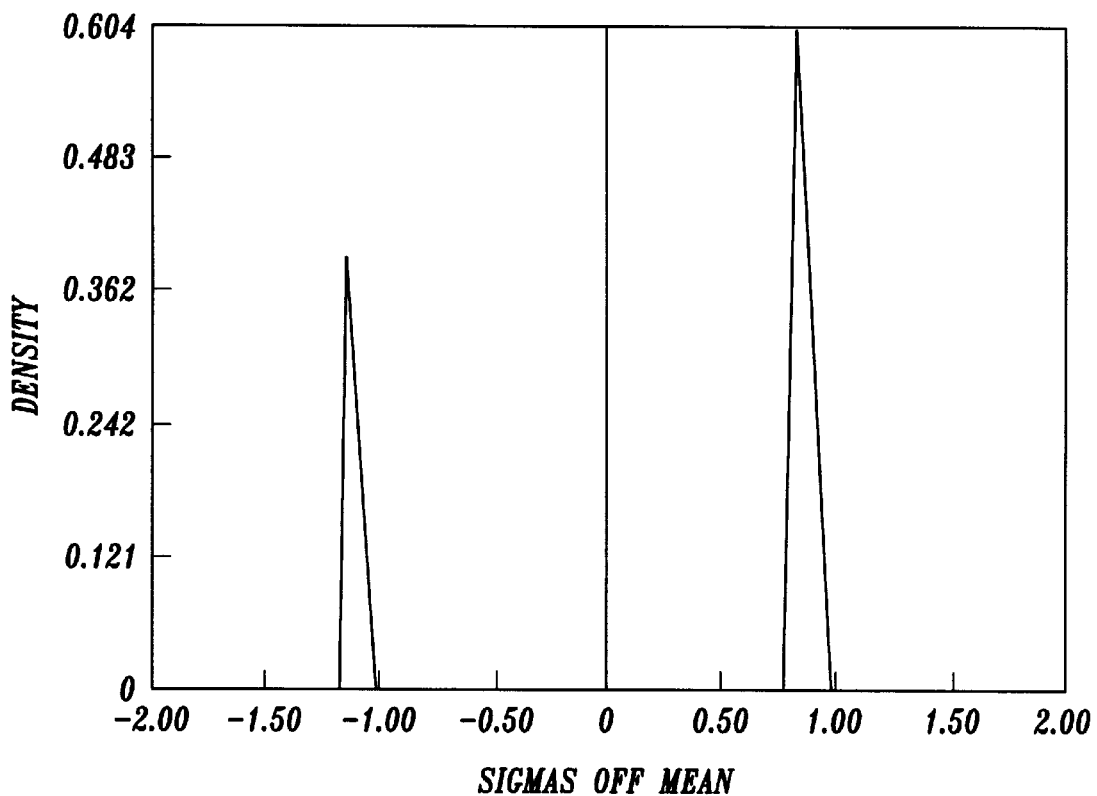

FIGS. 84 and 85 show the hops distribution and density functions of the first 10,000 packets received by Rio from Jerusalem. The hop density function shows that the number of hops resulting from the link removal in Jerusalem increases from 5 to 7. Those packets arriving before the switch correspond to the left spike in FIG. 85, and those arriving after the switch correspond to the right spike. FIGS. 86 and 87 show the delay distribution and density functions of the first 10,000 packets received by Rio from Jerusalem. The delay difference between packets received before and after the switch is clearly evident.

Figure 88:
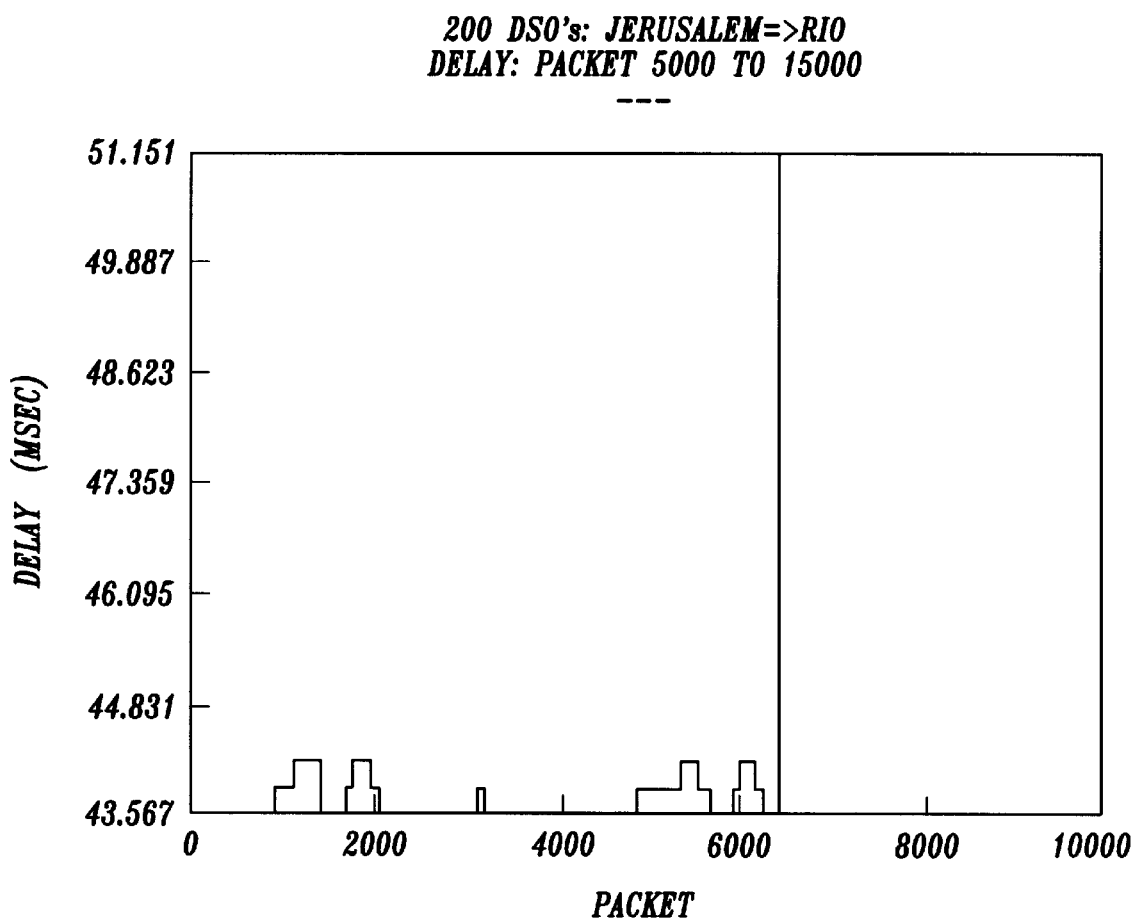

FIG. 88 shows the delay of packets received by Jerusalem from Rio. The first few hundred packets sent by Rio prior to the disconnect alarm are received by Jerusalem with almost no delay variance. Following the disconnect alarm, the entire network undergoes an adaptation process and continuously adapts in response to the reports of increasing LINK_PROP_DELAY from Jerusalem and satellite 216. During this transient period, packets enroute from Rio to Jerusalem may take different routes, depending on the particular state of the diffusion process at the time a packet arrives at some intermediate switching node. Despite the transient condition, all packets take very reasonable routes, as reflected in the relatively low delay variance of packets 1,000 through 6,500. When this process in satellites 216 has increased LINK_PROP_DELAY significantly, and after the news propagates in the diffusion process and reaches Rio, all newly generated packets numbered 6,500 and above take a route optimal for a condition in which the link from satellite 216 to Jerusalem is avoided altogether. At this stage, both satellite 216 and Jerusalem have not disconnected the link yet, because they are waiting for the safe removal conditions discussed earlier to be satisfied. These conditions are met around the time that packet 12,000 reaches Jerusalem.

Figure 89:
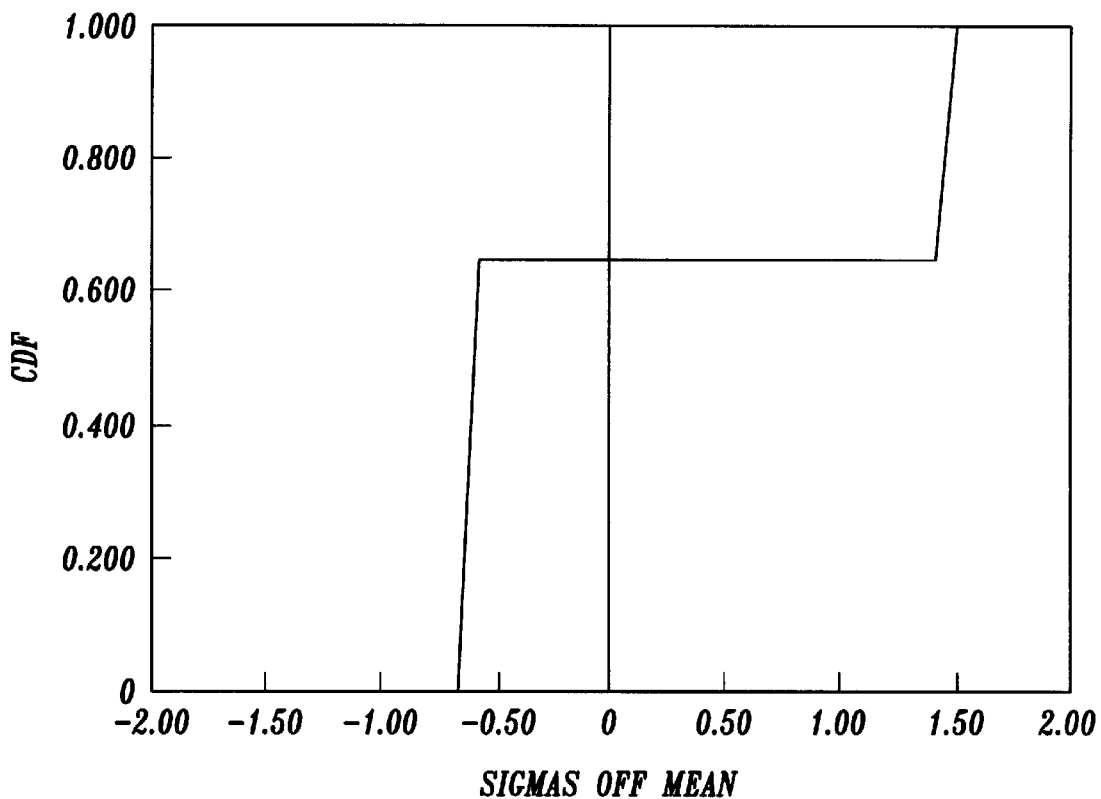
Figure 90:
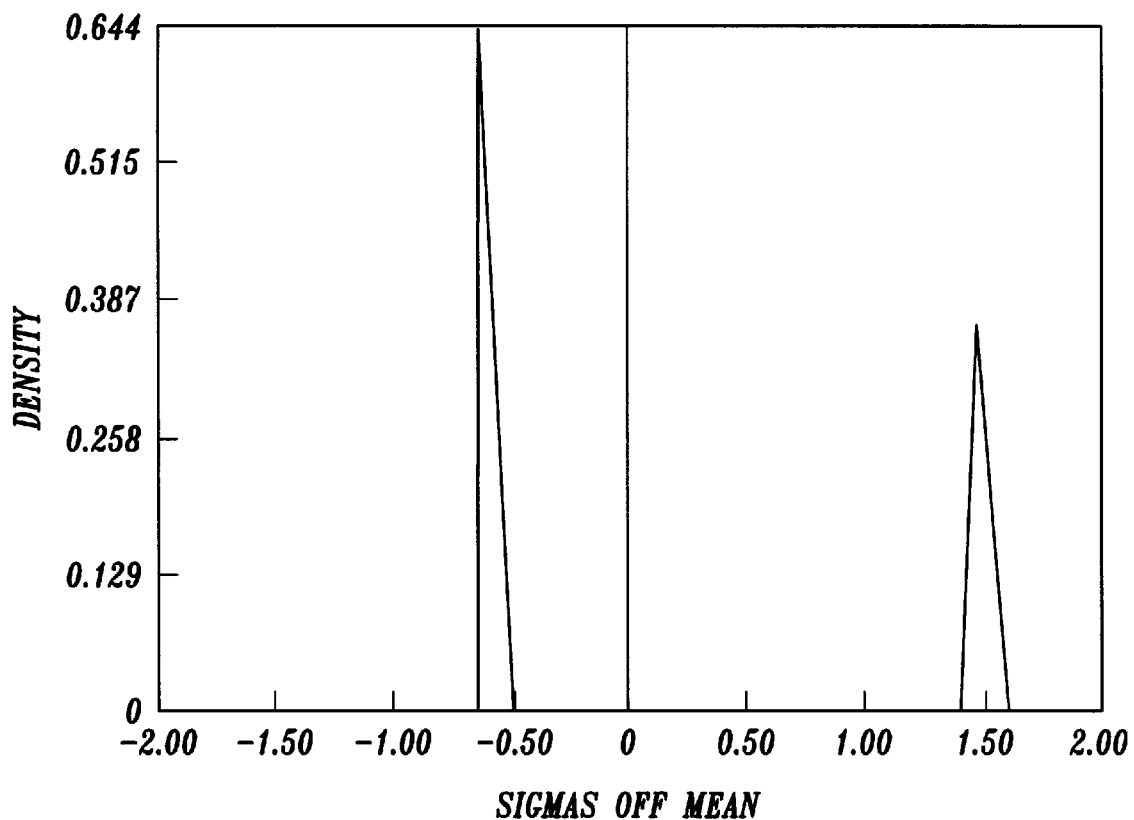
Figure 91:
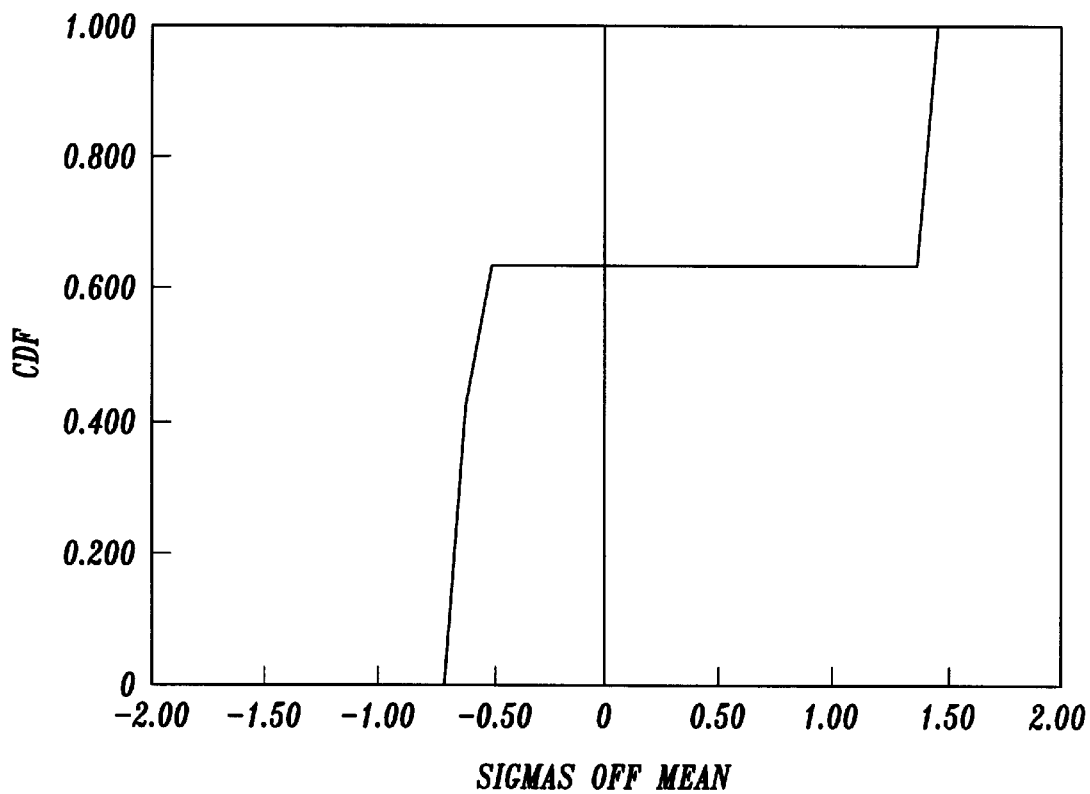
Figure 92:
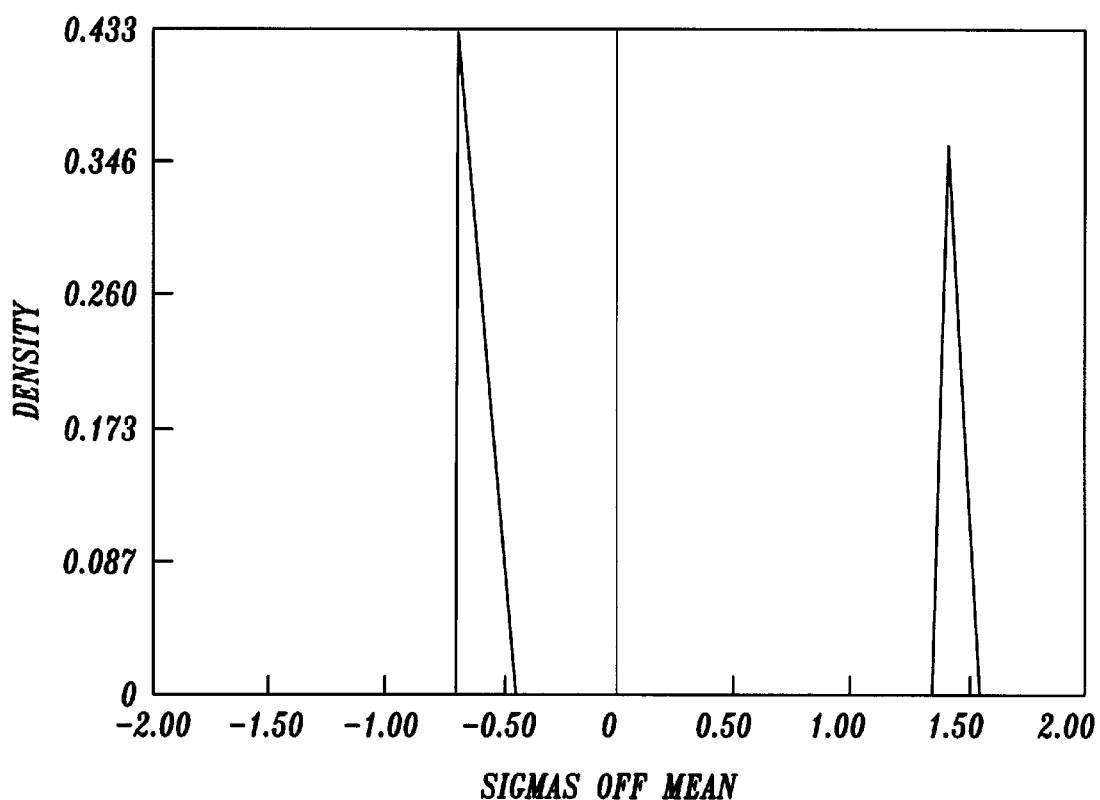

FIGS. 89 and 90 show the hops distribution and density functions of the first 10,000 packets received by Jerusalem from Rio. Note from the hop density function that despite the transient routing conditions, all packets take either a 5 hop or 7 hop route, depending on when the packet was launched by Rio with respect to the link disconnect process. In an unordered disconnect procedure, packets transported during the transient condition would have taken many more hops to reach the destination and at a considerably higher delay (See Abrupt Link Disconnect example below). Those packets originated by Rio before it has finally decided to switch its optimal route to Jerusalem correspond to the left spike and those arriving after the switch correspond to the right spike. FIGS. 91 and 92 show the delay distribution and density functions of the first 10,000 packets received by Jerusalem from Rio. As shown in FIGS. 91 and 92, the delay difference between packets received before and after the switch in Rio is clearly evident.

Disconnected GSL Reassignment

Figure 94:
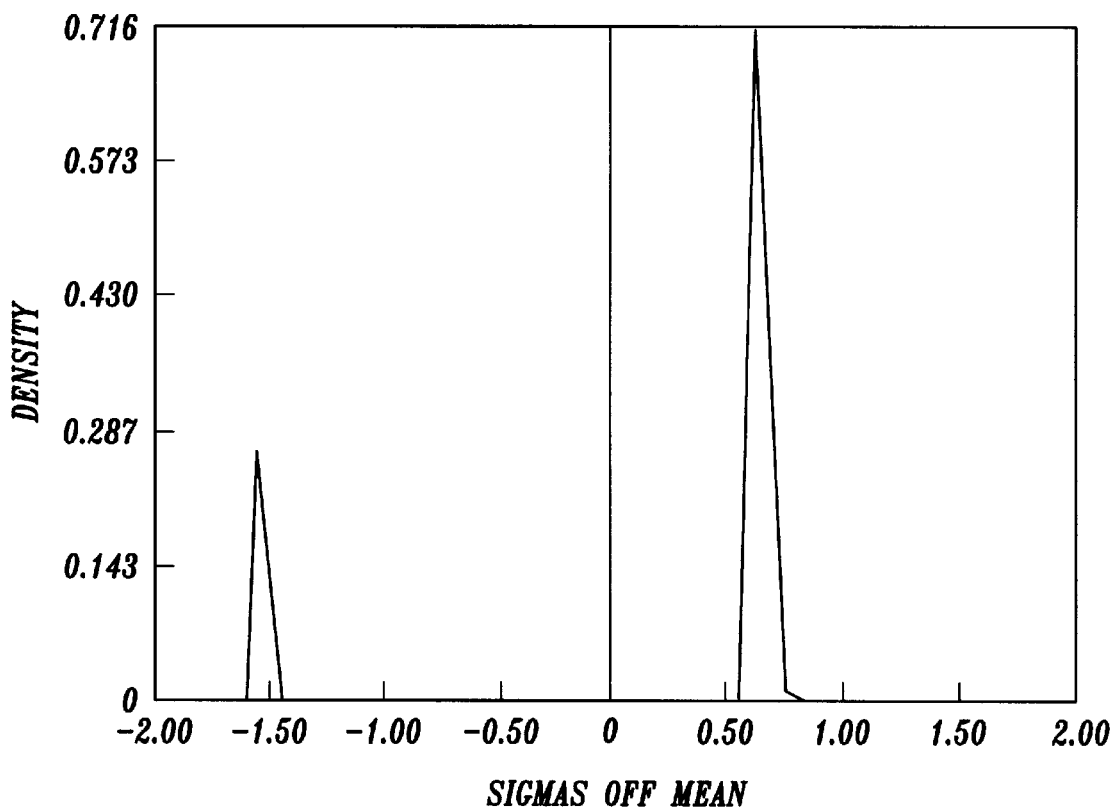
Figure 95:
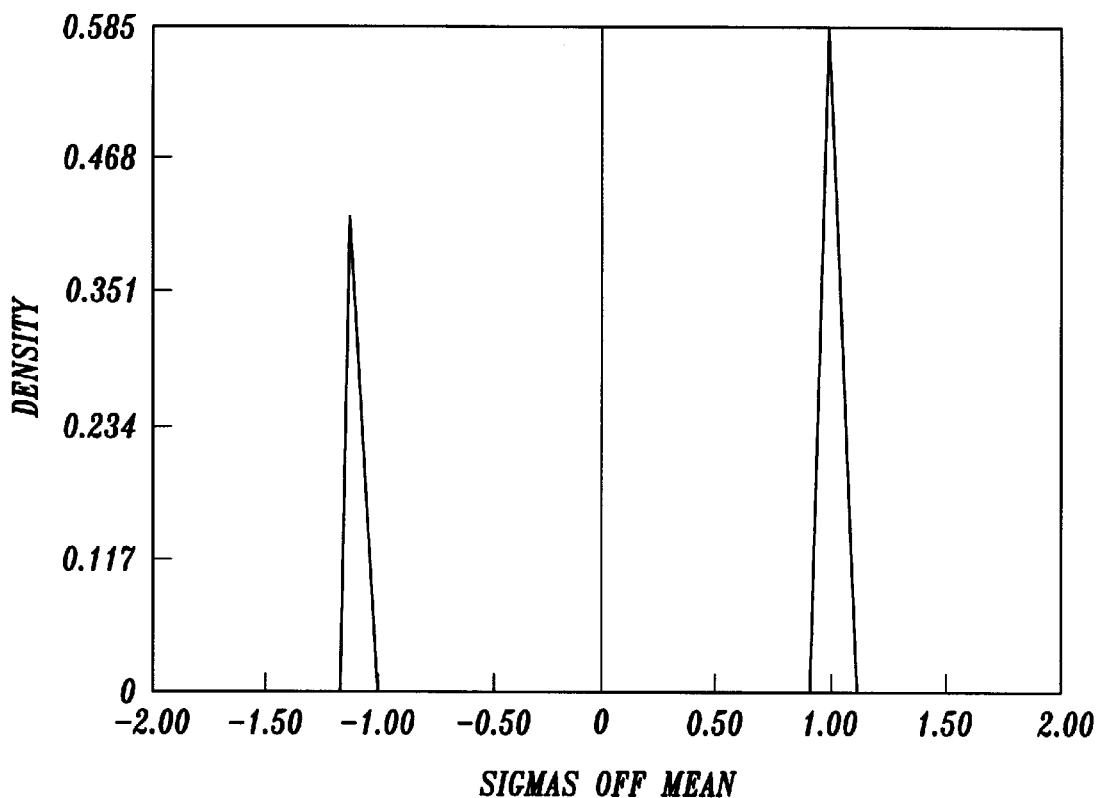
Figure 96:
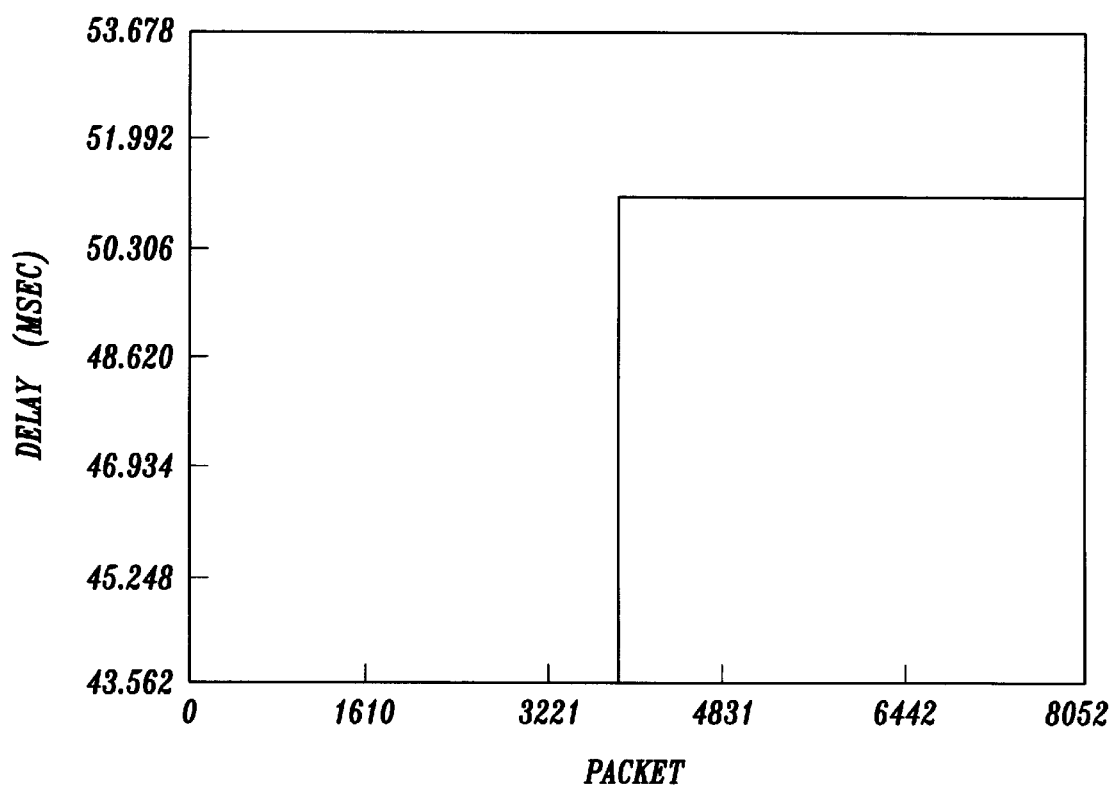
Figure 97:
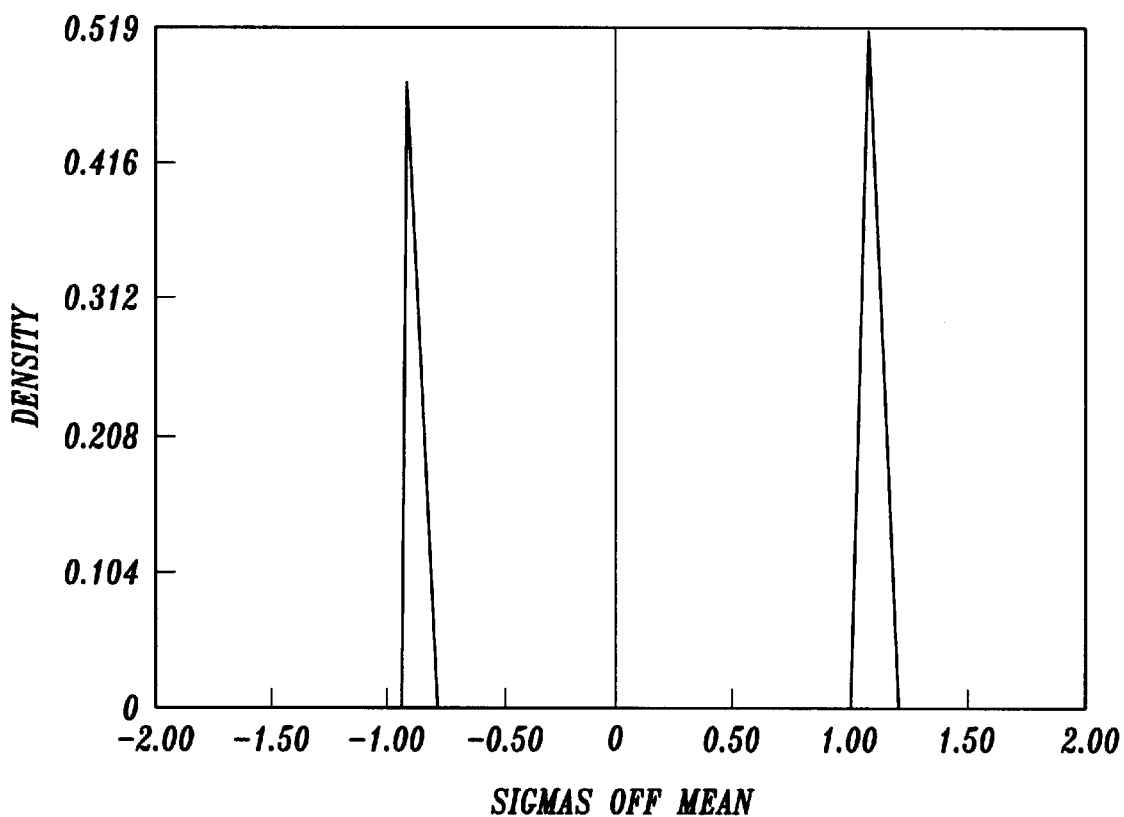
Figure 98:
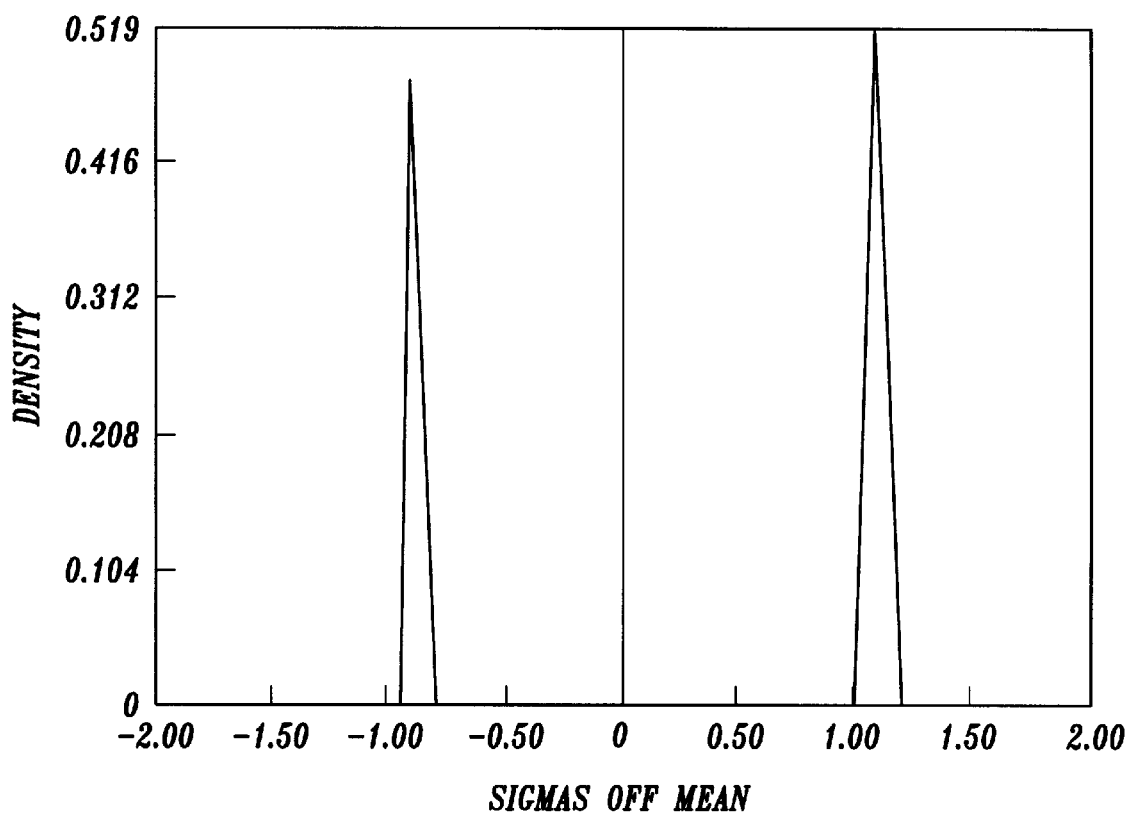
Figure 99:
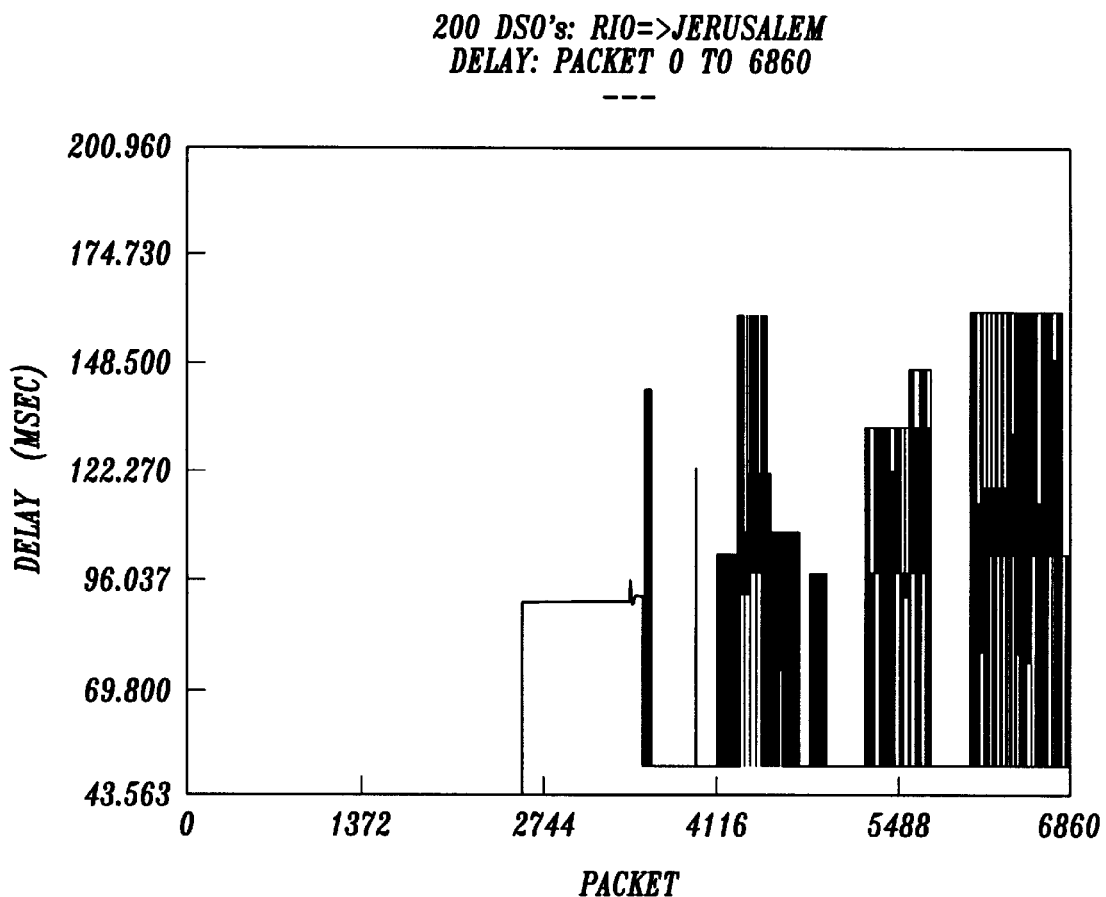
Figure 100:
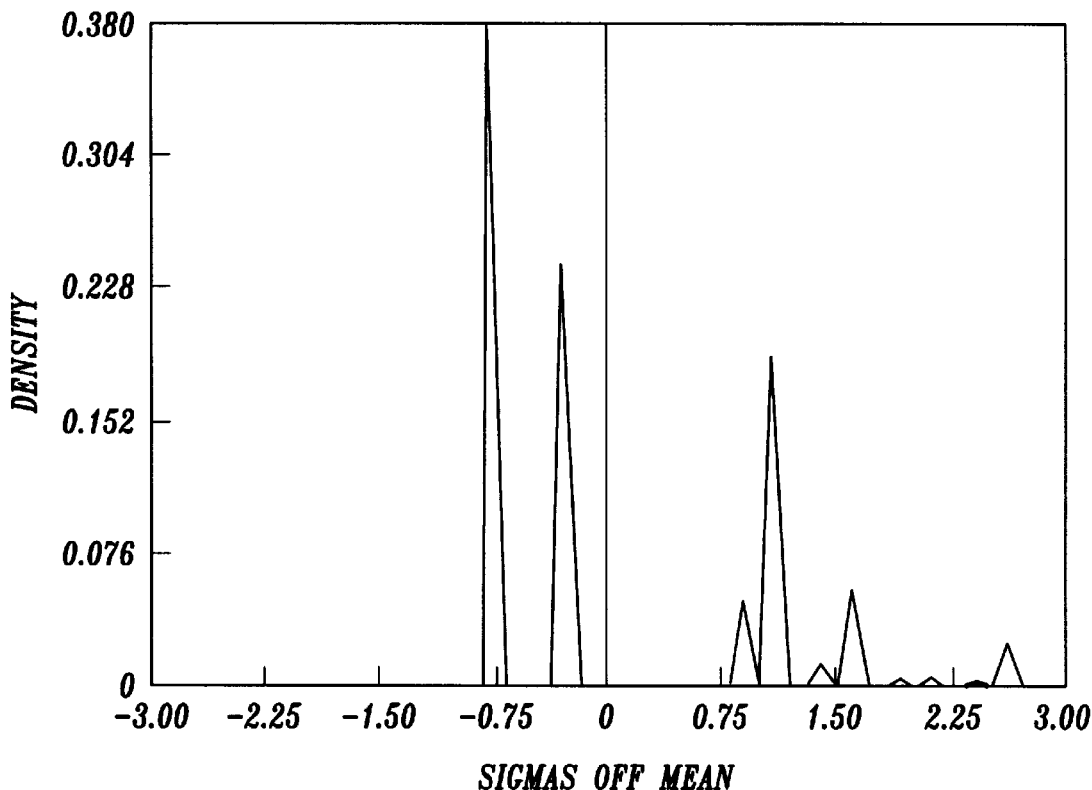
Figure 101:
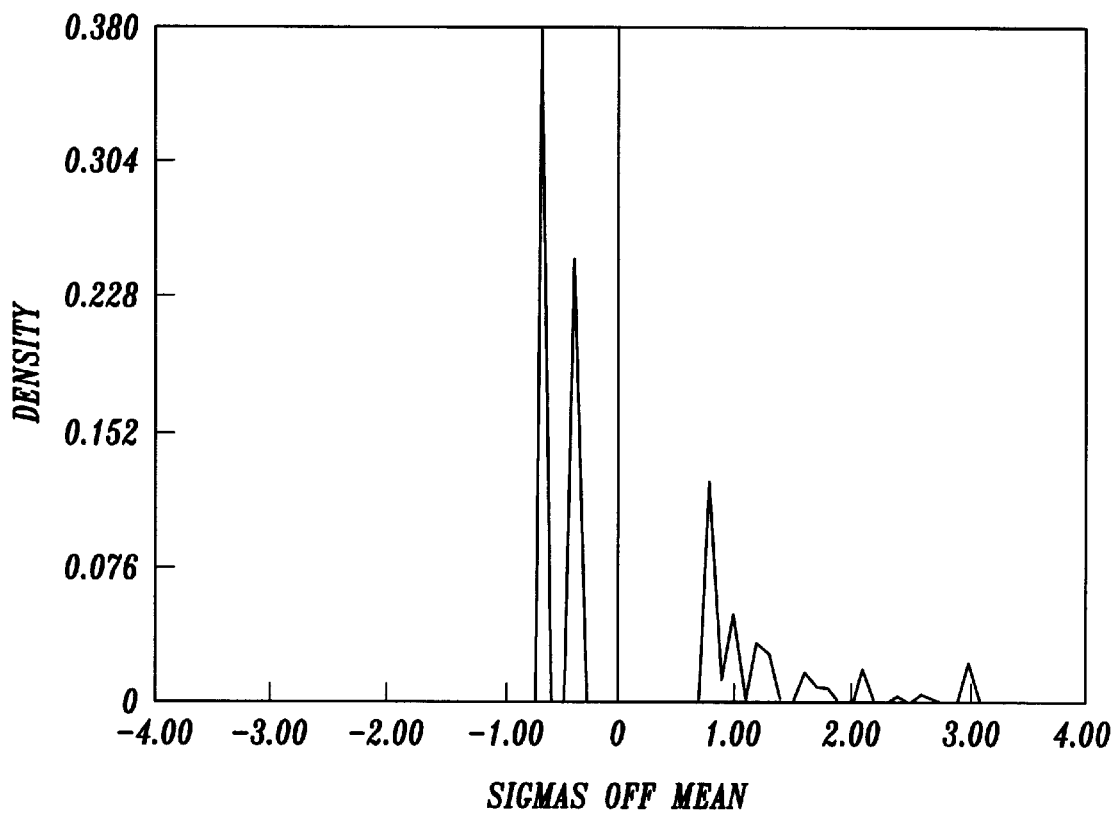

In this simulation, when packet 12,000 is received by Rio, the GSL between Jerusalem and satellite 216 is physically disconnected. The disconnect triggers the GSL assignment process described above to assign a new GSL between Jerusalem and satellite 231, which is the nearest consenting satellite to Jerusalem. The new GSL yields a delay of 47.535 msec from Jerusalem to Rio, and is therefore quickly selected by Jerusalem as its new optimal link to Rio, replacing the optimal link via satellite 19. All newly generated traffic in Jerusalem leaves Jerusalem via node 231. Packets originated shortly before the switch will take the "old" route via satellite 19, and may arrive slightly after the packets which were generated later, but took the new route via satellite 231. This behavior is seen in FIG. 93 as "ringing" around packet 15,000. FIG. 93 also provides an enlarged view of the area of interest. All packets after packet number 15,250 are received over the new and lower delay route. FIGS. 94 and 95 are the delay and hop density functions corresponding to the packets shown in FIG. 93. FIGS. 97 and 98 are the hop and delay density functions corresponding to the packets shown in FIG. 96. Rio will start using the new route as shown as soon as the routing diffusion process that originates in satellite 231 reaches Rio, perhaps some 100 msec later. A decrease in the end-to-end delay resulting from a link reassignment has the same effect as that caused by the abrupt increase in the delay resulting from a link disconnect. The direction of the delay change is of no importance, since only its absolute value affects network performance. The circuit terminal equipment must therefore be designed to cope with delay variance manifesting itself in the form of both abrupt delay increases and decreases

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters and satellite population and configuration statistics that have been disclosed above are intended to educate the reader about one preferred embodiment, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

10 Node hardware architecture
12 Common control
14 Tx internode messages
16 Rx internode messages
18 Receiver
20 Transmitters
22 Fast packet switch
24 Major node software systems
26 Packets
28 Header
30 Payload
32 CRC
34 Links
36 Link control
38 Routing process
40 Service demand
42 Subscribers
44 Routing algorithm
46 Routing tables
48 Local processes
50 Distributed network simulator
52 Dynamic packet routing process
54 Router
56 Packet router
58 Sorting network 60 Transmitter
62 Single event diffusion rate
64 Ideal diffusion rate
66 Monotonic diffusion rate
68 Node traffic flow
70 Channel decoder/encoder
72 Output module
74 Footprint output module
76 Fast packet switch architecture
78 Footprint input module
80 64 by 6 switch
82 Packet router
84 System message switching architecture
86 System architecture
88 Switch architecture
90 Distributed control architecture
92 RF power versus switch bandwidth
94 Traffic distribution
96 Switching architecture
98 Structure of packets
100 Input Packet Processor
102 128 by 128 switch
104 80 by 80 fast packet switch
106 Single switching cell
108 Footprint output module
110 Mobile terminal supercell beam transmitter
112 Fixed terminal supercell beam transmitter
114 Another schematic of RF power versus switch bandwidth
116 Another schematic of packet structure
118 Internal traffic flow
120 Signal flow
122 Architecture of satellite node
124 System message switching architecture
125 Input output packet processor (IOP) units
128 GSL switching matrix
130 Switching logic circuitry
132 FDDI ring
134 Input-output packet processor board
136 Another schematic of input packet processor
138 IPP common control
140 IPP four stage pipeline
142 IPP optimal route controller
144 OPP cell processor
146 Output packet structure
148 Message communication
150 128×128 switch
152 Switching cell
154 Graph of actual packet transmission time versus traffic load
156 Graph of message general rate versus time
158 Fast packet switch environment
160 Packet sorting prior to transmission
162 FPS output link selection hardware
F Fixed terminals
G Gateways
M Mobile terminals
P Portable terminals
S Satellites

What is claimed is:

1. A method of transporting a packet (26) from an origin node (OUR-NODE) to a destination node (DEST-NODE); said origin node (OUR-NODE) and said destination node (DEST-NODE) being located among a plurality of satellites (S) and among a plurality of gateways or terminals on the Earth; said method comprising the steps of:

(A.) receiving said packet (26) at said origin node (OUR-NODE) from one of
a plurality of portable terminals (P),
a plurality of mobile terminals (M),
a plurality of fixed terminals (F),
said plurality of stationary gateways (G) and
said plurality of satellites (S);
each of said plurality of satellites (S) having aboard a fast packet switch (22);
said packet (26) including a header (28) containing an address and a payload (30);

(B.) calculating a plurality of propagation delay vectors which estimate a time delay which said packet (26) would encounter in traveling from said origin node (OUR-NODE) to said destination node (DEST-NODE) over a plurality of links ($\mathcal{L}$) using orbit position information about each node; said orbit position information being generated onboard each of said plurality of satellites (S); each of said plurality of satellites (S) traveling in low Earth orbits and constantly moving with respect to the Earth; said vectors using an algorithm in which one of said plurality of propagation delay vectors in one of said plurality of links ($\mathcal{L}$) between said origin node (OUR-NODE) and said destination node (DEST-NODE) is represented by a variable "OUR-DELAY-EST (DEST-NODE, $\mathcal{L}$)", a current propagation time delay in one of said plurality of links ($\mathcal{L}$) connecting said origin node (OUR-NODE) to a neighboring node (OUR-NEIGHBOR ($\mathcal{L}$)) is represented by a variable "LINK-PROP-DELAY ($\mathcal{L}$)", a current link time delay for packet queuing, including time to be spent by said packet (26) in a link buffer awaiting transmission (Twait-in-q) and time for transmission (Ttx), is represented by a variable "LINK-Q-DELAY ($\mathcal{L}$)";

a least time delay for transmission of said packet (26) from a neighboring node (OUR-NEIGHBOR ($\mathcal{L}$)) to said destination node (DEST-NODE) determined by said neighboring node calculating a time delay of packet transmission over each link ($\mathcal{L}$) from said neighboring node (OUR-NEIGHBOR ($\mathcal{L}$)) to said destination node (DEST-NODE), is represented by a variable "OUR-NEIGHBOR-DELAY-EST (DEST-NODE, OUR-NEIGHBOR ($\mathcal{L}$))";

said algorithm having the form $$\text{OUR-DELAY-EST (DEST-NODE, } \mathcal{L}) = \text{LINK-PROP-DELAY}(\mathcal{L}) +$$
$$\text{LINK-Q-DELAY}(\mathcal{L}) + \text{OUR-NEIGHBOR-DELAY-EST(DEST-}$$
$$\text{NODE, OUR-NEIGHBOR}(\mathcal{L}));$$

(C.) selecting one of said plurality of propagation delay vectors (OUR-DELAY-EST (DEST-NODE, $\mathcal{L}$) which constitutes a minimum time delay for forwarding said packet (26) from said origin node (OUR-NODE) to said destination node (DEST-NODE) and designating that selected propagation delay vector as an optimal link (opt-link); and (D.) routing said packet (26) from said origin node (OUR-NODE) through said fast packet switch (22) aboard one of said plurality of satellites (S) to said destination node (DEST-NODE) via said optimal link (opt-link) between said fast packet switch (22) and said destination node (DEST-NODE); said fast packet switch (22) being capable of functioning as a sovereign, autonomous and independent switching node among said plurality of satellites (S) traveling in low Earth orbit.

2. A method of transporting a packet (26) from an origin node (OUR-NODE) to a destination node (DEST-NODE); said origin node (OUR-NODE) and said destination node (DEST-NODE) being located among a plurality of satellites (S) and among a plurality of gateways or terminals on the Earth; said method comprising the steps of:

(A.) receiving said packet (26) at said origin node (OUR-NODE) from one of
 a plurality of portable terminals (P),
 a plurality of mobile terminals (M),
 a plurality of fixed terminals (F),
 said plurality of stationary gateways (G) and
 said plurality of satellites (S);
  each of said plurality of satellites (S) having aboard a fast packet switch (22);
  each of said plurality of satellites (S) traveling in low Earth orbits and constantly moving with respect to the Earth;
said packet (26) including a header (28) containing an address and a payload (30);

(B.) estimating at said origin node (OUR-NODE) a time delay (OUR-DELAY-EST(DEST-NODE, $\mathcal{L}$)) which said packet (26) would encounter in traveling from said origin node (OUR-NODE) to said destination node (DEST-NODE) over a plurality of links ($\mathcal{L}$) by use of an algorithm calculating a plurality of propagation delay vectors using
 a current propagation time delay (LINK-PROP-DELAY ($\mathcal{L}$)) in one of said plurality of links ($\mathcal{L}$) connecting said origin node (OUR-NODE) to a neighboring node (OUR-NEIGHBOR ($\mathcal{L}$)),
 a current link time delay for packet queuing (LINK-Q-DELAY ($\mathcal{L}$)), including time to be spent by said packet (26) in a link buffer awaiting transmission (Twait-in-q) and time for transmission (Ttx), and
 a least transmission delay over each link from said neighboring node to said destination node (OUR-NEIGHBOR-DELAY-EST (DEST-NODE, OUR-NEIGHBOR ($\mathcal{L}$)));
said current propagation time delay (LINK-PROP-DELAY ($\mathcal{L}$)), said current link time delay for packet queuing (LINK-Q-DELAY ($\mathcal{L}$)) being generated onboard each of said plurality of satellites (S);
said least transmission delay over each link from said neighboring node to said destination node (OUR-NEIGHBOR-DELAY-EST (DEST-NODE, OUR-NEIGHBOR ($\mathcal{L}$))) being calculated at said neighboring node (OUR-NEIGHBOR ($\mathcal{L}$)) in like manner as at said origin node (OUR-NODE), and considering the delay from said neighboring node (OUR-NEIGHBOR ($\mathcal{L}$)) to said destination node (DEST-NODE) over all of said links ($\mathcal{L}$);
said least transmission delay over each link ($\mathcal{L}$) from said neighboring node to said destination node (OUR-NEIGHBOR-DELAY-EST (DEST-NODE, OUR-NEIGHBOR ($\mathcal{L}$))) being distributed to all other nodes, repetitively in a diffusion manner, as each node calculates said least transmission delay (OUR-NEIGHBOR-DELAY-EST (DEST-NODE, OUR-NEIGHBOR ($\mathcal{L}$))), iteratively; and (C) maintaining a table of neighboring node identification (OUR-NEIGHBOR) at the origin node (OUR-NODE) and placing therein identification of said neighboring node at a remote edge of each of said links ($\mathcal{L}$) from said origin node (OUR-NODE) to said neighboring node (OUR-NEIGHBOR ($\mathcal{L}$));

(D) maintaining a table of transmission delay estimates (OUR-DELAY-EST(DEST-NODE, $\mathcal{L}$) at the origin node (OUR-NODE) and placing therein values of said current propagation time delay (LINK-PROP-DELAY ($\mathcal{L}$)), said current link time delay for packet queuing (LINK-Q-DELAY ($\mathcal{L}$)), and said least transmission delay over each link ($\mathcal{L}$) from said neighboring node to said destination node (OUR-NEIGHBOR-DELAY-EST (DEST-NODE, OUR-NEIGHBOR ($\mathcal{L}$)));

(E) determining an optimal link (opt-link) for transmission of said packet (26) by finding in said table of delay estimates (OUR-DELAY-EST(DEST-NODE, $\mathcal{L}$) a combination of links ($\mathcal{L}$) which produces lowest transmission delay from said origin node (OUR-NODE) to said destination node (DEST-NODE);

(F) routing transmission of said packet (26) through said fast packet switch (22) to a next node (OUR-NEIGHBOR) in said optimal link (opt-link); and (G) repeating steps (A) through (F) at a next node which becomes said origin node (OUR NODE) for this purpose, until said packet (26) reaches said destination node (DEST-NODE).

3. The method as claimed in claim 2 in which the step of estimating a time delay (OUR-DELAY-EST(DEST-NODE, $\mathcal{L}$)) which said packet (26) would encounter in traveling from said origin node (OUR-NODE) to said destination node (DEST-NODE) over a plurality of links ($\mathcal{L}$) by use of an algorithm calculating a plurality of propagation delay vectors, includes the step of:
employing an algorithm having the form OUR-DELAY-EST (DEST-NODE, $\mathcal{L}$) = LINK-PROP-DELAY ($\mathcal{L}$)+

LINK-Q-DELAY ($\mathcal{L}$) + OUR-NEIGHBOR-DELAY-EST(DEST-

NODE, OUR-NEIGHBOR($\mathcal{L}$)).

4. A method of transporting a packet (26) from an origin node (OUR-NODE) to a destination node (DEST-NODE); said origin node (OUR-NODE) and said destination node (DEST-NODE) being located among a plurality of satellites (S) and among a plurality of gateways or terminals on the Earth; said method comprising the steps of:

(A.) receiving said packet (26) at said origin node (OUR-NODE) from one of
 a plurality of portable terminals (P),
 a plurality of mobile terminals (M),
 a plurality of fixed terminals (F),
 said plurality of stationary gateways (G) and
 said plurality of satellites (S);
 each of said plurality of satellites (S) having aboard a fast packet switch (22);
said packet (26) including a header (28) containing an address and a payload (30);

(B.) calculating a plurality of propagation delay vectors which estimate a time delay which said packet (26)

would encounter in traveling from said origin node (OUR-NODE) to said destination node (DEST-NODE) over a plurality of links ($\mathcal{L}$) using orbit position information about the nodes; each of said plurality of satellites (S) traveling in low Earth orbits and constantly moving with respect to the Earth; said vectors using an algorithm in which one of said plurality of propagation delay vectors in one of said plurality of links ($\mathcal{L}$) between said origin node (OUR-NODE) and said destination node (DEST-NODE) is represented by a variable "OUR-DELAY-EST (DEST-NODE, $\mathcal{L}$)", a current propagation time delay in one of said plurality of links ($\mathcal{L}$) connecting origin node (OUR-NODE) to a neighboring node (OUR-NEIGHBOR ($\mathcal{L}$)) is represented by a variable "LINK-PROP-DELAY ($\mathcal{L}$)", a current link time delay for packet queuing, including time to be spent by said packet (26) in a link buffer awaiting transmission (Twait-in-q) and time for transmission (Ttx), is represented by a variable "LINK-Q-DELAY ($\mathcal{L}$)", a least time delay for transmission of said packet (26) from a neighboring node (OUR-NEIGHBOR ($\mathcal{L}$)) to said destination node (DEST-NODE) determined by said neighboring node calculating a time delay of packet transmission over each link ($\mathcal{L}$) from said neighboring node (OUR-NEIGHBOR ($\mathcal{L}$)) to said destination node (DEST-NODE), is represented by a variable "OUR-NEIGHBOR-DELAY-EST(DEST-NODE, OUR-NEIGHBOR($\mathcal{L}$));

said algorithm having the form

OUR-DELAY-EST (DEST-NODE, $\mathcal{L}$) = LINK-PROP-DELAY($\mathcal{L}$) + LINK-Q-DELAY($\mathcal{L}$) + OUR-NEIGHBOR-DELAY-EST(DEST-NODE, OUR-NEIGHBOR($\mathcal{L}$));

(C.) selecting one of said plurality of propagation delay vectors (OUR-DELAY-EST (DEST-NODE, $\mathcal{L}$) which constitutes a minimum time delay for forwarding said packet (26) from said origin node (OUR-NODE) to said destination node (DEST-NODE) and designating that selected propagation delay vector as an optimal link (opt-link); and (D.) routing said packet (26) from said origin node (OUR-NODE) through said fast packet switch (22) aboard one of said plurality of satellites (S) to said destination node (DEST-NODE) via said optimal link (opt-link) between said fast packet switch (22) and said destination node (DEST-NODE); said fast packet switch (22) being capable of functioning as a sovereign, autonomous and independent switching node among said plurality of satellites (S) traveling in low Earth orbit.

5. A method of transporting a packet (26) from an origin node (OUR-NODE) to a destination node (DEST-NODE); said origin node (OUR-NODE) and said destination node (DEST-NODE) being located among a plurality of satellites (S) and among a plurality of gateways or terminals on the Earth; said method comprising the steps of:

(A.) receiving said packet (26) at said origin node (OUR-NODE) from one of a plurality of portable terminals (P),
a plurality of mobile terminals (M),
a plurality of fixed terminals (F),
said plurality of stationary gateways (G) and
said plurality of satellites (S);
each of said plurality of satellites (S) having aboard a fast packet switch (22);
each of said plurality of satellites (S) traveling in low Earth orbits and constantly moving with respect to the Earth;
said packet (26) including a header (28) containing an address and a payload (30);

(B.) estimating at said origin node (OUR-NODE) a time delay (OUR-DELAY-EST (DEST-NODE, $\mathcal{L}$)) which said packet (26) would encounter in traveling from said origin node (OUR-NODE) to said destination node (DEST-NODE) over a plurality of links ($\mathcal{L}$) by use of an algorithm calculating a plurality of propagation delay vectors using a current propagation time delay (LINK-PROP-DELAY ($\mathcal{L}$)) in one of said plurality of links ($\mathcal{L}$) connecting said origin node (OUR-NODE) to a neighboring node (OUR-NEIGHBOR ($\mathcal{L}$)), a current link time delay for packet queuing (LINK-Q-DELAY ($\mathcal{L}$)), including time to be spent by said packet (26) in a link buffer awaiting transmission (Twait-in-q) and time for transmission (Ttx), and a least transmission delay over each link from said neighboring node to said destination node (OUR-NEIGHBOR-DELAY-EST (DEST-NODE, OUR-NEIGHBOR ($\mathcal{L}$)));

said current propagation time delay (LINK-PROP-DELAY ($\mathcal{L}$)), said current link time delay for packet queuing (LINK-Q-DELAY ($\mathcal{L}$)) being generated onboard each of said plurality of satellites (S);

said least transmission delay over each link from said neighboring node to said destination node (OUR-NEIGHBOR-DELAY-EST (DEST-NODE, OUR-NEIGHBOR ($\mathcal{L}$))) being calculated at said neighboring node (OUR-NEIGHBOR ($\mathcal{L}$)) in like manner as at said origin node (OUR-NODE), and considering the delay from said neighboring node (OUR-NEIGHBOR ($\mathcal{L}$)) to said destination node (DEST-NODE) over all of said links ($\mathcal{L}$);

said least transmission delay over each link ($\mathcal{L}$) from said neighboring node to said destination node (OUR-NEIGHBOR-DELAY-EST (DEST-NODE, OUR-NEIGHBOR ($\mathcal{L}$))) being distributed to other nodes repetitively as the nodes calculate said least transmission delay (OUR-NEIGHBOR-DELAY-EST (DEST-NODE, OUR-NEIGHBOR ($\mathcal{L}$))), iteratively; and (C.) maintaining a table of neighboring node identification (OUR-NEIGHBOR) at the origin node (OUR-NODE) and placing therein identification of said neighboring node at a remote edge of each of said links ($\mathcal{L}$) from said origin node (OUR-NODE) to said neighboring node (OUR-NEIGHBOR ($\mathcal{L}$));

(D.) maintaining a table of transmission delay estimates (OUR-DELAY-EST (DEST-NODE, $\mathcal{L}$) at the origin node (OUR-NODE) and placing therein values of said current propagation time delay (LINK-PROP-DELAY ($\mathcal{L}$)), said current link time delay for packet queuing (LINK-Q-DELAY ($\mathcal{L}$)), and said least transmission delay over each link ($\mathcal{L}$) from said neighboring node to said destination node (OUR-NEIGHBOR-DELAY-EST (DEST-NODE, OUR-NEIGHBOR ($\mathcal{L}$)));

(E.) determining an optimal link (opt-link) for transmission of said packet (26) by finding in said table of delay estimates (OUR-DELAY-EST (DEST-NODE, $\mathcal{L}$) a combination of links ($\mathcal{L}$) which produces lowest transmission delay from said origin node (OUR-NODE) to said destination node (DEST-NODE);

(F.) routing transmission of said packet (26) through said fast packet switch (22) to a next node (OUR-NEIGHBOR) in said optimal link (opt-link); and (G.) repeating steps (A) through (F) at a next node which becomes said origin node (OUR-NODE) for this purpose, until said packet (26) reaches said destination node (DEST-NODE).

6. The method as claimed in claim 5 in which the step of estimating a time delay (OUR-DELAY-EST (DEST-NODE $\mathcal{L}$)) which said packet (26) would encounter in traveling from said origin node(OUR-NODE) to said destination node (DEST-NODE) over a plurality of links ($\mathcal{L}$) by use of an algorithm calculating a plurality of propagation delay vectors includes the step of:

employing an algorithm having the form $$\text{OUR-DELAY-EST (DEST-NODE, } \mathcal{L}) = \text{LINK-PROP-DELAY}(\mathcal{L}) +$$
$$\text{LINK-Q-DELAY}(\mathcal{L}) + \text{OUR-NEIGHBOR-DELAY-EST(DEST-NODE,}$$
$$\text{OUR-NEIGHBOR}(\mathcal{L})).$$

* * * * *

UNITED STATES PATENT AND TRADEMARK OFFICE
CERTIFICATE OF CORRECTION

PATENT NO. : 6,084,864
DATED : July 4, 2000
INVENTOR(S) : M.L. Liron

It is certified that error appears in the above-identified patent and that said Letters Patent is hereby corrected as shown below:

Title page,

| COLUMN | LINE | | |
|---|---|---|---|
| [63] Pg. 1, col. 1 | Related U.S. Application Data | "07/016,204, Feb. 18, 1987" should read --07/016,204, Feb. 9, 1993-- | |

Signed and Sealed this

Twenty-second Day of May, 2001

Attest:

NICHOLAS P. GODICI

Attesting Officer    Acting Director of the United States Patent and Trademark Office